US010412472B2

(12) United States Patent
Beshai

(10) Patent No.: US 10,412,472 B2
(45) Date of Patent: Sep. 10, 2019

(54) CONTIGUOUS NETWORK

(71) Applicant: Maged E. Beshai, Maberly (CA)

(72) Inventor: Maged E. Beshai, Maberly (CA)

( * ) Notice: Subject to any disclaimer, the term of this patent is extended or adjusted under 35 U.S.C. 154(b) by 0 days.

(21) Appl. No.: 16/116,932

(22) Filed: Aug. 30, 2018

(65) Prior Publication Data

US 2019/0014397 A1 Jan. 10, 2019

Related U.S. Application Data

(63) Continuation-in-part of application No. 15/644,883, filed on Jul. 10, 2017, now Pat. No. 10,070,208.

(51) Int. Cl.

| | |
|---|---|
| ***H04B 10/00*** | (2013.01) |
| ***H04Q 11/00*** | (2006.01) |
| ***H04J 14/02*** | (2006.01) |
| ***H04L 12/761*** | (2013.01) |
| ***H04L 12/733*** | (2013.01) |
| ***H04L 12/707*** | (2013.01) |

(52) U.S. Cl.

CPC ...... *H04Q 11/0005* (2013.01); *H04J 14/0204* (2013.01); *H04J 14/0284* (2013.01); *H04L 45/122* (2013.01); *H04L 45/16* (2013.01); *H04L 45/24* (2013.01); *H04Q 2011/0016* (2013.01); *H04Q 2011/0039* (2013.01); *H04Q 2011/0058* (2013.01)

(58) Field of Classification Search

USPC ........................................................ 398/66–73

See application file for complete search history.

(56) References Cited

U.S. PATENT DOCUMENTS 6,487,177 B1 * 11/2002 Weston-Dawkes ..... H04L 45/04 370/254
7,016,608 B1 * 3/2006 Ball .................... H04J 14/0204 398/58
7,313,094 B2 * 12/2007 Oki ......................... H04L 45/02 370/238
7,587,516 B2 * 9/2009 Bhanot ................... H04L 45/06 370/352
7,613,187 B2 * 11/2009 Choi .................. H04Q 11/0067 370/392
8,428,457 B2 * 4/2013 Mizutani .............. H04B 10/272 370/314
8,972,603 B1 * 3/2015 Brandwine ............. H04L 69/14 370/399

(Continued)

*Primary Examiner* — Agustin Bello

(57) ABSTRACT

A large-scale contiguous network comprises access nodes arranged into access groups and distributors arranged into constellations of collocated distributors. The distributors may comprise switches, rotators, or a mixture of switches and rotators. Each access group connects to each distributor of a respective set of distributors selected so that each pair of access groups connects once to a respective distributor. At least one access group comprises a global controller. Each access node has a dual multichannel link to each constellation of a respective set of constellations, the link carrying a set of dual channels connecting through a spectral demultiplexer and a spectral multiplexer to a subset of distributors. Each access node is equipped with a respective access controller having a memory device storing identifiers of dual paths to all other access nodes and the global controller, each path traversing only one distributor.

20 Claims, 85 Drawing Sheets

(56) References Cited

U.S. PATENT DOCUMENTS

| | | | | |
|---|---|---|---|---|
| 2003/0020982 | A1* | 1/2003 | Rychlicki | H04J 14/02 398/79 |
| 2003/0156536 | A1* | 8/2003 | Oki | H04L 45/02 370/229 |
| 2005/0002405 | A1* | 1/2005 | Gao | G06F 13/102 370/401 |
| 2005/0129400 | A1* | 6/2005 | Kim | H04J 14/0227 398/67 |
| 2007/0092252 | A1* | 4/2007 | Bouda | H04B 10/272 398/72 |
| 2010/0239257 | A1* | 9/2010 | Grossman | H04J 14/0282 398/68 |
| 2012/0320753 | A1* | 12/2012 | Vasseur | H04L 45/02 370/237 |
| 2014/0160939 | A1* | 6/2014 | Arad | H04L 47/122 370/237 |
| 2014/0369184 | A1* | 12/2014 | Keesara | H04L 12/4658 370/221 |
| 2015/0304046 | A1* | 10/2015 | Kramer | H04Q 11/0067 398/66 |
| 2018/0375760 | A1* | 12/2018 | Saavedra | H04L 45/64 |
| 2019/0014397 | A1* | 1/2019 | Beshai | H04Q 11/0005 |

* cited by examiner

CONTIGUOUS NETWORK

CROSS-REFERENCE TO RELATED APPLICATIONS

The present application is a continuation-in-part of U.S. patent application Ser. No. 15/644,883 filed on Jul. 10, 2017, entitled "Distributed control of a modular switching system", the specification of which is incorporated herein by reference in its entirety.

FIELD OF THE INVENTION

The invention is related to a modular switching system configured as a large-scale data center or a network of global coverage. In particular, the invention is concerned with efficient distribution of payload data and control data in a switching system having a large number of access nodes interconnected through switches or rotators.

SUMMARY

In accordance with an aspect, the invention provides a symmetrical-access contiguous network comprising a plurality of access nodes and a plurality of distributors. The access nodes are arranged into a plurality of access groups, each access group comprising a respective set of access nodes.

The distributors are independent and not directly connected to each other; none of the distributors directly connects to any other distributor. Each distributor connects to two access groups. Each access node has a dual channel to each distributor of a respective set of distributors, where the respective set of distributors is selected so that each access group has a dual path to each other access group through a respective distributor of the plurality of distributors. Each access node comprises a respective access controller comprising a memory device storing identifiers of paths to the other access nodes. Thus, a given access node connects to a designated set of distributors. Each path from an access node to another access node traverses only one distributor. Thus, the invention provides a network enabling data transfer from any access node to any other access node through only one distributor.

An access group may also include at least one global controller. At least one access group comprises a global controller having a dual channel to each distributor of a corresponding set of distributors, where the corresponding set of distributors is selected so that the global controller has a dual path to each access node of the network through a respective distributor of the plurality of distributors.

An access node may connect to external data sources and sinks. At least one access node may connect to dual channels coupled to data sources and sinks. According to an embodiment, an access node may connect to servers of a plurality of servers and at least one access node may connect to dual channels coupled to servers of a plurality of servers. According to another embodiment, an access node may connect to data sources and sinks in addition to servers of a plurality of servers and at least one access node may connect to dual channels coupled to data sources and sinks and dual channels coupled to servers.

Each distributor is coupled to a timing circuit for exchanging timing data with access nodes of respective two access groups.

The number of access nodes per access group may be limited by the dimensions of individual distributors and may vary between two access nodes and a predefined upper bound, m, of access nodes, m>2. Thus, the plurality of access nodes comprises at most m×μ access nodes, μ being the total number of access groups of the contiguous network.

In accordance with an embodiment, an access group of index g, 0≤g<μ, connects to (μ−1) distributors of indices:

$$\{j+g\times(g-1)/2\} \text{ for } 0\leq j<g, \text{ and}$$

$$\{g+j\times(j-1)/2\} \text{ for } g<j<\mu;$$

the access groups being indexed sequentially from 0 to (μ−1), and the distributors of the plurality of distributors indexed sequentially in steps of 1 starting from 0. The above connectivity pattern creates a path from each access node to each other access node traversing only one distributor.

Consequently, an access group of index g and an access group of index h, 0<g<μ, 0≤h<(μ−1), g>h, connect to a distributor of index {h+g×(g−1)/2}.

In order to connect the access groups to distributors through wavelength-division-multiplexed (WDM) links, the plurality of distributors may be arranged into a plurality of constellations and a given access node connects to a respective set of constellations, of the plurality of constellations, through a set of multichannel links.

As described above, each access node connects to a designated set of distributors and the respective set of constellations are selected to collectively contain the designated set of distributors. Each multichannel link from an access node to a constellation carries a set of dual channels connecting through a spectral demultiplexer and a spectral multiplexer to a subset of distributors of the designated set of distributors.

The number Π of constellations of to which an access node connects and the number Ω of dual channels per multichannel link are selected so that (Π×Ω)≥(μ−1), Π and Ω being positive integers, and μ denoting a count of the access groups of the plurality of access groups as mentioned above.

As mentioned above, each access node comprises a respective access controller comprising a memory device storing identifiers of paths to the other access nodes. The identifiers comprise an identifier of a WDM link of the set of multichannel links emanating from a given access node and an identifier of a dual channel of the Ω dual channels of the WDM link.

The plurality of distributors of the contiguous network comprises M distributors, M=μ×(μ−1)/2, indexed from 0 to (M−1). The plurality of constellations comprises Γ constellations, Γ={Π×(Π+1)}/2, indexed from 0 to (Γ−1). The indices of distributors connecting to a specific constellation are determined as follows:

a constellation of index {(q×(q+1))/2+p}, 0≤ρ<Π, p≤q<Π, comprises distributors of indices: {j+k (k−1)/2}, k>j, where $$[p\times\Omega]\leq j<[\Omega\times(p+1)] \text{ and}$$

$$[(q\times\Omega)+1]\leq k\leq[\Omega\times(q+1)].$$

The M distributors may comprise switches, temporal rotators, or a mixture of switches and temporal rotators. A temporal rotator is also referenced as a rotator. In accordance with an embodiment, at least one distributor of the plurality of distributors is configured as an optical rotator. In accordance with another embodiment, at least one distributor of the plurality of distributors is configured as an optical switch. The optical switch comprises a plurality of dual ports connecting to access nodes of a respective pair of access groups and a respective switch controller.

In accordance with another aspect, the invention provides a symmetrical-access contiguous network comprising a plurality of access nodes interconnected through a plurality of distributors arranged into a set of constellations. The plurality of access nodes is arranged into a plurality of access groups where each access group comprises a respective set of access nodes. The access groups may have different numbers of constituent access nodes. Each access node of the plurality of access nodes connects to a respective subset of constellations. An access node connects to a specific constellation through a dual multichannel link. Each dual channel of the dual multichannel link connects to a respective distributor within the specific constellation. The subset of constellations to which an access node connects and a distributor to which each dual channel connects are selected so that each access node has a path to each other access node of the plurality of access nodes traversing only one distributor. Thus, the network provides a dual path from each access node to each other access node traversing only one distributor.

To enable time alignment of data received at input of each distributor from respective access nodes, each access node is equipped with a respective access controller. The access controller of an individual access node is configured to exchange time-alignment information with each distributor to which the individual access node connects through a respective dual channel. The access controller adjusts transmission time instants of data directed to a distributor according to the time-alignment information.

Each access node comprises a switching mechanism coupled to a plurality of inner dual ports. A dual multichannel link connecting an access node to a constellation is coupled to a respective number of inner dual ports of the plurality of inner dual ports through a spectral demultiplexer and a spectral multiplexer. Thus, each dual inner port has a dual channel connecting to a selected distributor of the plurality of distributors.

In accordance with a further aspect, the invention provides a method of routing. The method comprises arranging a plurality of access nodes into a plurality of access groups and connecting each pair of access groups to a respective distributor of a plurality of distributors. Each access group comprises a respective set of access nodes. The distributors are independent of each other and none of the distributors directly connects to any other distributor.

With each distributor comprising a respective distributor controller configured to selectively interconnect access nodes of a respective pair of access groups, and each access node comprising a respective access controller coupled to a memory device, the method further comprises storing in the memory device identifiers of paths from each access node to other access nodes, each path of which traversing only one distributor. Data from any access node to any other access node may then be transferred through paths each traversing a single distributor.

The method further comprises arranging the plurality of distributors into a plurality of constellations and connecting each access node to each constellation of a respective set of constellations of the plurality of constellations. An access node connects to a specific constellation through a respective multichannel link carrying a respective set of dual channels each dual channel coupled to a respective distributor of the specific constellation.

A contiguous network may also be configured as an asymmetrical-access contiguous network In accordance with an aspect of an asymmetrical-access contiguous network, the invention provides a switching system comprising a plurality of rotators interconnecting a plurality of access nodes. Each rotator comprises a number of input ports and a same number of output ports. The rotators are logically arranged in a matrix of μ columns and μ rows, μ>2. Each access node connects to an input port of each rotator of a respective row and an output port of each rotator of a respective column.

To facilitate temporal alignment of data received at input ports of each rotator, each diagonal rotator pair is coupled to a respective dual timing circuit configured to directly exchange timing data with each access node connecting to each diagonal rotator pair. With the μ columns indexed as 0 to (μ−1) and the μ rows indexed as 0 to (μ−1), a rotator of column j and row k together with a rotator of column k and row j, 0≤j<μ, 0≤k<μ, j≠k, form a diagonal rotator pair. With the above connectivity pattern, the switching system provides a path from each access node to each other access node traversing only one rotator.

Each diagonal rotator, i.e., a rotator belonging to column j and row j, 0≤j<μ, is coupled to a respective single timing circuit connected to a respective master time indicator. The timing circuit of a diagonal rotator comprises a processor configured to directly exchange timing data with each access node connecting to a diagonal rotator. The single timing circuit is configured to receive timing data from any input port of the diagonal rotator and communicate a corresponding time indication of the master time indicator to a corresponding output port of the diagonal rotator.

A dual timing circuit of a diagonal rotator pair comprises two constituent timing circuits, both coupled to a master time indicator. A first timing circuit connects to a control outlet of a first rotator of a diagonal rotator pair and a control inlet of a second rotator of the diagonal rotator pair. A second timing circuit connects to a control outlet of the second rotator and a control inlet of the first rotator. The first timing circuit is configured to receive timing data from any input port of the first rotator and communicate a corresponding time indication of the master time indicator to a corresponding output port of the second rotator. The second timing circuit is configured to receive timing data from any input port of the second rotator and communicate a corresponding time indication of the master time indicator to a corresponding output port of the first rotator.

According to an embodiment, the switching system comprises at least one spectral demultiplexer preceding each rotator and at least one spectral multiplexer succeeding each rotator. A spectral demultiplexer directs individual spectral bands from a respective upstream wavelength-division-multiplexed link to respective input ports of a rotator. A spectral multiplexer combines spectral bands from respective output ports of a rotator onto a respective downstream wavelength-division-multiplexed link.

A plurality of upstream spectral routers connects the plurality of access nodes to the plurality of rotators and a plurality of downstream spectral routers connects the plurality of rotators to the plurality of access nodes. Each upstream spectral router connects a set of input WDM links originating from a respective set of access nodes to a set of output WDM links each terminating on one rotator of the plurality of rotators. Each output WDM link carries a spectral band from each input WDM link. Each downstream spectral router connects a set of input WDM links each originating from a respective rotator to a set of output WDM links each terminating on a single access node with each output WDM link carrying a spectral band from each input WDM link.

In accordance with another aspect of an asymmetrical-access contiguous network, the invention provides a method of switching. The method comprises arranging a plurality of rotators in a matrix of μ columns and μ rows, μ>2, and connecting each access node of a plurality of access nodes to an input port of each rotator of a respective row; and an output port of each rotator of a respective column. Each rotator comprises a number m of input ports and m output ports. Each diagonal rotator pair is coupled to a respective dual timing circuit comprising a respective master time indicator and a hardware processor.

The dual timing circuit performs a process of exchanging timing data with access nodes connecting to input ports of a first rotator and output ports of a second rotator of a diagonal rotator pair and with access nodes connecting to input ports of the second rotator and output ports of the first rotator. The exchange of timing data is effected through the first rotator and the second rotator.

The connectivity pattern yields a path from each access node to each other access node traversing a respective one of the rotators, thus enabling direct data transfer without contention. Additionally, data transfer from a first access node to a second access node may be effected through a path traversing a second rotator connecting the first access node to any intermediate access node and a path traversing a third rotator connecting the intermediate access node to the second node.

The dual timing circuit performs processes of receiving timing data from a particular access node connecting to an input port of the first rotator, correlating the timing data with a reading of the master time indicator; and communicating a result of correlating to the particular access node through the second rotator. Likewise, the dual timing circuit performs processes of receiving timing data from a particular access node connecting to an input port of the second rotator, correlating the timing data with a reading of the master time indicator; and communicating a result of correlating to the particular access node through the first rotator.

The switching system accommodates μ×m access nodes. For a requisite initial number of access nodes, μ and m may be selected so that the product μ×m at least equals the requisite initial number. Expansion of the switching system may be realized according to either of two schemes.

According to a first scheme, m new access nodes may be accommodated by adding a number (2×μ+1) of new rotators to form a new column of rotators and a new row of rotators, thus expanding the matrix of rotators. The switching system is expanded through processes of:

connecting each access node of the m additional access nodes to an input port of each rotator of (μ+1) rotators of the new row of rotators; and connecting m input ports of each rotator of remaining μ rotators of the (2×μ+1) new rotators to a set of access nodes connecting to one of the rows of rotators.

According to a second scheme, the number of access nodes may be increased through:

providing an additional input port and an additional output port to each rotator of a current plurality of rotators;

providing μ additional access nodes; and connecting each access node of the μ additional access nodes to an input port of each rotator of a respective row and an output port of each rotator of a respective column of the matrix of rotators.

In accordance with a further aspect of an asymmetrical-access contiguous network, the invention provides a switching system comprising a plurality of rotators interconnecting a plurality of access nodes. Each rotator comprises a number of input ports and the same number of output ports. The plurality of rotators is logically organized into a matrix of constellations. Each constellation comprises a set of collocated rotators, a set of spectral demultiplexers, and a set of spectral multiplexers.

Each access node is coupled to an upstream WDM link to a respective spectral demultiplexer within each constellation of a respective row of the matrix of constellations. Each access node is coupled to a downstream WDM link from a spectral multiplexer within each constellation of a respective column of the matrix of constellations. A spectral demultiplexer directs each spectral band within an upstream WDM link to an input port of a respective rotator of a constellation. A spectral multiplexer combines spectral bands from output ports of respective rotators of a constellation onto a downstream WDM link.

According to a preferred implementation, the collocated rotators of a constellation are organized into a sub-matrix of Λ rows and Λ columns of rotators, Λ>1. The set of spectral demultiplexers within a constellation comprises Λ arrays of spectral demultiplexers, where each spectral demultiplexer is coupled to rotators of a respective row of said sub-matrix. The set of spectral multiplexers within a constellation comprises Λ arrays of spectral multiplexers, where each spectral multiplexer is coupled to rotators of a respective column of the sub-matrix.

In accordance with another aspect of an asymmetrical-access contiguous network, the present invention provides a switching system comprising switches interconnecting access nodes. The switches are logically arranged in a matrix of a number of columns and the same number of rows. Each switch has a number of input ports and the same number of output ports and is coupled to a respective switch controller.

Each access node is communicatively coupled to an input port of each switch of a respective row and an output port of each switch of a respective column. To facilitate distribution of control data from the switches to the access nodes, each switch and its diagonal mirror, forming a diagonal pair, with respect to the matrix are spatially collocated. Switch controllers of a first switch and a second switch of each diagonal pair of switches are communicatively coupled.

With the matrix of switches of μ columns and μ rows, μ>2, a diagonal pair of switches comprises a switch of column j and row k and a switch of column k and row j, j≠k, the columns being indexed as 0 to (μ−1) and the rows being indexed as 0 to (μ−1).

In addition to the input ports and output ports connecting to access nodes, the switching mechanism of a switch may provide a control inlet and a control outlet. The switch controller of a switch may be coupled to the control inlet and control outlet so that an access node may communicate with the switch controller through an input port, the switching mechanism, and the outlet port and, conversely, the switch controller may communicate with an access node through the control inlet, the switching mechanism, and an output port.

Other means of communication between access nodes coupled to a switch and a controller of the switch may be devised; for example, by providing separate control paths from each input port of a switch to a controller of the switch and separate paths from the controller of the switch to output ports of the switch. Thus, access nodes connecting to the input ports may send upstream control data to the switch controller and the switch controller may send downstream control data to access nodes connecting to the output ports of the switch.

A switch controller of a switch comprises a scheduler for scheduling data transfer through the switch and a timing circuit for exchanging timing data with each access node connecting to the switch. A master time indicator is coupled to the switch controllers of the two switches of a diagonal pair of switches.

According to an embodiment, the access nodes of the switching system may be communicatively coupled to the switches through intermediate spectral routers. With this method of coupling, the input ports of a switch connect to output channels of a spectral demultiplexer and the output ports of the switch connect to input channels of a spectral multiplexer. The spectral demultiplexer directs individual spectral bands from an upstream wavelength-division-multiplexed link originating from an access node to respective input ports of the switch. The spectral multiplexer combines spectral bands from the output ports of the switch onto a downstream wavelength-division-multiplexed link terminating at an access node.

Thus, the switching system employs a plurality of upstream spectral routers and a plurality of downstream spectral routers. Each spectral router connects a set of upstream wavelength-division-multiplexed (WDM) links originating from a respective set of access nodes to a set of WDM links each terminating on a single switch. Each downstream spectral router connects a set of WDM links each originating from a single switch to a respective set of downstream WDM links each terminating on a single access node.

According to another embodiment, the access nodes of the switching system may be communicatively coupled to the switches directly. With this method of coupling, the switches would be organized into constellations of switches where the switches of each constellation are spatially collocated. Each constellation may be organized in the form of a sub-matrix of $\Lambda$ rows and $\Lambda$ columns of switches, $\Lambda>1$. With the matrix of switches having $\mu$ columns and $\mu$ rows, $\mu$ is selected as an integer multiple of $\Lambda$.

A constellation of switches is coupled to $\Lambda$ arrays of spectral demultiplexers and $\Lambda$ arrays of spectral multiplexers. Each spectral demultiplexer directs spectral bands of a respective upstream WDM link to an input port of each switch of a row of the constellation. Each spectral multiplexer combining spectral bands from an output port of each switch of a column of the constellation onto a respective downstream WDM link. Each access node is communicatively coupled to the switches through an upstream WDM link to each constellation of a respective row of constellations and a downstream WDM link from each constellation of a respective column of constellations. An upstream WDM link connects an access node to input of a spectral demultiplexer coupled to a constellation. A downstream WDM link connects output of a spectral multiplexer coupled to a constellation to an access node.

In accordance with another aspect, the present invention provides a method of switching data among a plurality of access nodes. The method comprises arranging a plurality of switches in a matrix of $\mu$ columns and $\mu$ rows, $\mu>2$, collocating the two switches of each diagonal pair of switches, mutually coupling controllers of the two switches of a diagonal pair of switches, each switch being coupled to a respective controller, and coupling the two switches of a diagonal pair of switches to a respective master time indicator.

Control data is communicated from a first controller of a first switch of a diagonal switch pair to a first access node connected to an input port of the first switch along a first control path traversing a second controller of a second switch of the diagonal switch pair and a switching mechanism of the second switch.

Control data is communicated from the second controller to a second access node connected to an input port of the second switch along a second control path traversing the first controller and a switching mechanism of the first switch.

The method further comprises performing, at the respective controller of a particular switch, processes of scheduling data transfer through a switching mechanism of the particular switch and exchanging timing data with each access node connecting to the particular switch.

The method further comprises receiving at the first controller timing data from the first access node and correlating at the first controller the received timing data with a reading of the master time indicator. A result of the correlation is communicated to the first access node through the first control path.

The method further comprises receiving at the second controller additional timing data from the second access node and correlating at the second controller the received additional timing data with a reading of the master time indicator. A result of the correlation is communicated to the second access node through the second control path.

The method further comprises adding $(2\times\mu+1)$ new switches as a new column of switches and a new row of switches to the matrix of switches and providing m additional access nodes, m being a number of input ports and a number of output ports of each switch of the plurality of switches. Each access node of the additional access nodes connects to an input port of each switch of $(\mu+1)$ switches of the new row of switches. The m input ports of each switch of remaining $\mu$ switches connect to a set of access nodes connecting to one of the rows of switches.

The method further comprises indexing access nodes of the plurality of access nodes sequentially where access nodes connecting to a row of index q and a column of index q, $0\leq q<\mu$, are indexed as $(j+m\times q)$, $0\leq j<m$, thereby the index of an access node remains unchanged as the switching system grows to accommodate more access nodes.

The method further comprises adding an input port and an output port to each switch of the plurality of switches and providing $\mu$ additional access nodes. Each access node of the additional access nodes connects to an input port of each switch of a row of index q and an output port of each switch of a column of index q, $0\leq q<\mu$.

The method further comprises indexing access nodes of the plurality of access nodes sequentially where access nodes connecting to a row of index q and a column of index q, $0\leq q<\mu$, are indexed as $(q+\mu\times j)$, $0\leq j<m$. Thus, the index of an access node remains unchanged as the switching system grows to accommodate more access nodes.

In accordance with a further aspect of an asymmetrical-access contiguous network, the present invention provides a switching system comprising a plurality of switches logically organized into a matrix of constellations of collocated switches. Each constellation comprises $\Lambda$ rows and $\Lambda$ columns of switches, $\Lambda>1$. Each switch coupled to a respective switch controller and comprises a number of input ports and the same number of output ports. Each constellation of switches is coupled to $\Lambda$ arrays of spectral demultiplexers and $\Lambda$ arrays of spectral multiplexers. A spectral demultiplexer directs spectral bands of a respective upstream WDM link to an input port of each switch of a row of a constellation. A spectral multiplexer combines spectral bands from an output port of each switch of a column of a constellation onto a respective downstream WDM link.

To interconnect access nodes of a plurality of access nodes, each access node connects to constellations of a respective row and constellations of a respective column of the matrix of constellations. An access node has a number of upstream WDM links, each directed to a spectral demultiplexer coupled to one of the constellations of the respective row, and a number of downstream WDM links each originating from a spectral multiplexer coupled to one of the constellations of the respective column.

Thus, each access node connects to a respective set of spectral demultiplexers coupled to constellations of a row of matrix of constellations and respective set of multiplexers coupled to constellations of a column of matrix of constellations. The respective set of spectral demultiplexers and respective set of multiplexers are selected so that each switch of a first constellation and a corresponding switch of a second constellation constitute a complementary switch pair, where said first constellation and said second constellation constitute a diagonal constellation pair.

BRIEF DESCRIPTION OF THE DRAWINGS

Features and implementations will be further described with reference to the accompanying exemplary drawings, in which.

TERMINOLOGY

Figure 1:
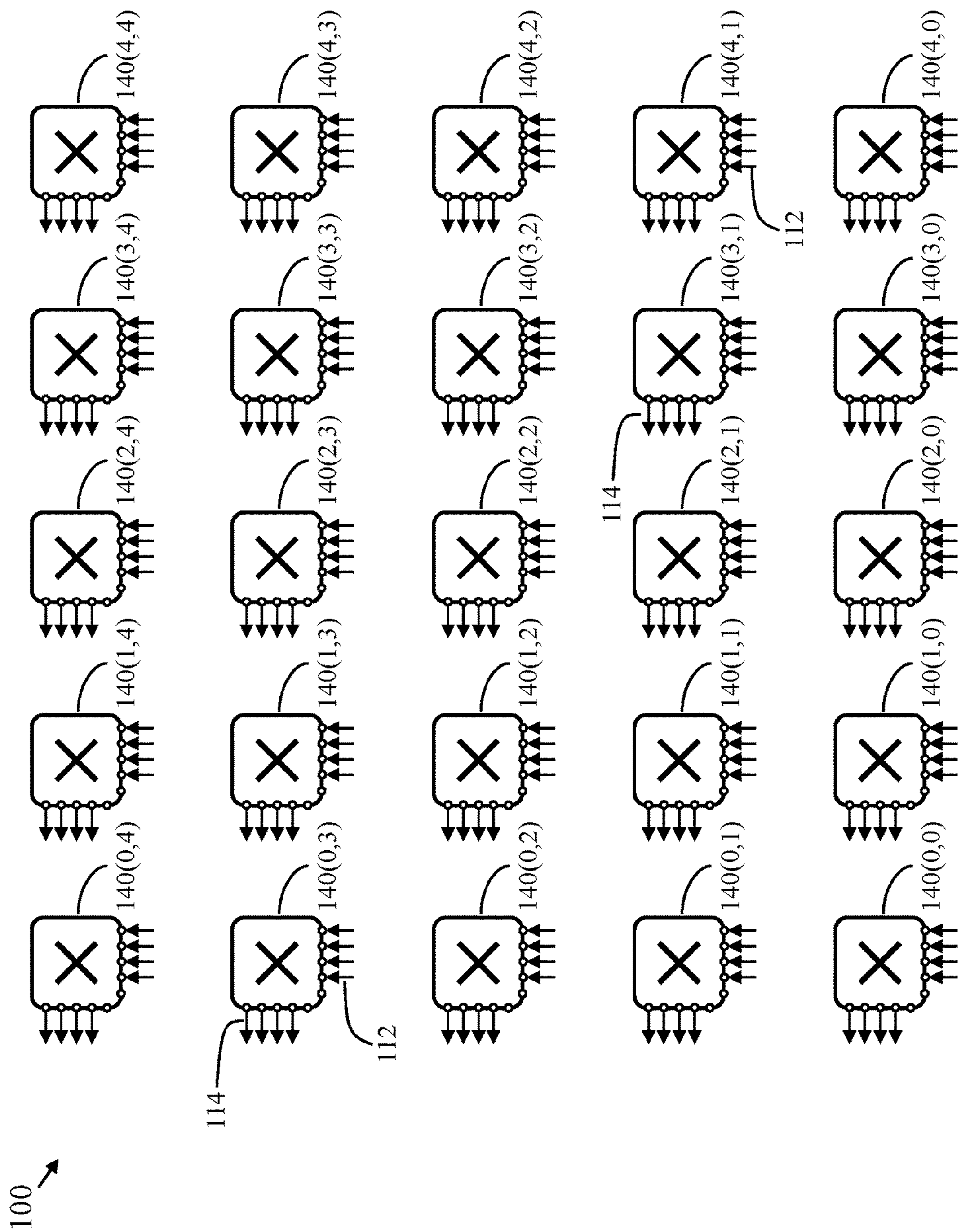
FIG. 1 illustrates switches logically arranged in a matrix of switches for use in illustrating switching-system growth according to a first growth scheme.

Terms used in the present application are defined below.

Access node: A switching device connecting to data sources and data sinks, and configured to transfer data from the data sources to another switching device and transfer data from another switching device to the data sinks is referenced as an access node.

Switch: A switch comprises a switching mechanism for transferring data from a set of input ports to a set of output ports. In the switching system of the present application, a switch transfer data from one set of access nodes connecting to input ports of the switch to another set, or the same set, of access nodes connecting to output ports of the switch. A switch may use an electronic or a photonic switching mechanism.

Rotator: A rotator comprises a rotation mechanism for cyclically transferring data from a set of input ports and at least one control inlet to a set of output ports and at least one control outlet. Each input port transfers data to each output port and to each control outlet during a respective time interval of a rotation time frame. Likewise, each control inlet transfers data to each output port and to each control outlet during a respective time interval of the rotation time frame. A rotator may use an electronic or a photonic rotation mechanism. The term "rotator" is used in the present application to refer exclusively to a "temporal rotator" which cyclically connects each port on the input side (i.e., an input port or a control inlet) to each port on the output side (i.e., an output port or a control outlet).

Distributor: A device comprising a plurality of input ports and a plurality of output ports where any input port may transfer data to any output port is herein referenced as a distributor. The transfer of data may be selective or cyclic. A distributor configured to transfer data from any input port to selected output port is conventionally called a "switch. A distributor configured to cyclically transfer data from each input port to each output port is conventionally called a "rotator". Thus, the term "distributor" refers to either a switch or a rotator. Certain architectural aspects of the contiguous network of the present invention are independent of the type of distributor.

Access group: An access group comprises a number of access nodes that connect to each distributor of a respective set of distributors. The number of access nodes per access group may vary from one access group to another. In order to simplify addressing of access nodes in a growing network, the number of access nodes per access group is limited to a predefined upper bound.

Spectral band: The term refers to a frequency band (bandwidth) occupied by a signal in a transmission medium, such as a fiber-optic link.

Dual channel: A dual channel comprises a channel from a first device to a second device and a channel from the second device to the first device.

Multichannel link: The term refers to a transmission link comprising multiple channels—a wavelength-division-multiplexed link (WDM link) carrying multiple spectral bands is a multichannel link.

Dual multichannel link: The term refers to a transmission link comprising multiple dual channels where a dual channel comprises two channels of opposite transmission directions.

Constellation of distributors: A number of distributors may be spatially collocated to enable direct communication with access nodes through wavelength-division-multiplexed (WDM) links avoiding the need for intermediate spectral routers.

Symmetrical-access network: The term refers to a network in which each access node has an upstream channel to a respective distributor and a downstream channel from the same distributor, i.e., each access node has a dual path to a respective distributor. In the symmetrical network of the present invention, each access node has multiple dual paths to a respective set of distributors.

Asymmetrical-access network: The term refers to a network in which an access node has upstream channels to a first set of distributors and downstream channels from a second set of distributors where the first set and the second set has only one common distributor.

Dimension of a switch: The number of input ports and output ports, excluding ports used exclusively for control purposes, defines a "dimension" of a switch.

The input ports and output ports of a switch handle payload data while a control inlet or a control outlet of a switch handle control data relevant to scheduling and timing.

Dimension of a rotator: The number of input ports and output ports, excluding ports used exclusively for control purposes, defines a "dimension" of a rotator. The input ports and output ports of a rotator handle payload data while a control inlet or a control outlet of a rotator handle timing data.

Contiguous network: A network supporting access nodes interconnected through distributors in which any access node may transfer data to any other access node through a path traversing only one distributor is herein referenced as a "contiguous network).

Collocation: The term refers to spatial proximity of devices which may be interconnected using relatively short links, such as fiber links each carrying a single spectral band.

Global network: A network comprising a large number of nodes covering a wide geographical area is traditionally referenced as a global network.

Switching-system coverage: In a switching system configured as a network comprising geographically distributed access nodes, the term "coverage" refers to the number of access nodes.

Spectral multiplexer: A spectral multiplexer combines spectral bands of separate input channels onto an output wavelength-division-multiplexed link (WDM link), the input channels which originate from different switches.

Spectral demultiplexer: A spectral demultiplexer directs individual spectral bands of an input WDM link to separate output channels which may terminate onto different switches.

Diagonal pair of switches: In a switching system employing a plurality of switches logically arranged in a matrix of switches having a number of columns and a same number of rows, a diagonal pair of switches comprises a switch of column j and row k and a switch of column k and row j, j≠k, the columns being indexed as 0 to $(\mu-1)$ and the rows being indexed as 0 to $(\mu-1)$, $\mu$ being the number of columns. A switch of a column and a row of the same index is referenced as a "diagonal switch".

Complementary pair of switches: In a switching system employing a plurality of switches interconnecting a number of access nodes, a complementary pair of switches (complementary switch pair) comprises a first switch, transferring data from a first set of access nodes to a second set of access nodes, and a second switch transferring data from the second set of access nodes to the first set of access nodes. The complementary pair of switches may share a common controller or a dual controller comprising a first controller coupled to the first switch and a second controller coupled to the second switch where the two controllers are communicatively coupled to enable transferring control data from the first controller to the first set of access nodes and control data from the second controller to the second set of access nodes. Herein, the two switches, and respective controller(s), of a complementary pair of switches are considered to be collocated.

Constellation of switches: A number of collocated switches form a constellation.

Diagonal constellation pair: In a switching system employing a plurality of switches arranged into a matrix of constellations of collated switches having a number of $\chi$ columns and $\chi$ rows, $\chi>1$, a diagonal pair of constellations comprises a constellation of column j and row k and a constellation of column k and row j, j≠k, the columns being indexed as 0 to $(\chi-1)$ and the rows being indexed as 0 to $(\chi-1)$.

Diagonal pair of rotators: In a switching system employing a plurality of rotators logically arranged in a matrix rotators having a number of columns and a same number of rows, a diagonal pair of rotators comprises a rotator of column j and row k and a rotator of column k and row j, j≠k, the columns being indexed as 0 to $(\mu-1)$ and the rows being indexed as 0 to $(\mu-1)$, $\mu$ being the number of columns. A rotator of a column and a row of the same index is referenced as a "diagonal rotator".

Complementary pair of rotators: In a switching system employing a plurality of rotators interconnecting a number of access nodes, a complementary pair of rotators comprises a first rotator, transferring data from a first set of access nodes to a second set of access nodes, and a second rotator transferring data from the second set of access nodes to the first set of access nodes.

Processor: The term "processor" as used in the specification of the present application, refers to a hardware processor, or an assembly of hardware processors, having at least one memory device.

Controller: The term "controller", as used in the specification of the present application, is a hardware entity comprising at least one processor and at least one memory device storing software instructions. Any controller type, such as a "node controller", "switch controller", "domain controller", "network controller", or "central controller" is a hardware entity.

Node controller: Each node, whether an ordinary node or a principal node, has a node controller for scheduling and establishing paths from input ports to output ports of the node.

Software instructions: The term refers to processor-executable instructions which may be applied to cause a processor to perform specific functions.

Configuring a controller: The term refers to an action of installing appropriate software for a specific function.

Channel: A directional channel is a communication path from a transmitter to a receiver. A dual channel between a first port having a transmitter and a receiver and a second port having a transmitter and a receiver comprises a directional channel from the transmitter of the first port to the receiver of the second port and a directional channel from the transmitter of the second port to the receiver of the first port. A channel may occupy a spectral band in a wavelength division multiplexed (WDM) link.

Link: A link is a transmission medium from a first node to a second node. A link contains at least one channel, each channel connecting a port of the first node to a port of the second node. A directional link may contain directional channels from ports of the first node to ports of the second node, or vice versa. A dual link comprises two directional links of opposite directions.

WDM link: A number of channels occupying different spectral bands of an electromagnetic transmission medium form a wavelength-division-multiplexed link (a WDM link).

Spectral router: A spectral router (also called "wavelength router") is a passive device connecting a number of input WDM links to a number of output WDM links where each output WDM link carries a spectral band from each input WDM link.

Processor-executable instructions causing respective processors to route data through the switching system may be stored in a processor-readable media such as floppy disks, hard disks, optical disks, Flash ROMS, non-volatile ROM, and RAM. A variety of hardware processors, such as microprocessors, digital signal processors, and gate arrays, may be employed.

A reference numeral may individually or collectively refer to items of a same type. A reference numeral may further be indexed to distinguish individual items of a same type.

DETAILED DESCRIPTION

The invention provides a large-scale contiguous network comprising a plurality of access nodes interconnected through a plurality of distributors. A distributor may be configured as a switch or a temporal rotator. A switch comprises a set of input ports which selectively connects to a set of output ports. A temporal rotator comprises a set of input ports each of which cyclically connects to each output port of a set of output ports. The detailed description below covers contiguous networks employing distributors configured as switches as well as contiguous networks employing distributors configures as temporal rotators. The two types of contiguous networks have similar structures but may employ different control systems. A switch provides selective steering of data from input ports to output ports, thus requiring intra-switch data-transfer scheduling. A switch controller of a specific switch performs time-alignment with subtending access nodes as well as scheduling data transfer through the specific switch. A temporal rotator is a clock-driven cyclical connector. A rotator controller of a specific rotator performs time-alignment with subtending access nodes.

FIG. 1 illustrates distributors 140 logically arranged in a matrix 100 of distributors (switches or rotators) having $\mu$ columns and $\mu$ rows, $\mu>2$. The distributors are individually identified as 140($j,k$), $0\le j<\mu$, $0\le k<\mu$, where j and k are indices of a column and a row, respectively, of the matrix of distributors. In the exemplary arrangement of FIG. 1, $\mu=5$. Each distributor 140 connects to respective input channels 112 and respective output channels 114. The $\mu$ columns may be indexed as 0 to $(\mu-1)$ and the $\mu$ rows may be indexed as 0 to $(\mu-1)$. A distributor of column j and row k together with a distributor of column k and row j, $0\le j<\mu$, $0\le k<\mu$, $j\ne k$, form a diagonal distributor pair.

Figure 2:
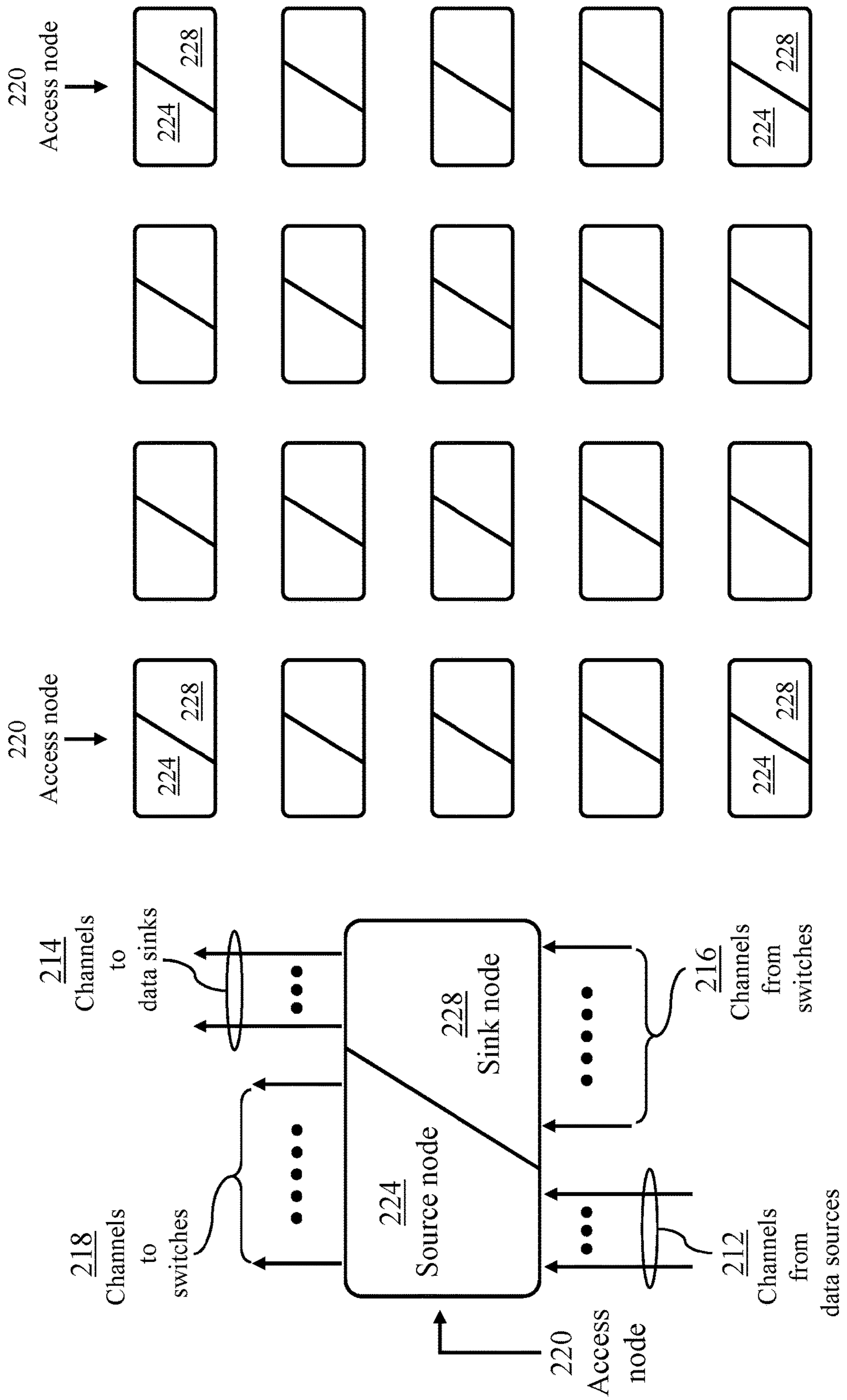
FIG. 2 illustrates a plurality of access nodes interconnected through switches of the matrix of switches of FIG. 1.

FIG. 2 illustrates access nodes 220 which may be interconnected through the matrix of distributors of FIG. 1. Each access node 220 comprises a source node 224 and a sink node 228. Each access node 220 (source node 224) connects to an upstream channel 218 to each switch 140 of a selected set of switches. Each access node 220 (sink node 228) connects to a downstream channel 216 from each switch 140 of another selected set selected switches. A source node 224 (of access node 220) receives data from data sources through a number of channels 212. A sink node 228 (of access node 220) transmits data from data sinks through a number of channels 214.

An access node 220 serves external traffic and may support servers of a server farm. A dual channel 212/214 of an access node may connect to a server or a set of network users constituting data sources and data sinks. In one embodiment, the entire set of dual channels 212/214 of an access node 220 connects to network users. In another embodiment, the entire set of dual channels 212/214 of an access node 220 may connect to a server farm. In a further embodiment, some dual channels 212/214 of an access node connect to network users and some other dual channels 212/214 connect to servers.

Each access node 220 comprises a respective access-node controller (not illustrated) configured to communicate with controllers of switching nodes or other switching-system components. The access controller is a hardware entity which employs at least one hardware processor, memory devices storing software instructions, and memory devices storing control data such as routing-related data.

Figure 3:
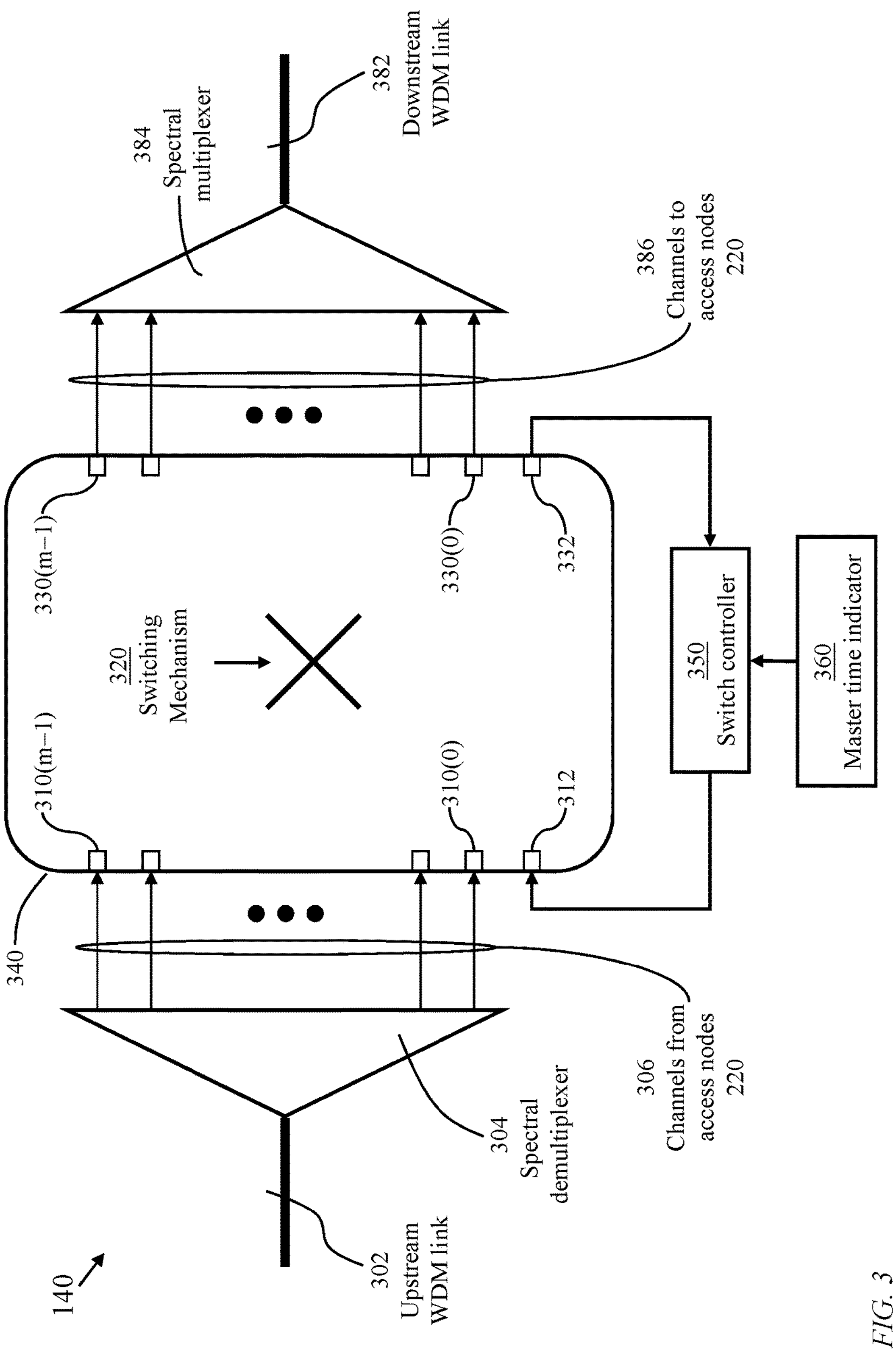
FIG. 3 illustrates a switch of the matrix of switches of FIG. 1.

FIG. 3 illustrates a switch 140 comprising a number m of input ports 310, m>2, a control inlet 312, a number m of output ports 330, and a control outlet 332. The m input ports are individually identified as input ports 310(0), 310(1), . . . , 310($m-1$). The m output ports are individually identified as output ports 330(0), 330(1), . . . , 330($m-1$). The m input ports receive data originating at a respective set of access nodes 220 through upstream channels 306. The m output ports transmit data to a respective set of access nodes 220 through downstream channels 386. For a switch along a diagonal of matrix 100, i.e., a switch positioned in a column j and a row j, $0\le j<\mu$, channels 306 receive data from a set of m access nodes and channels 386 transmit data to the same set of m access nodes 220. For a switch positioned in a column j and a row k, where $k\ne j$, channels 306 receive data from a respective first set of m access nodes and channels 386 transmit data to a respective second set of m access nodes 220, where the first set of m access nodes and the second set of m access nodes are disjoint, i.e., not having any access node in common. A switching mechanism 320 selectively transfers data from the input ports and from the control inlet to the output ports and the control outlet. A switch controller 350 receives control data from the input ports 310 through the switching mechanism 320 and control outlet 332. The switch controller 350 transmits control data to the output ports 310 through control inlet 312 and the switching mechanism 320. A master time indicator 360 provides reference time to the switch controller. The switch controller 350 is a hardware entity comprising at least one hardware processor and a storage medium holding software instructions which cause the at least one hardware processor to implement routing and time alignment functions.

Upstream channels 306 from a first set of access nodes 220 and downstream channels 386 to a second set of access nodes may be routed individually if the switching mechanism is collocated with the first set and second set of access nodes. In a geographically distributed switching system, upstream channels 306 may occupy different spectral bands in an upstream WDM link 302 and a spectral demultiplexer 304 separates the spectral bands to be directed to different input ports of the switching mechanism 320. Downstream channels 386 from different output ports of the switching mechanism may occupy different spectral bands and a spectral multiplexer 384 combines the spectral bands onto in a downstream WDM link 382. While FIG. 3 illustrates one upstream WDM link 302, one spectral demultiplexer 304, one spectral multiplexer 384, and one downstream WDM link 382, it should be understood that the spectral demultiplexer 304 may be implemented as multiple spectral demultiplexers, and the upstream WDM link may be implemented as multiple upstream WDM links each connected to a respective spectral demultiplexer. Likewise, the spectral multiplexer 384 may be implemented as multiple spectral multiplexers each combining a respective number of spectral bands onto a respective downstream WDM links. For example, if the number m of input ports or output ports is 128 and it is desired to use WDM links each carrying 64 spectral bands, then spectral demultiplexer 304 would be implemented as two demultiplexers and spectral multiplexer 384 would be implemented as two spectral multiplexers.

Expansion of the Switching System

With the matrix of switches containing $\mu^2$ switches 140 arranged into μ columns and μ rows, each switch having m dual ports (m input ports and m output ports), in addition to control inlets and outlets, the maximum number of access nodes 220 supported by the switching system would be limited to μ×m. To increase the number of access nodes 220, the dimension of each switch, i.e., the number m of dual ports, may be increased, the number of switches may be increased, or both the dimension of each switch and the number of switches may be increased, In a first growth scheme, illustrated in FIG. 4 to FIG. 11, the dimension of each switch is kept unchanged and growth is realized by adding a column and a row of switches 140. Thus, with a current switching system employing $\mu^2$ switches, (2×μ+1) switches are added to increase the number of access nodes from μ×m to (μ×m+m). Each access node 220 would then have (μ+1) channels 218 to switches of a row of the matrix of switches and (μ+1) channels 216 from switches of a column of the matrix of switches. The access nodes may be indexed sequentially so that access nodes connecting to a row of index q and a column of index q, 0≤q<μ, are indexed as (j+m×q), 0≤j<m. Thus, the index of an access node remains unchanged as the switching system grows to accommodate more access nodes by increasing the number of rows and columns of the switch matrix while keeping the dimension m of each switch unchanged.

In a second growth scheme, illustrated in FIG. 13 to FIG. 18, each access node 220 has a fixed number μ of channels 218 to switches of a row of the matrix of switches and the same number μ of channels 216 from switches of a column of the matrix of switches. Thus, with the number $\mu^2$ of switches is unchanged. Growth is realized by adding a dual port (an input port and an output port) in each switch to increase the number of access nodes from μ×m to (μ×m+μ). The access nodes may be indexed sequentially so that access nodes connecting to a row of index q and a column of index q, 0≤q<μ, are indexed as (q+μ×j), 0≤j<m. Thus, the index of an access node remains unchanged as the switching system grows to accommodate more access nodes by increasing the dimension of each switch while keeping number of rows and columns of the switch matrix unchanged.

First Scheme of Switching-System Growth

Figure 4:
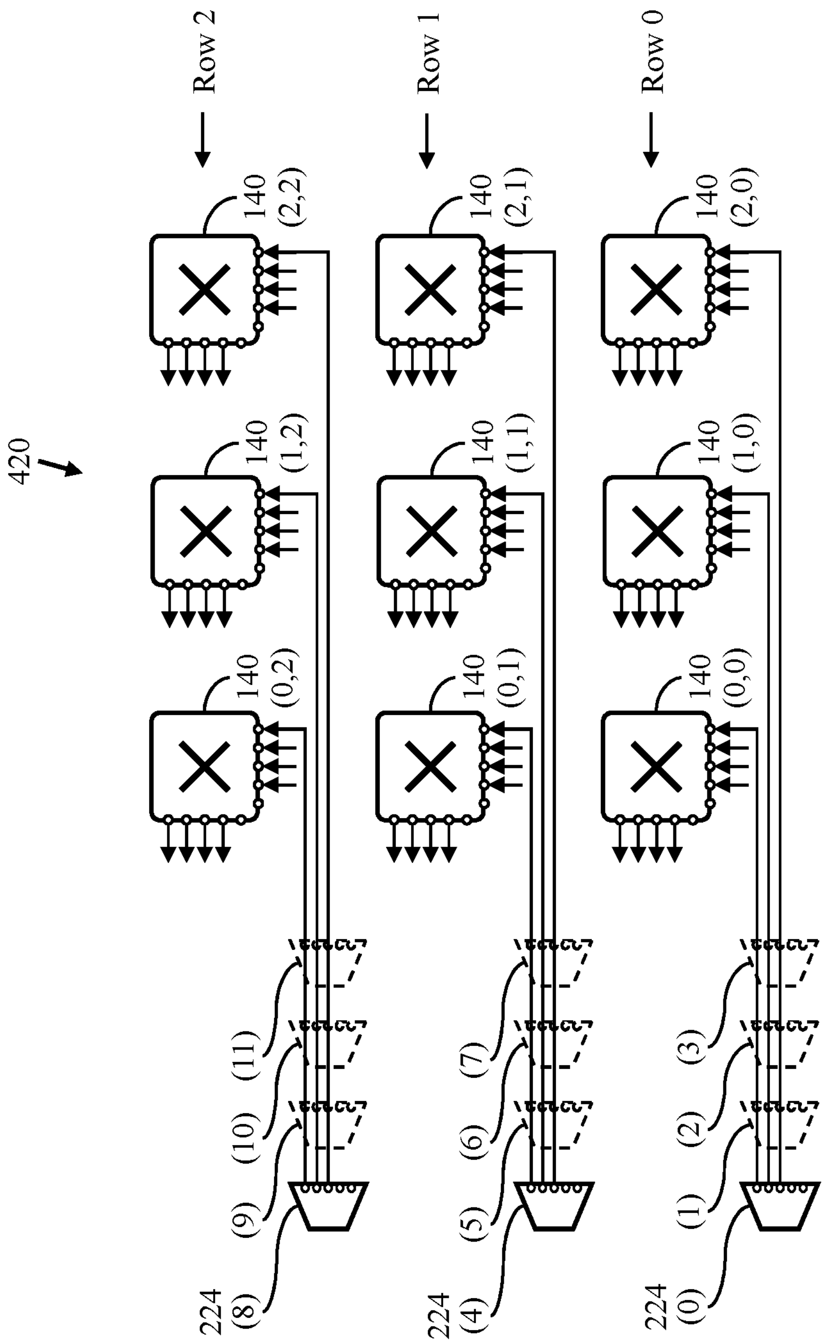
FIG. 4 illustrates connectivity of a set of source nodes connecting to switches of a sub-matrix of the matrix of switches of FIG. 1.

FIG. 4 illustrates a selected set of source nodes 224 (of access nodes 220) connecting to switches of a sub-matrix 420 of the matrix of switches of FIG. 1. The exemplary arrangement of switches of FIG. 1 comprises 25 switches arranged in five columns and five rows (μ=5). A switching system may initially use switches of a sub-matrix of three columns and three rows (μ=3). Each source node 220 connects to a respective upstream channel 218 to each switch 140 of a row.

Figure 5:
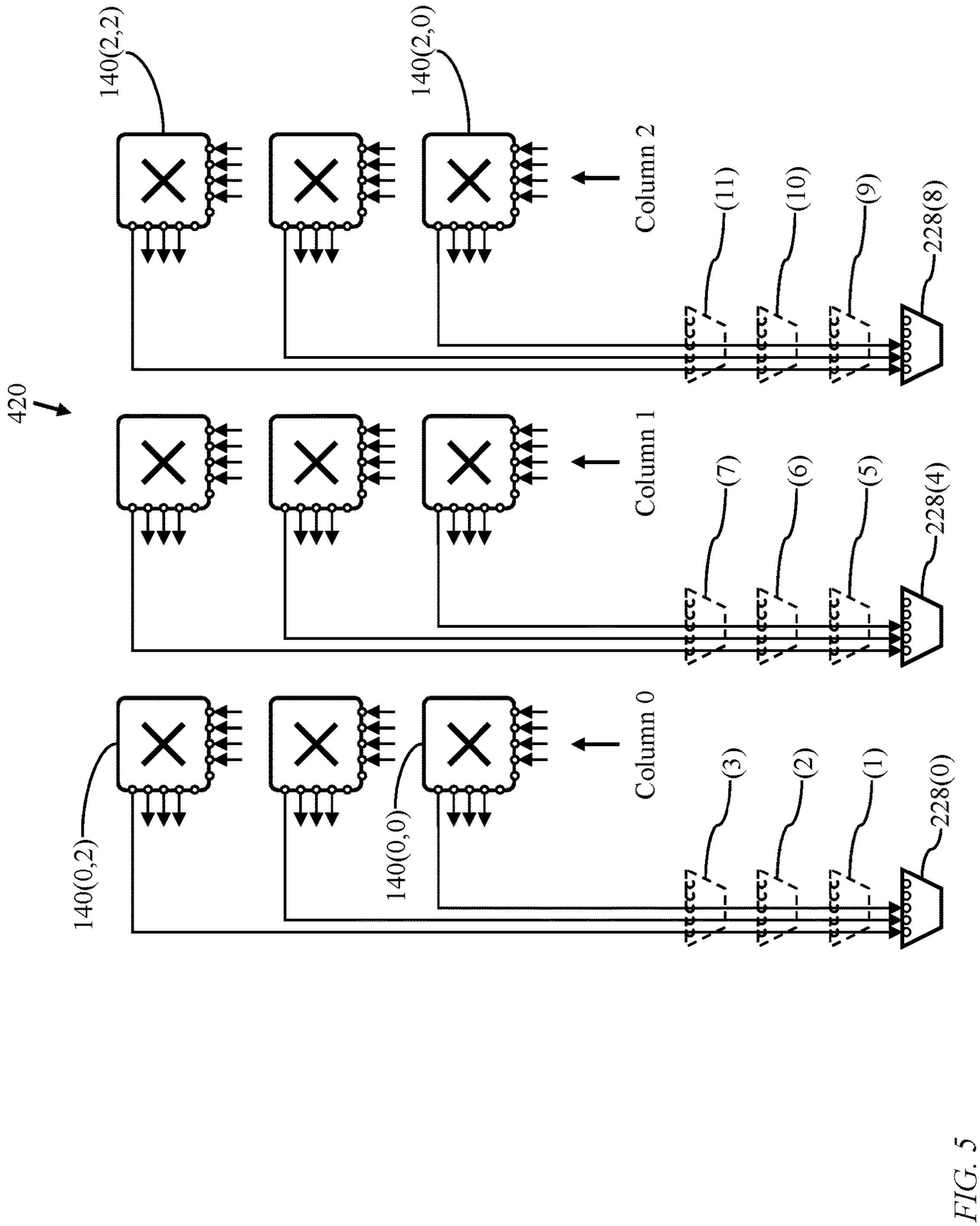
FIG. 5 illustrates connectivity of a set of sink nodes connecting to switches of the sub-matrix of FIG. 4 according to the first growth scheme, where each sink node is integrated with a respective source node to form an access node.

FIG. 5 illustrates a selected set of sink nodes 228 (of access nodes 220) connecting to the switches of FIG. 4, where each sink node 228 connects to a respective downstream channel 216 from each switch 140 of a respective column. The connectivity patterns of FIG. 4 and FIG. 5 are similar to the connectivity pattern of FIG. 5 of U.S. Pat. No. 7,760,716. Each sink node may be integrated with a respective source node to form an access node.

According to the connectivity patterns of FIG. 4 and FIG. 5, an access node 220 (224/228) has an upstream channel 218 to a switch 140(*j, k*), and a downstream channel 216 from a switch 140(*k, j*), 0≤j<μ, 0≤k<μ.

Figure 6:
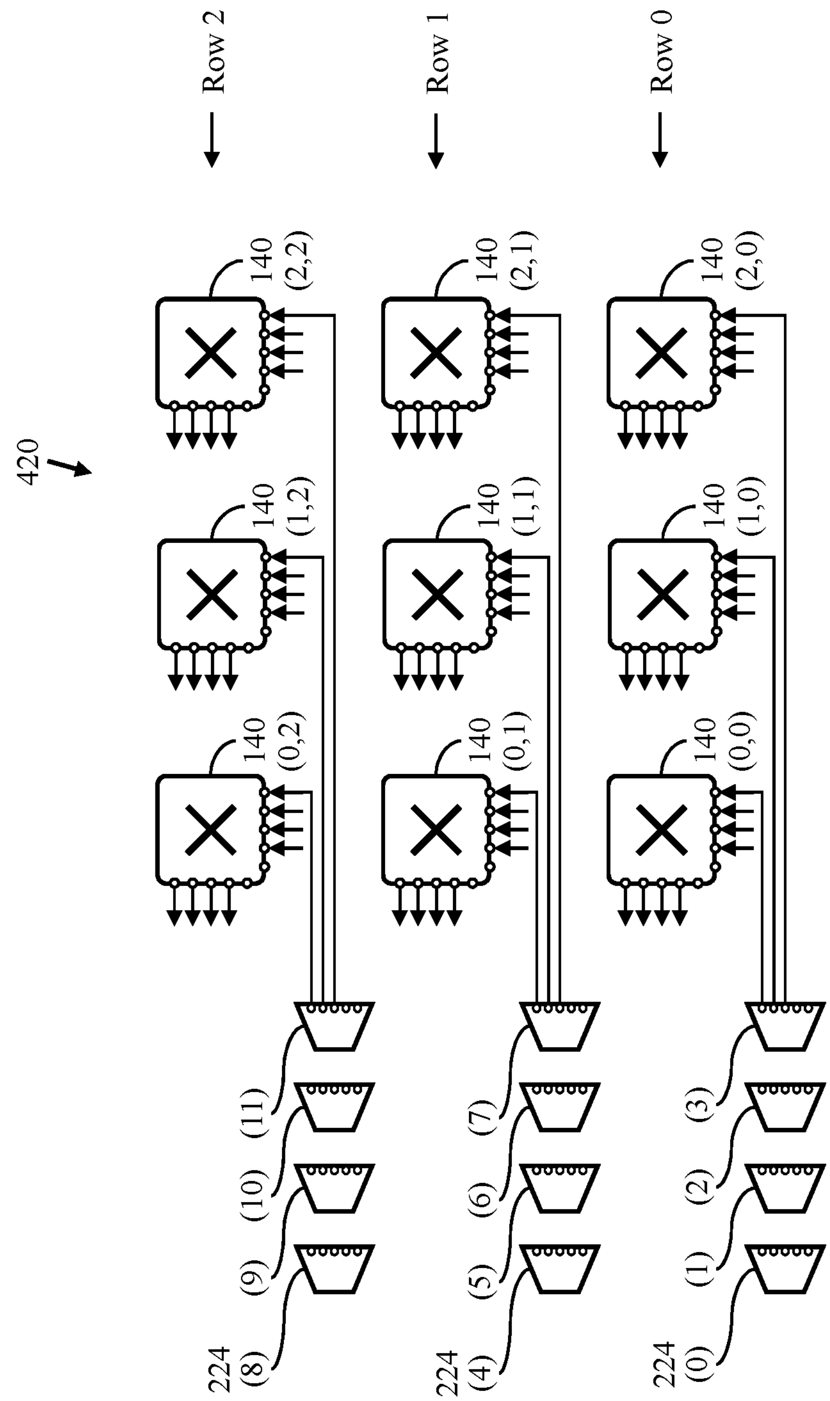
FIG. 6 illustrates connectivity of another set of source nodes connecting to switches of the sub-matrix of FIG. 4.

FIG. 6 illustrates another selected set of source nodes 224 connecting to switches 140 of sub-matrix 420 of switches of the matrix of FIG. 1.

Figure 7:
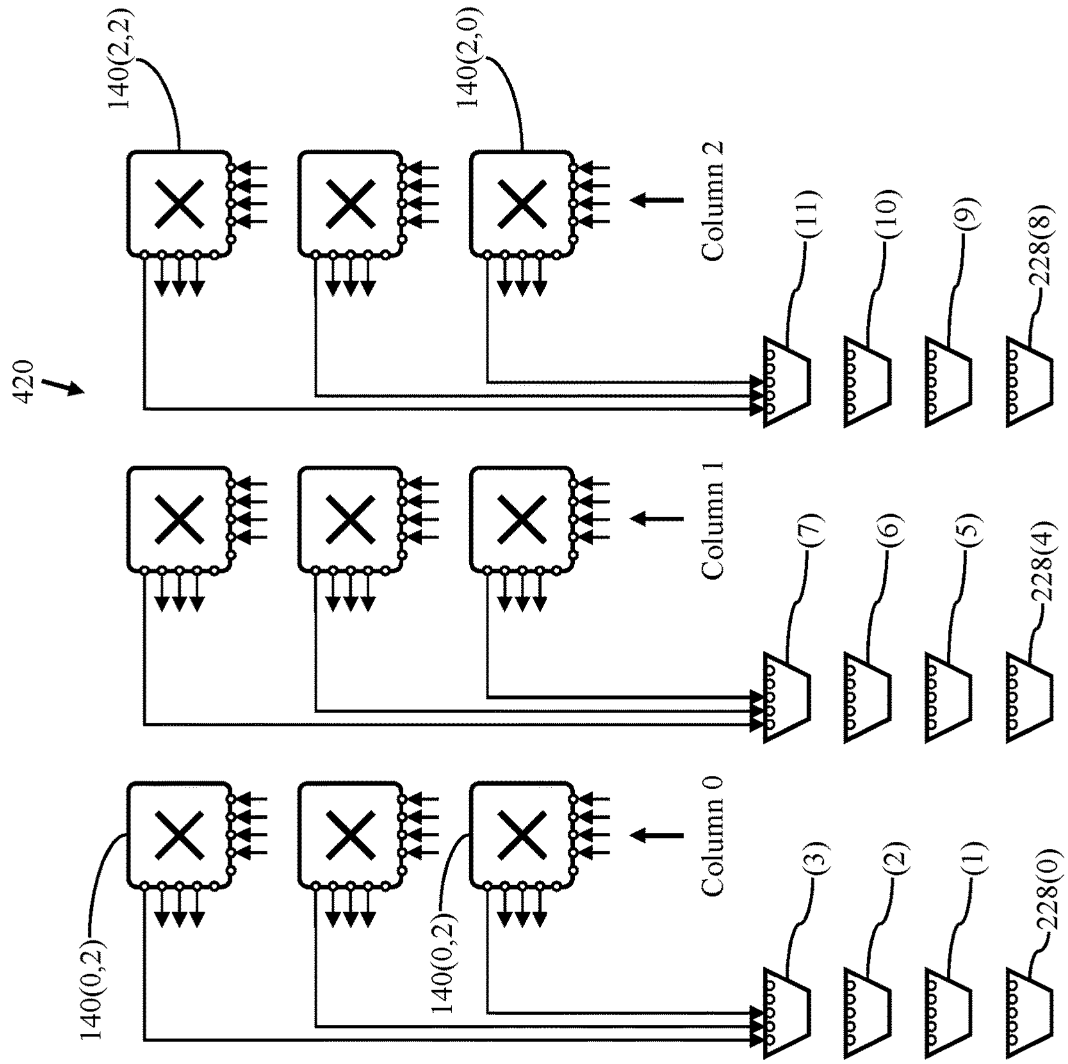
FIG. 7 illustrates connectivity of another set of sink nodes connecting to switches of the sub-matrix of FIG. 4.

FIG. 7 illustrates another selected set of sink nodes 228 connecting to the switches of FIG. 4, where each sink node 228 has a downstream channel 216 from each switch 140 of a respective column.

Figure 8:
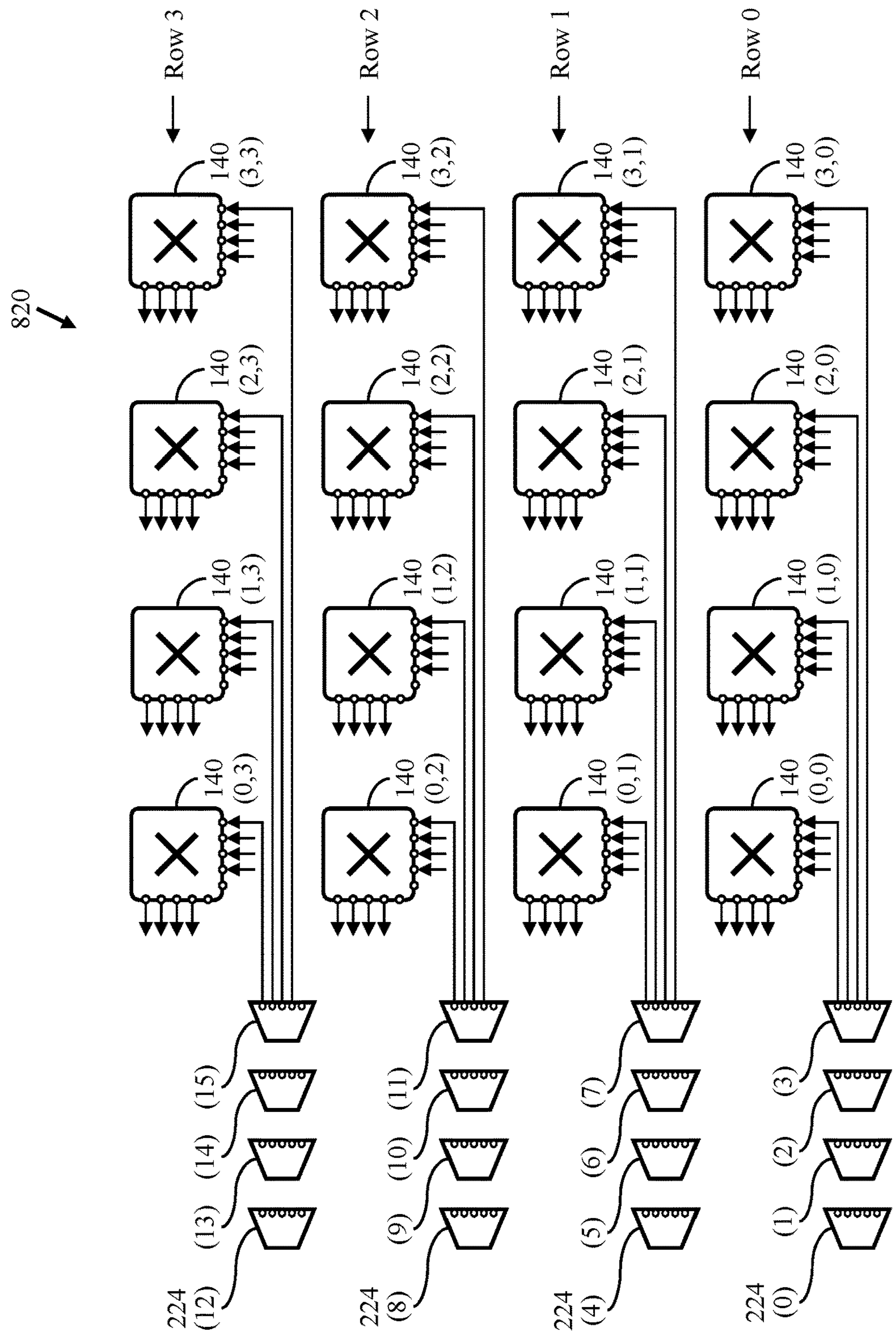
FIG. 8 illustrates an increased number of source nodes connecting to switches of another sub-matrix of the matrix of switches of FIG. 1 according to the first growth scheme.
Figure 9:
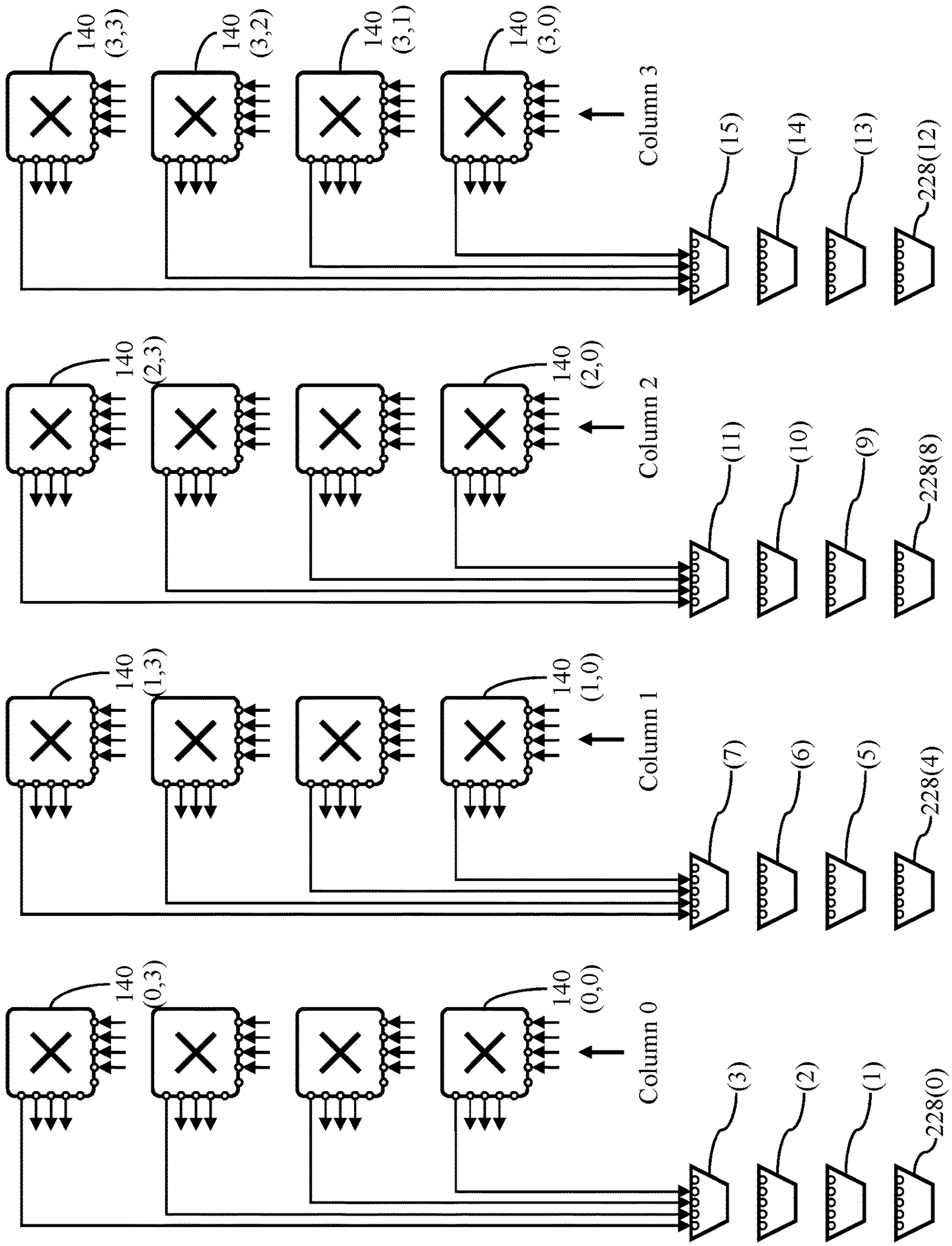
FIG. 9 illustrates an increased number of sink nodes connecting to switches of the sub-matrix of switches of FIG. 8 according to the first growth scheme.

FIG. 8 and FIG. 9 illustrate growth of the switching system of FIG. 4 and FIG. 5, according to a first growth scheme, using switches of a sub-matrix 820 of four columns and four rows (μ=4). FIG. 8 illustrates source nodes 224 connecting to switches of a sub-matrix 820. FIG. 9 illustrates sink nodes 228 connecting to witches 140 of sub-matrix 820 of FIG. 8.

Figure 10:
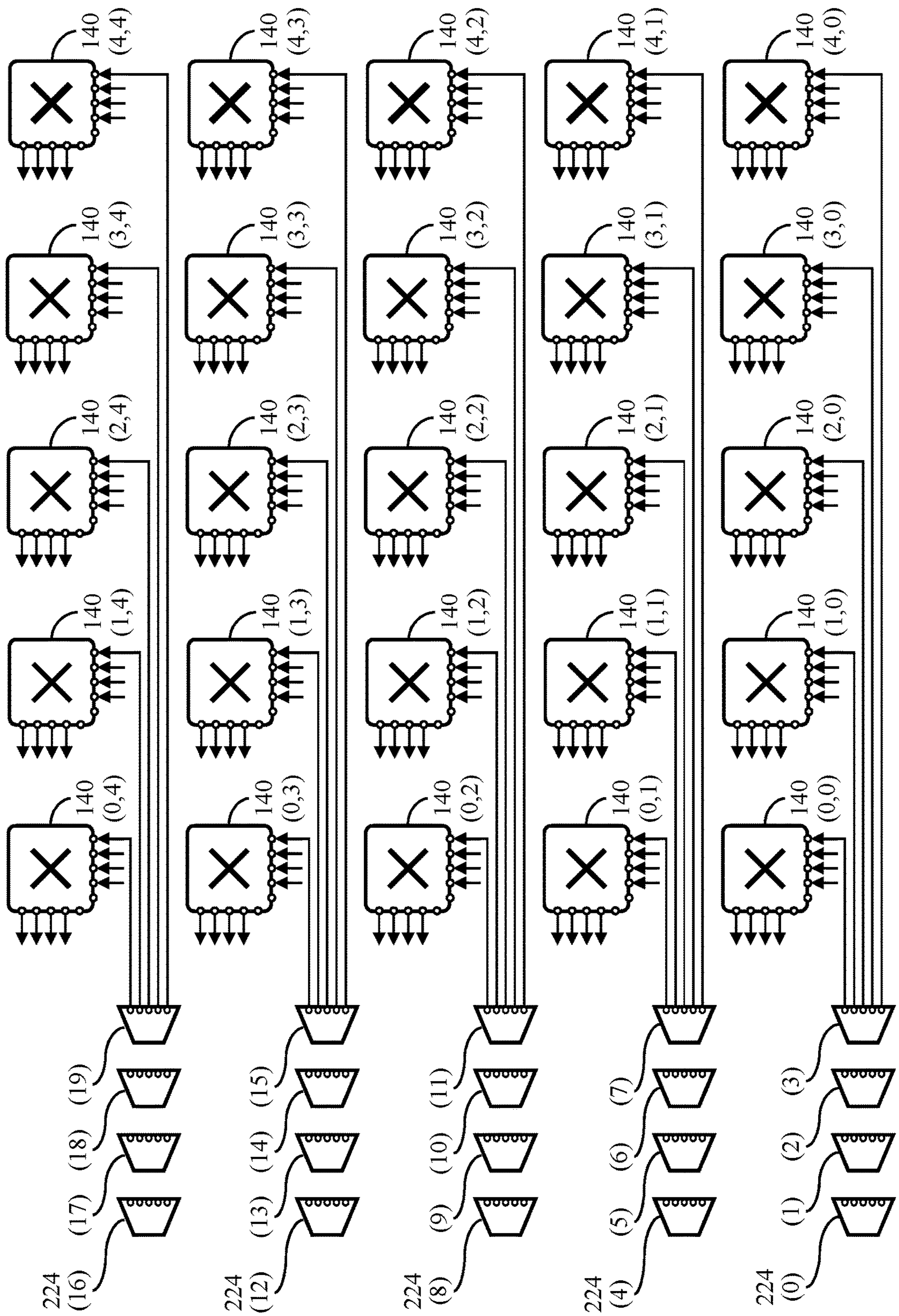
FIG. 10 illustrates further growth of the number of source nodes connecting to the switches of the matrix of switches of FIG. 1 according to the first growth scheme.
Figure 11:
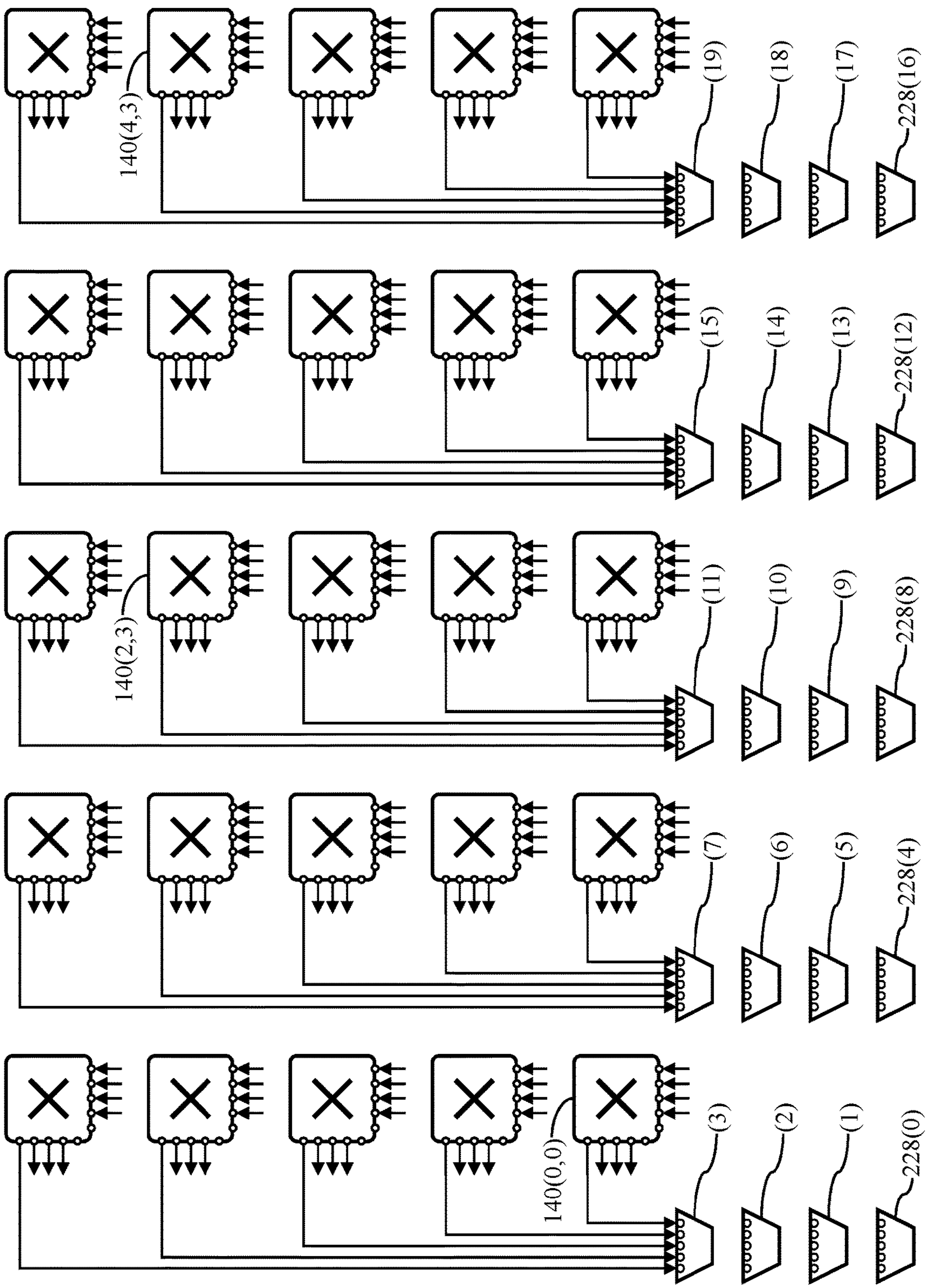
FIG. 11 illustrate further growth of the number of sink nodes connecting to the switches of the matrix of switches of FIG. 1 according to the first growth scheme.

FIG. 10 and FIG. 11 illustrate further growth of the switching system of FIG. 8 and FIG. 9, according to the first growth scheme, to a switching system using all switches of the matrix of switches of FIG. 1 arranged in five columns and five rows (μ=5).

FIG. 4, FIG. 6, FIG. 8, and FIG. 10 illustrate upstream connectivity of source nodes to respective switches. FIG. 5, FIG. 7, FIG. 9, and FIG. 11 illustrate downstream connectivity of switches to respective sink nodes.

Second Scheme of Switching-System Growth

Figure 12:
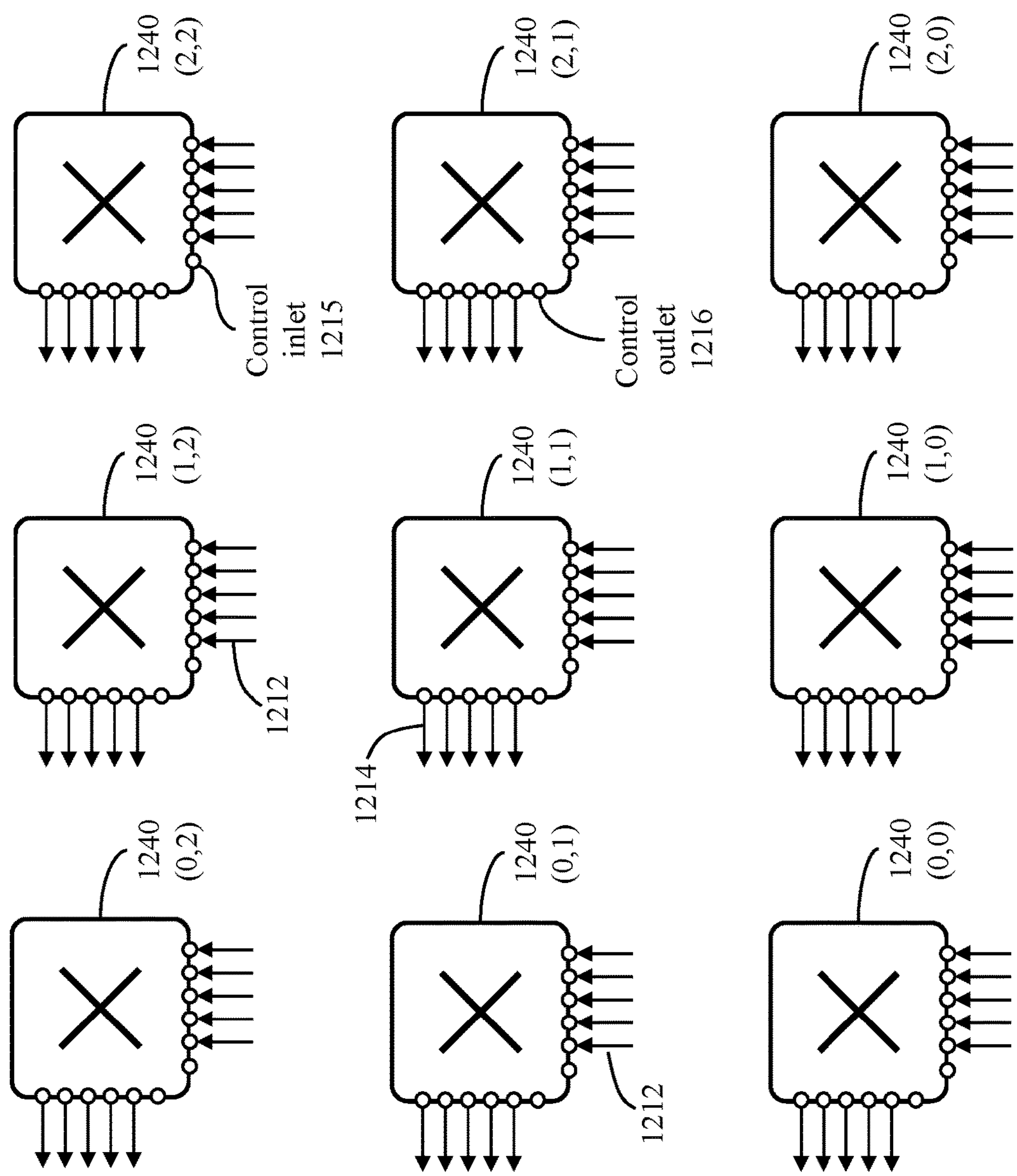
FIG. 12 illustrates switches logically arranged in a matrix of switches for use in illustrating switching-system growth according to a second growth scheme.

FIG. 12 illustrates expandable switches 1240 arranged in a matrix of switches of according to a second growth scheme where the dimension of each switch of the matrix of switches may be increased to increase the coverage and capacity of the switching system. The number of supported access nodes is μ×m, and the access capacity of the switching system is $\alpha\times\mu^2\times m\times R$, where α, 0≤α<1.0, is a design parameter and R is the capacity of each access channel; R=20 Gigabits/second, for example.

A switch 1240 is structurally similar to a switch 140. In the switching-system configurations of FIG. 4 to FIG. 11, the number m of dual ports 310/330 of a switch is kept unchanged (m=4) while the number μ of dual channels (upstream channels and downstream channels) connecting each access node 220 to switches 140 is increased to grow the switching system according to the first growth scheme. In the switching-system configurations of FIG. 13 to FIG. 18, the number μ of dual channels connecting each access node 220 to switches 1240 is kept unchanged (μ=3) while the number m of dual ports 310/330 of each switch is increased to grow the switching system according to the second growth scheme.

The switches 1240 of FIG. 12 are logically arranged in a matrix of switches having μ columns and μ rows, μ=3 (generally, μ>2). The switches are individually identified as 1240(*j,k*), 0≤j<μ, 0≤k<μ, where j and k are indices of a column and a row, respectively, of the matrix of switches. In the exemplary arrangement of FIG. 12, μ=3. Each switch 1240 connects to respective input channels 1212 and respective output channels 1214. Each switch 1240 of the exemplary switch arrangement comprises five input ports, five output ports, one control inlet 1215, and one control outlet 1216.

Figure 13:
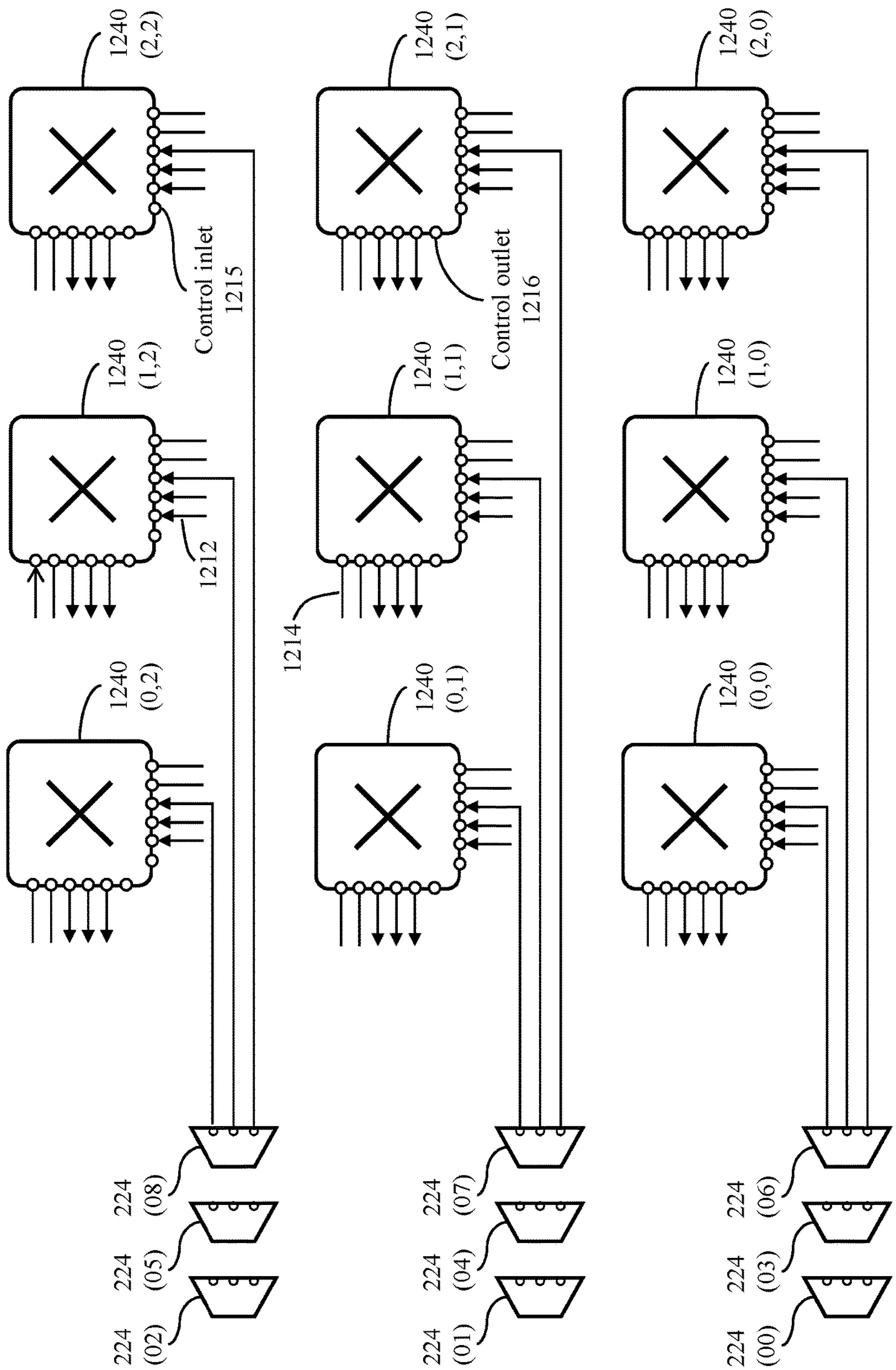
FIG. 13 illustrates source nodes connecting to the switches of FIG. 12 for use in illustrating the second growth scheme.
Figure 14:
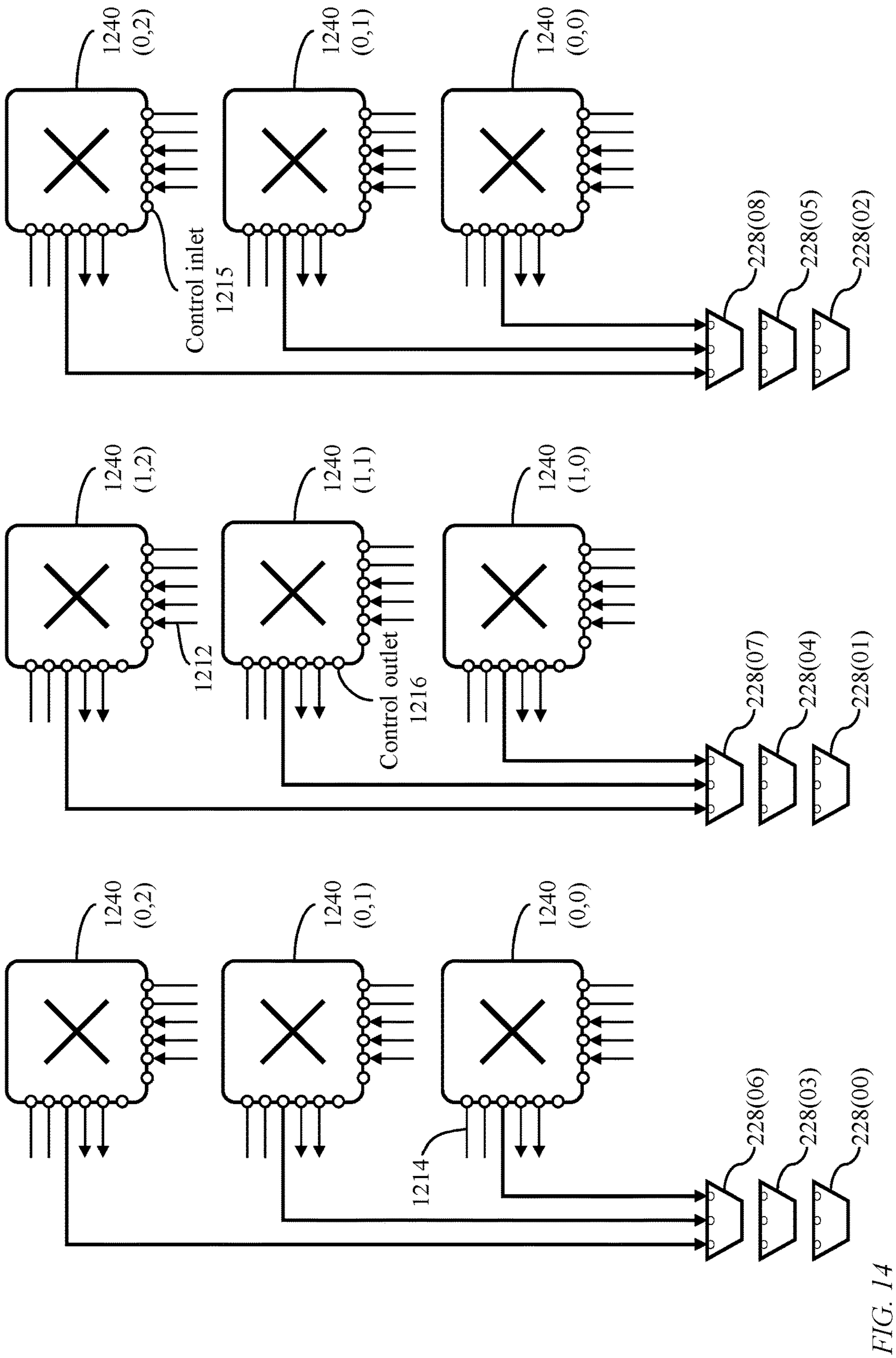
FIG. 14 illustrates sink nodes connecting to the switches of FIG. 12 for use in illustrating the second growth scheme.

FIG. 13 and FIG. 14 illustrate source nodes 224 (of access nodes 220) connecting to the switches 1240 of FIG. 12 and sink nodes 228 (of access nodes 220) connecting to the switches of FIG. 12, where each switch 1240 connects to three source nodes 224 and three sink nodes 228 (m=3).

Figure 15:
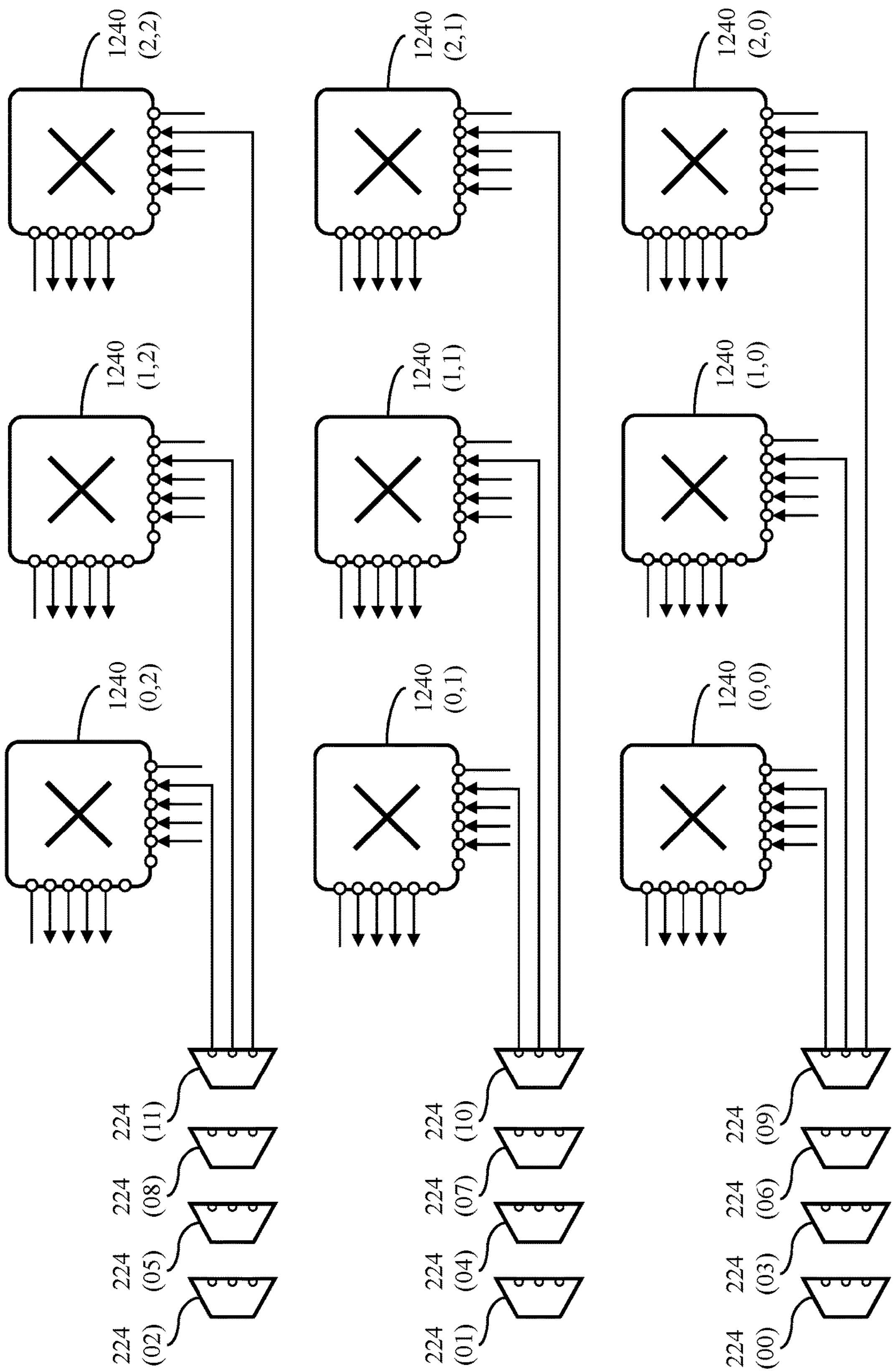
FIG. 15 illustrates a larger number of source nodes connecting to the switches of FIG. 12 according to the second growth scheme.
Figure 16:
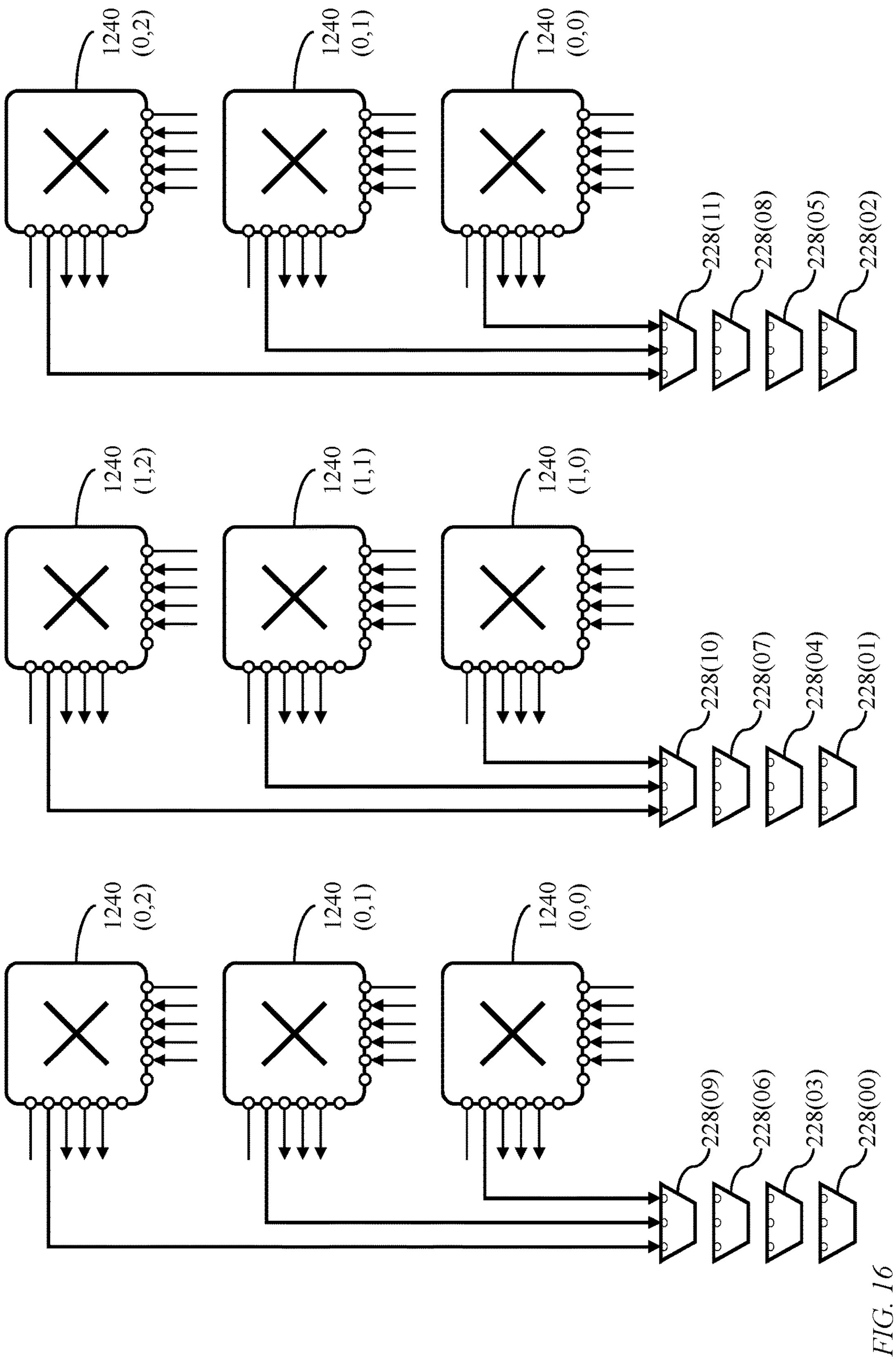
FIG. 16 illustrates a larger number of sink nodes connecting to the switches of FIG. 12 according to the second growth scheme.

FIG. 15 and FIG. 16 illustrate growth of the switching system of FIG. 13 and FIG. 14, according to the second growth scheme, where each switch connects to four source nodes and four sink nodes (m=4). FIG. 15 illustrates source nodes 224 connecting to the switches 1240 of FIG. 12 and FIG. 16 illustrates sink nodes 228 connecting to the switches 1240 of FIG. 12.

Figure 17:
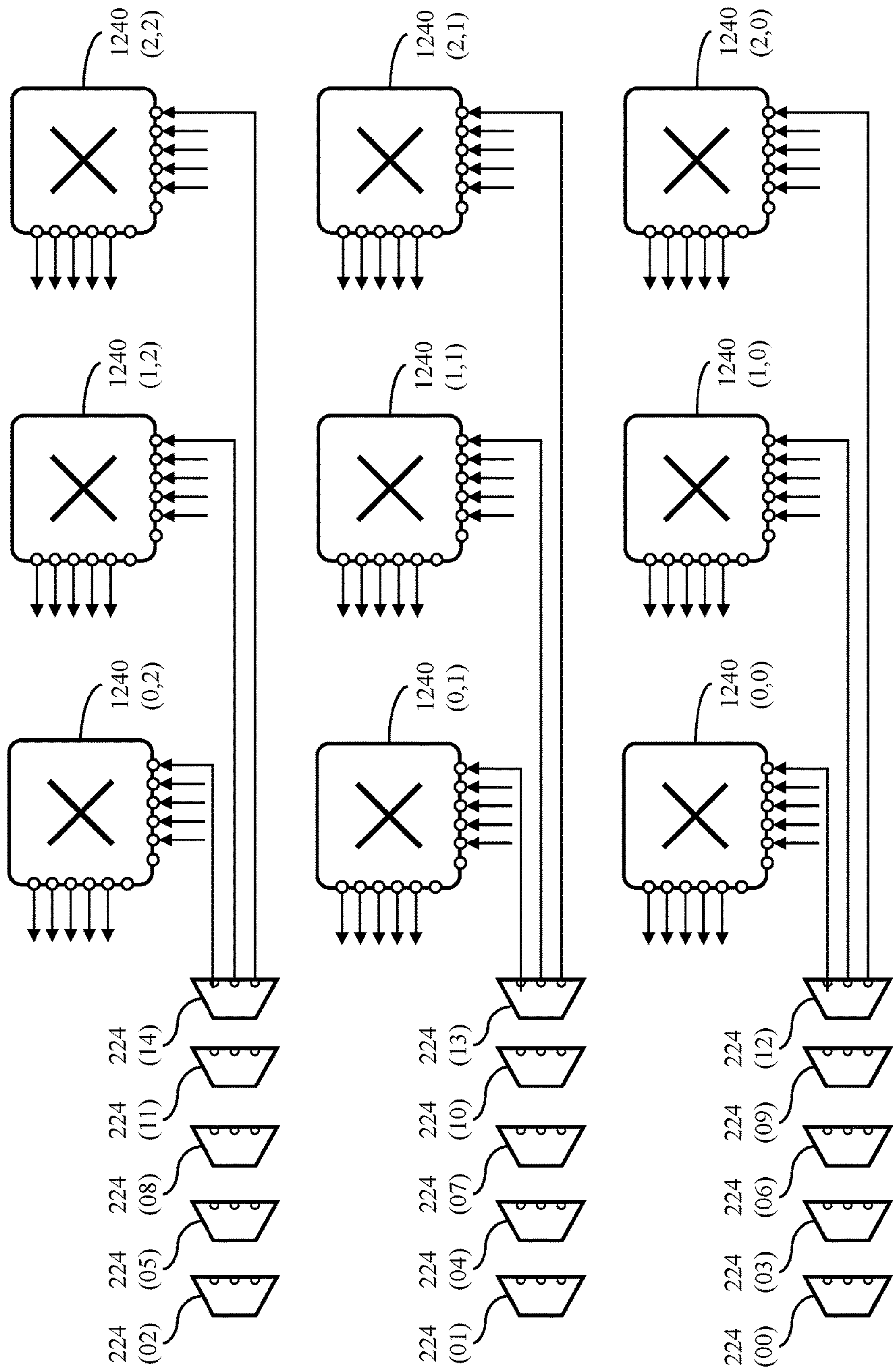
FIG. 17 illustrates further growth of the number of source nodes connecting to the switches of FIG. 12 according to the second growth scheme.
Figure 18:
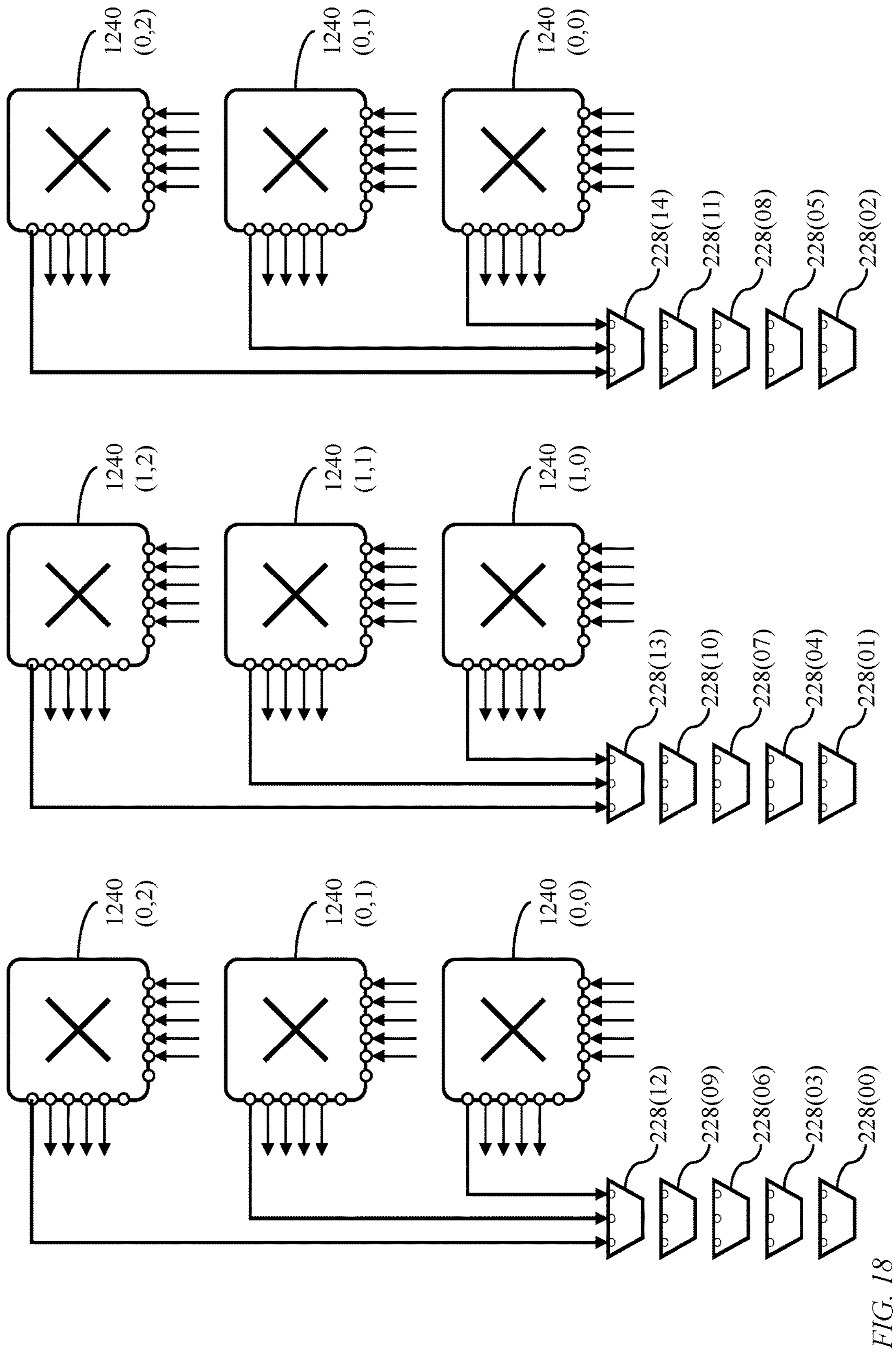
FIG. 18 illustrates further growth of the number of sink nodes connecting to the switches of FIG. 12 according to the second growth scheme.

FIG. 17 and FIG. 18 illustrate further growth of the switching system of FIG. 15 and FIG. 16, according to the second growth scheme, where each switch 1240 connects to five source nodes and five sink nodes (m=5). FIG. 17 illustrates source nodes 224 connecting to the switches 1240 of FIG. 12 and FIG. 18 illustrates sink nodes 228 connecting to the switches 1240 of FIG. 12.

As defined earlier, a switch of column j and row j, $0 \le j < \mu$, in a matrix of switches having μ columns and μ rows, $\mu > 2$, is referenced as a diagonal switch, the columns being indexed as 0 to $(\mu-1)$ and the rows being indexed as 0 to $(\mu-1)$. A diagonal pair of switches comprises a switch of column j and row k and a switch of column k and row j, $j \ne k$ of the matrix of switches.

In summary, the switching system accommodates $\mu \times m$ access nodes. For a requisite initial number of access nodes, μ and m may be selected so that the product $\mu \times m$ at least equals the requisite initial number. Expansion of the switching system may be realized according to either of two schemes.

The first switching-system expansion scheme illustrated in FIG. 4 to FIG. 11 is applicable to a switching system employing distributors (switches or rotators) of fixed dimensions. The second switching-system expansion scheme illustrated in FIG. 13 to FIG. 18 is applicable to a switching system employing expandable distributors (switches or rotators).

According to the first expansion scheme, m new access nodes 220 may be accommodated by adding a number $(2\times\mu+1)$ of new distributors to form a new column of distributors and a new row of distributors, thus extending the matrix of distributors. The switching system is expanded through processes of:

- connecting each access node of m additional access nodes to an input port of each distributor of $(\mu+1)$ distributors of a new row of distributors; and
- connecting m input ports of each distributor of remaining μ distributors of the $(2\times\mu+1)$ new distributors to a set of access nodes connecting to a respective row of distributors.

According to the second expansion scheme, the number of access nodes may be increased through:

- providing an additional input port and an additional output port to each distributor of a current plurality of distributors;
- providing μ additional access nodes; and
- connecting each access node of the μ additional access nodes to an input port of each rotator of a respective row and an output port of each rotator of a respective column of the matrix of distributors.

Routing Control of the Switching System

Figure 19:
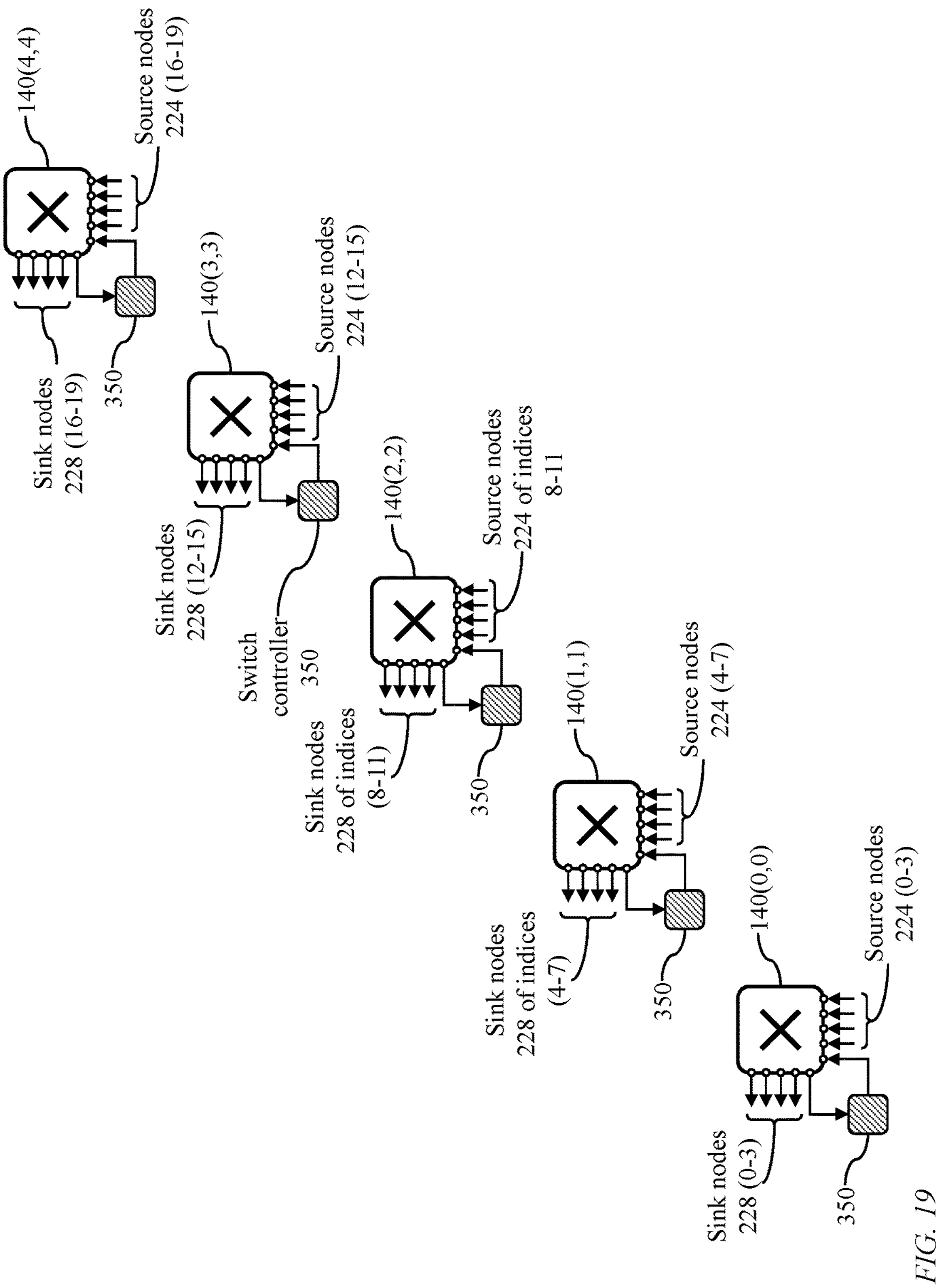
FIG. 19 illustrates diagonal switches along a diagonal of the matrix of switches of FIG. 1.

FIG. 19 illustrates diagonal switches 140($j$, $j$), $0 \le j < \mu$, along a diagonal of the matrix of switches of FIG. 1. Each access node 220 which connects to an input port of a switch 140($j,k$), where j=k, also connects to an output port of the same switch. Thus, where an access node 220 connects to a switch 140($j,j$), there is a return control path from the access node 220 to itself, i.e., from the source node 224 to the sink node 228 of the same access node, through the same switch 140($j,j$). This is not the case where $k \ne j$. In the configurations of FIG. 4 to FIG. 11, each source node 224 has a path to each sink node 228 through one of the switches 140. Thus, when a source node 224 and a sink node 228 of a same access node 220 connect to different switches, a return control path from an access node to itself can be provided through any intermediate access node 220. It is preferable, however, that such a return control path be created without the need to traverse an intermediate access node 220. This can be realized by collocating a switch 140($j$, $k$) with a switch 140($k$, $j$), where $j \ne k$, $0 \le j < \mu$, $0 \le j < \mu$. A switch 140($j,k$) and a switch 140($k,j$), $j \ne k$, form a "diagonal switch pair". With the connectivity schemes of FIG. 4 to FIG. 11, switch 140($j,k$) and 140($k,j$) are also complementary switches forming a "complementary switch pair" as defined above.

Figure 20:
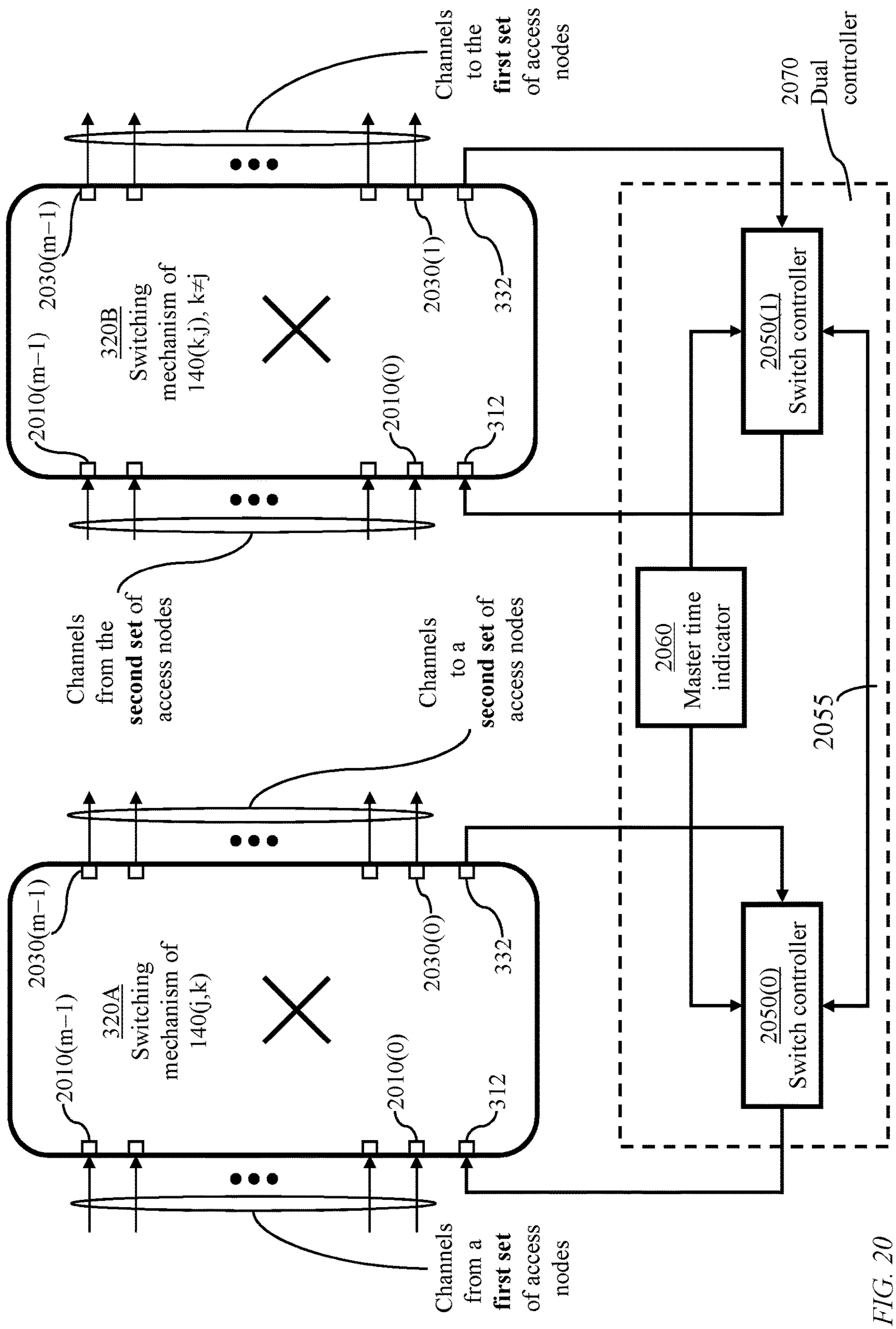
FIG. 20 illustrates coupling of controllers of any complementary switch pairs, in accordance with an embodiment of the present invention.

FIG. 20 illustrates coupling of controllers of any complementary pair of switches of the matrix 100 of switches 140 of FIG. 1 or the matrix of switches 1240 of FIG. 12 to form a "dual controller". A controller 2050(0), which comprises a processor, a scheduler and a timing circuit for time-aligning data arriving at inputs of a switching mechanism 320A of a switch 140($j$, $k$), is coupled through a dual channel 2055 to a similar controller 2050(1) of a switching mechanism 320B of a switch 140($k,j$), $j \ne k$. The mutually coupled controllers 2050(0) and 2050(1) are herein referenced as a "dual controller" 2070. Controller 2050(0) connects to control inlet 312 and control outlet 332 of switching mechanism 320A while controller 2050(1) connects to control inlet 312 and control outlet 332 of switching mechanism 320B. Controllers 2050(0) and 2050(1) are coupled to a master time indicator 2060. Each controller receives control data from respective input ports 2010(0) to 2010($m-1$) through a respective switching mechanism 320A or 320B and transmits control data to respective output ports 2030(0) to 2030($m-1$) through a respective switching mechanism 320A or 320B. Since the input ports 2010(0) to 2010($m-1$) of a switching mechanism 320A and the output ports 2030(0) to 2030($m-1$) of switching mechanism 320B connect to a same set of access nodes, control data from controller 2050(0) may be sent through controller 2050(1) to the same set of access nodes. Likewise, control data may be sent from controller 2050(1) through controller 2050(0) to access nodes connecting to input ports of switching mechanism 320B and output ports of switching mechanism 320A. The two controllers 2050(0) and 2050(1) may be integrated to function as a single controller (not illustrated).

FIG. 21, FIG. 22, FIG. 23, and FIG. 24 illustrate diagonal switch pairs {140($j,k$), 140($k,j$), $j \ne k$}, $0 \le j < \mu$, $0 \le k < \mu$, each diagonal switch pair connecting to a respective set of source nodes and a respective set of sink nodes where, for each switch pair, source nodes of a respective first set of access nodes and sink nodes of a respective second set of access nodes connect to one of the switches while source nodes of the respective second set of access nodes and sink nodes of the respective first set of access nodes connect to the other switch. Thus, each of the diagonal switch pairs is also a complementary switch pair as defined above.

Figure 21:
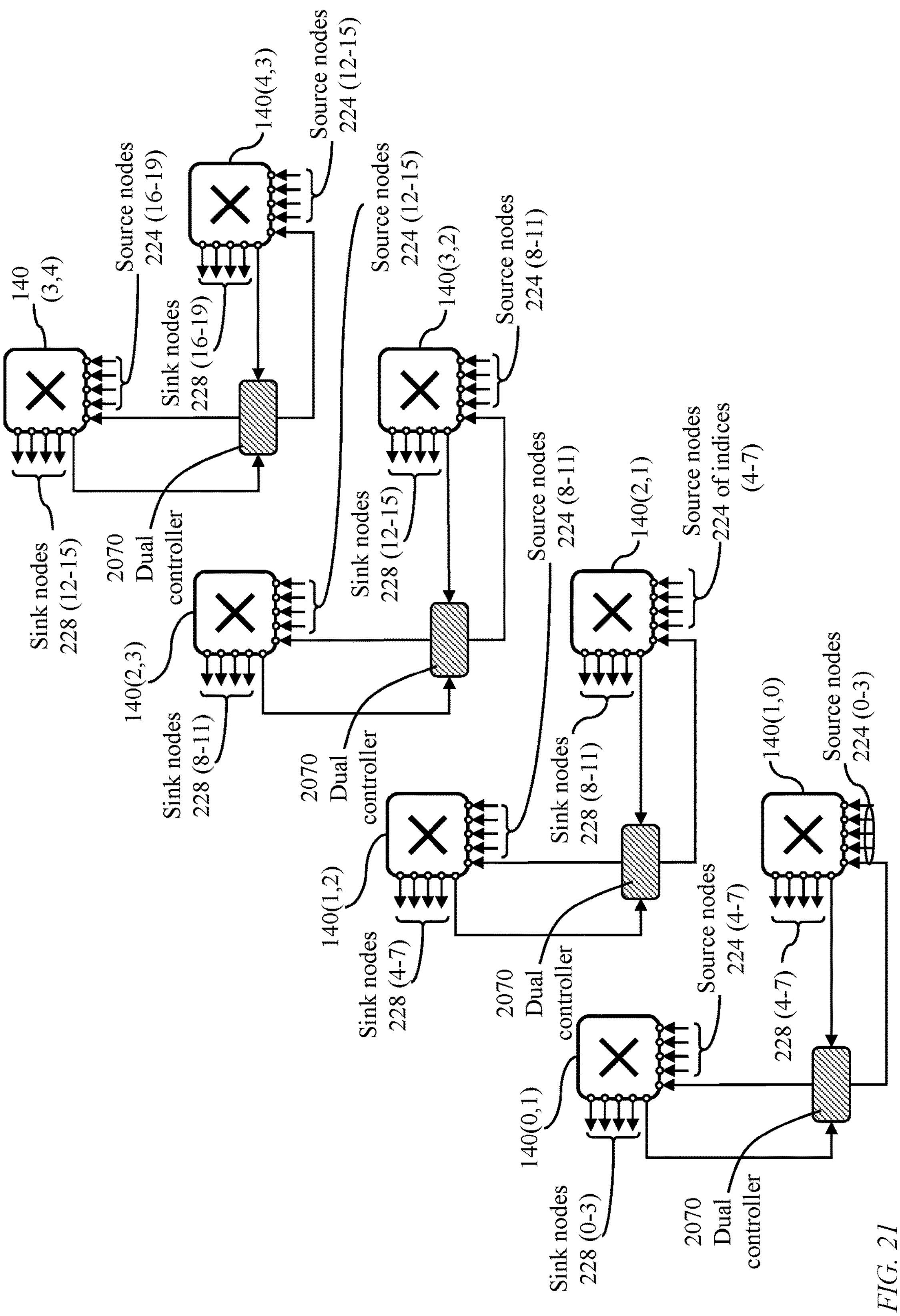
FIG. 21 illustrates a first set of switch pairs each connecting to a respective dual controller where, for each switch pair, source nodes of a respective first set of access nodes and sink nodes of a respective second set of access nodes connect to one of the switches while source nodes of the respective second set of access nodes and sink nodes of the respective first set of access nodes connect to the other switch, in accordance with an embodiment of the present invention.

FIG. 21 illustrates diagonal switch pairs of the matrix of switches of FIG. 1. A switch 140(1,0) connects to source nodes 224 of indices {0, 1, 2, 3} and sink nodes 228 of indices {4, 5, 6, 7} while a complementary switch 140(0,1)

connects to source nodes 224 of indices {4, 5, 6, 7} and sink nodes 228 of indices {0, 1, 2, 3}. Thus, if the two switches 140(1,0) and 140(0,1) are collocated, the two switches may share a dual controller 2070 and a return control path through the switch pair can be established. A switch 140(2,1) connects to source nodes 224 of indices {4, 5, 6, 7} and sink nodes 228 of indices {8, 9, 10, 11} while a complementary switch 140(1,2) of switch 140(2, 1) connects to source nodes 224 of indices {8, 9, 10, 11} and sink nodes 228 of indices {4, 5, 6, 7}. Thus, collocating switches 140(2,1) and 140(1, 2) enables employing a dual controller 2070 and creating a return control path for each of the access nodes of indices 4 to 11 through the switch pair. Likewise, switches 140(3, 2) and 140(2,3) form a complementary pair, and switch 140(3, 4) and switch 140(4, 3) form a complementary pair. The source nodes 224 and sink nodes 228 connecting to each of switches 140(1,0), 140(0,1), 140(2,1), 140(1,2), 140(3,2), 140(2,3), 140(4,3), and 140(3,4) are indicated in FIG. 21.

Figure 22:
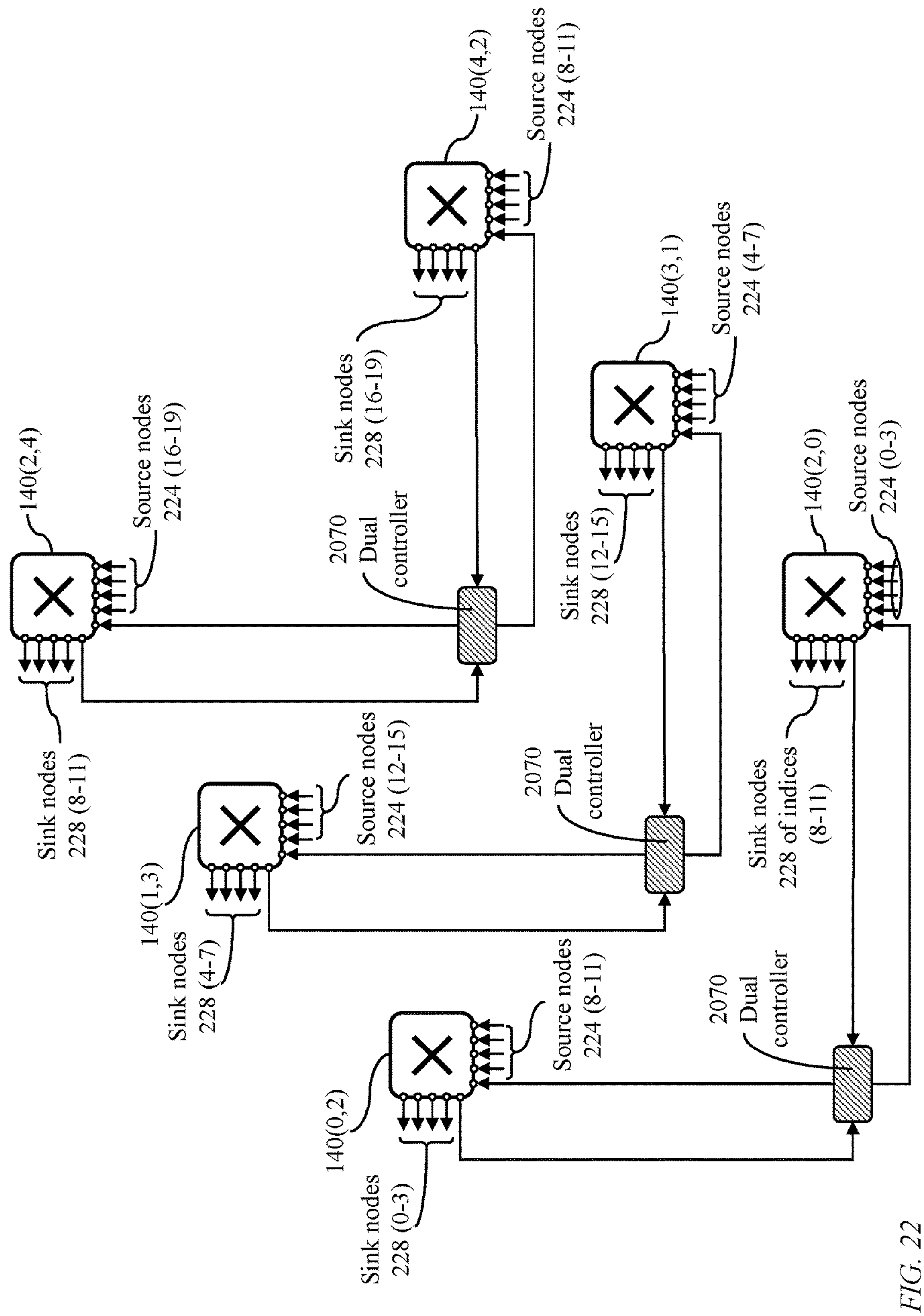
FIG. 22 illustrates a second set of switch pairs each connecting to a respective dual controller where the connectivity of each switch pair to source nodes and sink nodes is analogous to the connectivity of FIG. 21.

As illustrated in FIG. 22, switch 140(2, 0) and switch 140(0,2) form a complementary switch pair, switch 140(3,1) and switch 140(1,3) form a complementary switch pair, and switch 140(4,2) and switch 140(2,4) form a complementary switch pair. The source nodes 224 and sink nodes 228 connecting to each of switches 140(2,0), 140(0,2), 140(3,1), 140(1,3), 140(4,2), and 140(2,4) are indicated in FIG. 22.

Figure 23:
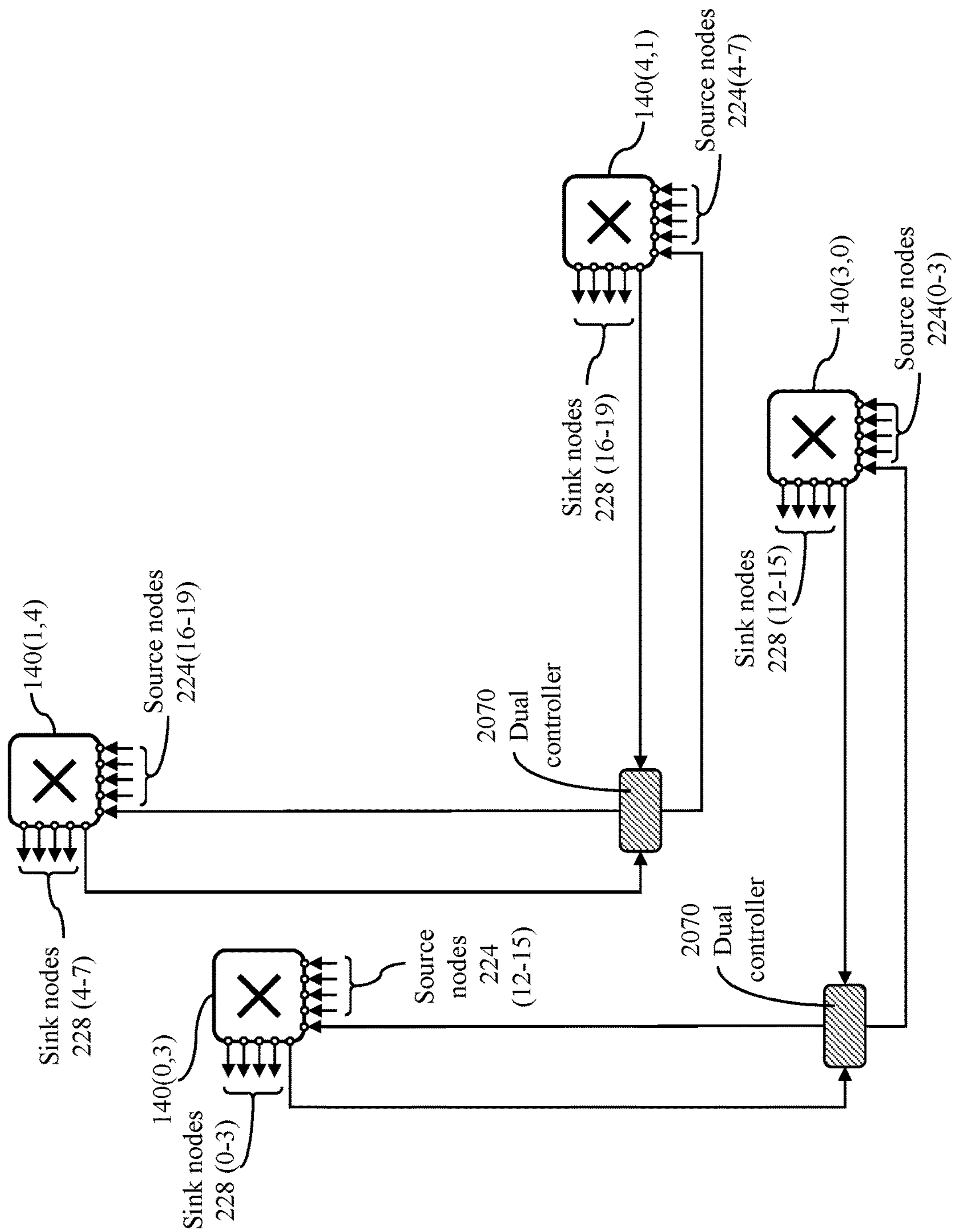
FIG. 23 illustrates a third set of switch pairs each connecting to a respective dual controller where the connectivity of each switch pair to source nodes and sink nodes is analogous to the connectivity of FIG. 21.

FIG. 23 illustrates a dual controller 2070 of switch 140(3, 0) and switch 140(0,3) which form a complementary switch pair, and a dual controller 2070 of switch 140(4,1) and switch 140(1,4) which form a complementary switch pair. Switch 140(3, 0) connects to source nodes 224 of indices 0-3 and sink nodes 228 of indices 12-15, while complementary switch 140(0, 3) connects to sink nodes 228 of indices 0-3 and source nodes 224 of indices 12-15. Switch 140(4, 1) connects to source nodes 224 of indices 4-7 and sink nodes 228 of indices 16-19, while complementary switch 140(1,4) connects to sink nodes 228 of indices 4-7 and source nodes 224 of indices 16-19.

Figure 24:
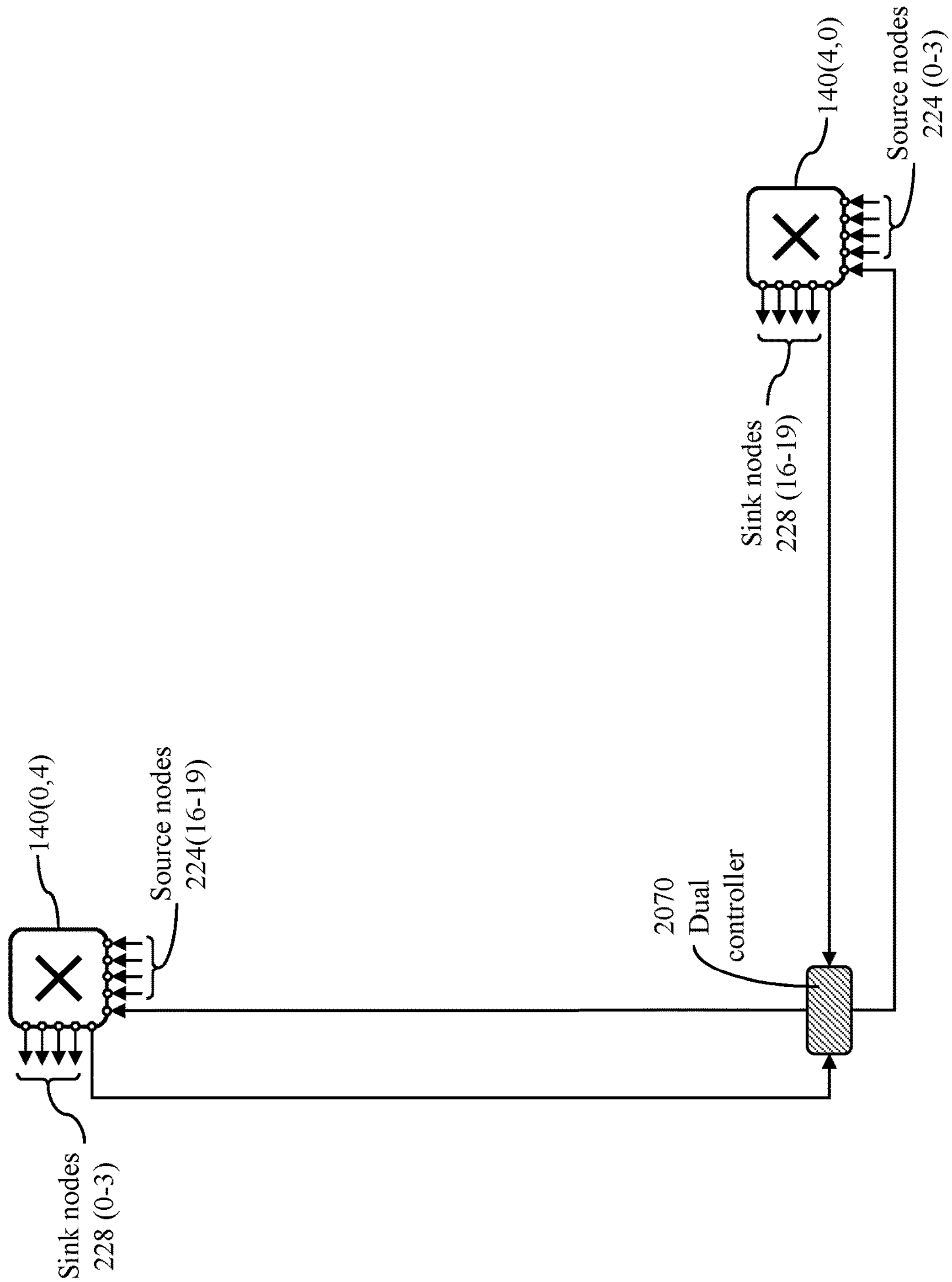
FIG. 24 illustrates a switch pair connecting to a respective dual controller where the connectivity of the switch pair to source nodes and sink nodes is analogous to the connectivity of FIG. 21.

FIG. 24 illustrates a dual controller 2070 of switch 140(4, 0) and switch 140(0,4) which form a complementary switch pair. Switch 140(4, 0) connects to source nodes 224 of indices 0-3 and sink nodes 228 of indices 16-19, while complementary switch 140(0,4) connects to sink nodes 228 of indices 0-3 and source nodes 224 of indices 16-19.

Switching System Employing Core Rotators

A large-scale temporal rotator may be used to interconnect a large number of access nodes to create a fully-meshed network. A temporal rotator having N input ports and N output ports, N>2, provides a path from each access node to each other access node. With each input port (and each output port) having a capacity of R bits/second, a path of capacity R/N from each port to each other port is created, with each access node having a return data path to itself. A number of N×N temporal rotators may be operated in parallel to distribute data from N upstream wavelength-division-multiplexed (WDM) links to N downstream WDM links. However, with a large number N (8000, for example), the delay resulting from use of a temporal rotator of large dimension and the small capacity of a path within each temporal rotator may be undesirable.

Figure 25:
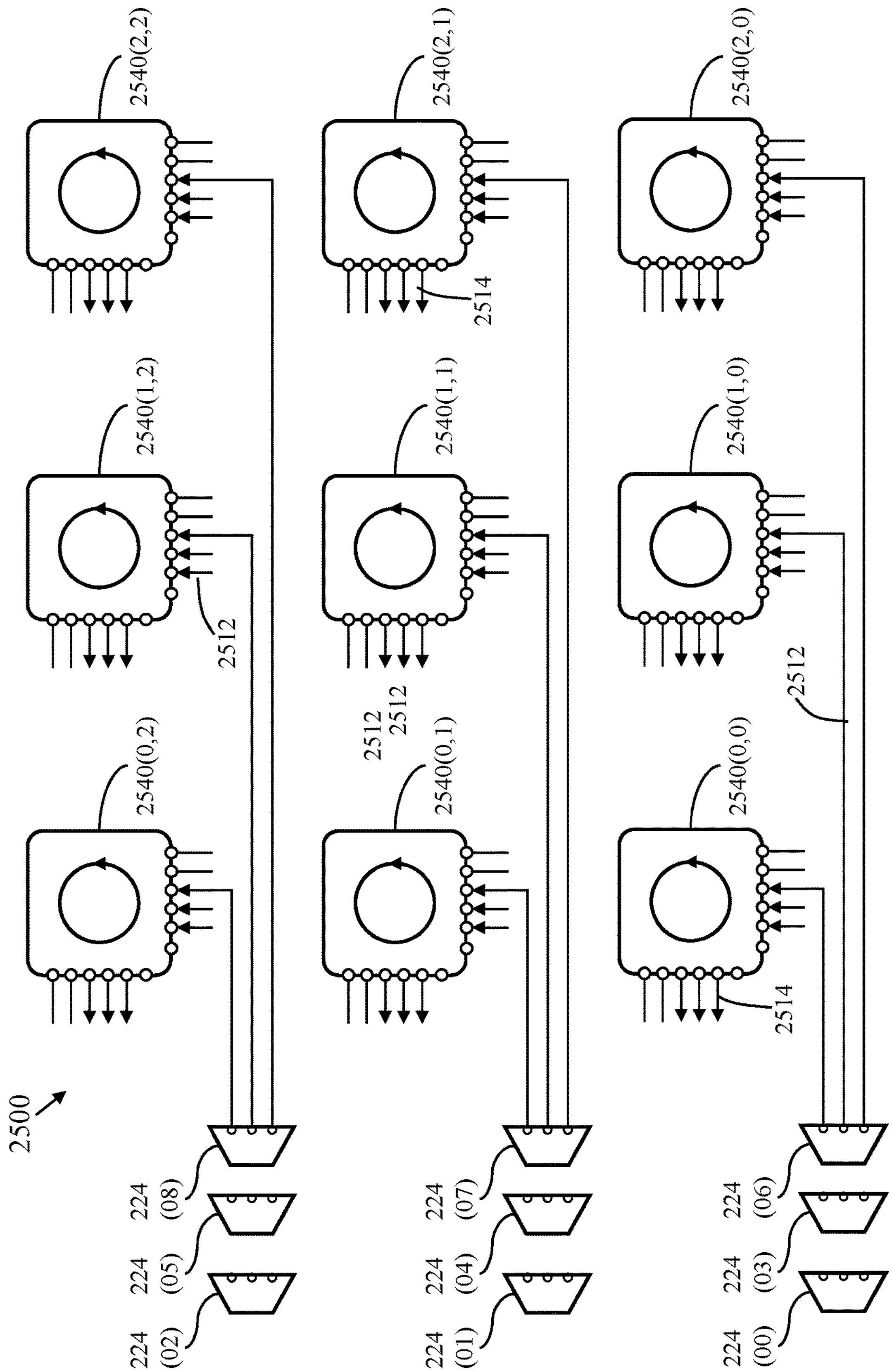
FIG. 25 illustrates source nodes connecting to rotators arranged in a matrix of rotators, in accordance with an embodiment of the present invention.

FIG. 25 illustrates temporal rotators 2540 of relatively small dimensions arranged in a μ×μ matrix 2500, μ>2. A temporal rotator is herein also referenced as a "rotator"; all rotators used in the present application are temporal rotators. The access nodes of FIG. 2 may be interconnected through a matrix of rotators. The matrix of rotators may interconnect a large number of access nodes 220 with a reduced delay and a larger path capacity for each directed pair of access nodes. The matrix 2500 of rotators illustrated in FIG. 25 has three columns and three rows (μ=3). Each rotator 2540 connects to a respective set of input channels 2512 and a respective set of output channels 2514. With each rotator 2540 having m inputs and m outputs, m>2, and each source node having μ upstream channels individually connecting to rotators of a respective row of the matrix of rotators, the total number of access nodes is m×μ. With m=32 and μ=256, for example, the total number of source nodes is 8192.

The μ columns of matrix 2500 may be indexed as 0 to (μ−1) and the μ rows may be indexed as 0 to (μ−1). A rotator of column j and row j, 0≤j<μ is referenced as a "diagonal rotator". A rotator of column j and row k together with a rotator of column k and row j, 0≤j<μ, 0≤k<μ, j≠k, are said to form a "diagonal rotator pair".

Figure 26:
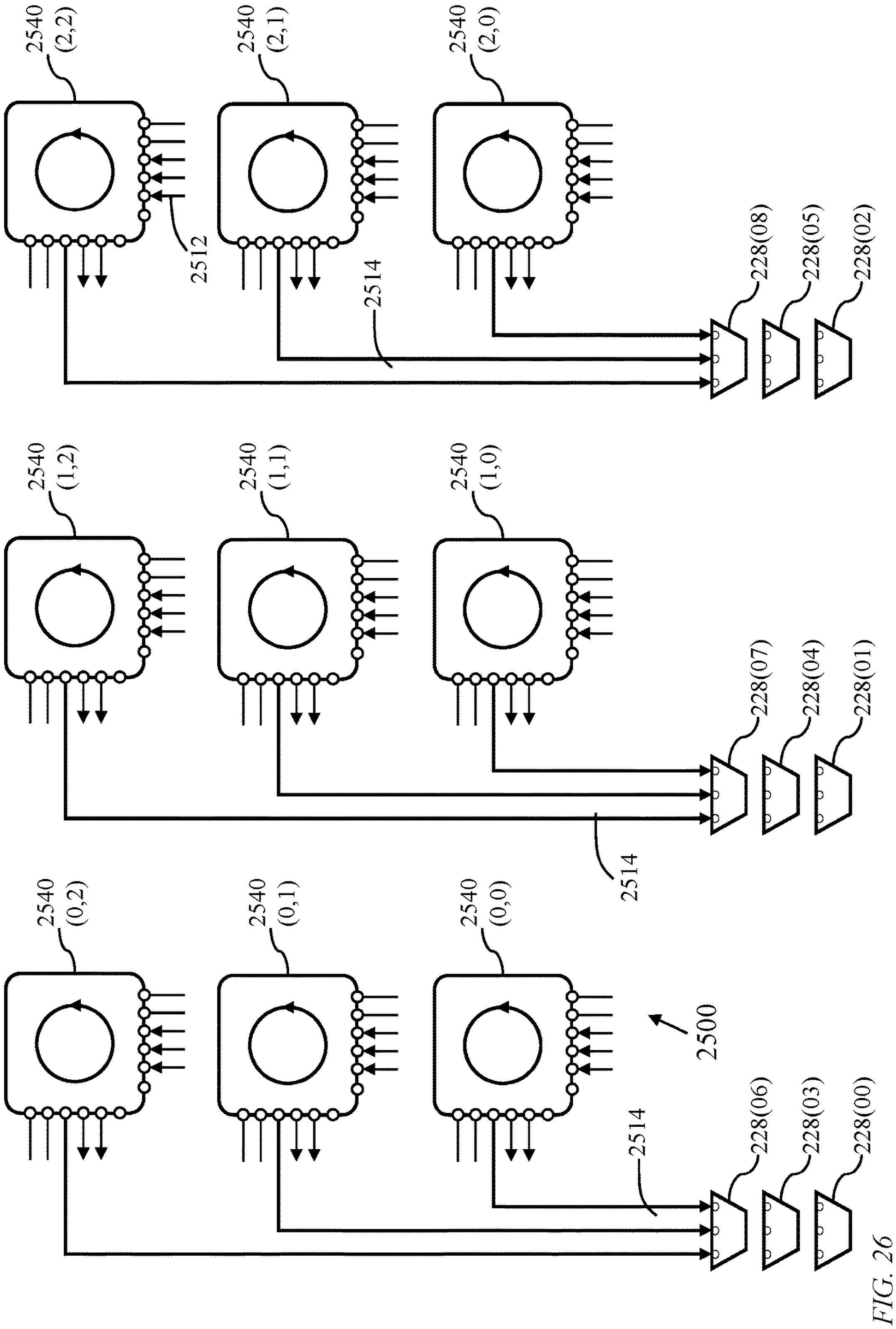
FIG. 26 illustrates connections of the rotators of FIG. 25 to sink nodes.

FIG. 26 illustrates connections of the rotators of FIG. 25 to sink nodes 228. With each sink node having μ downstream channels individually connecting to rotators of a respective column of the matrix of rotators, the number of sink nodes is m×μ.

Figure 27:
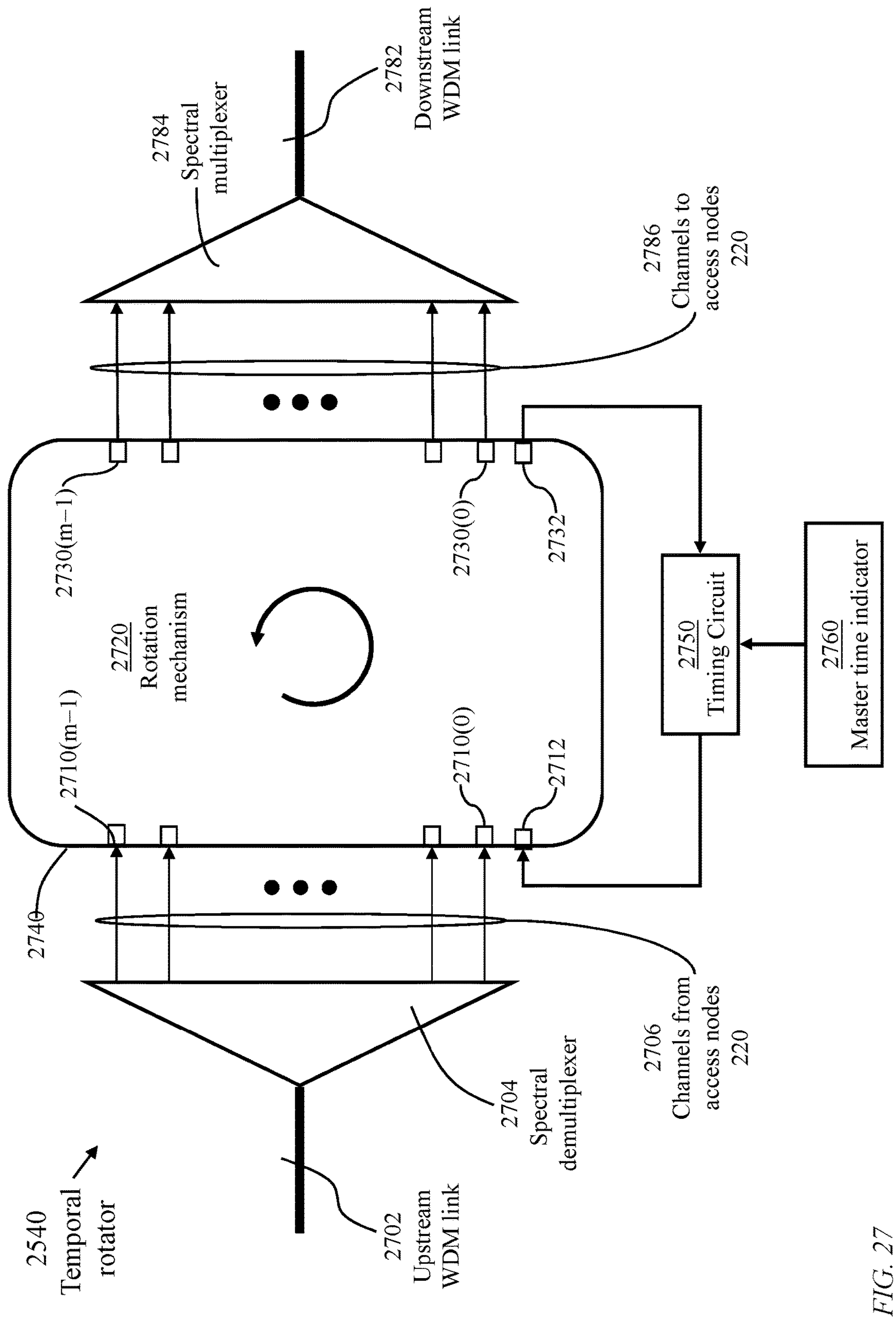
FIG. 27 illustrates a rotator coupled to a timing circuit.

FIG. 27 illustrates a temporal rotator 2540 comprising a number, m, of input ports 2710, m output ports 2730, a control inlet 2712, and a control outlet 2732, and a rotation mechanism 2720 cyclically connecting each input port 2710 and control inlet 2712 to each output port 2730 and control outlet 2732. The m input ports are individually identified as input ports 2710(0), 2710(1), . . . , **2710(*m*−1), m>2. The m output ports are individually identified as output ports 2730(0), 2730(1), . . . , 2730(*m*−1). The m input ports receive data originating at a respective set of access nodes 220 through upstream channels 2706. The m output ports transmit data to a respective set of access nodes 220 through downstream channels 2786. For a rotator along a diagonal of matrix 2500 of rotators, i.e., a rotator positioned in a column j and a row j, 0≤j<μ, channels 2706 receive data from a set of m access nodes and channels 2786 transmit data to the same set of m access nodes 220. For a rotator positioned in a column j and a row k, where k≠j, channels 2706 receive data from a respective first set of m access nodes and channels 2786 transmit data to a respective second set of m access nodes 220, where the first set and the second set are disjoint, i.e., not having any access node in common. A rotation mechanism 2720** cyclically transfers data from the input ports and the control inlet to the output ports and the control outlet.

A timing circuit 2750 receives timing data from a set of access nodes 220 connecting to input ports 2710 through the input ports 2710, the rotation mechanism, and control outlet 2732. The timing circuit 2750 transmits timing data to a set of access nodes 220 connecting to output ports 2730 through control inlet 2712, the rotation mechanism, and output ports 2730. Timing circuit 2750 is coupled to a master time indicator 2760. Timing circuit 2750 comprises a processor and a memory device storing processor-executable instructions which cause the processor to perform processes relevant to comparing timing data received from an access node with corresponding time indications of master time indicator 2760 and reporting discrepancies to the access node.

Upstream channels 2706 from a first set of access nodes 220 and downstream channels 2786 to a second set of access nodes may be routed individually if the rotation mechanism is collocated with the first set and second set of access nodes. In a geographically distributed switching system, upstream channels 2706 may occupy different spectral bands in an upstream WDM link 2702 and a spectral demultiplexer 2704 separates the spectral bands to be directed to different input ports of the rotation mechanism 2720. Downstream channels 2786 from different output ports of the rotation mechanism may occupy different spectral bands and a spectral multiplexer 2784 combines the spectral bands onto in a downstream WDM link 2782. While FIG. 27 illustrates one upstream WDM link 2702, one spectral demultiplexer 2704, one spectral multiplexer 2784, and one downstream WDM link 2782, the spectral demultiplexer 2704 may be implemented as multiple spectral demultiplexers, and the upstream WDM link may be implemented as multiple upstream WDM links each connected to a respective spectral demultiplexer. Likewise, the spectral multiplexer 2784 may be implemented as multiple spectral multiplexers each combining a respective number of spectral bands onto a respective downstream WDM links.

Figure 28:
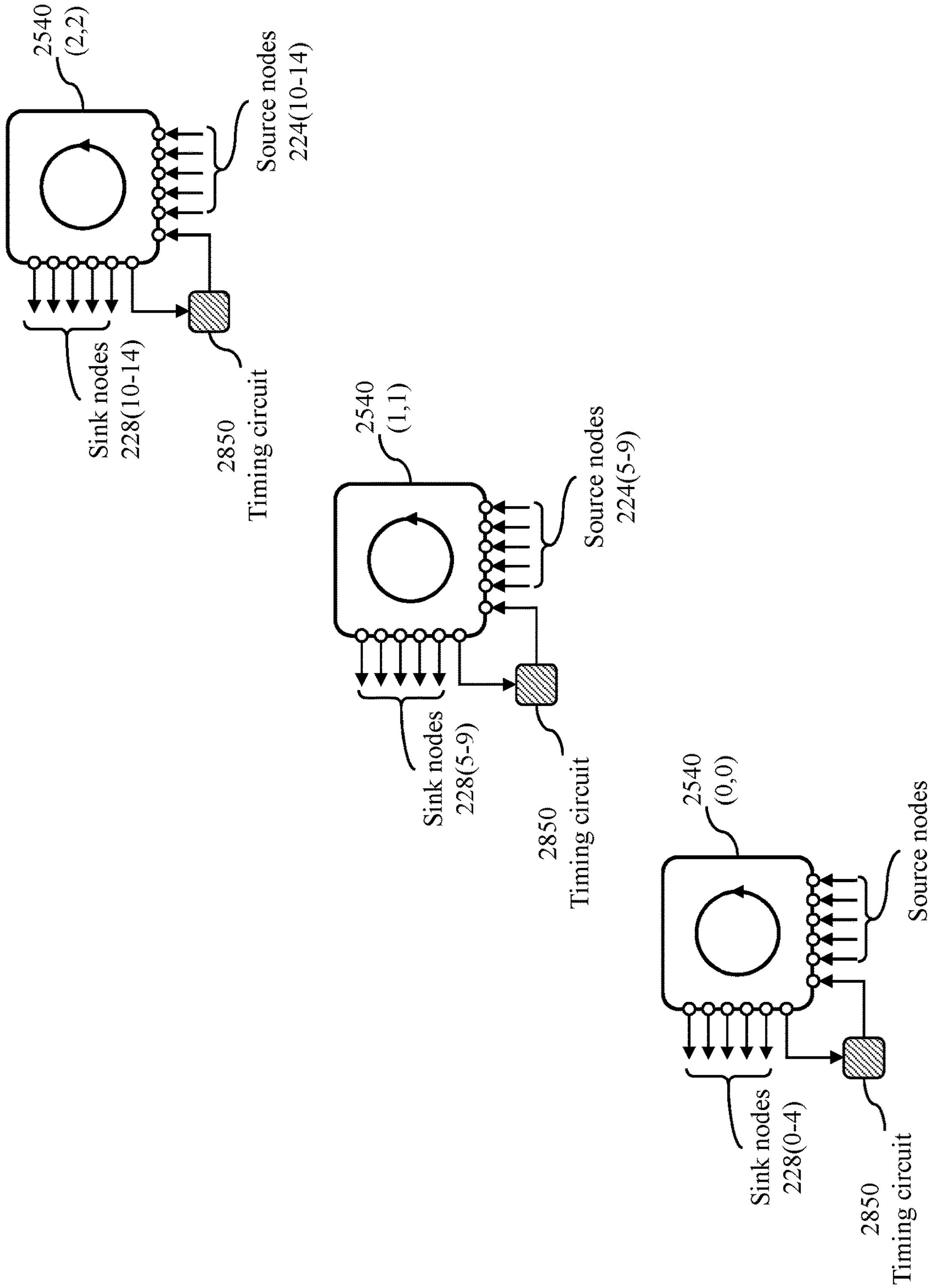
FIG. 28 illustrates diagonal rotators each of which connecting to a respective set of access nodes, where each access node combines a source node and a sink node.

FIG. 28 illustrates diagonal rotators 2540($j$, $j$), 0≤j<μ, along a diagonal of the matrix of rotators of FIG. 25. Each access node which connects to an input port of a rotator 2540($j$,$k$), where j=k, also connects to an output port of the same rotator. Thus, where an access node connects to a rotator 2540($j$,$j$), there is a return control path from the access node to itself through the same rotator 2540($j$,$j$). In the configuration of FIG. 25 and FIG. 26, each source node 224 has a path to each sink node 228 through one of the rotators 2540. Thus, when a source node 224 and a sink node 228 of a same access node connect to different rotators, a return control path from an access node to itself can be realized through any intermediate access node. However, it is preferable that such a return control path be created without the need to traverse an intermediate access node. This can be realized by collocating a rotator 2540($j$, $k$) with a rotator 2540($k$, $j$), where j≠k, 0≤j<μ, 0≤k<μ, where j and k are indices of a column and a row, respectively, of the matrix of rotators.

Rotator 2540(0,0) cyclically connects source nodes 224 of indices 0-4 to sink nodes 228 of indices 0-4. Rotator 2540(1,1) cyclically connects source nodes 224 of indices 5-9 to sink nodes 228 of indices 5-9. Rotator 2540(2,2) cyclically connects source nodes 224 of indices 10-14 to sink nodes 228 of indices 10-14.

Figure 29:
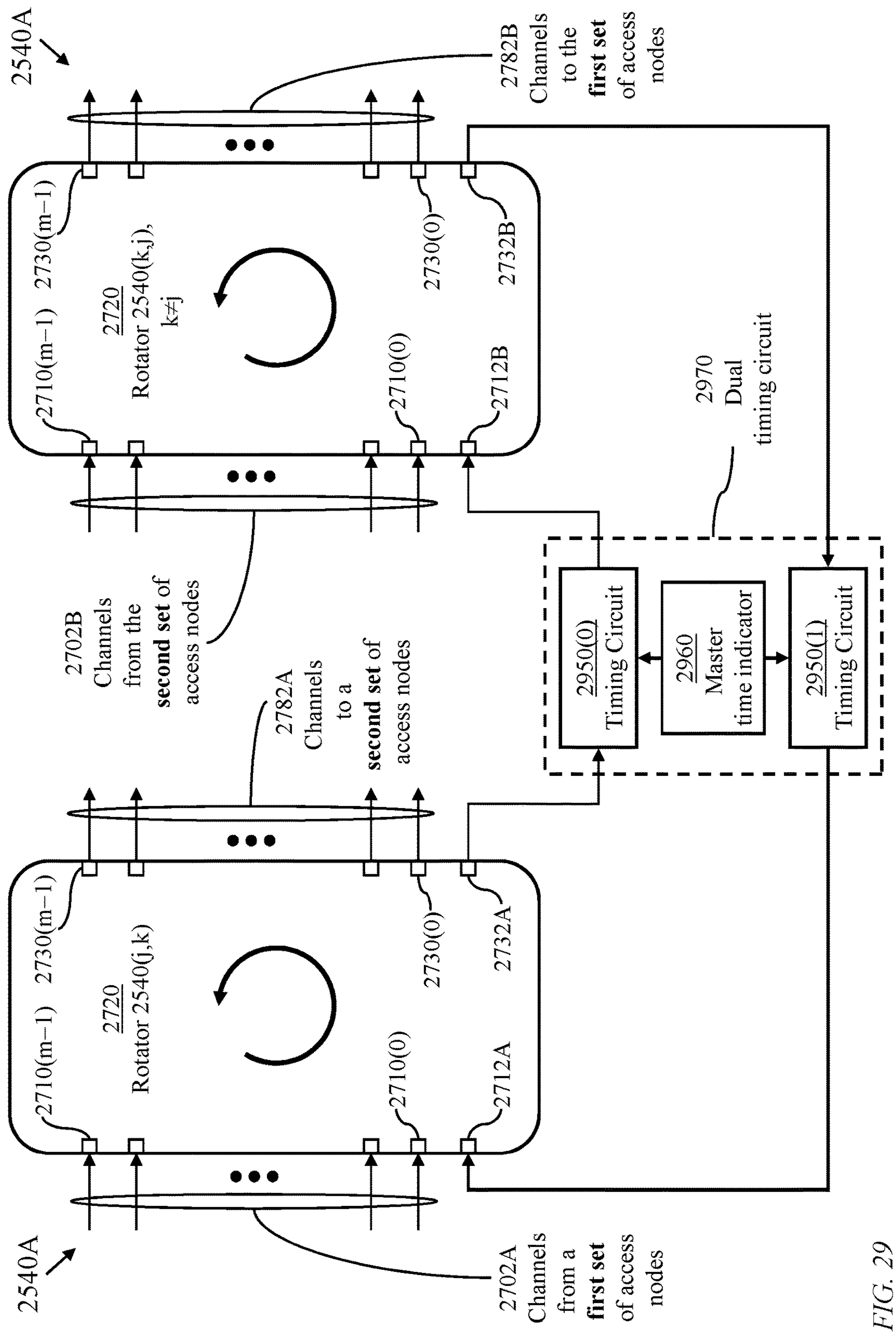
FIG. 29 illustrates coupling of timing circuits to rotators of any complementary rotator pair, in accordance with an embodiment of the present invention.

FIG. 29 illustrates coupling a dual timing circuit 2970 to a diagonal rotator pair. (a complementary rotator pair). The dual timing circuit 2970 comprises constituent timing circuits 2950(0) and 2950(1), both coupled to a master time indicator 2960. Timing circuit 2950(0) compares timing data received from input channels 2702A of rotator 2540($j$,$k$) with corresponding readings of master time indicator 2960 and sends a result of the comparison from control inlet 2712B to output channels 2782B of rotator 2540($k$,$j$). Likewise, timing circuit 2950(1) compares timing data received from input channels 2702B of rotator 2540($k$,$j$) with corresponding readings of the master time indicator 2960 and sends a result of the comparison from control inlet 2712A to output channels 2782A of rotator 2540($j$,$k$).

As defined earlier, a rotator of column j and row j, 0≤j<μ, in a matrix of rotators having μ columns and μ rows, μ>2, is referenced as a diagonal rotator, the columns being indexed as 0 to (μ−1) and the rows being indexed as 0 to (μ−1). A diagonal pair of rotators comprises a rotator of column j and row k and a rotator of column k and row j, j≠k, of the matrix of rotators.

Each diagonal rotator is coupled to a timing circuit coupled to a control outlet and a control inlet of the same diagonal rotator. The timing circuit is coupled to a respective master time indicator and is configured to receive timing data from external sources and return information relevant to discrepancy of received timing data from corresponding readings of the master time indicator.

Thus, the switching system of FIG. 25 and FIG. 26 comprises a plurality of rotators 2540 arranged in a matrix of a number of columns and the same number of rows, wherein a first rotator 2540A and a second rotator 2540B of each diagonal pair of rotators (FIG. 29) are collocated. Each rotator 2540 comprises a number m of input ports 2710, m output ports 2730, m>2, a control inlet 2712, a control outlet 2732, and a rotating mechanism 2720. Each access node is communicatively coupled to an input port 2710 of each rotator 2540 of a respective row, and an output port 2730 of each rotator 2540 of a respective column of the matrix of rotators.

A first timing circuit 2950(0) connects to a control outlet 2732A of the first rotator 2540A and a control inlet 2712B of the second rotator. A second timing circuit 2950(1) connects to a control outlet 1732B of the second rotator 2540B and a control inlet 2712A of the first rotator. A master time indicator 2960 provides reference time to the first timing circuit 2950(0) and the second timing circuit 2950(1).

Figure 30:
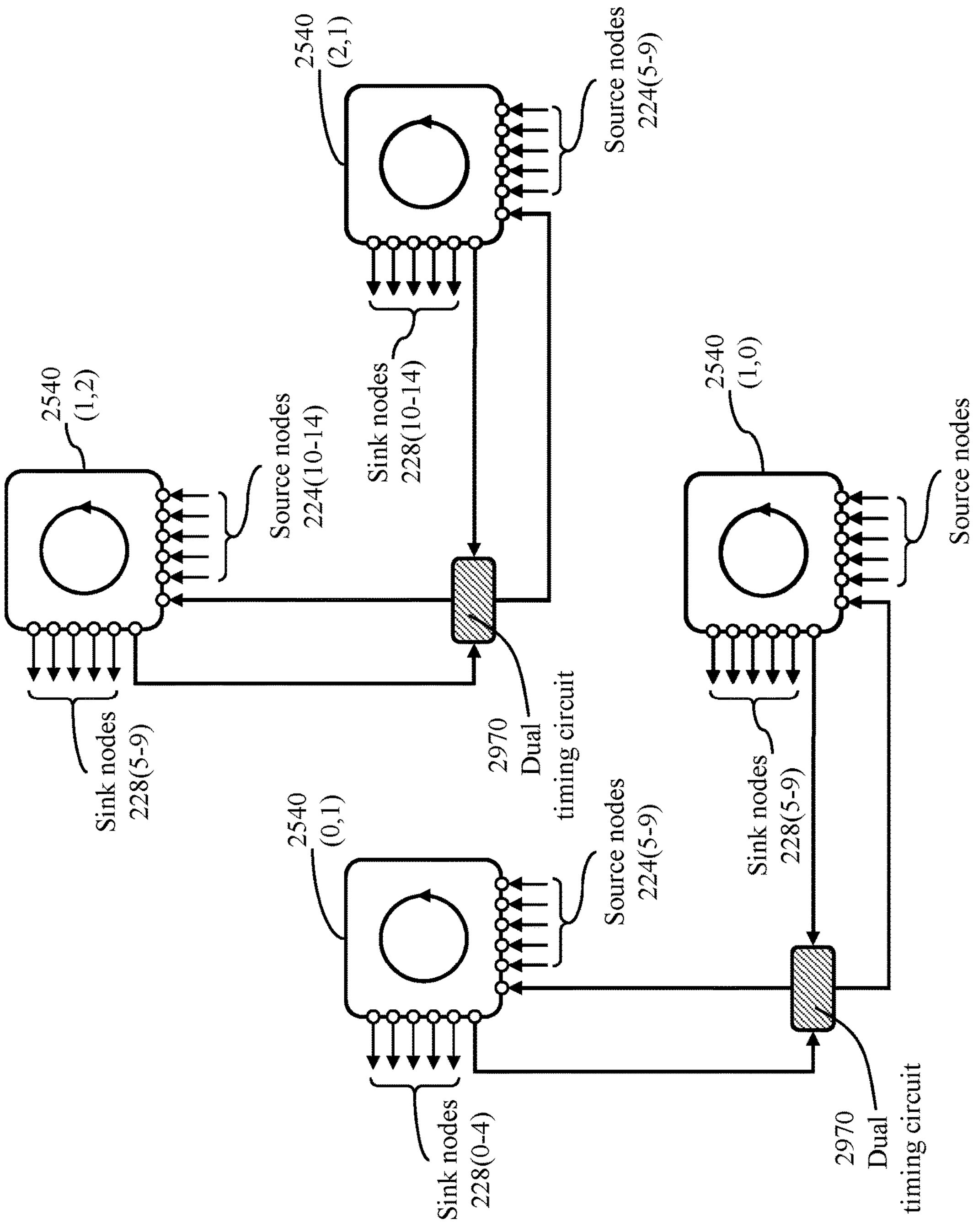
FIG. 30 illustrates rotator pairs each connecting to a respective dual timing circuit where, for each rotator pair, source nodes of a respective first set of access nodes and sink nodes of a respective second set of access nodes connect to one of the rotators while source nodes of the respective second set of access nodes and sink nodes of the respective first set of access nodes connect to the other rotator of the each rotator pair, in accordance with an embodiment of the present invention.
Figure 31:
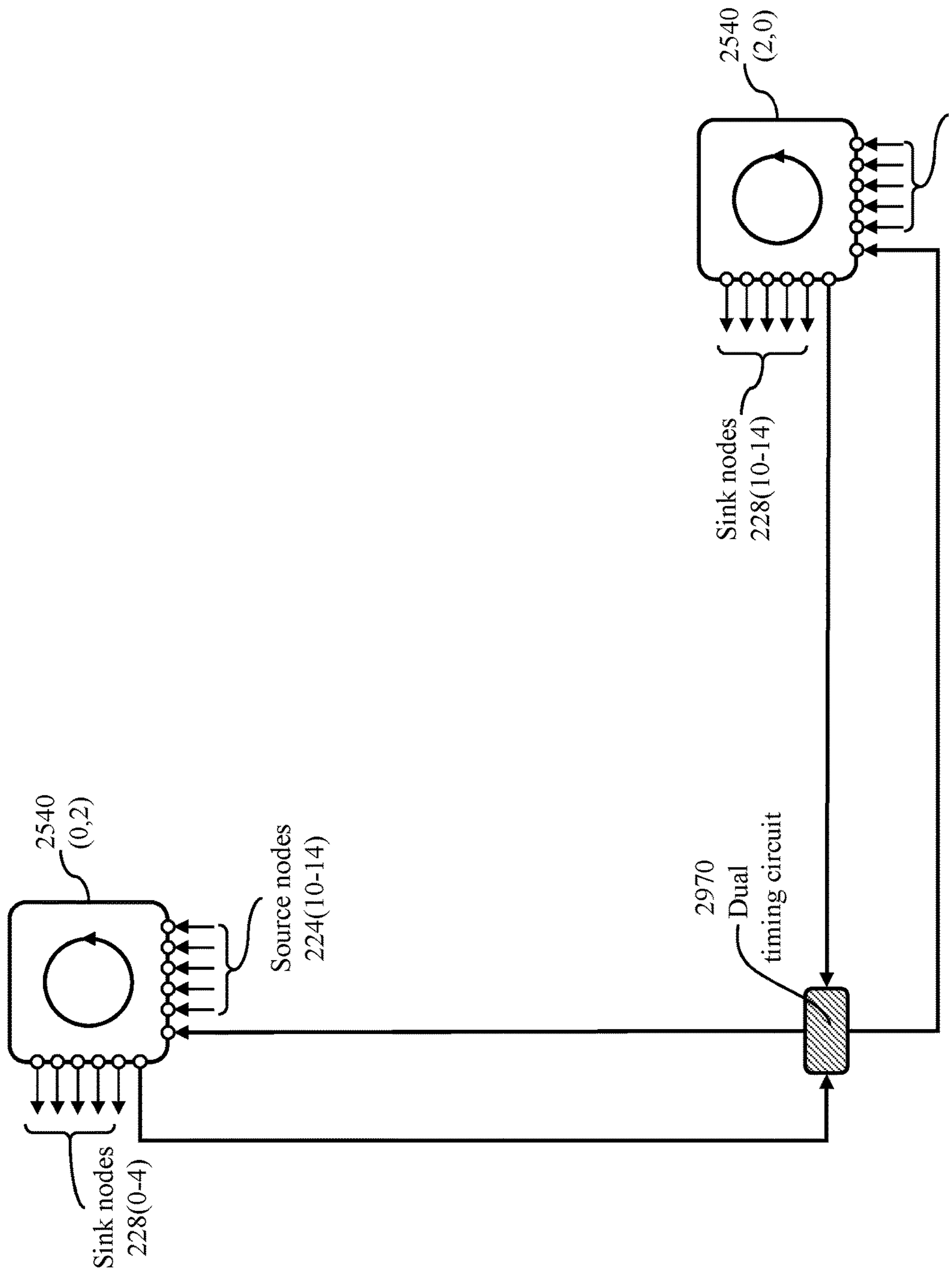
FIG. 31 illustrates a rotator pair connecting to a respective dual timing circuit where the connectivity of the rotator pair to source nodes and sink nodes is analogous to the connectivity of FIG. 30.

FIG. 30 and FIG. 31 illustrate rotator pairs each connecting to a respective set of source nodes and a respective set of sink nodes where, for each rotator pair, source nodes of a respective first set of access nodes and sink nodes of a respective second set of access nodes connect to one of the rotators while source nodes of the respective second set of access nodes and sink nodes of the respective first set of access nodes connect to the other rotator of the each rotator pair. The rotator-pair connectivity illustrated in FIG. 30 and FIG. 31 are analogous to the switch-pair connectivity of FIG. 23 and FIG. 24, respectively. Rotators 2540($j$, $k$) and 2540($k$,$j$), k≠j, are preferably collocated to exchange timing data using a dual timing circuit 2970 illustrated in FIG. 29.

Rotator 2540(1,0) transfers data from source nodes 224 of indices 0-4 to sink nodes 228 of indices 5-9 while rotator 2540(0,1) transfers data from source nodes 224 of indices 5-9 to sink nodes 228 of indices 0-4. Rotator 2540(2,1) transfers data from source nodes 224 of indices 5-9 to sink nodes 228 of indices 10-14 while rotator 2540(1,2) transfers data from source nodes 224 of indices 10-14 to sink nodes 228 of indices 5-9. Rotator 2540(2,0) transfers data from source nodes 224 of indices 0-4 to sink nodes 228 of indices 10-14 while rotator 2540(0,2) transfers data from source nodes 224 of indices 10-14 to sink nodes 228 of indices 0-4.

Rotators 2540(1,0) and 2540(0,1) form a diagonal rotator pair and with the connectivity scheme of FIGS. 25 and 26, the two rotators also form a complementary rotator pair. Likewise, rotators 2540(2,1) and 2540(1,2) form a diagonal rotator pair which is also a complementary rotator pair. Rotators 2540(2,0) and 2540(0,2) form a diagonal rotator pair which is also a complementary rotator pair.

Figure 32:
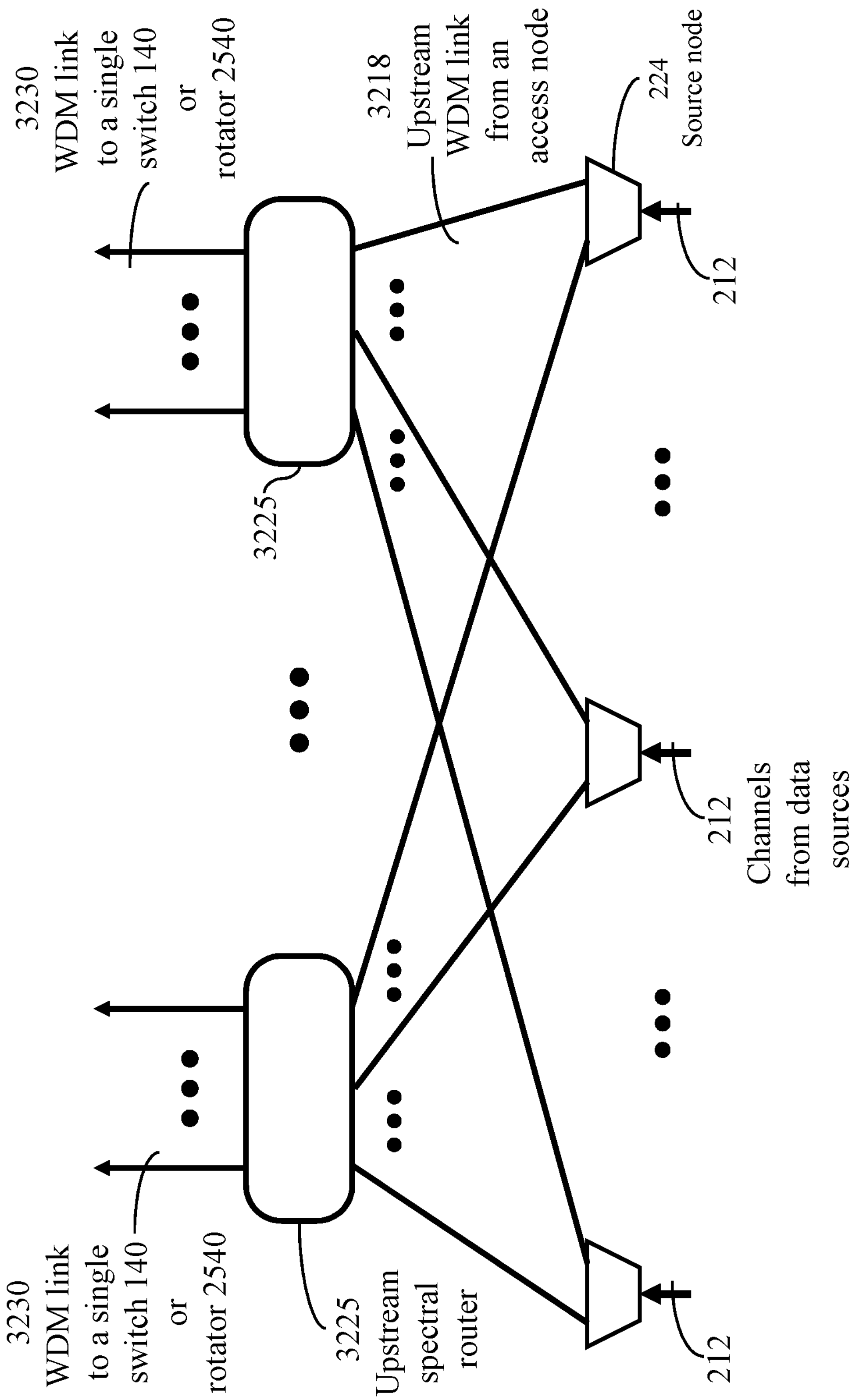
FIG. 32 illustrates connection of source nodes to switches or rotators through upstream spectral routers.

FIG. 32 illustrates connection of a set of source nodes 224 (a set of access nodes 220) to switches 140 or rotators 2540 through a respective set of upstream spectral routers 3225. Each source node 224 of the set of source nodes has an upstream WDM link 3218 to each upstream spectral router 3225 of the respective set of upstream spectral routers. Each upstream spectral router receives optical signals from an upstream WDM link 3218 from each source node 224 of the set of source nodes and directs individual spectral bands from each upstream WDM link 3218 connecting to the upstream spectral router to each output WDM link 3230 connecting to the upstream spectral router. Each output WDM link 3230 is directed to a respective switch 140 or a respective rotator 2540. Thus, each switch 140 (or rotator 2540) receives a spectral band from each source node 224 of the set of source nodes. Each source node 224 receives data from data sources through channels 212 as illustrated in FIG. 2.

Figure 33:
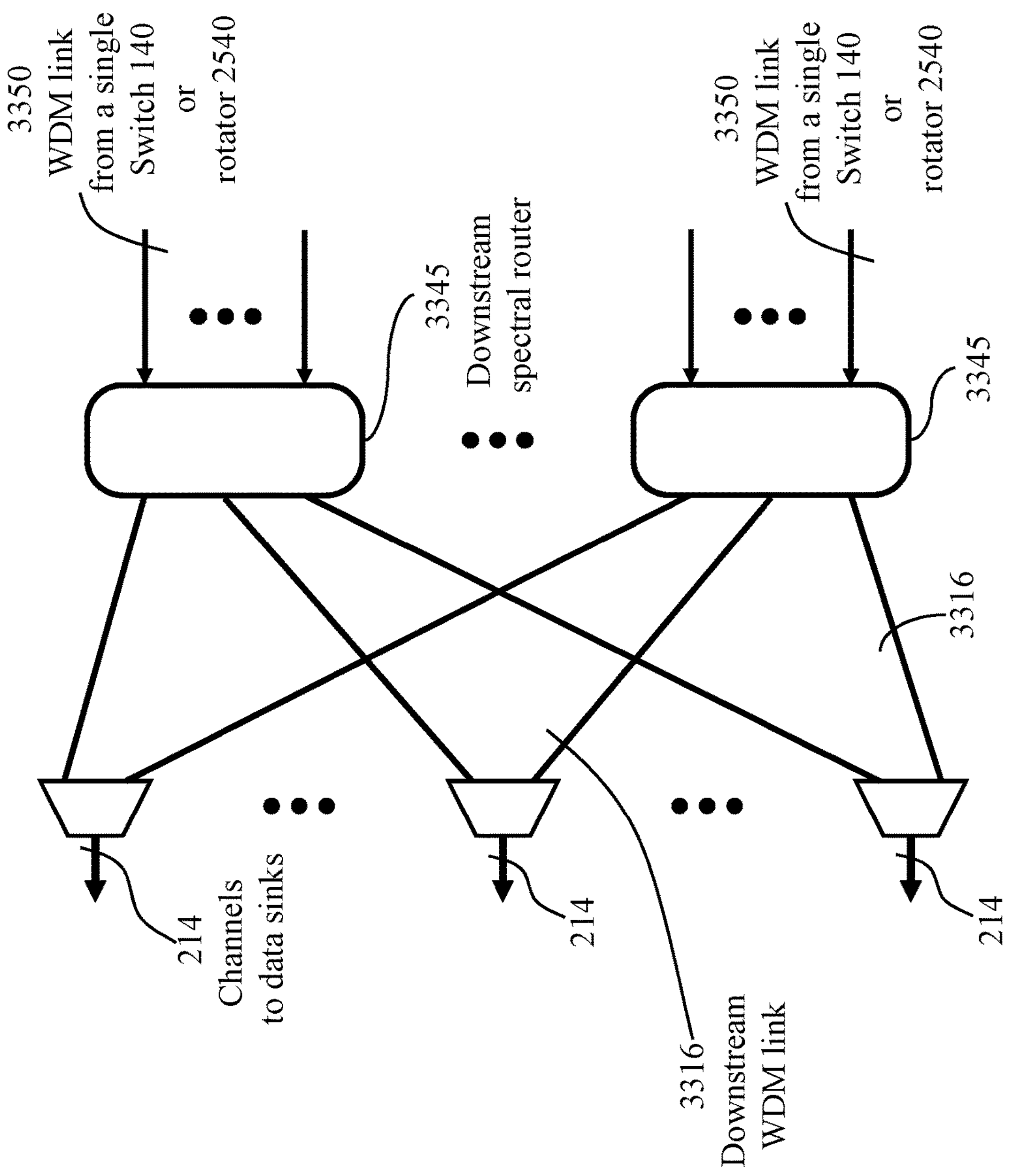
FIG. 33 illustrates connection of switches or rotators to sink nodes, through downstream spectral routers.

FIG. 33 illustrates connection of switches 140 or rotators 2540 to a set of sink nodes 228 (a set of access nodes 220) through a respective set of downstream spectral routers 3345. Each sink node 228 of the set of sink nodes connects to a downstream WDM link 3316 from each downstream spectral router 3345 of the respective set of downstream spectral routers. Each downstream spectral router receives optical signals from a set of switches 140 or a set of rotators 2540 through input WDM links 3350 and directs individual spectral bands of each input WDM link 3350 to each sink node 228 of the set of sink nodes through a respective downstream WDM link 3216. Thus, each sink node 228 of the set of sink nodes receives a spectral band from each input WDM link 3350. Each sink node 228 transmits data to data sinks through channels 214 as illustrated in FIG. 2.

Eliminating the Need for Spectral Routers

As described above with reference to FIG. 32 and FIG. 33, the connectivity scheme of access nodes to switches or rotators, where the access nodes are geographically distributed and the switches or rotators are geographically distributed, relies on use of intermediate spectral routers. Each access node is coupled to an upstream WDM link to each of a respective set of upstream spectral routers and a downstream WDM link from each of a respective set of downstream spectral routers. To eliminate the need for upstream and downstream spectral routers, the switches 140 or rotators 2540 may be arranged into constellations of collocated switches or rotators. Preferably, the switches or rotators of each constellation are logically arranged in a matrix and the entire plurality of switches 140 or plurality of rotators 2540 are arranged in a matrix of constellations. Each source node 224 may connect to each constellation of a respective row of the matrix of constellations through an upstream WDM link. Each sink node 228 may connect to each constellation of a respective column of the matrix of constellations through a downstream WDM link.

Figure 34:
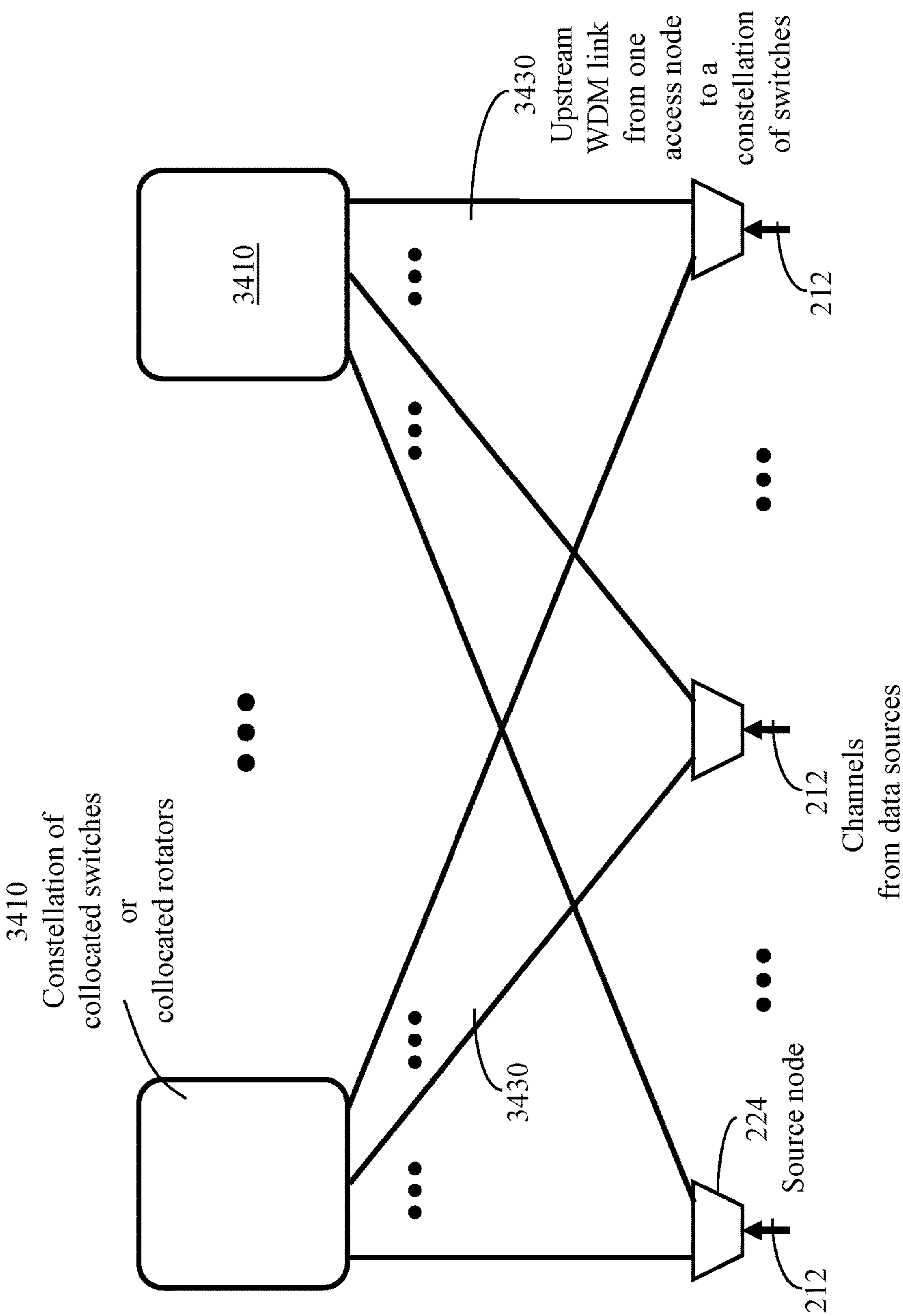
FIG. 34 illustrates direct connection, through upstream wavelength-division-multiplexed links (WDM links), of source nodes to a number of constellations of switches or rotators, in accordance with an embodiment of the present invention.

FIG. 34 illustrates direct connection, through upstream WDM links 3430, of source nodes 224 (of access nodes 220) to constellations 3410 of switches or rotators belonging to a row of a matrix of constellations.

Figure 35:
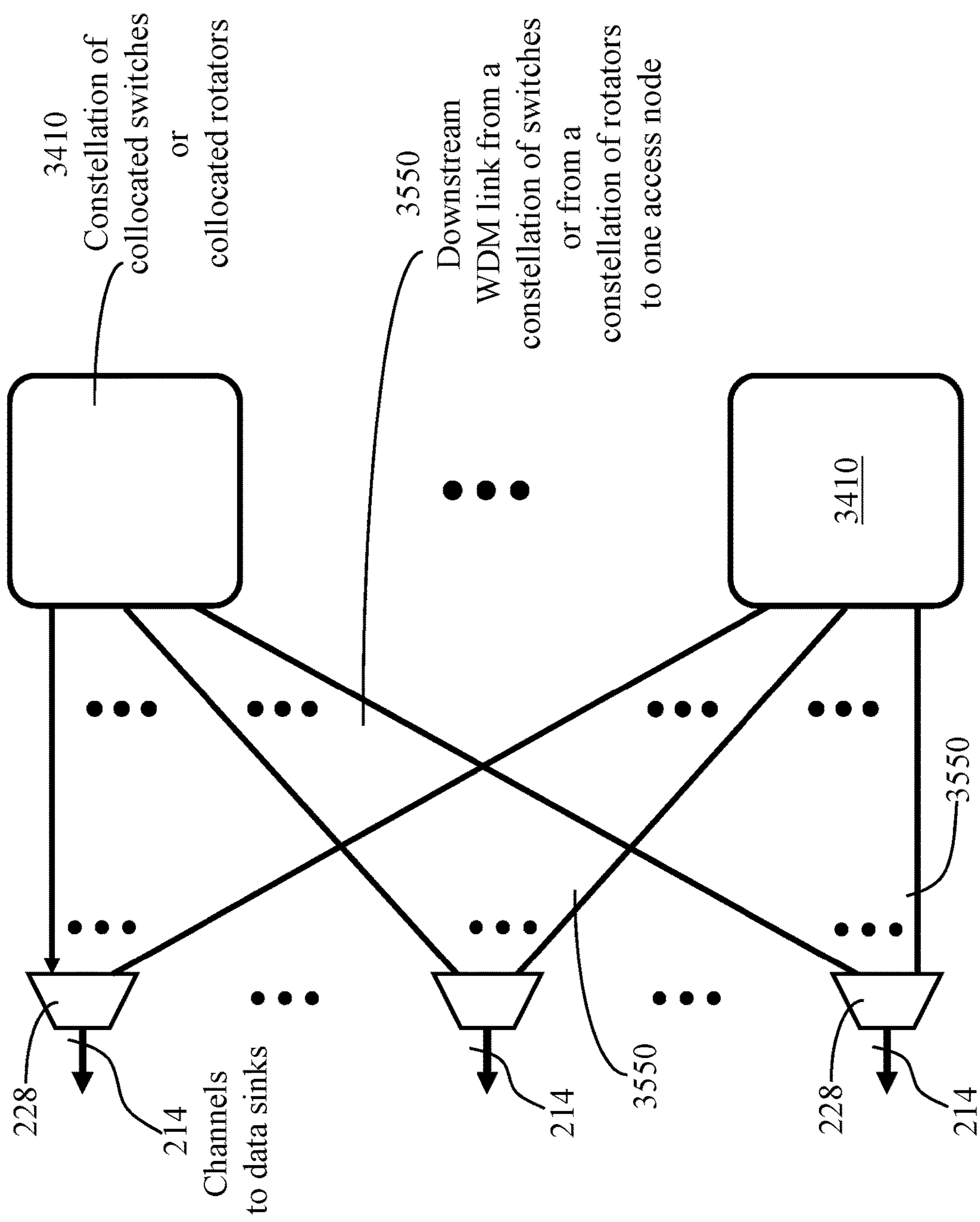
FIG. 35 illustrates connection of constellations of switches or rotators to sink nodes through downstream WDM links, in accordance with an embodiment of the present invention.

FIG. 35 illustrates connection of constellations 3410 of switches or rotators to sink nodes 228 (of access nodes 220) through downstream WDM links 3550.

WDM Linkage of Access Nodes to Switches or Rotators

In the exemplary switching system of FIG. 36 to FIG. 41, distributors (switches or rotators) 3640 are arranged in a matrix having six columns and six rows (μ=6). Each switch or rotator 3640 has four input ports, four output ports (m=4), a control inlet, and a control outlet.

Figure 36:
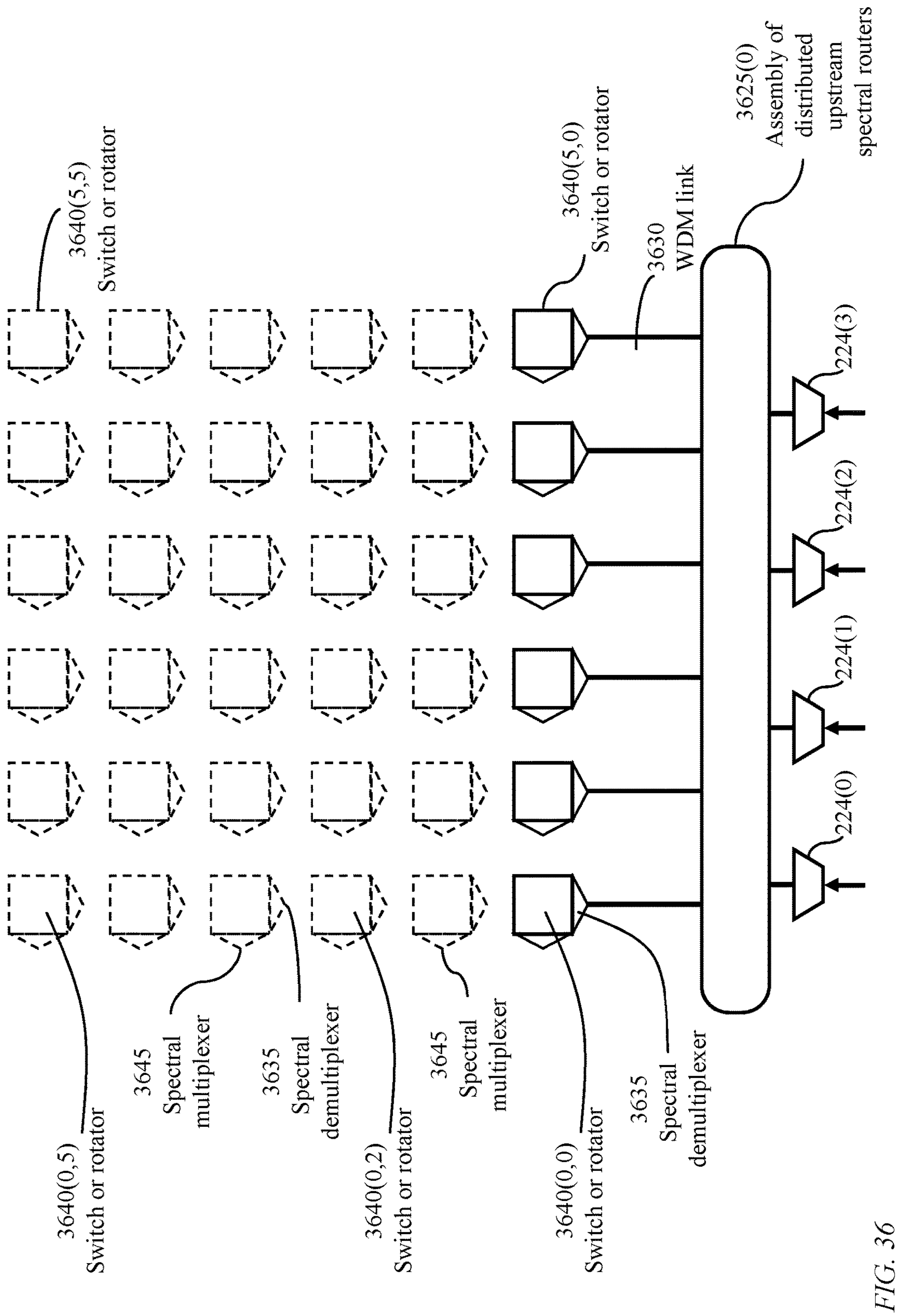
FIG. 36 illustrates upstream connections from a subset of access nodes to switches or rotators through an assembly of upstream spectral routers.
Figure 37:
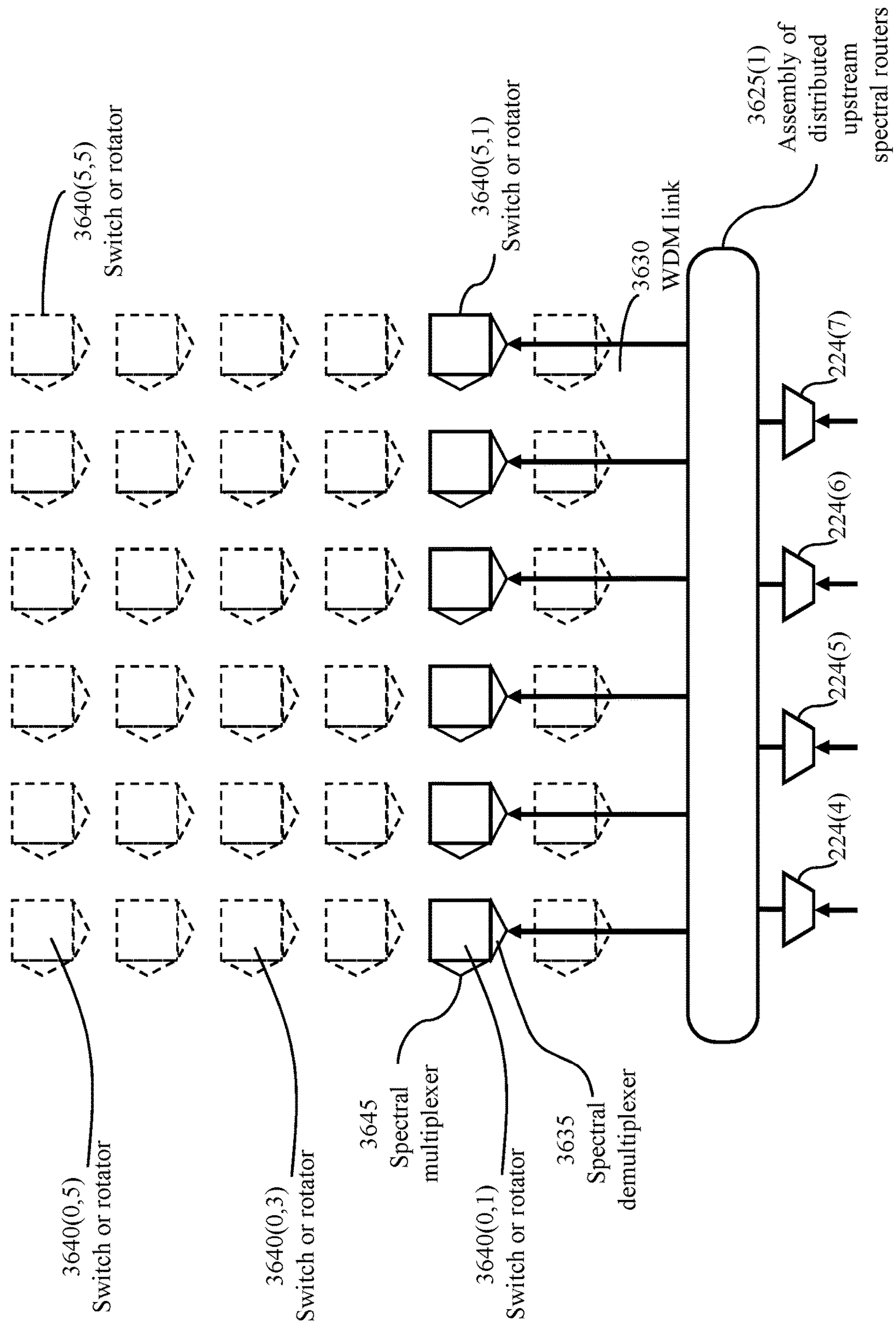
FIG. 37 illustrates upstream connections from another subset of access nodes to switches or rotators through an assembly of upstream spectral routers.
Figure 38:
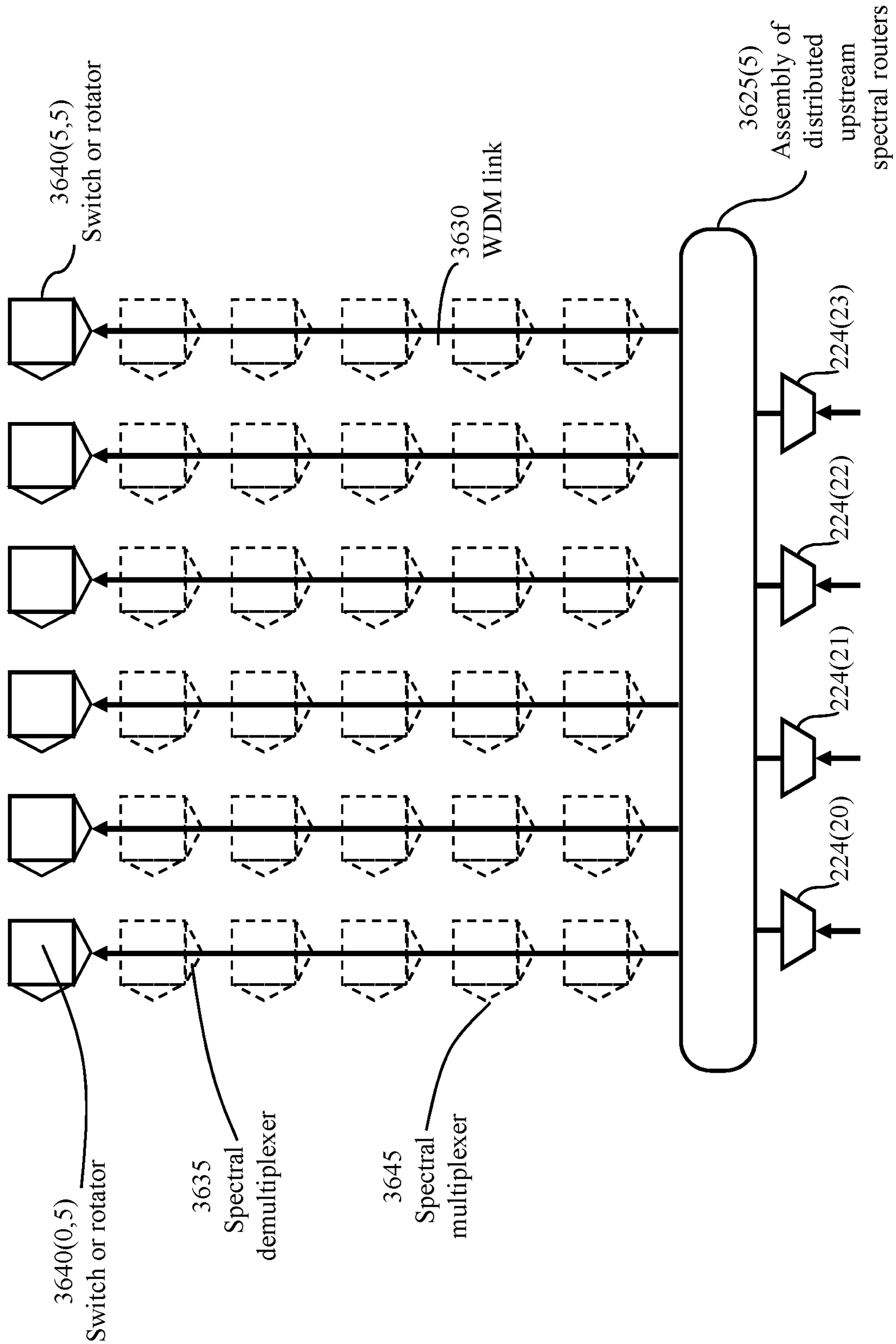
FIG. 38 illustrates upstream connections from a further subset of access nodes to switches or rotators through an assembly of upstream spectral routers.

FIG. 36, FIG. 37, and FIG. 38 illustrate upstream connections from source nodes 224 (of access nodes 220) to switches or rotators 3640 through an assembly 3625 of upstream spectral routers. Each switch or rotator 3640 is coupled to a spectral demultiplexer 3635 at input and a spectral multiplexer 3645 at output. Assembly 3625 of upstream spectral routers connects a set of four source nodes 224 to six spectral demultiplexers 3635 each preceding a switch or rotator 3640 of a row of the matrix of switches or rotators 3640. A WDM link 3630 at input of each spectral demultiplexer 3635 carries a spectral band from each of the four source nodes 224.

Figure 39:
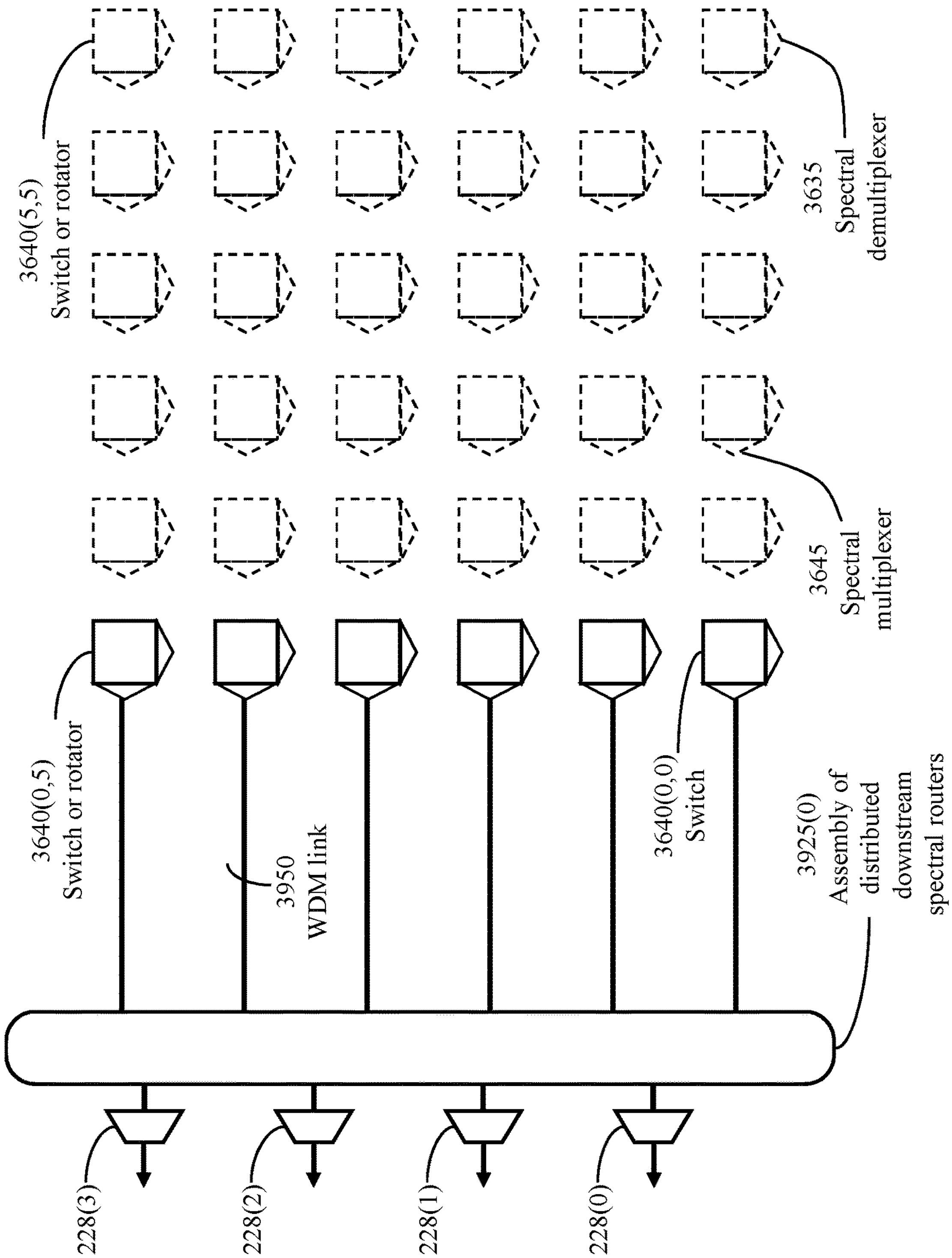
FIG. 39 illustrates downstream connections from switches or rotators to a subset of access nodes through an assembly of downstream spectral routers.
Figure 40:
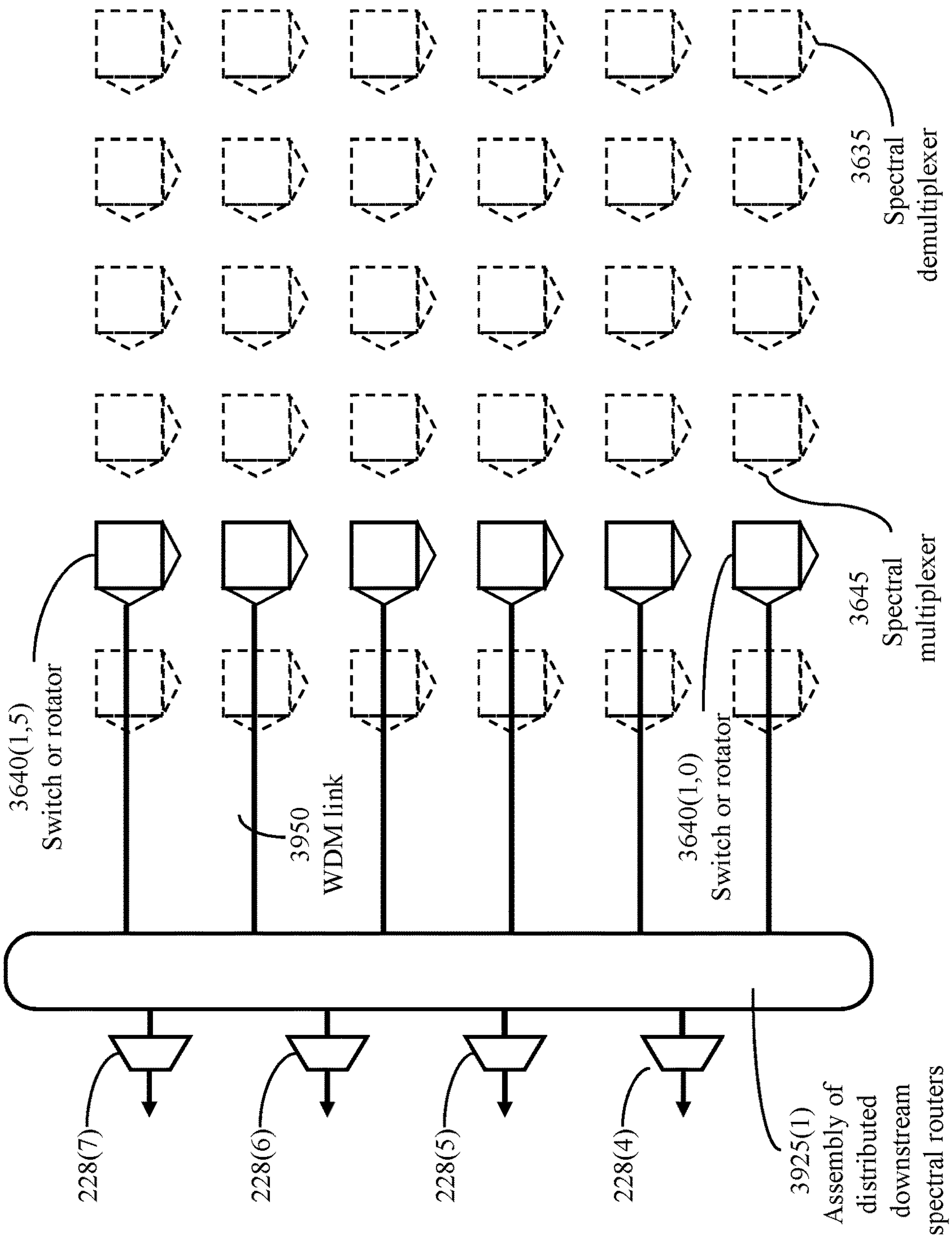
FIG. 40 illustrates downstream connections from switches or rotators to another subset of access nodes through an assembly of downstream spectral routers.
Figure 41:
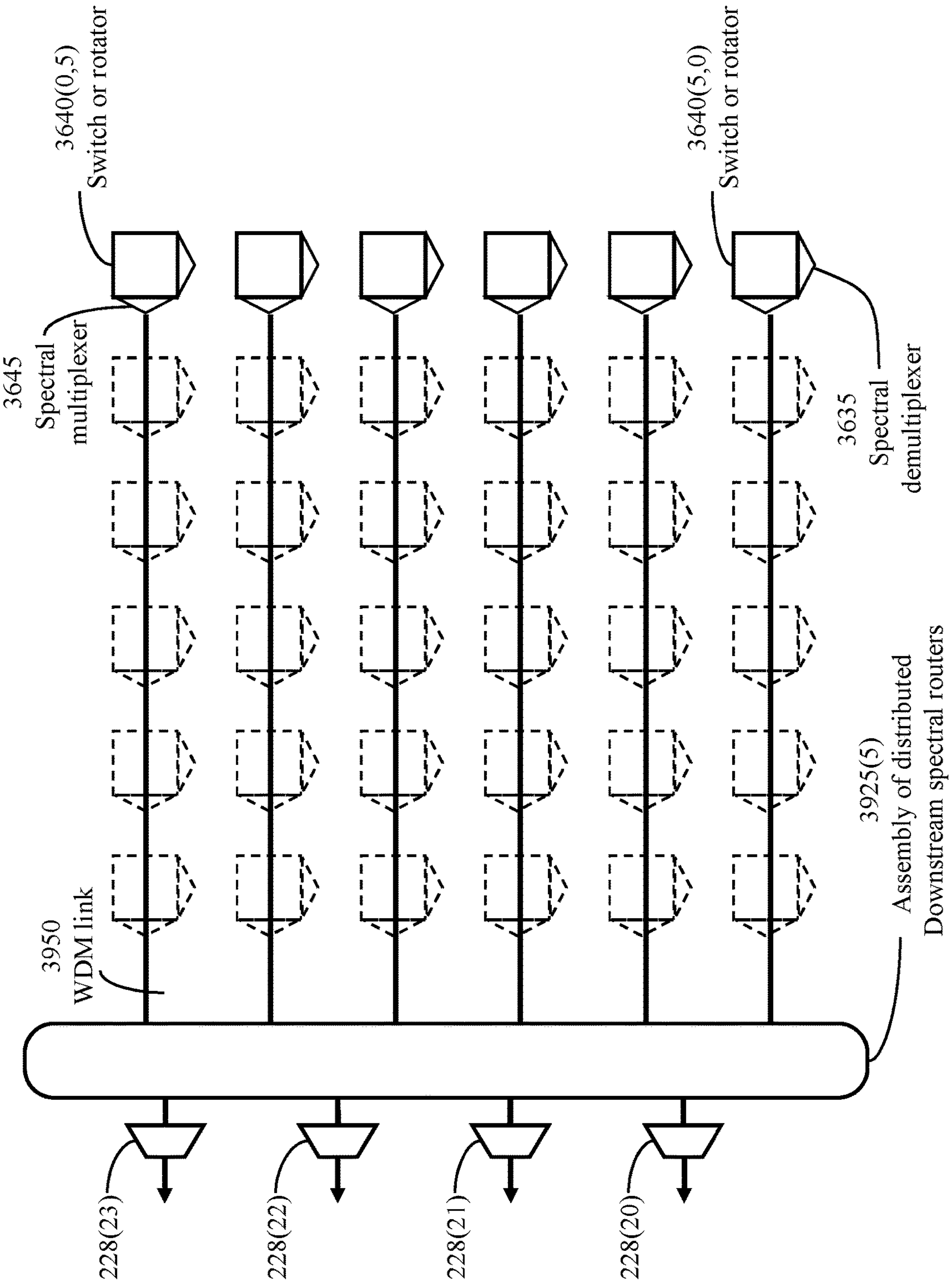
FIG. 41 illustrates downstream connections from switches or rotators to a further subset of access nodes through an assembly of downstream spectral routers.

FIG. 39, FIG. 40, and FIG. 41 illustrate downstream connections from switches or rotators 3640 to sink nodes 228 (of access nodes 220) through an assembly 3925 of downstream spectral routers. Assembly 3925 of downstream spectral routers connects six spectral multiplexers 3645 each succeeding a switch or rotator 3640 of a column of the matrix of switches or rotators 3640 to a set of four sink nodes 228. A WDM link 3950 at output of each spectral multiplexer 3645 carries a spectral band to each of the four sink nodes 228.

Source nodes 224 of indices {j×m} to {(j+1)×m−1} connect to switches or rotators 3640 of a row of index j through an assembly 3625(*j*), 0≤j<μ, of upstream spectral routers. For j=0, FIG. 36 illustrates source nodes 3620 of indices 0 to 3 {0 to m−1} connecting through assembly 3625(0) of upstream spectral routers to switches or rotators 3640 of a row of index 0 of the matrix of switches or rotators 3640. For j=1, FIG. 37 illustrates source nodes 3620 of indices 4 to 7 {m to 2×m−1} connecting through assembly 3625(1) of upstream spectral routers to switches or rotators 3640 of a row of index 1 of the matrix of switches or rotators 3640. For j=μ−1, μ=6, FIG. 38 illustrates source nodes 3620 of indices 20 to 23 {(μ−1)×m to μ×m−1)} connecting through assembly 3625(μ−1) of upstream spectral routers to switches or rotators 3640 of a row of index (μ−1) of the matrix of switches or rotators 3640.

Switches or rotators 3640 of a column of index j connect to sink nodes of indices {j×m} to {(j+1)×m−1} through an assembly 3925(*j*), 0≤j<μ, of downstream spectral routers. For j=0, FIG. 39 illustrates switches or rotators 3640 of a column of index 0 of the matrix of switches or rotators 3640 connecting to sink nodes 228 of indices 0 to 3 {0 to m−1} through assembly 3925(0) of downstream spectral routers. For j=1, FIG. 40 illustrates switches or rotators 3640 of a column of index 1 of the matrix of switches or rotators 3640 connecting to sink nodes 228 of indices 4 to 7 {m to 2×m−1} through assembly 3925(1) of downstream spectral routers. For j=μ−1, FIG. 41 illustrates switches or rotators 3640 of a column of index (μ−1), μ=6, of the matrix of switches or rotators 3640 connecting to sink nodes 228 of indices 20 to 23 {(μ−1)×m to μ×m−1)} through assembly 3925(μ−1) of downstream spectral routers (μ=6).

Thus, the invention provides a switching system 2500 comprising a plurality of rotators 2540 interconnecting a plurality of access nodes 220, each access node comprising a source-node component 224 and a sink-node component 228. Each rotator 2540 comprises a number of input ports 2710 and a same number of output ports 2730. The rotators are logically arranged in a matrix of μ columns and μ rows, μ>2; μ=3 in the configuration of FIG. 25 and FIG. 26. Each access node 220 connects to an input port 2710 of each rotator 2540 of a respective row and an output port 2730 of each rotator of a respective column.

To facilitate temporal alignment of data received at input ports 2710 of each rotator 2540, each diagonal rotator pair, as illustrated in FIG. 29, FIG. 30, and FIG. 31, is coupled to a respective dual timing circuit 2970 configured to directly exchange timing data with each access node connecting to each diagonal rotator pair. With the μ columns indexed as 0 to (μ−1) and the μ rows indexed as 0 to (μ−1), a rotator of column j and row k together with a rotator of column k and row j, 0≤j<μ, 0≤k<μ, j≠k, form a diagonal rotator pair. With the above connectivity pattern, the switching system provides a path from each access node 220 to each other access node 220 that traverses only one rotator.

Each diagonal rotator, i.e., a rotator belonging to column j and row j, $0 \le j < \mu$, is coupled to a respective single timing circuit 2850 connected to a respective master time indicator. The timing circuit of a diagonal rotator comprises a processor configured to directly exchange timing data with each access node connecting to a diagonal rotator. The single timing circuit is configured to receive timing data from any input port of the diagonal rotator and communicate a corresponding time indication of the master time indicator to a corresponding output port of the diagonal rotator.

A dual timing circuit 2970 of a diagonal rotator pair comprises two constituent timing circuits 2950(0) and 2950(1), both coupled to a master time indicator 2960. A first timing circuit 2950(0) connects to a control outlet 2732A of a first rotator 2540(*j,k*) of a diagonal rotator pair and a control inlet 2712B of a second rotator 2540(*k,j*) of the diagonal rotator pair. A second timing circuit 2950(1) connects to a control outlet 2732B of the second rotator and a control inlet 2712A of the first rotator. The first timing circuit is configured to receive timing data from any input port 2710 of the first rotator and communicate a corresponding time indication of the master time indicator to a corresponding output port 2730 of the second rotator. The second timing circuit is configured to receive timing data from any input port 2710 of the second rotator and communicate a corresponding time indication of the master time indicator to a corresponding output port 2730 of the first rotator.

According to an embodiment, the switching system comprises at least one spectral demultiplexer 2704 preceding each rotator and at least one spectral multiplexer 2784 succeeding each rotator. A spectral demultiplexer directs individual spectral bands from a respective upstream wavelength-division-multiplexed link 2702 to respective input ports 2710 of a rotator. A spectral multiplexer 2784 combines spectral bands from respective output ports 2730 of a rotator onto a respective downstream wavelength-division-multiplexed link 2782.

A plurality of upstream spectral routers 3225 connects the source-node components 224 of a plurality of access nodes 220 to a plurality of rotators and a plurality of downstream spectral routers 3345 connects the plurality of rotators to the plurality of access nodes. Each upstream spectral router connects a set of input WDM links originating from a respective set of access nodes to a set of output WDM links each terminating on one rotator of the plurality of rotators. Each output WDM link carries a spectral band from each input WDM link of a respective set of input WDM links. Each downstream spectral router connects a set of input WDM links each originating from a respective rotator to a set of output WDM links each terminating on a single access node with each output WDM link carrying a spectral band from each input WDM link connecting to the downstream spectral router.

Figure 42:
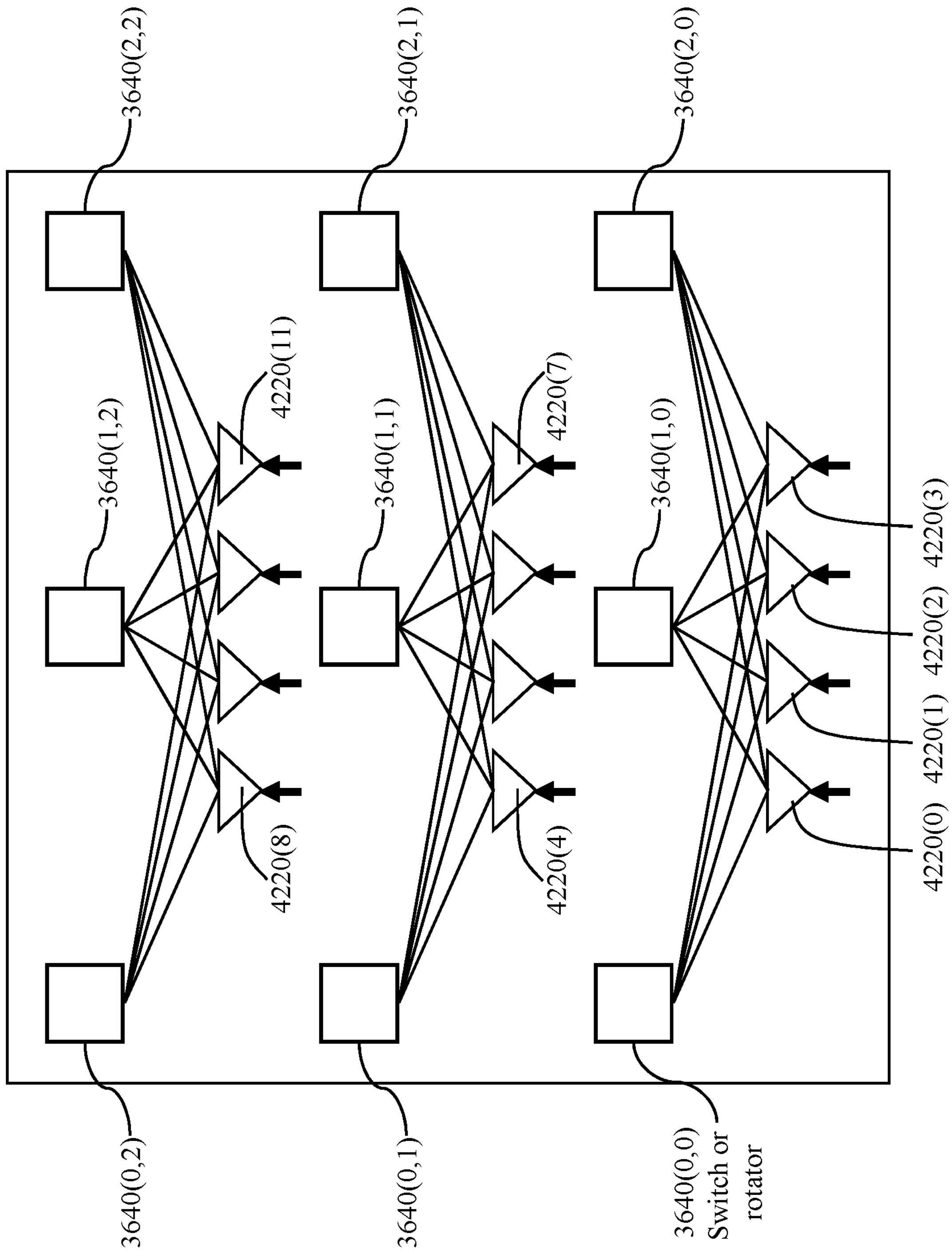
FIG. 42 illustrates a constellation of collocated switches or rotators indicating collocated spectral demultiplexers, each spectral demultiplexer separating spectral bands from a WDM link originating from a respective access node.

FIG. 42 illustrates a constellation of collocated switches or rotators 3640 indicating collocated spectral demultiplexers 4220, each spectral demultiplexer separating spectral bands from an upstream WDM link originating from a respective source node 224 (a respective access node 220). Each spectral demultiplexer receives data from a single access node 220 (a single source node 224) through an upstream WDM link. Spectral demultiplexers 4220(0) to 4220(3) coupled to the first row of switches or rotators of the constellation connect to upstream WDM links from access nodes 220(0) to 220(3). Spectral demultiplexers 4220(4) to 4220(7) coupled to the second row of switches or rotators of the constellation connect to upstream WDM links from access nodes 220(4) to 220(7). Spectral demultiplexers 4220(8) to 4220(11) coupled to the third row of switches or rotators of the constellation connect to upstream WDM links from access nodes 220(8) to 220(11).

Figure 43:
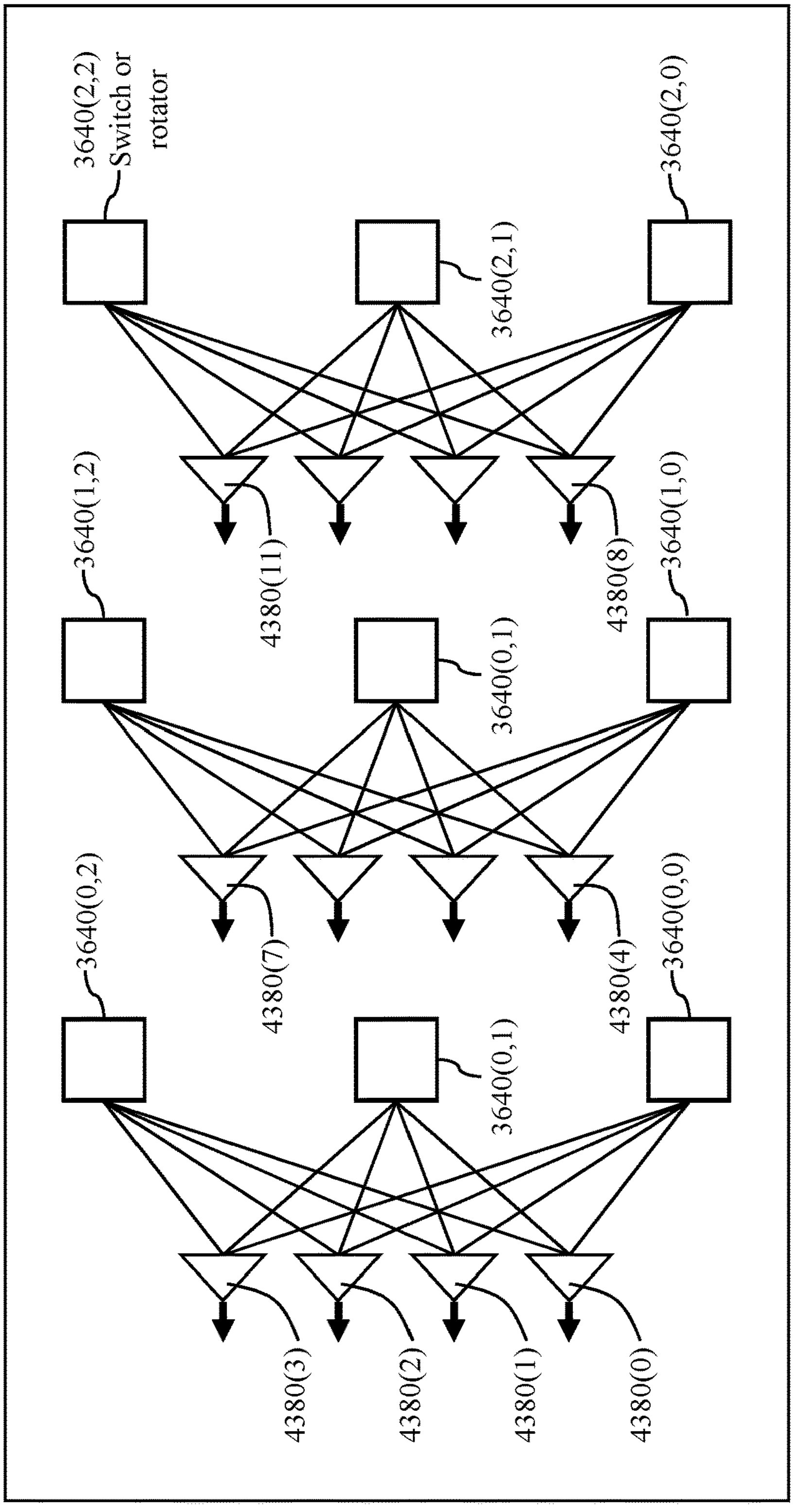
FIG. 43 illustrates collocated spectral multiplexers coupled to the constellation of collocated switches or rotators of FIG. 42, each spectral multiplexer combining spectral bands onto a WDM link directed to a respective access node.

FIG. 43 illustrates collocated spectral multiplexers 4380 coupled to the constellation of collocated switches or rotators of FIG. 42, each spectral multiplexer 4380 combining spectral bands directed to a respective sink node 228 (a respective access node 220). Each spectral multiplexer transmits data to a single access node 220 (a single sink node 228) through a downstream WDM link 4380. Spectral multiplexers 4380(0) to 4380(3) coupled to the first column of switches or rotators of the constellation connect to downstream WDM links to access nodes 220(0) to 220(3). Spectral multiplexers 4380(4) to 4380(7) coupled to the second column of switches or rotators of the constellation connect to downstream WDM links to access nodes 220(4) to 220(7). Spectral multiplexers 4380(8) to 4380(11) coupled to the third column of switches or rotators of the constellation connect to downstream WDM links to access nodes 220(8) to 220(11).

The matrix of switches or rotators 3640 of FIG. 36 may be arranged into four constellations arranged in a constellation matrix of $\chi$ columns and $\chi$ rows, each constellation comprising distributors (switches or rotators) arranged in a sub-matrix of $\Lambda$ columns and $\Lambda$ rows so that $\mu=\chi\times\Lambda$. In the configurations of FIG. 44 to FIG. 47, $\Lambda=3$ and $\chi=2$.

Figure 44:
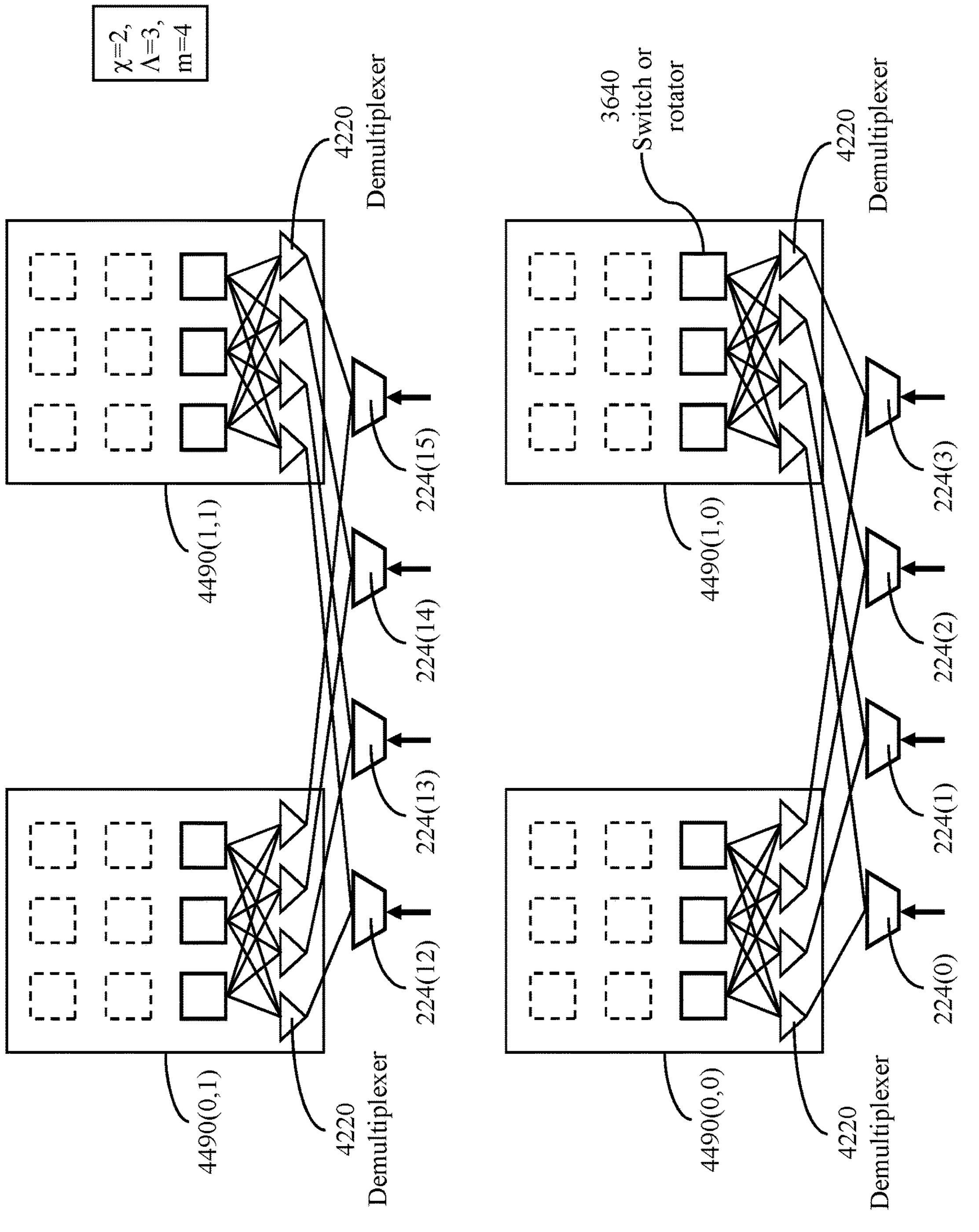
FIG. 44 illustrates upstream connections of a subset of access nodes to constellations of switches or rotators to eliminate the need for intermediate upstream spectral routers.
Figure 45:
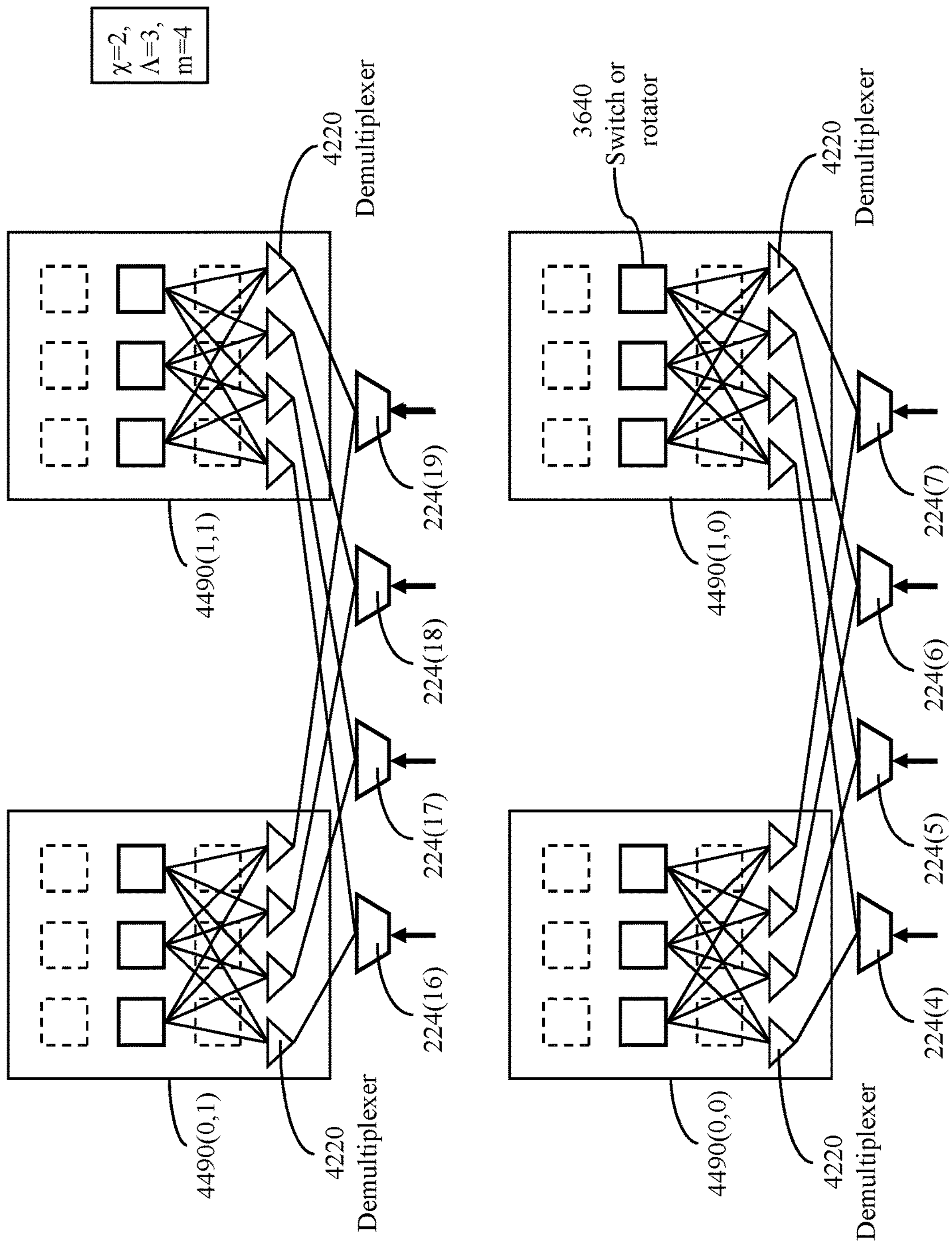
FIG. 45 illustrates upstream connections of another subset of access nodes to constellations of switches or rotators to eliminate the need for intermediate upstream spectral routers.

FIG. 44 and FIG. 45 illustrate upstream connections of access nodes 220 (source nodes 224) to four constellations of switches or rotators 3640 of the matrix of switches or rotators of FIG. 36. The four constellations are arranged into a constellation matrix of two rows and two columns. A constellation assembly 4490 comprises switches or rotators 3640 of a constellation coupled to respective demultiplexers 4220 and respective multiplexers 4380. Each of access nodes 220 of indices ($j\times m$) to ($j\times m+m-1$), $0 \le j < \mu$, has two upstream WDM links each connecting to a demultiplexer 4220 coupled to respective switches or rotators 3640 of a row of index j, $0 \le j < \mu$, of the matrix of switches or rotators of FIG. 36.

Thus, each of access nodes 220(0) to 220(3) has an upstream WDM link to a demultiplexer 4220 coupled to switches or rotators 3640 of a first row of each of the two constellation assemblies 4490(0,0) and 4490(1,0) as illustrated in FIG. 44.

Each of access nodes 220(4) to 220(7) has an upstream WDM link to a demultiplexer 4220 coupled to switches or rotators 3640 of a second row of switches or rotators of each of the two constellation assemblies 4490(0,0) and 4490(1,0), as illustrated in FIG. 45.

Each of access nodes 220(12) to 220(15) has an upstream WDM link to a demultiplexer 4220 coupled to switches or rotators 3640 of a row of distributors of each of the two constellation assemblies 4490(0,1) and 4490(1,1), as illustrated in FIG. 44.

Each of access nodes 220(16) to 220(19) has an upstream WDM link to a demultiplexer 4220 coupled to distributors 3640 of a row of distributors of each of the two constellation assemblies 4490(0,1) and 4490(1,1), as illustrated in FIG. 45.

Figure 46:
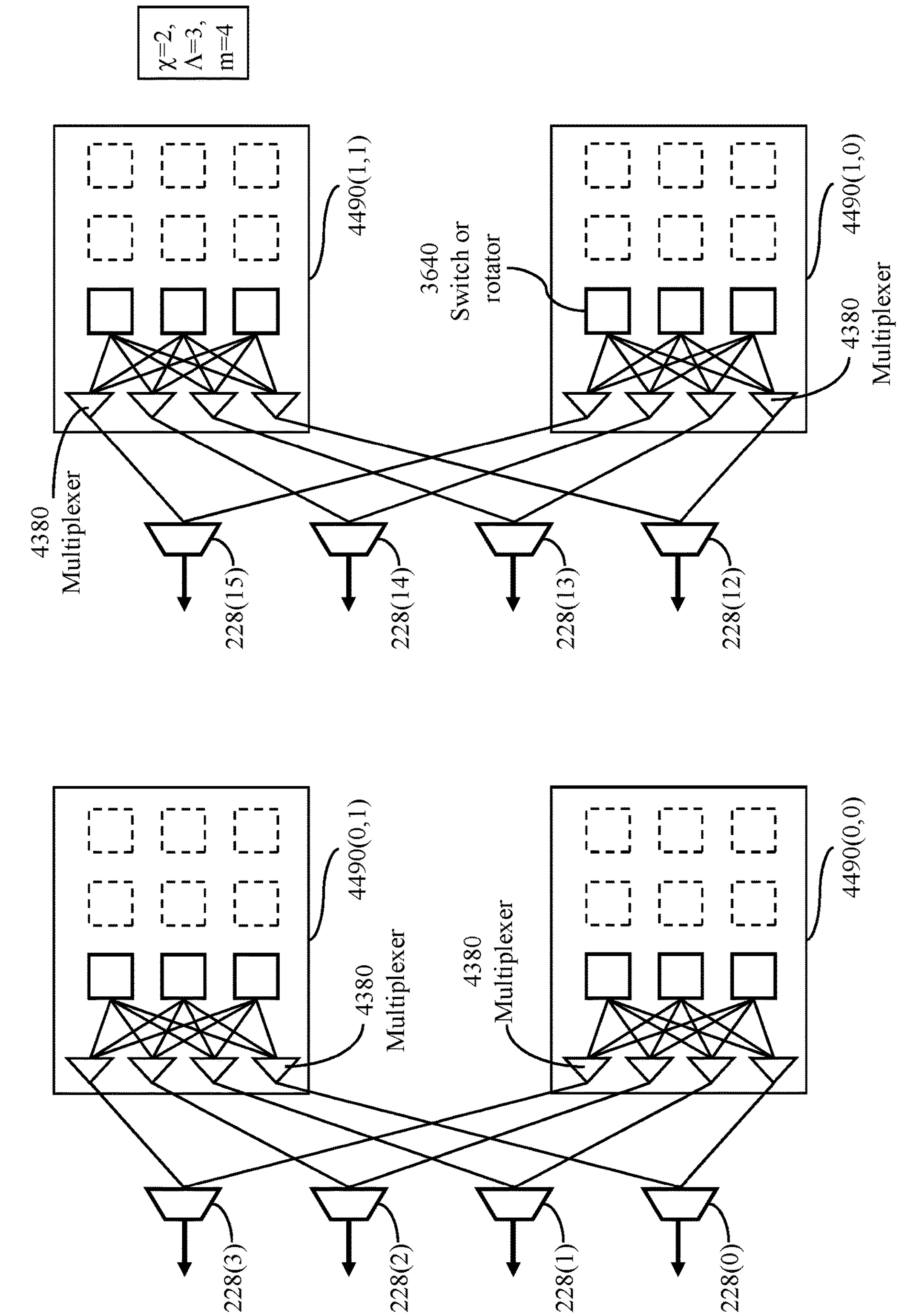
FIG. 46 illustrates downstream connections of constellations of switches or rotators to a subset of access nodes to eliminate the need for intermediate downstream spectral routers.
Figure 47:
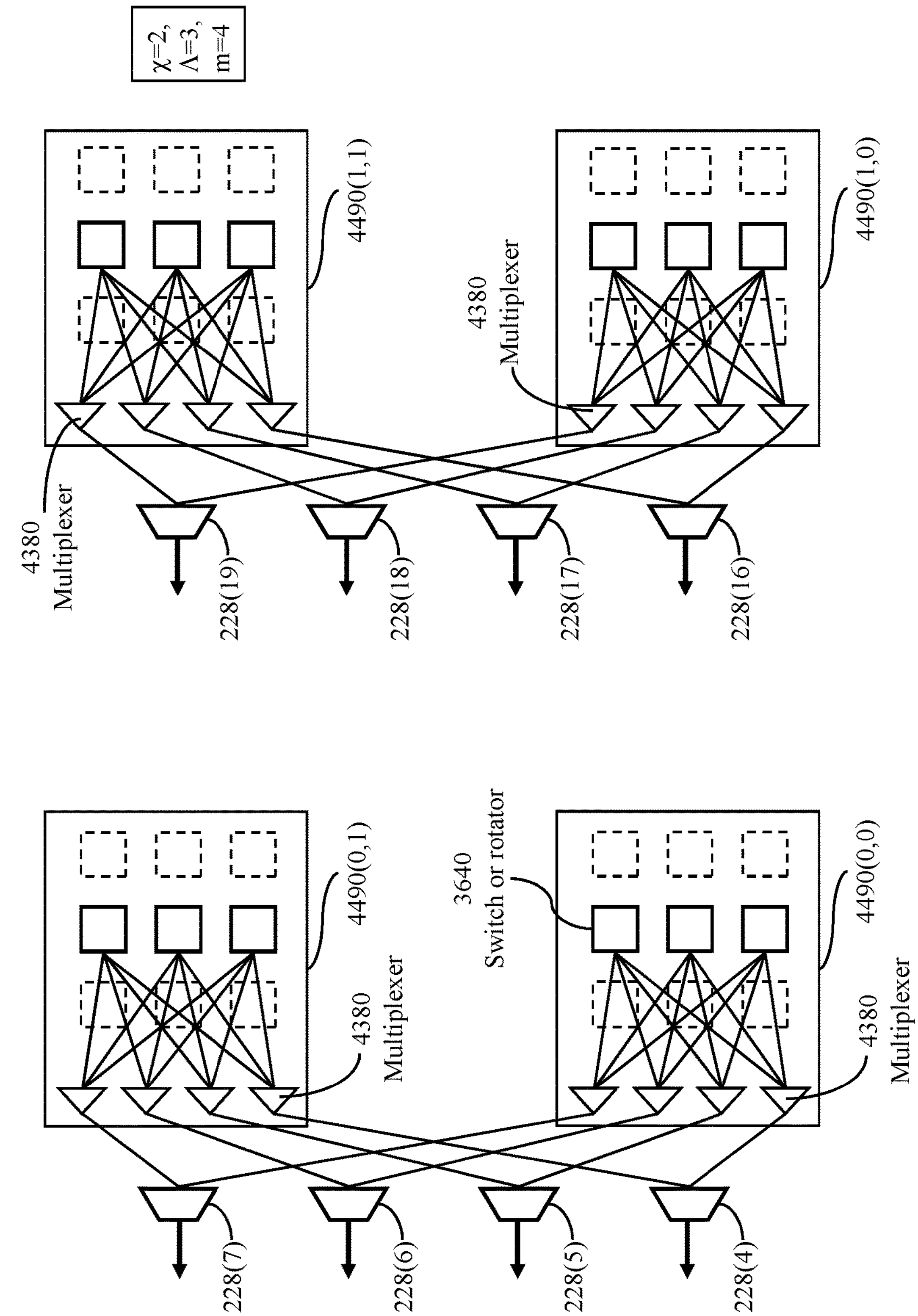
FIG. 47 illustrates downstream connections of constellations of switches or rotators to another subset of access nodes to eliminate the need for intermediate downstream spectral routers.

FIG. 46 and FIG. 47 illustrate downstream connections of access nodes 220 to the four constellations of switches or rotators 3640 of the matrix of switches or rotators of FIG. 36. Each of access nodes 220 (sink nodes 228) of indices ($j\times m$) to ($j\times m+m-1$), has two downstream WDM links each originating from a multiplexer 4380 coupled to switches or rotators 3640 of a column of index j, 0≤j<μ, of the matrix of switches or rotators of FIG. 36.

Thus, each of access nodes 220(0) to 220(3) has a downstream WDM link from a multiplexer 4380 coupled to switches or rotators 3640 of a first column of switches or rotators of each of the two constellation assemblies 4490(0, 0) and 4490(0,1) as illustrated in FIG. 46.

Each of access nodes 220(4) to 220(7) has a downstream WDM link from a multiplexer 4380 coupled to switches or rotators 3640 of a second column of switches or rotators of each of the two constellation assemblies 4490(0,0) and 4490(0,1), as illustrated in FIG. 47.

Each of access nodes 220(12) to 220(15) has a downstream WDM link from a multiplexer 4380 coupled to switches or rotators 3640 of a column of switches of each of the two constellation assemblies 4490(1,0) and 4490(1,1), as illustrated in FIG. 46.

Each of access nodes 220(16) to 220(19) has a downstream WDM link from a multiplexer 4380 coupled to switches or rotators 3640 of a column of switches or rotators of each of the two constellation assemblies 4490(1,0) and 4490(1,1), as illustrated in FIG. 47.

Figure 48:
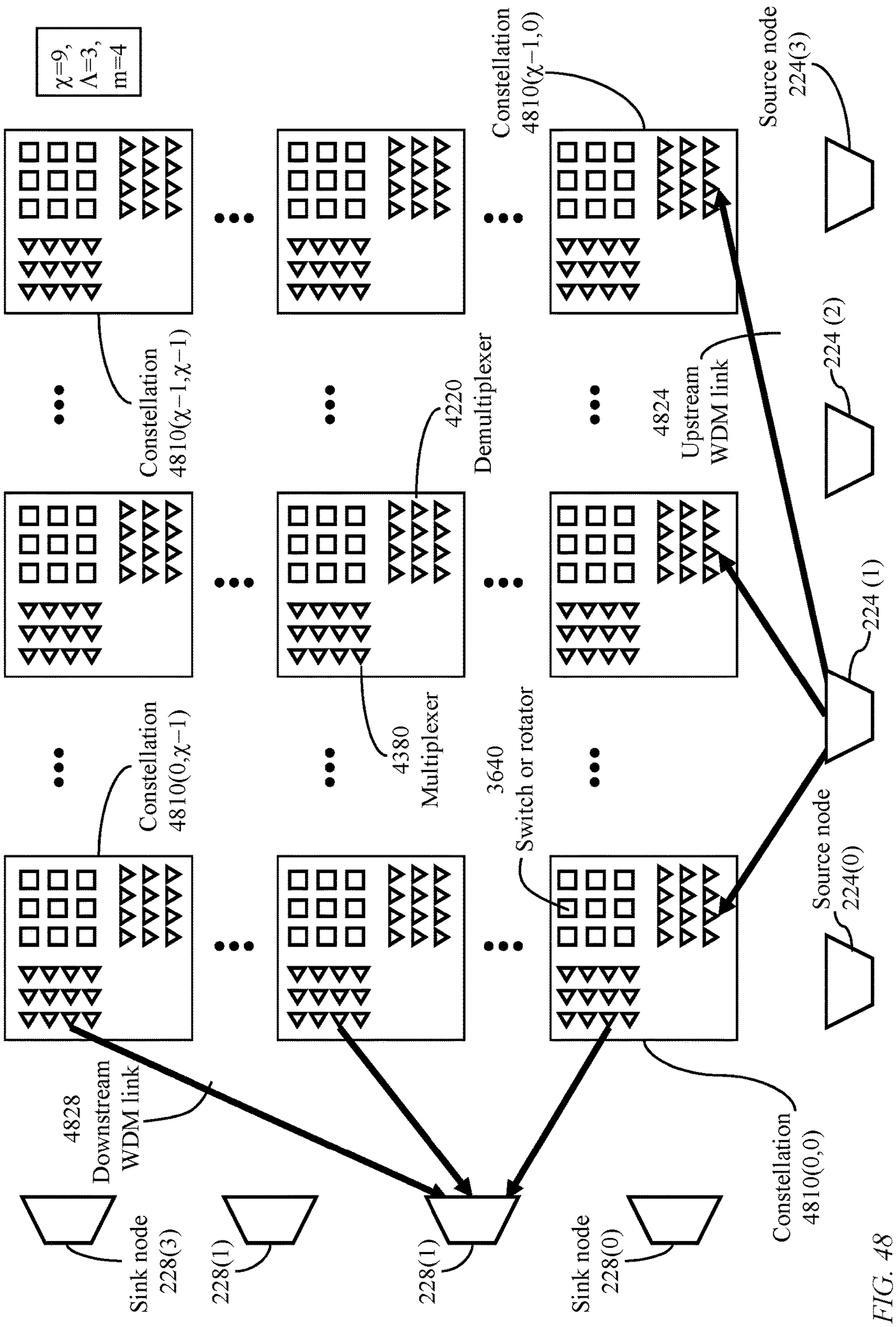
FIG. 48 illustrates connecting source nodes to constellations of switches or rotators of a network of global coverage, in accordance with an embodiment of the present invention.

FIG. 48 illustrates a switching system comprising switches or rotators arranged into a constellation matrix of $\chi$ columns of constellations and $\chi$ rows of constellations where $\chi$=9. Each constellation is similar to the constellation of FIG. 42 and FIG. 43 which comprises switches or rotators logically arranged in a sub-matrix of Λ columns and Λ rows where Λ=3. Each switch or rotator has m input ports and m output ports, m=4, in addition to a control inlet and a control outlet as illustrated in FIG. 3 and FIG. 27. Source nodes 224 and sink nodes 228 are connected to the constellations of switches or rotators through spectral demultiplexers 4220 and spectral multiplexers 4380. Each source node 224 (of access node 220) may have an upstream WDM link 4824 to a respective spectral demultiplexer in each of respective constellations and each sink node 228 (of access node 220) may have a downstream WDM link 4828 from a respective spectral multiplexer in each of respective constellations. The switches or rotators of all of the constellations of FIG. 48 form a logical matrix of switches of μ columns and μ rows, $\mu=\chi\times\Lambda=27$. The total number of access nodes 220 is μ×m=108.

Figure 49:
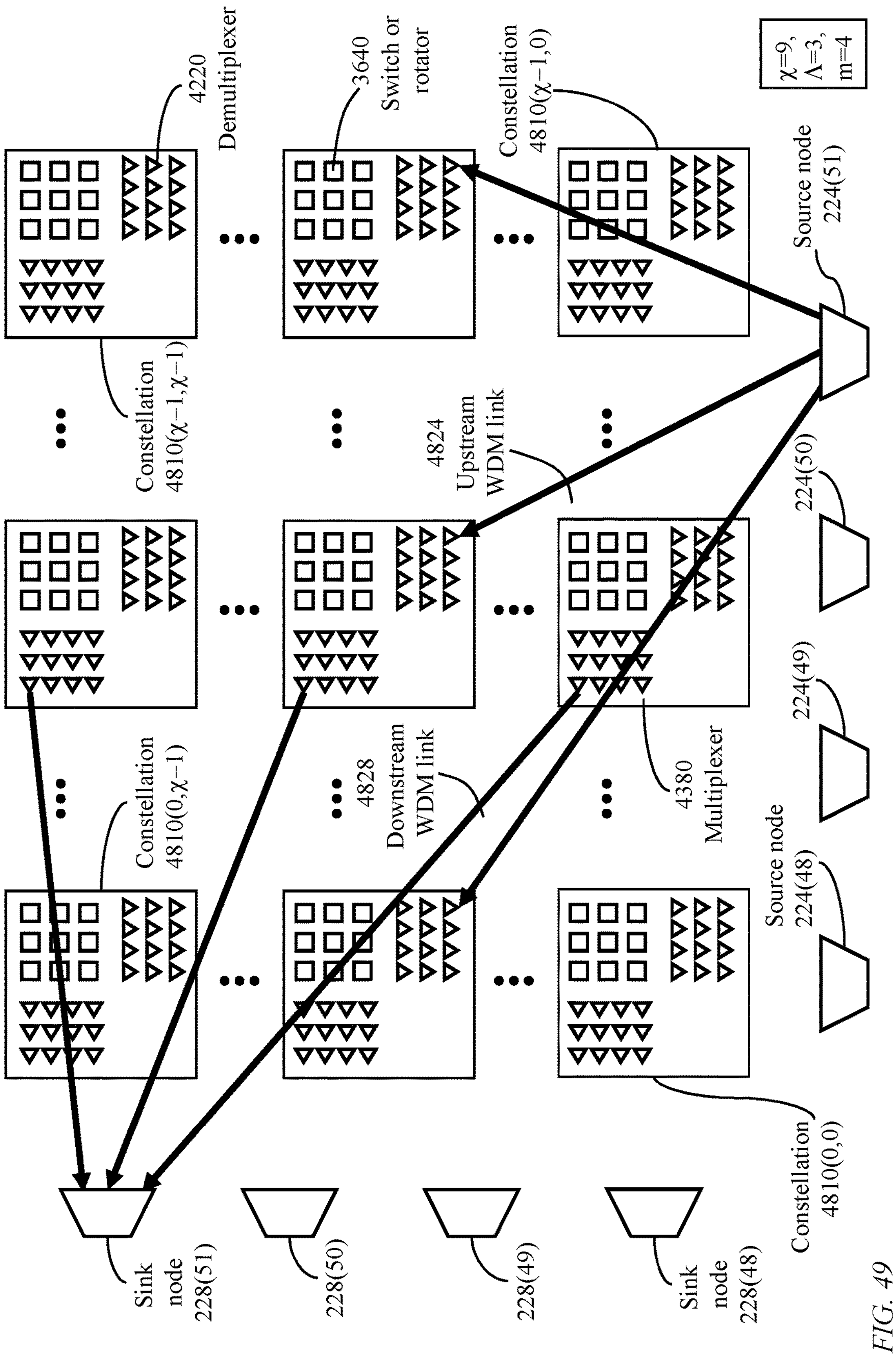
FIG. 49 illustrates connecting the constellations of switches or rotators to sink nodes, in accordance with an embodiment of the present invention.

FIG. 48 illustrates upstream WDM links 4824 from access node 220(1), i.e. from source node 224(1), and downstream WDM links 4828 to access node 220(1), i.e., to sink node 228(1). FIG. 49 illustrates upstream WDM links 4824 from access node 220(51), i.e. from source node 224(51), to constellations of switches or rotators of a respective row of constellations, and downstream WDM links 4828 to access node 220(51), i.e., to sink node 228(51), from constellations of switches or rotators of a respective column of constellations.

In a switching system configured as a global network having a relatively large number of switches or rotators, the switches or rotators may be grouped into a large number of constellations of collocated switches or rotators. For example, the network may comprise 256 constellations arranged in a constellation matrix of 16 columns of constellations and 16 rows of constellations ($\chi$=16), each constellation being organized into a sub-matrix of 64 columns of switches or rotators and 64 rows of switches or rotators (Λ=64). With each switch or rotator having 64 input ports and 64 output ports (m=64), in addition to a control inlet and a control outlet, the network may support 65536 access nodes 220 where each access node has 1024 upstream channels 218 (FIG. 2) to a set of 1024 switches or rotators in different constellations of a row of 16 constellations and 1024 downstream channels 216 (FIG. 2) from another set of 1024 of switches or rotators in different constellations of a column of 16 constellations.

In a switching system configured as a large-scale network, upstream spectral routers may be used to connect source nodes 224 (of access nodes 220) to the switches 140 or rotators 2540 and downstream spectral routers may be used to connect the switches 140 or rotators 2540 to the sink nodes 228 (of access nodes 220) as illustrated in FIG. 32 and FIG. 33. To eliminate the need for spectral routers, the switches or rotators may be arranged in collocated constellations as described above with reference to FIG. 42 to FIG. 49.

Thus, the invention provides a switching system comprising a plurality of rotators 2540 interconnecting a plurality of access nodes 220. Each rotator 2540 comprises a number of input ports 2710 and the same number of output ports 2730. The plurality of rotators is logically organized into a matrix of constellations as illustrated in FIGS. 44-48. Each constellation comprises a set of collocated rotators, a set of spectral demultiplexers 4220, and a set of spectral multiplexers 4380.

Each access node is coupled to an upstream WDM link 4824 to a respective spectral demultiplexer 4220 within each constellation of a respective row of the matrix of constellations. Each access node is coupled to a downstream WDM link 4828 from a spectral multiplexer 4380 within each constellation of a respective column of the matrix of constellations. A spectral demultiplexer 4220 directs each spectral band within an upstream WDM link to an input port of a respective rotator of a constellation. A spectral multiplexer combines spectral bands from output ports of respective rotators of a constellation onto a downstream WDM link.

According to a preferred implementation, the collocated rotators of a constellation are organized into a sub-matrix of Λ rows and Λ columns of rotators, Λ>1, as illustrated in FIG. 42 and FIG. 43. The set of spectral demultiplexers within a constellation comprises Λ arrays of spectral demultiplexers 4220, where each spectral demultiplexer 4220 is coupled to rotators of a respective row of the sub-matrix. The set of spectral multiplexers 4380 within a constellation comprises Λ arrays of spectral multiplexers 4380, where each spectral multiplexer 4380 is coupled to rotators of a respective column of the sub-matrix.

Integrating Diagonal Pairs of Switches

The switches 140 are preferably implemented as fast optical switches and the rotators 2540 are preferably implemented as fast optical rotators. A fast optical switch, or a fast optical rotator, has a scalability limitation in terms of the number of input and output ports. The coverage and capacity of the switching systems described above, whether based on interconnecting access nodes through switches 140 or rotators 2540, increases with the number of input ports (and output ports) of a switch or rotator. A preferred implementation of a switching system may be based on employing collocated switches of each diagonal pair of switches as illustrated in FIG. 20, where the two switches of a diagonal pair of switches share a dual controller 2070 comprising two mutually coupled controllers, or have a common controller (not illustrated). Likewise, a preferred implementation of a switching system employing rotators (FIG. 25 and FIG. 26) to interconnect access nodes may be based on employing collocated rotators of each diagonal pair of rotators as illustrated in FIG. 29, where the two rotators of a diagonal pair of rotators share a dual timing circuit 2970.

Symmetrical-Access Contiguous Network

The contiguous switching system (network) described above with reference to FIGS. 1 to 49 is based on asymmetrical access where an access node has upstream channels to a first set of distributors and downstream channels from a second set of distributors, the first set and the second set having only one common distributor. In an alternate implementation, a contiguous switching system (network) may be based on symmetrical access where each access node has an upstream channel to a respective distributor and a downstream channel from the same distributor. An advantage of a contiguous network in general is control simplicity and high overall efficiency. An advantage of a contiguous network (contiguous switching system) based on symmetrical access is further control simplicity. An advantage of a contiguous network (contiguous switching system) based on asymmetrical access is higher scalability. The distributors (switches or rotators) are preferably implemented as fast optical distributors (fast optical switches or fast optical rotators) which have scalability limitations; for example, a fast optical distributor may be limited to support 128 input spectral bands (channels) and 128 output spectral bands (channels). For a specified optical distributor, a contiguous network based on asymmetrical access scales to larger coverage (larger number of supported access nodes).

Figure 50:
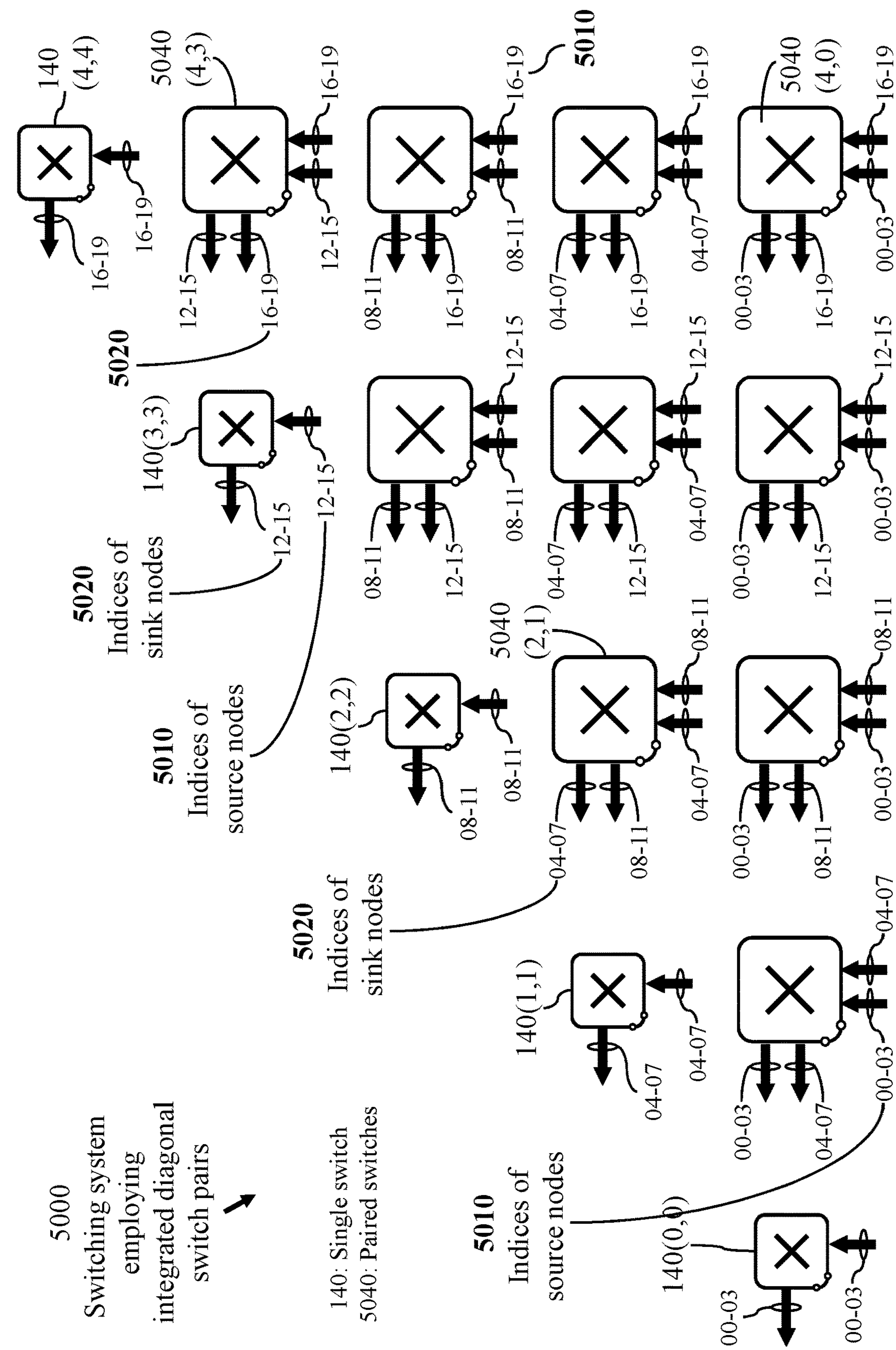
FIG. 50 illustrates a switching system based on the matrix of switches of FIG. 1 where the two switches of each diagonal pair of switches are integrated to share a common switching mechanism, in accordance with an embodiment of the present invention.

FIG. 50 illustrates a switching system 5000 similar to the switching system of FIG. 10 and FIG. 11 where the two switches 140 of each diagonal pair of switches, each having m dual ports, m>2, are integrated to share a common switching mechanism forming a larger switch 5040 supporting 2×m input ports and 2×m output ports in addition to a control inlet and a control outlet. As described above, a diagonal pair of switches comprises a switch of column j and row k and a switch of column k and row j, j≠k, of a matrix of switches having μ columns and μ rows, μ>2. The columns are indexed as 0 to (μ−1) and the rows are indexed as 0 to (μ−1). The diagonal switches 140(*j, j*), 0≤j<μ, of switching system 5000, are the same as the diagonal switches of the switching system of FIG. 10 and FIG. 11.

Indices 5010 of source nodes 224 (of access nodes 220) connecting to input ports of each switch 140 or 5040, and the indices 5020 of sink nodes 228 (of access nodes 220) connecting to output ports of each switch 140 or 5040, are indicated in FIG. 50. For example, switch 5040(2,1) receives data from access nodes 220 (source nodes 224) of indices 4 to 11 and transmits switched data to access nodes 220 (sink nodes 228) of indices 4 to 11. Switch 5040(4,0) receives data from access nodes 220 (source nodes 224) of indices 0 to 3 and 16 to 19, and transmits switched data to access nodes 220 (sink nodes 228) of indices 0 to 3 and 16 to 19. Diagonal switch 140(2,2) receives data from access nodes 220 (source nodes 224) of indices 8 to 11 and transmits data to access nodes 220 (sink nodes 228) of indices 8 to 11.

Figure 51:
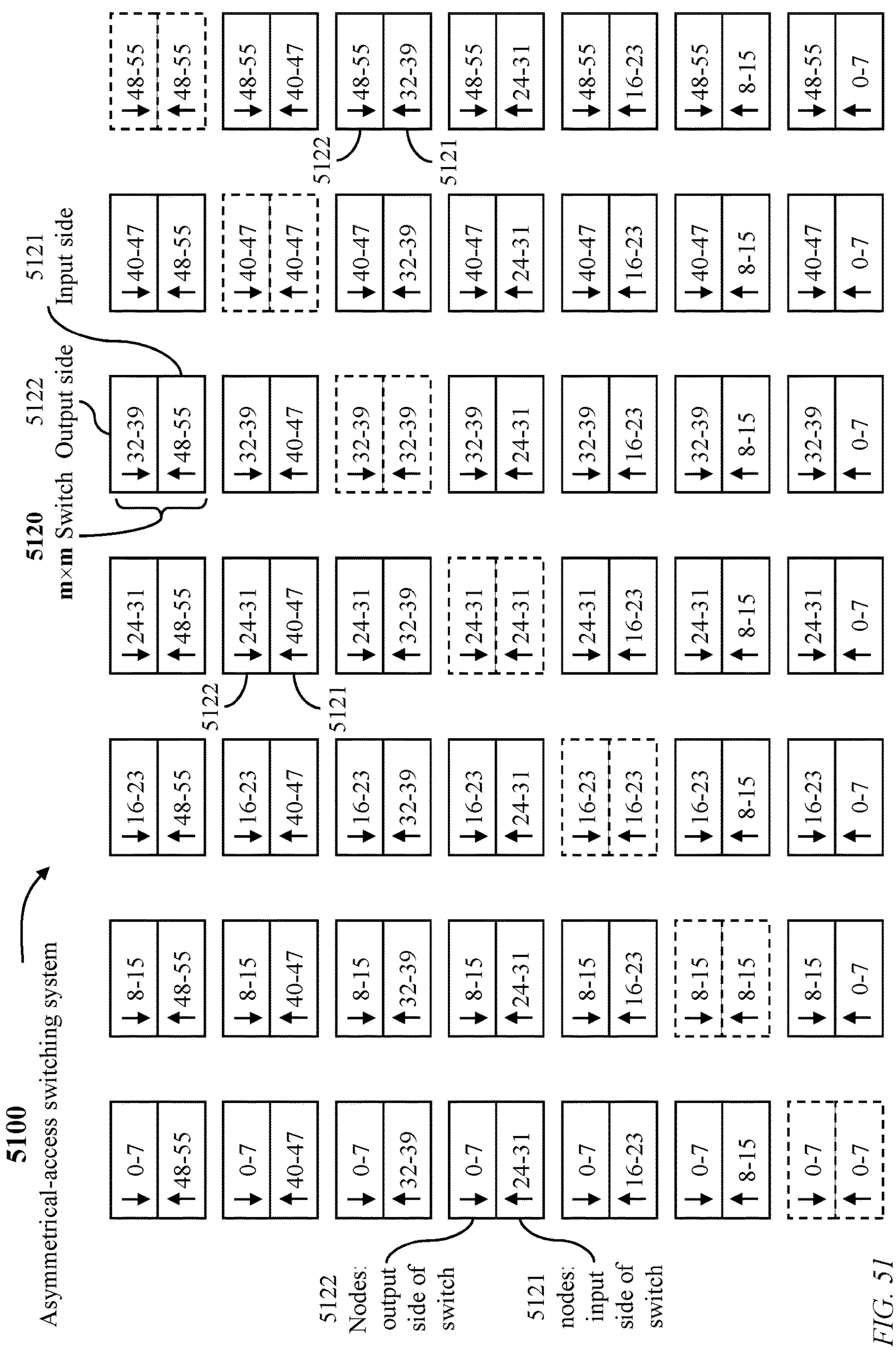
FIG. 51 illustrates connectivity of access nodes to switches of an asymmetrical-access switching system where the accessed nodes are arranged into access groups.

FIG. 51 illustrates an asymmetrical-access switching system 5100 similar to the switching system depicted in FIG. 8 and FIG. 9. Switching system 5100 comprises switches 5120 arranged in a matrix of μ columns and μ rows; μ=7 in the exemplary switching system of FIG. 51. The switches 5120 are independent of each other, none of the switches 5120 has a direct connection to any other switch 5120. Each switch comprises a respective controller and a respective master time indicator. The $\mu^2$ switches interconnect a plurality of access nodes 220 (FIG. 2). The access nodes 220 are arranged into access groups each access group comprising at least two access nodes and at most a predetermined number, m, of access nodes, m>2. Each access group connects to a respective number of input ports of each switch of a respective row of switches and to a respective number of output ports of each switch of a respective column of switches. For example, with each access group comprising eight nodes, a group of access nodes of indices 0 to 7 connects to input ports of each switch of a row of index 0 of the matrix of switches and to output ports of each switch of a column of index 0 of the matrix of switches. A group of access nodes of indices 40 to 47 connects to input ports of each switch of a row of index 5 of the matrix of switches and to output ports of each switch of a column of index 5 of the matrix of switches. Thus, the connectivity of access nodes to the switches is asymmetrical; a group 5121 of access nodes connecting to the input ports of a switch 5120 may differ from a group 5122 of access nodes connecting to the output port of the same switch. As illustrated in FIG. 51, each switch 5120 belonging to one diagonal of the μ×μ switching matrix connects to a respective group of access nodes at both input and output while each other switch connects to a respective group 5121 of access nodes at input and a disjoint group 5122 of access nodes at output. The access-node numbers are selected to correspond to full provisioning where each access group contains m access nodes. With access groups comprising less than m access nodes, the indices of access nodes are still based on full provisioning where each access group contains the predefined bound m; absent access nodes are still assigned indices for ease of identification and for potential future expansion.

Indexing the μ columns of switches of the matrix switches as 0 to (μ−1) and indexing the rows of the matrix of switches as 0 to (μ−1), each switch 5120 belonging to a column j and a row j, 0≤j<μ, connects at input and at output to a same group of access nodes. However, each switch 5120 belonging to column j and row k, where j≠k, connects to different groups of access nodes at input and output. Each access group connects only once to input ports and output ports of a same switch. Each access group connects to input ports of (μ−1) switches which connect at output to other groups of access nodes. Each access connects to output ports of (μ−1) switches which connect at input to other groups of access nodes. This connectivity pattern realizes a contiguous switching system supporting μ×m access nodes where each access node has a path to each other access node traversing a single switch. With μ=256 and m=64, for example, the total number of access nodes would be 16384.

Indexing the switches 5120 according to the column and row to which a switch belongs, a first switch of column j and row k, 0≤j<μ, 0≤k<μ, k≠j, connects at input to a first access group and connects at output to a second access group while a switch of column k and row j connects at input to the second access group and connects at output to the first access group. The first and second switches form a complementary switch pair as defined above. Thus, as illustrated in FIG. 20 to FIG. 24, coupling controllers of complementary switches or providing a common controller for complementary switches facilitates control of the entire switching system.

Figure 52:
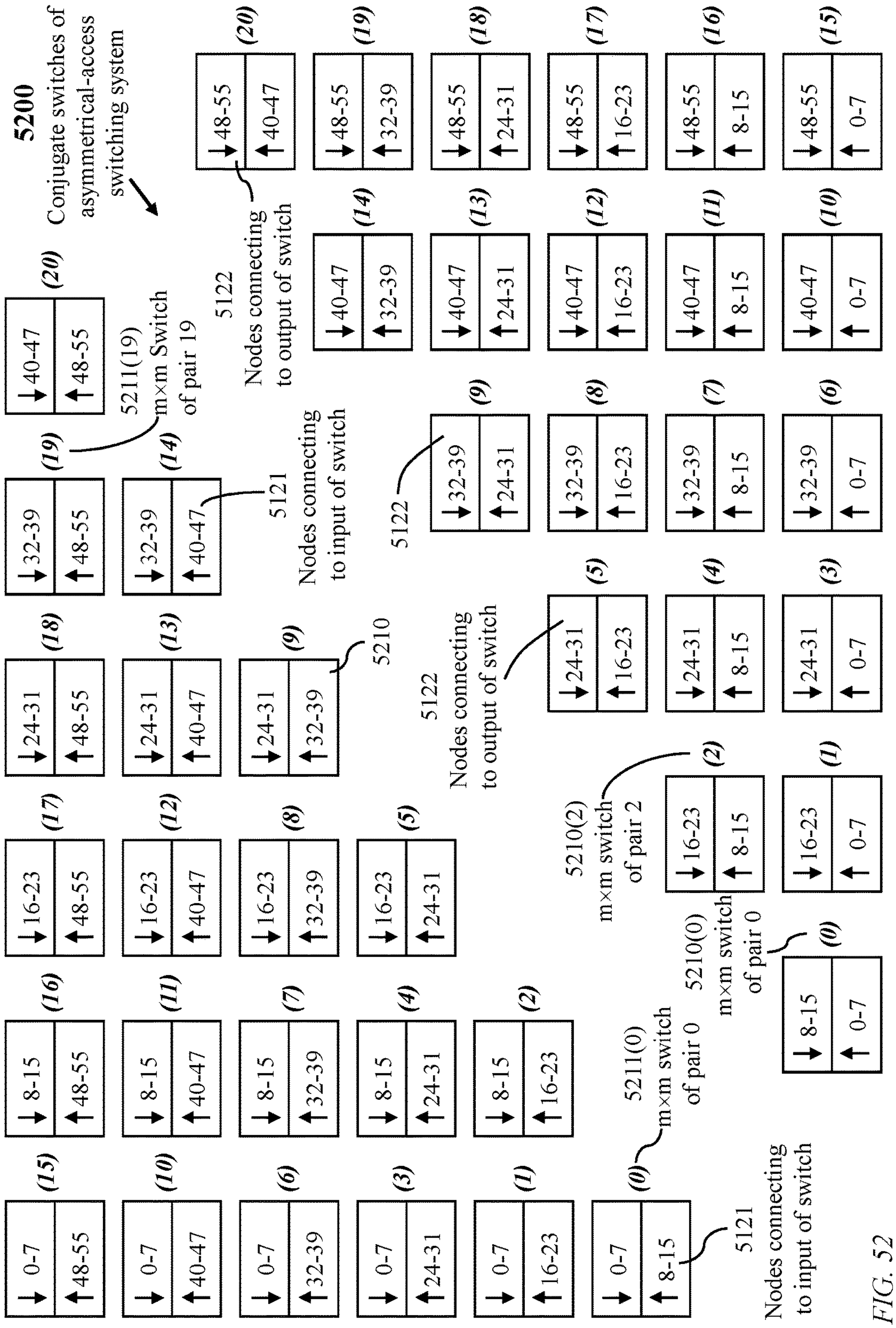
FIG. 52 illustrates conjugate switches of the network of FIG. 51.

FIG. 52 illustrates the complementary switch pairs 5200 of asymmetrical-access switching system 5100, omitting diagonal switches. Each complementary pair is assigned a same index and a same reference numeral 5211. For example, a switch of column 2 and row 0 and a switch of column 0 and row 2 are assigned an index of 1. The switch of column 2 and row 0 connects at input to access nodes of indices of indices 0 to 7 and connects at output to access nodes of indices 16 to 23 while the switch of column 0 and row 2 connects at input to access nodes of indices 16 to 23 and connects at output to access nodes of indices 0 to 7. The symbols "↑" and "↓" indicate an input side and an output side of a switch, respectively. The switch pairs are indexed as 0 to 20.

Figure 53:
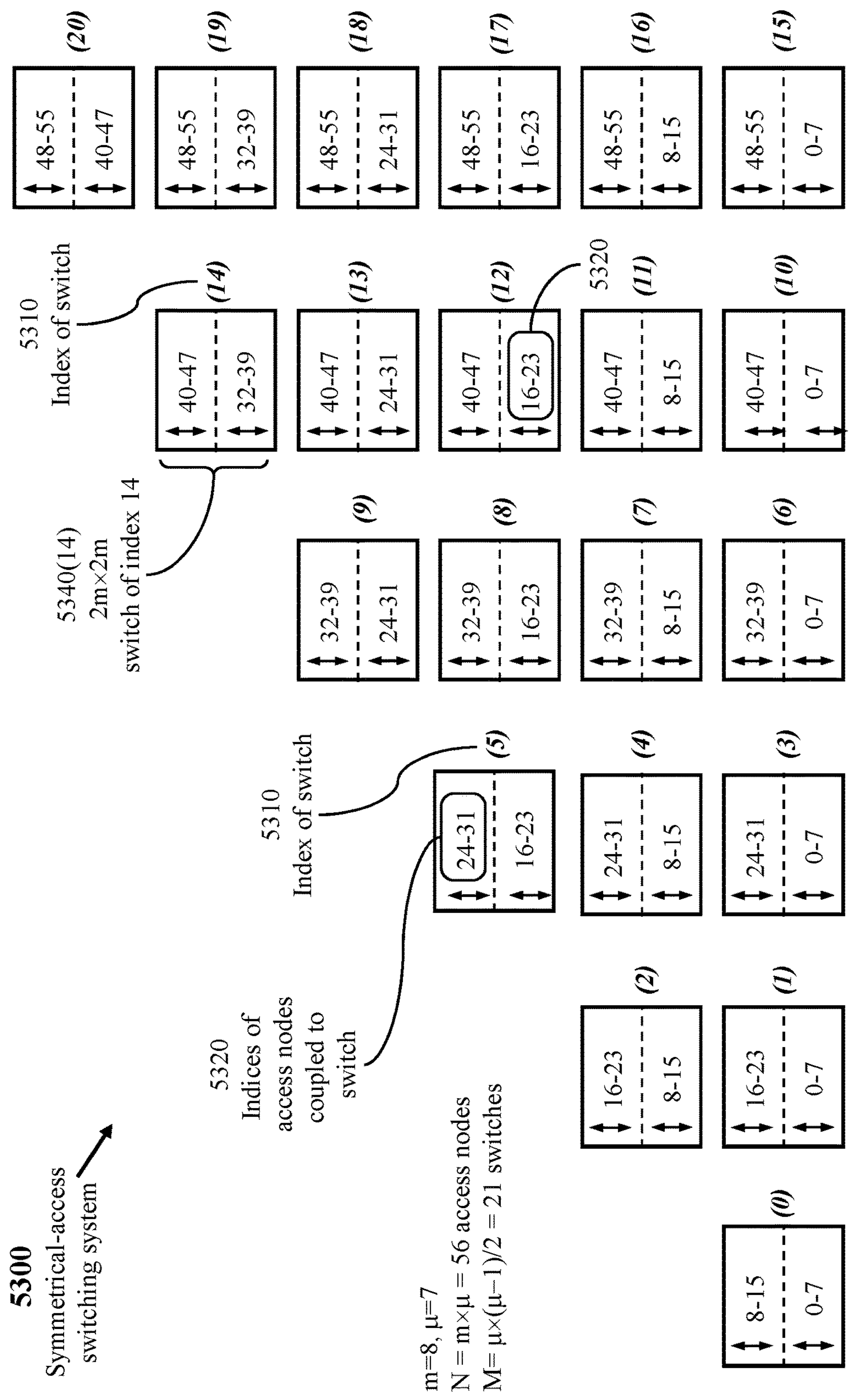
FIG. 53 illustrates a symmetrical-access switching system based on combining each pair of conjugate switches to form a respective single switch, in accordance with an embodiment of the present invention.

FIG. 53 illustrates a symmetrical-access switching system 5300 based on combining two switches 5120 of each complementary switch pair to form a respective integrated switch 5340 having a switching mechanism of larger dimension. With each switch 5120 having a switching mechanism supporting m dual ports, handling payload data, in addition to any dual control ports, an integrated switch 5340 would have a switching mechanism supporting 2×m dual ports in addition to any dual control ports. The diagonal switches of the asymmetrical switching system 5100 are not needed in the symmetrical switching system 5300 where the access nodes of each access group can connect to each other access group without the diagonal switches. As illustrated in FIG. 53, access nodes of indices 0 to 7 may connect to each other through any of integrated switches of indices 0, 1, 3, 6, 10, and 15, and access nodes of indices 32 to 39 may connect to each other through any of integrated switches of indices 6, 7, 8, 9, 14, and 19. With each access node connecting to each of (μ−1) switches 5340, the total number M of integrated switches 5340 is μ×(μ−1)/2. The M complementary switch pairs may be indexed sequentially as 0, 1, . . . (M−1).

The total number of access groups is limited to μ. With each access group comprising m access nodes, m>2, the total number, N, of access nodes is limited to m×μ. With μ=7, the total number of integrated switches 5340 is (7×6)/2 indexed as 0 to 20. With m=8, the total number, N, of access nodes is limited to 56; the access nodes are conveniently indexed as 0 to (N−1). The sequential order is arbitrary. In the arrangement of FIG. 53, the index 5310 of a switch 5340 is selected so that an access node of an access group of index ν, 0≤ν<μ, connects to (μ−1) switches 5340 of indices:

$$\{j+\nu\times(\nu-1)/2 \text{ for } 0\le j<\nu, \text{ and}$$

$$\{\nu+j\times(j-1)/2\} \text{ for } \nu<j<\mu.$$

It is noted that in the above expressions, the index j does not assume the value of ν; j≠ν. An access node of index n, 0≤n<N, belongs to an access group of index ν determined as: ν=⌊n/m⌋, where ⌊Q⌋ denotes the integer part of Q, where Q is generally a real number. With m>2, the total number N of access nodes is in the range of {(2×μ)<N≤m×μ}.

Figure 54:
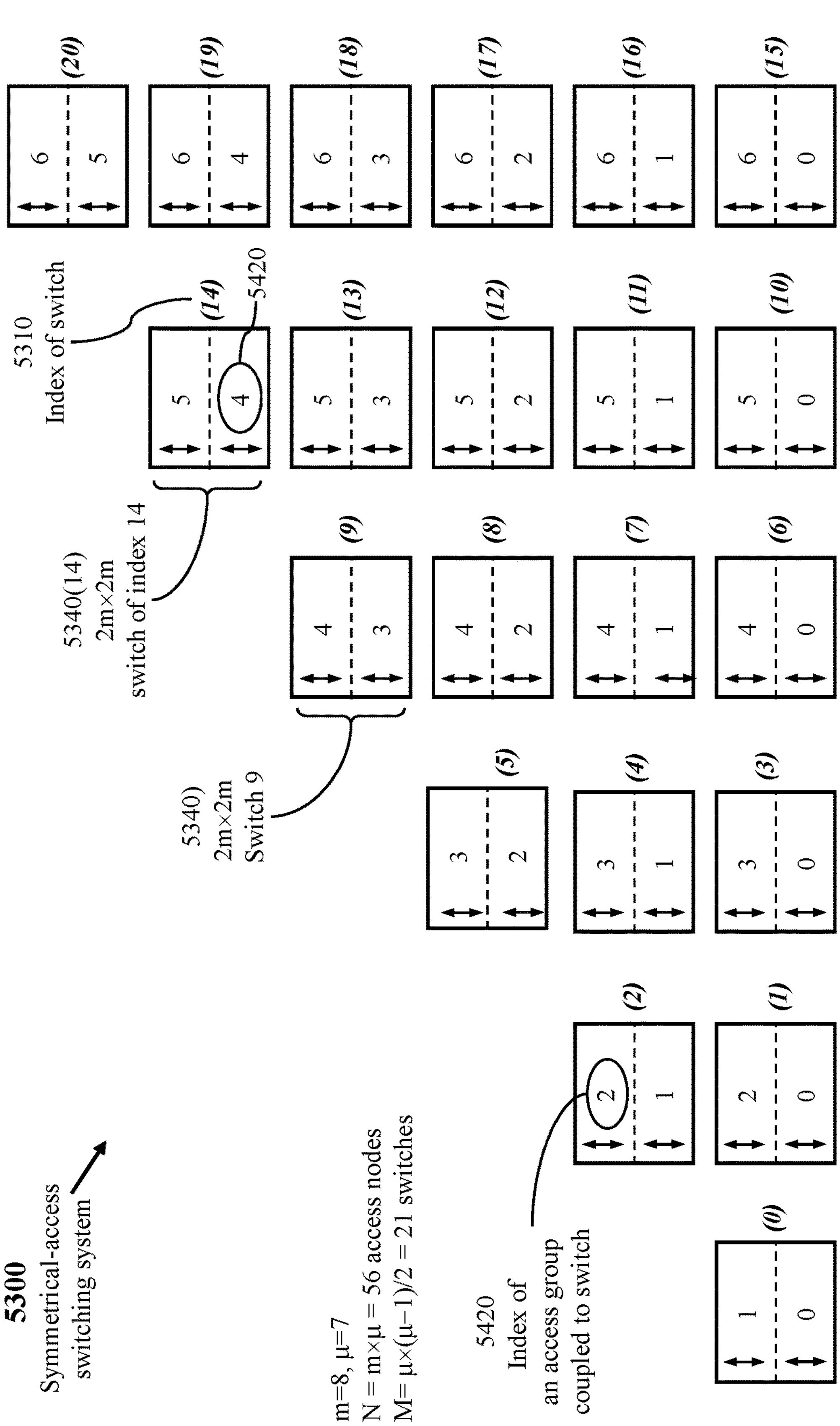
FIG. 54 illustrates the symmetrical-access switching system of FIG. 53 indicating indices of access groups connecting to each switch.

FIG. 54 illustrates the symmetrical-access switching system 5300 of FIG. 53 illustrating indices 5420 of access groups connecting to each switch. With m=8, the access groups of {0-7}, {8-15}, {16-23}, {24-31}, {32-39}, {40-47}, and {48-55} are indexed as 0, 1, . . . , 6, respectively.

Figure 55:
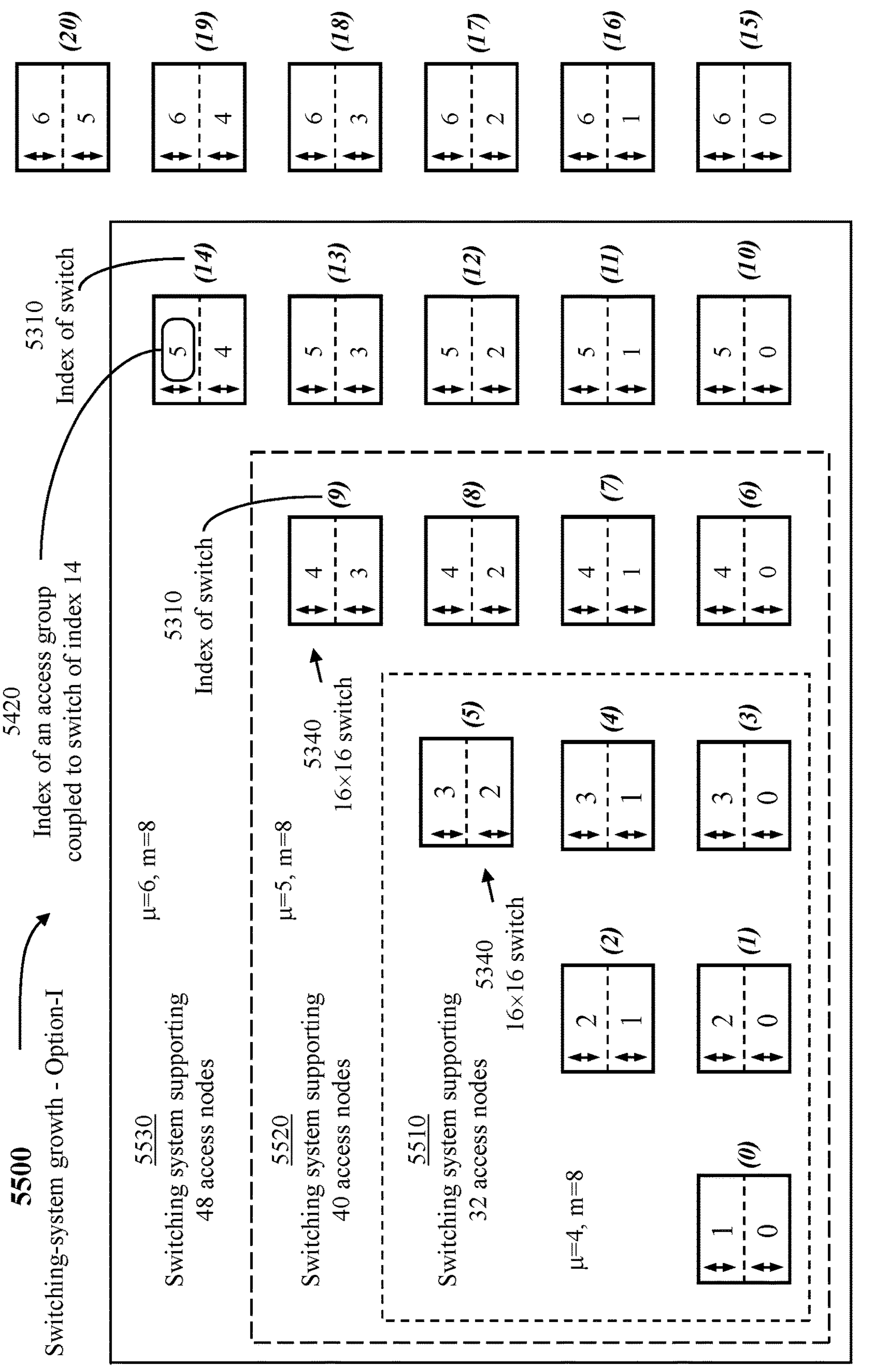
FIG. 55 illustrates a first growth scheme of the symmetrical-access switching system of FIG. 53 based on adding new switches of same dimensions and new access nodes, in accordance with an embodiment of the present invention.

FIG. 55 illustrates a first expansion scheme 5500 of the symmetrical-access switching system based on adding new switches and new access nodes. As described above, with each access node having μ dual channels each connecting to a respective switch 5340 having 2×m dual ports for handling payload data, the total number M of switches is μ×(μ−1)/2 and the number N of access nodes is limited to m×μ.

According to the illustrated exemplary case, an initial switching system 5510, with m=8, and μ=4 (four access groups of indices 0, 1, 2, 3) comprises six switches 5340 {M=(4×3)/2)} supporting 32 access nodes (N=8×4). The six switches are identified by indices 5310 of 0, 1, . . . 5. Each switch 5340 comprises 2×m dual ports for handling payload data, in addition to any dual control ports.

Figure 56:
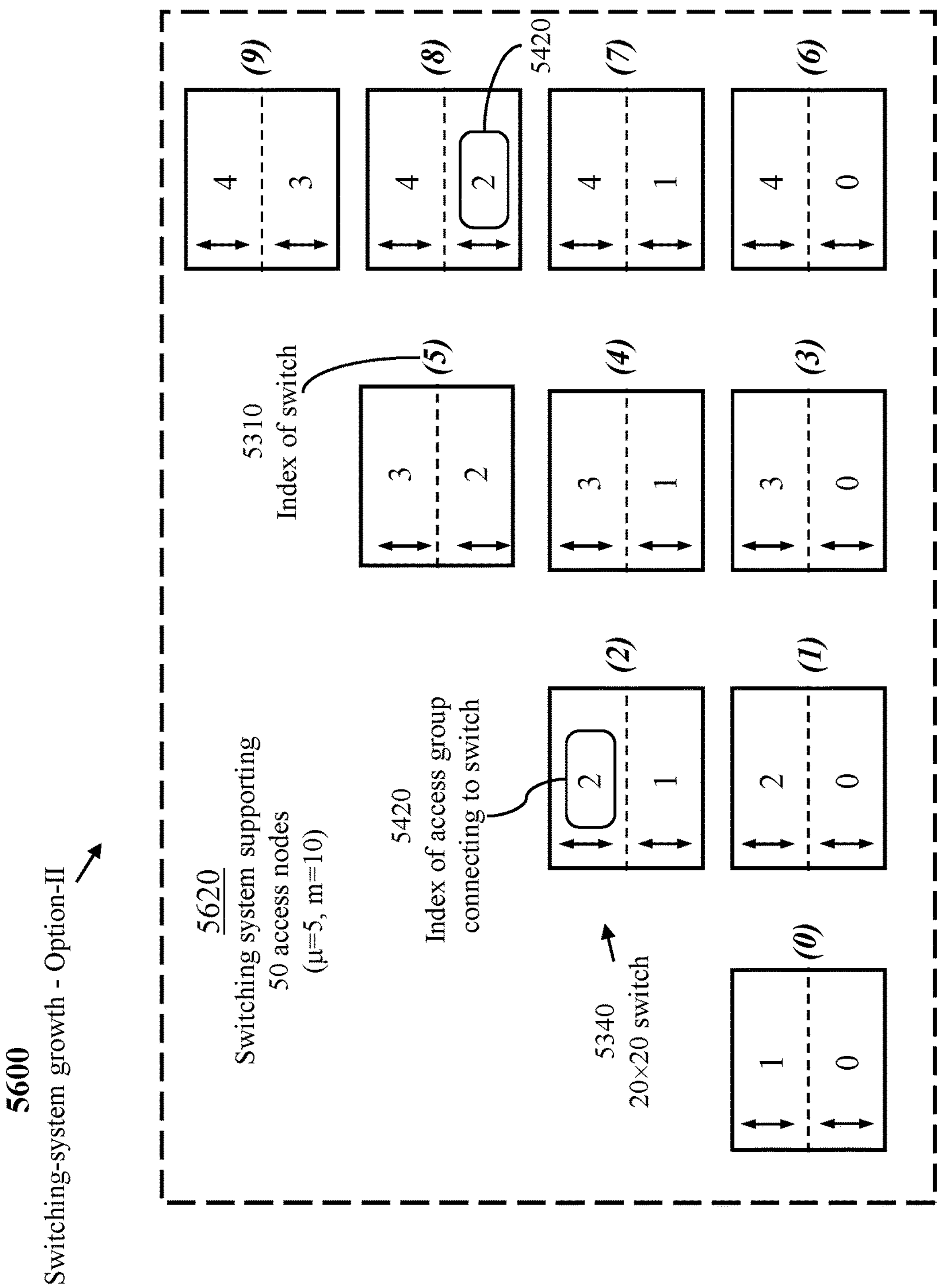
FIG. 56 illustrates a second growth scheme of the symmetrical-access switching system of FIG. 53 based on adding new access nodes and increasing the dimensions of current switches, in accordance with an embodiment of the present invention.

Expansion of the switching system to support more access nodes may be realized through increasing the number (μ−1) of switches to which each access node connects (first expansion scheme, FIG. 55) or increasing the number of dual ports 2×m per switch (second expansion scheme, FIG. 56). Expansion may also be realized through increasing both μ and m (third expansion scheme, FIG. 57).

In the exemplary case of FIG. 55, expansion to a switching system 5520 is realized through increasing μ from 4 to 5 while keeping the dimensions of the switches unchanged. With μ=5, the number of switches 5340 increases to ten {M=(5×4)/2)} and the number of access nodes increases to 40 (N=8×5). Thus, four switches of indices 6, 7, 8, and 9 are added, and a new access group of index 4 connects to the new switches. Each of the initial access nodes of indices 0 to 31 (of access groups of indices 0 to 3) further connects to one of the added switches 5340 of indices 6, 7, 8, and 9. The access groups of indices 0 to 3 connect to switches 5340 of indices 6, 7, 8, and 9, respectively.

Likewise, further expansion to a switching system 5530 is realized through increasing μ from 5 to 6 while keeping the dimensions of the switches unchanged. With μ=6, the number of switches 5340 increases to fifteen and the number of access nodes increases to 48. Thus, five switches of indices 10, 11, 12, 13, and 14 are added, and a new access group of index 5 comprising up to eight access nodes connects to the new switches. Each of access nodes of access groups 0 to 4 further connects to one of the added switches 5340 of indices 10, 11, 12, 13, and 14. The access groups of indices 0 to 4 respectively connect to switches 5340 of indices 10, 11, 12, 13, and 14. A further expansion step adds six switches 5340, of indices 15 to 20, and a new access group of index 6 as illustrated in FIG. 55.

FIG. 56 illustrates the second expansion scheme 5600 of the symmetrical-access switching system of FIG. 53 based on increasing the dimensions of current switches and adding new access nodes. In the exemplary case of FIG. 56, expansion of the switching system 5520 (FIG. 55) to a switching system 5620 is realized through increasing m from 8 to 10 while keeping μ unchanged (μ=5). Thus, the number M of switches 5340 remains unchanged at M=μ×(μ−1)/2. The number of access groups, μ, remains unchanged but the number m of access nodes per access group increases from 8 to 10. The number N of access nodes is determined as m×μ Thus, ten access nodes may be added.

Figure 57:
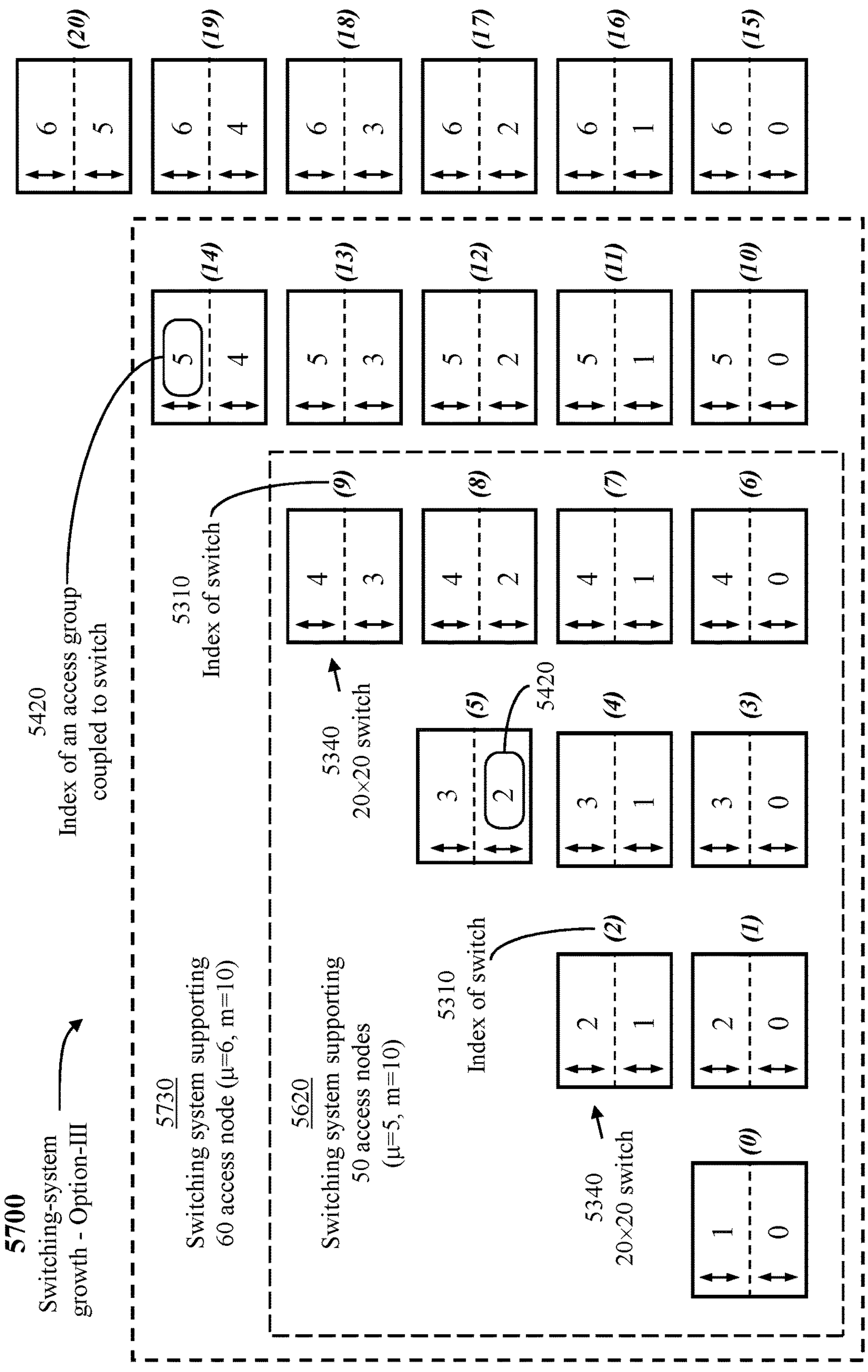
FIG. 57 illustrates a third growth scheme of the symmetrical-access switching system of FIG. 53 based on adding new switches of larger dimensions and new access nodes, in accordance with an embodiment of the present invention.

FIG. 57 illustrates the third expansion scheme 5700 of the symmetrical-access switching system of FIG. 53 based on adding new switches of larger dimensions and new access groups.

In the exemplary case of FIG. 57, expansion of the switching system 5520 (FIG. 55) to a switching system 5620 is realized through increasing m from 8 to 10 while keeping μ unchanged (μ=5) as in the case of FIG. 56. Further expansion from switching system 5620 to switching system 5730 is realized by increasing μ from five to six and providing (μ−1) new switches 5340 of indices 10 to 14, each comprising 20 dual ports for handling payload data in addition to dual control ports. A further expansion step adds six switches 5340, of indices 15 to 20, and a new access group of index 6 as illustrated in FIG. 57, with each switch 5340 comprising 20 dual ports for handling payload data in addition to dual control ports.

Figure 58:
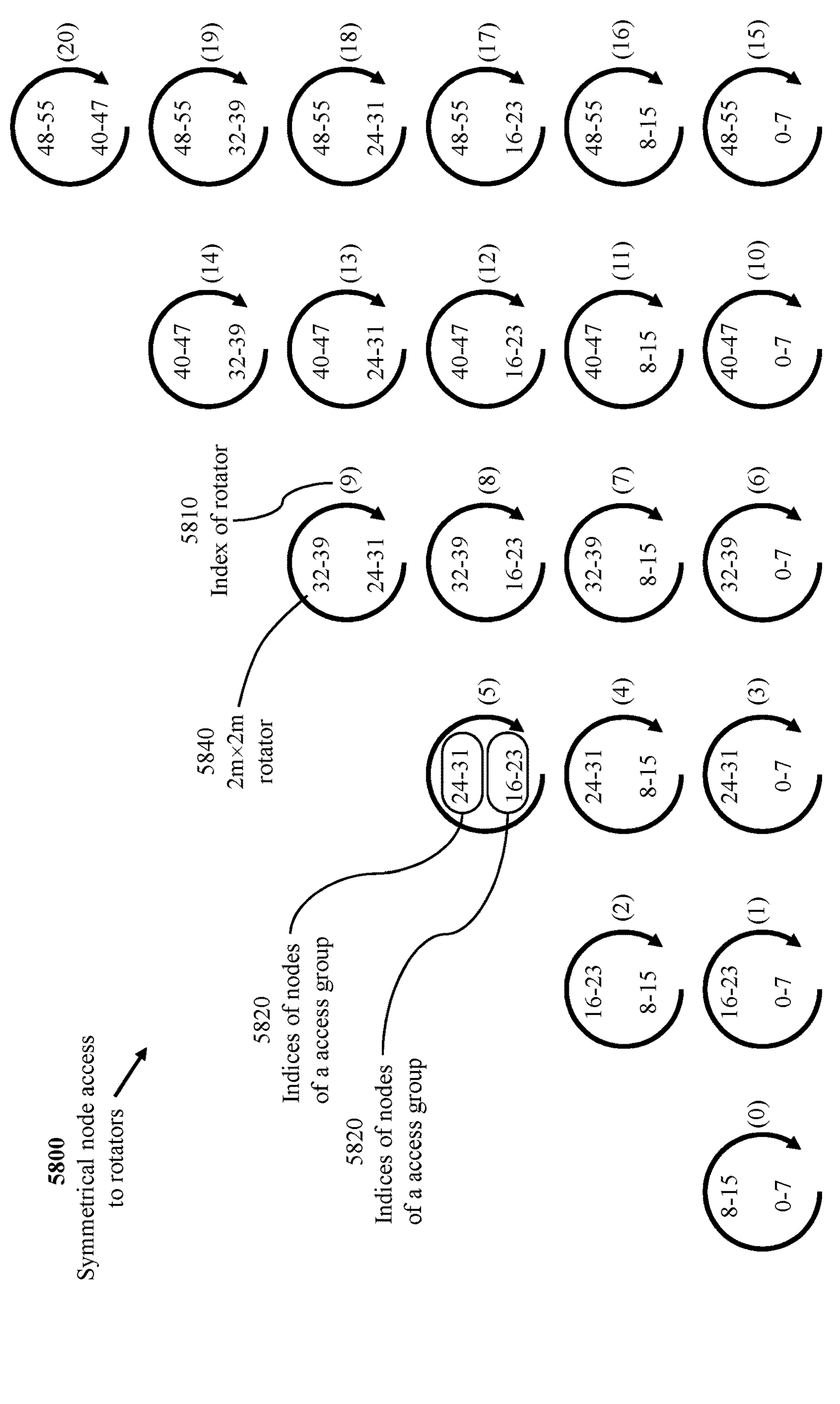
FIG. 58 illustrates a symmetrical-access switching system based on combining each pair of conjugate rotators to form a respective single rotator, in accordance with an embodiment of the present invention.

FIG. 25 and FIG. 26 illustrate an asymmetrical switching system employing rotators instead of switches. A plurality of rotators 2540 is arranged in a matrix of a number of columns and the same number of rows, wherein a first rotator 2540A and a second rotator 2540B of each complementary pair of rotators are collocated (FIG. 29). Each rotator 2540 comprises (FIG. 27) a number m of input ports 2710, m output ports 2730, m>2, a control inlet 2712, a control outlet 2732, and a rotating mechanism 2720. Each access node is communicatively coupled to an input port 2710 of each rotator 2540 of a respective row, and an output port 2730 of each rotator 2540 of a respective column. FIG. 58 illustrates a symmetrical-access switching system 5800 based on combining each pair of complementary rotators to form a respective single rotator 5840 having 2×m dual ports in addition to any control ports. Each rotator is coupled to respective two groups of access nodes 5820.

The arrangement of rotators of FIG. 58 is analogous to the arrangement of switches of FIG. 53 and the indices 5810 of rotators 5840 are likewise selected.

Figure 68:
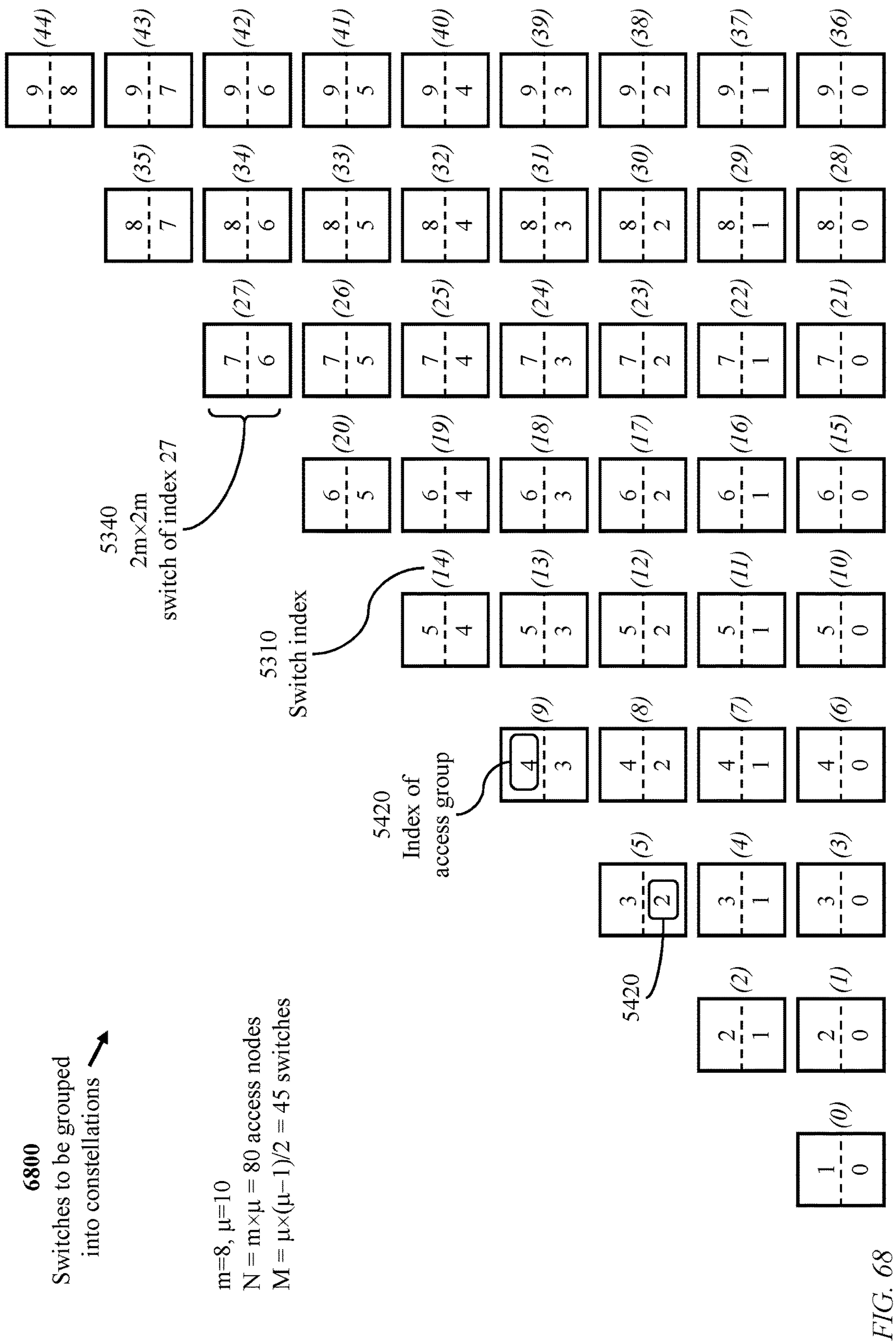
FIG. 68 illustrates switches of a symmetrical-access switch to be arranged into constellations of switches.
Figure 69:
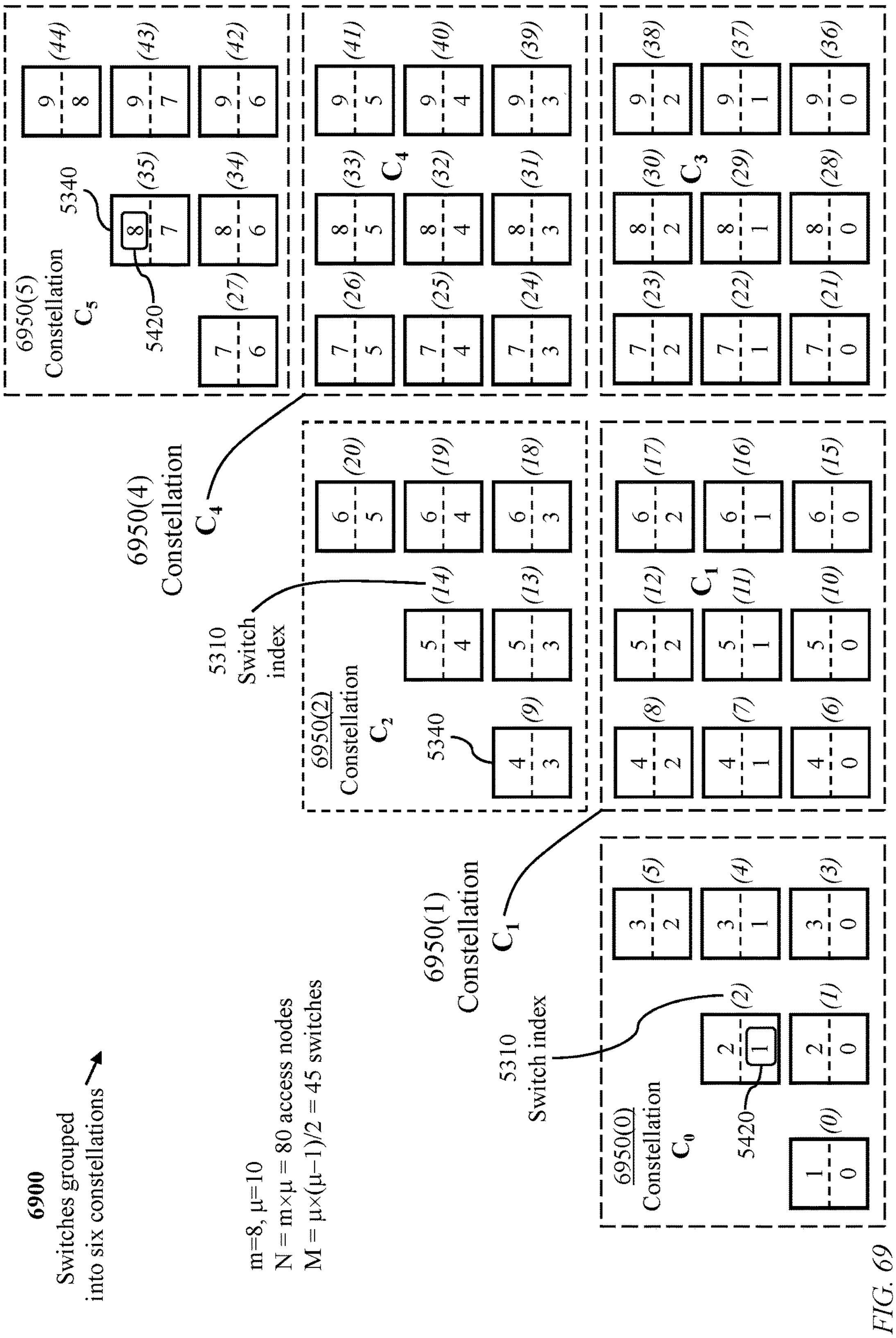
FIG. 69 illustrates an exemplary arrangement of the switches of FIG. 68 into a number of constellations, in accordance with an embodiment of the present invention.

Thus, regardless of the type of distributors (switches or rotators), an access group of index g, 0≤g<μ, connects to (μ−1) distributors of indices:

$$\{j+g\times(g-1)/2\} \text{ for } 0\leq j<g, \text{ and}$$

$$\{g+j\times(j-1)/2\} \text{ for } g<j<\mu;$$

μ denoting a count of access groups of the plurality of access groups. The access groups are indexed sequentially from 0 to (μ−1), and the distributors of the plurality of distributors are indexed sequentially in steps of 1 starting from 0. The plurality of distributors (switches or rotators) comprises M=μ×(μ−1)/2 indexed as 0, 1, . . . , (M−1). For example, for a network supporting 10 access groups (μ=10), the access group of index 5 connects to distributors of indices {10, 11, 12, 13, 14} and {20, 26, 33, 41} as indicated in FIG. 68 and FIG. 69 (where the distributors are switches).

Figure 59:
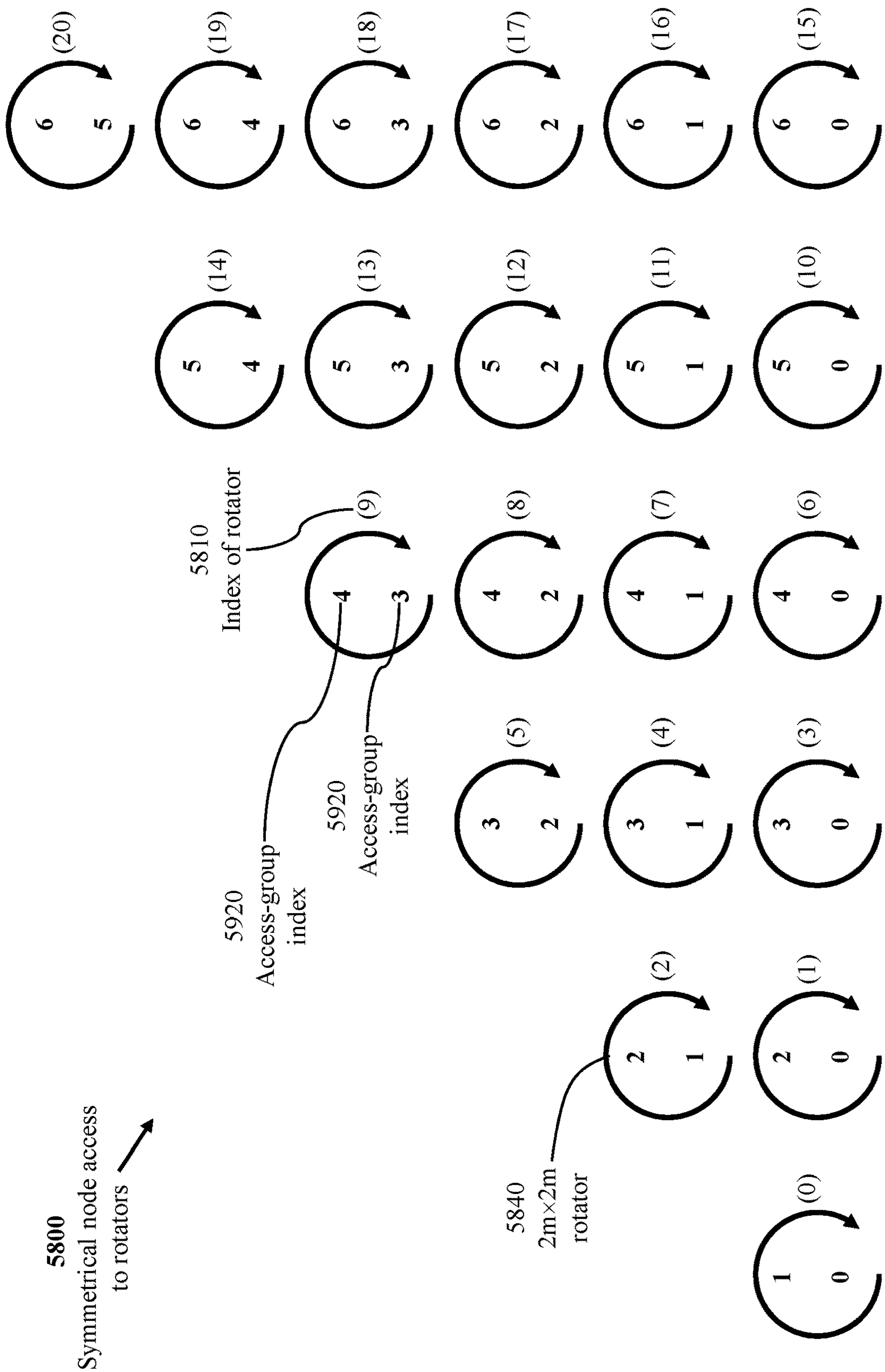
FIG. 59 illustrates the symmetrical-access switching system of FIG. 58 indicating indices of access groups connecting to each switch.

FIG. 59 illustrates the symmetrical-access switching system 5800 of FIG. 59 illustrating indices 5920 of access groups connecting to each rotator 5840. With m=8, the access groups of {0-7}, {8-15}, {16-23}, {24-31}, {32-39}, {40-47}, and {48-55} are indexed as 0, 1, . . . , 6, respectively.

Figure 60:
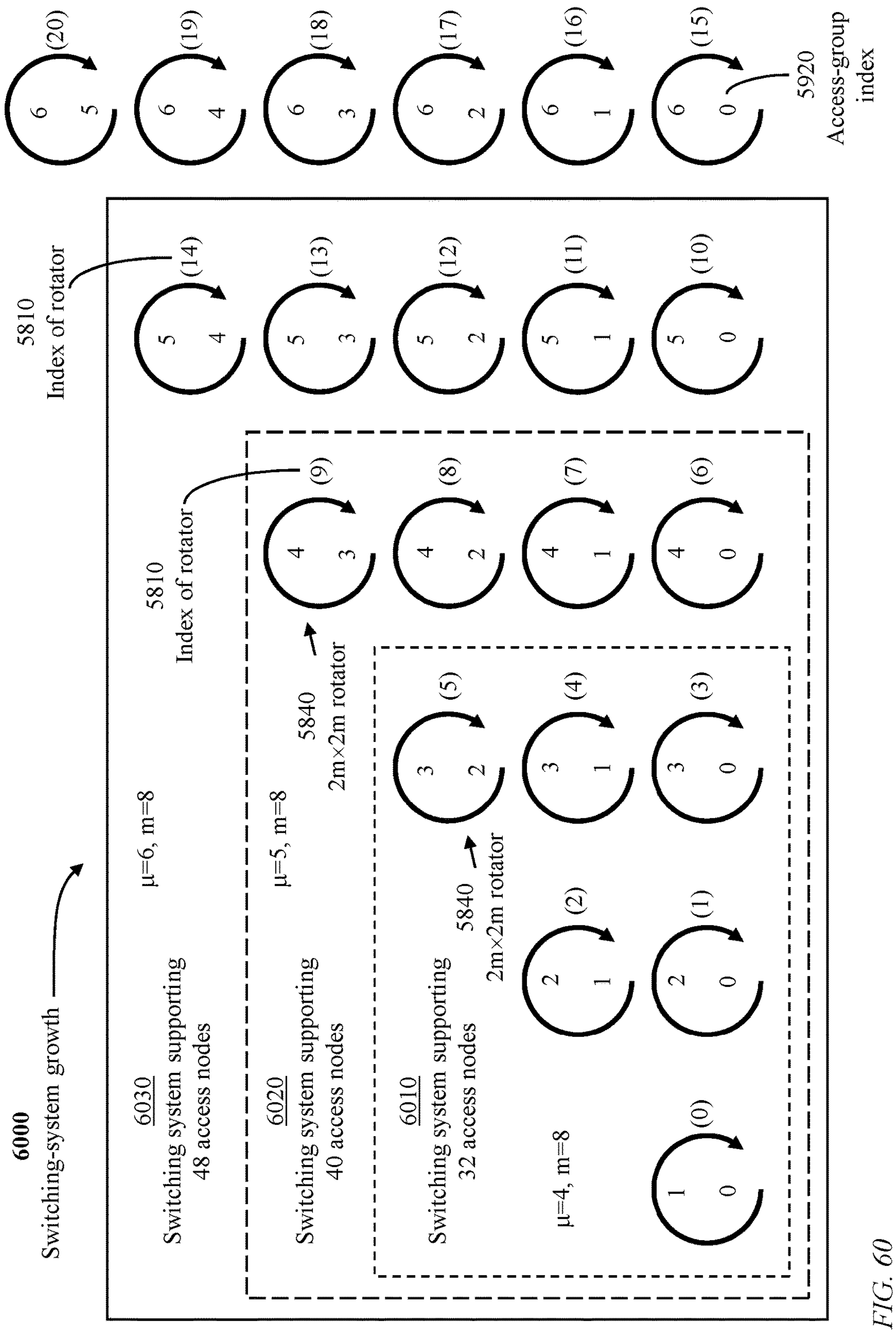
FIG. 60 illustrates an expansion scheme of the symmetrical-access switching system of FIG. 59, in accordance with an embodiment of the present invention.

FIG. 60 illustrates an expansion scheme 6000 of the symmetrical-access switching system 5800 of FIG. 59 similar to expansion scheme 5500. Expansion scheme 6000 is based on adding new rotators of same dimensions and new access nodes. With each access node having (μ−1) dual channels each connecting to a respective rotator 5840 having 2×m dual ports for handling payload data, the total number M of rotators is μ×(μ−1)/2 and the number N of access nodes is limited to m×μ.

Figure 61:
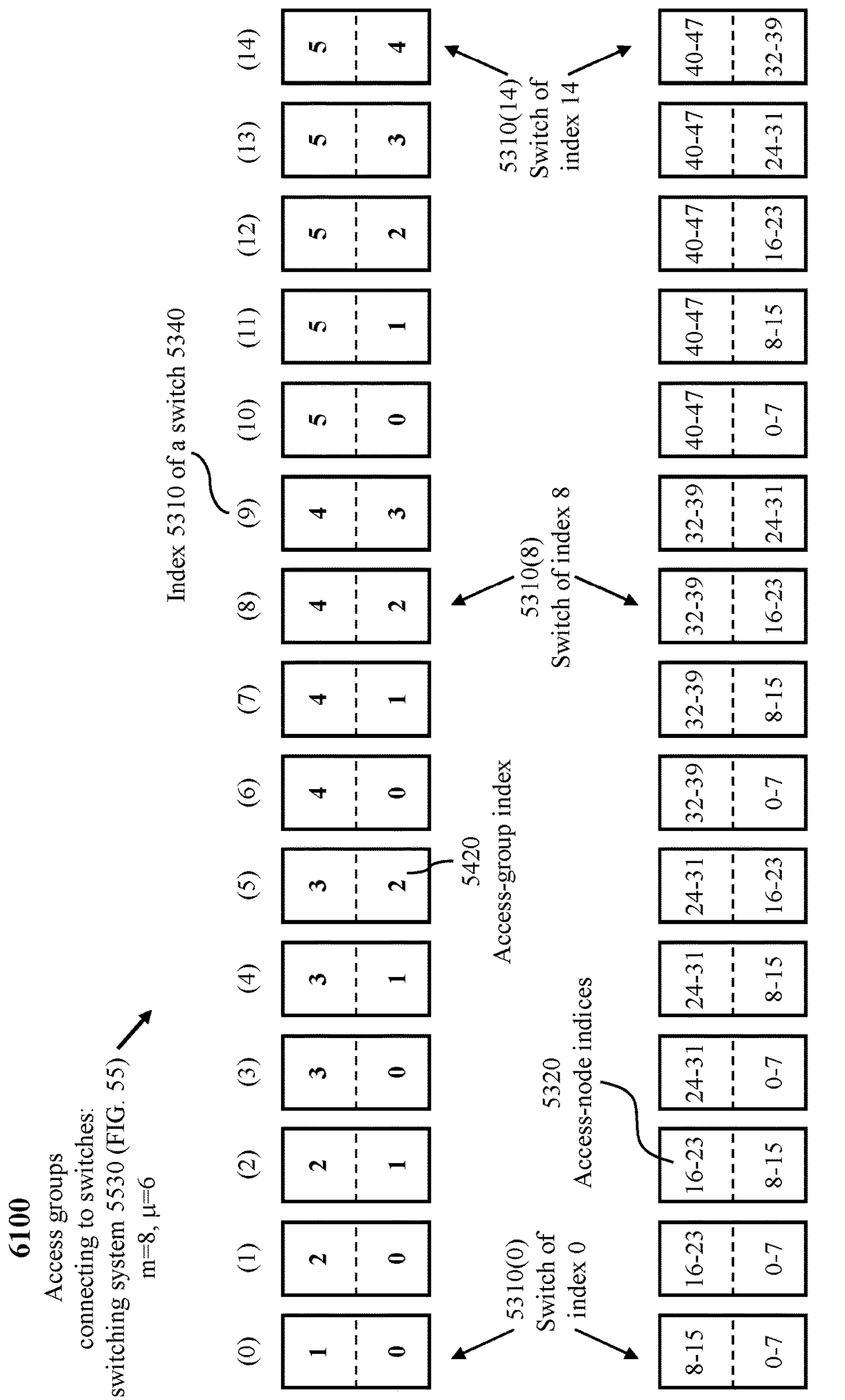
FIG. 61 illustrates indices of access nodes connecting to a set of switches of the symmetrical-access switching system of FIG. 53 and corresponding indices of access groups.

FIG. 61 illustrates access groups 6100 connecting to switches 5340 of a symmetrical-access switching system 5530 of FIG. 55. Indices 5320 of access nodes and corresponding indices 5420 of access groups connecting to each switch 5340 are illustrated.

Figure 62:
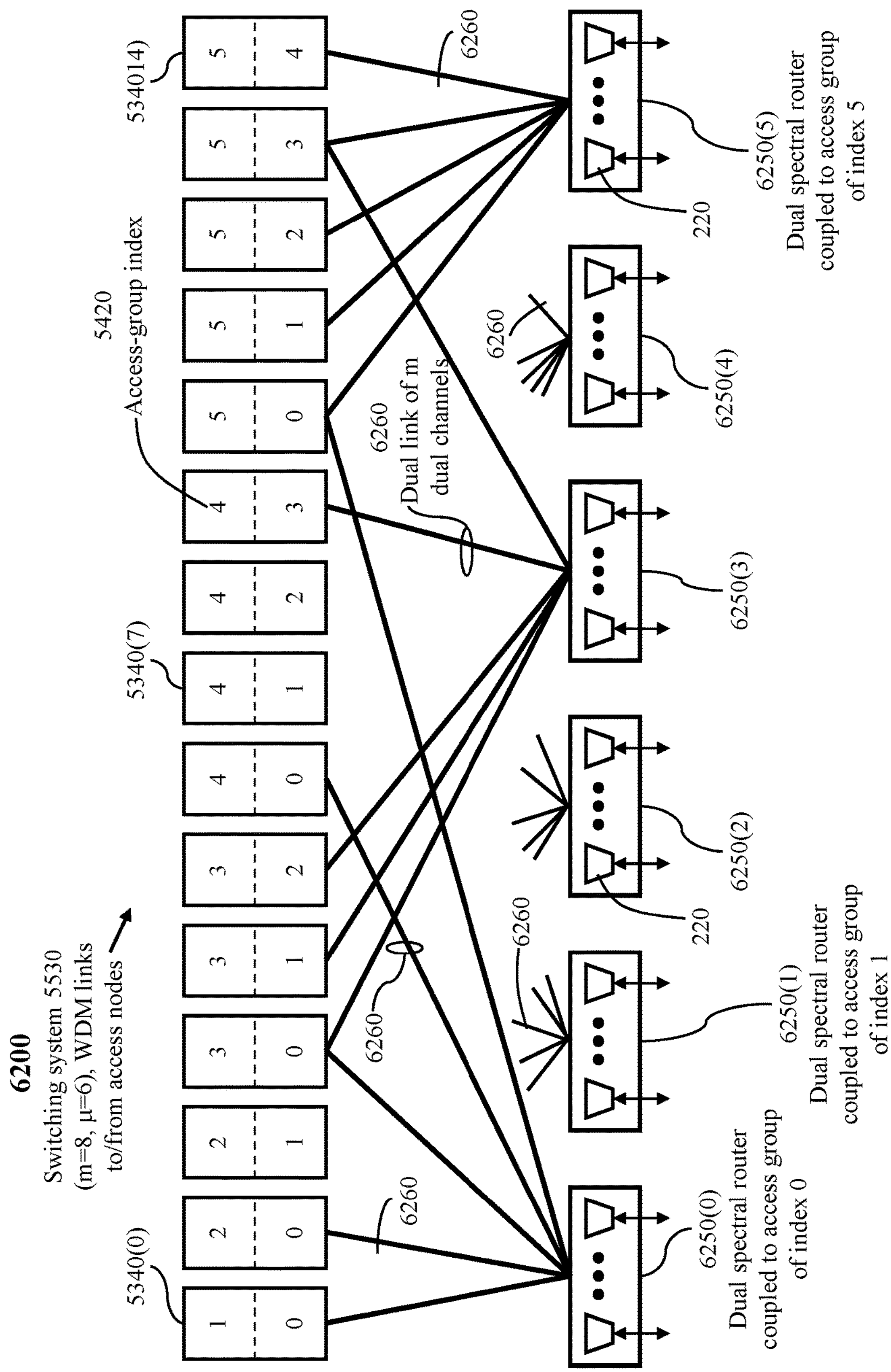
FIG. 62 illustrates connectivity of access groups to switches of the symmetrical-access switching system of FIG. 53 using upstream WDM links and downstream WDM links in accordance with an embodiment of the present invention.

FIG. 62 illustrates an implementation 6200 of the switching system 5530 of FIG. 55 where access groups 5320 connect to switches 5340 of the symmetrical-access switching system 5530 using dual WDM links 6260; a dual WDM link comprises an upstream WDM link and a downstream WDM link.

An access group of index g and an access group of index h, 0<g<μ, 0≤h<(μ−1), g>h, connect to a distributor of index {h+g×(g−1)/2}, μ denoting the number of access groups. The distributors of the plurality of distributors are indexed sequentially in steps of 1 starting from 0. For example, an access group if index 4 and an access group of index 6 (g=6 and h=4) connect to a distributor of index {4+(6×5)/2}; that is the distributor of index 19 as indicated in FIG. 68 and FIG. 69 (where the distributors are switches). An access group if index 8 and an access group of index 5 (g=8 and h=5) connect to a distributor of index {5+(8×7)/2}; that is the distributor of index 33 as indicated in FIG. 68 and FIG. 69.

Each access node of an access group directs a spectral band to each of (μ−1) upstream WDM links directed to a set of (μ−1) switches 5340 and receives a spectral band from each of (μ−1) downstream WDM links originating from the same set of (μ−1) switches 5340. An upstream spectral router transfers spectral bands from the access nodes of an access group to (μ−1) upstream WDM links and a downstream spectral router transfers spectral bands from (μ−1) downstream WDM links to the access nodes. An upstream spectral router and a corresponding downstream spectral router are indicated as a dual spectral router 6250 to be further detailed in FIG. 63 to FIG. 67. An upstream WDM link and a corresponding downstream WDM link connecting an access node to a switch are indicated as a dual link 6260.

Figure 63:
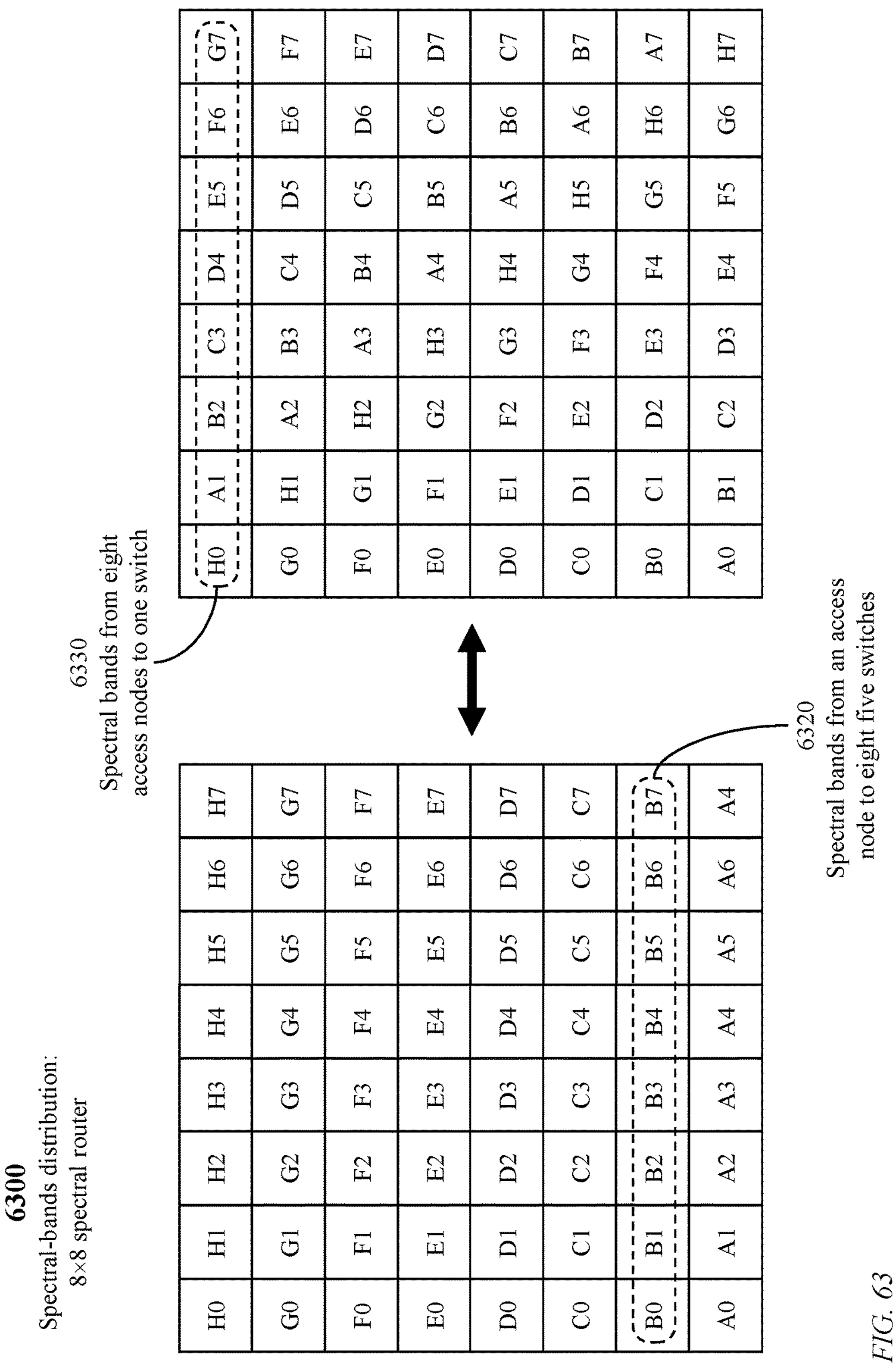
FIG. 63 illustrates distribution of spectral bands of input WDM links among a same number of output WDM links for use as an upstream spectral router or a downstream spectral router.

FIG. 63 illustrates spectral-band distribution 6300 using a spectral router to transfer spectral bands of input WDM links to a same number of output WDM links. In the illustrated case, an upstream spectral router connects to eight input WDM links originating from access nodes and eight output WDM links directed to distributors, and a downstream spectral router connects to eight input WDM links originating from distributors and directed to access nodes. In the upstream direction, each input WDM link carries eight spectral bands 6320 originating from one access node and directed to eight switches. Each output WDM link carries eight spectral bands 6330 received from eight access nodes and directed to one switch 5340. The input spectral bands of a first input link are denoted {A0, A1, . . . , A7}, the spectral bands of a second input link are denoted {B0, B1, . . . , B7}, the spectral bands of a third input link are denoted {C0, C1, . . . , C7}, and so on with the spectral bands of the last input link denoted {H0, H1, . . . , H7}. In the spectral-band notation above, the characters A, B, C, D, E, F, G, H identify a physical link and the numerals 0, 1, 2, 3, 4, 5, 6, and 7 identify respective spectral bands (or wavelength bands). Thus, the set of signals {A0, B0, C0, D0, E0, F0, G0, and H0} refers to signals occupying the same spectral band in different physical transport media and the set of signals {A0, B1, C2, D3, E4, F5, G6, and H7} refers to signals occupying non-overlapping spectral bands which may then share a same physical transport medium (a fiber link). Each output WDM link carries eight non-overlapping spectral bands comprising a spectral band from each input link. In the downstream direction, each input WDM link to a downstream spectral router carries eight spectral bands originating from one switch 5340 and directed to eight access nodes. Each output WDM link of the downstream spectral router carries eight spectral bands received from eight switches and directed to one access node.

Figure 64:
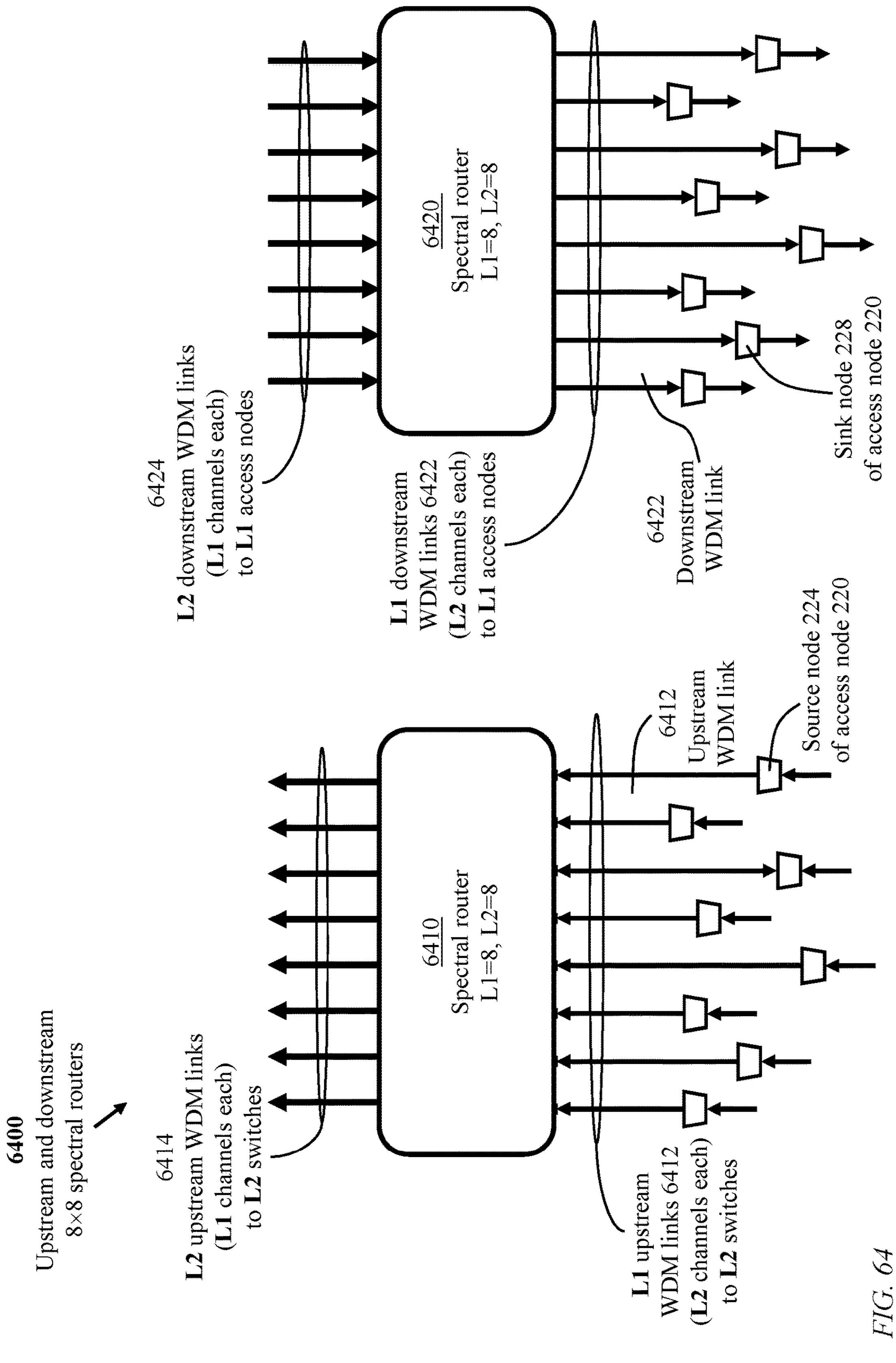
FIG. 64 illustrates an upstream spectral router and a downstream spectral router each having equal numbers of input and output WDM links.

FIG. 64 illustrates a configuration of dual spectral router 6400 comprising an upstream spectral router 6410 connecting to L1 input WDM links and L2 output WDM links and a downstream spectral router 6420 connecting to L1 input WDM links and L2 output WDM links with L1=L2−8. Each of m access nodes 220 connects to a respective upstream WDM link 6412 directed to upstream spectral router 6410 and a respective downstream WDM link 6422 from downstream spectral router 6420. Each of (μ−1) upstream WDM links 6414 from upstream spectral router 6410 connects to a respective distributor. Each of (μ−1) downstream WDM links 6424 connects a respective distributor to downstream spectral router 6420.

Figure 65:
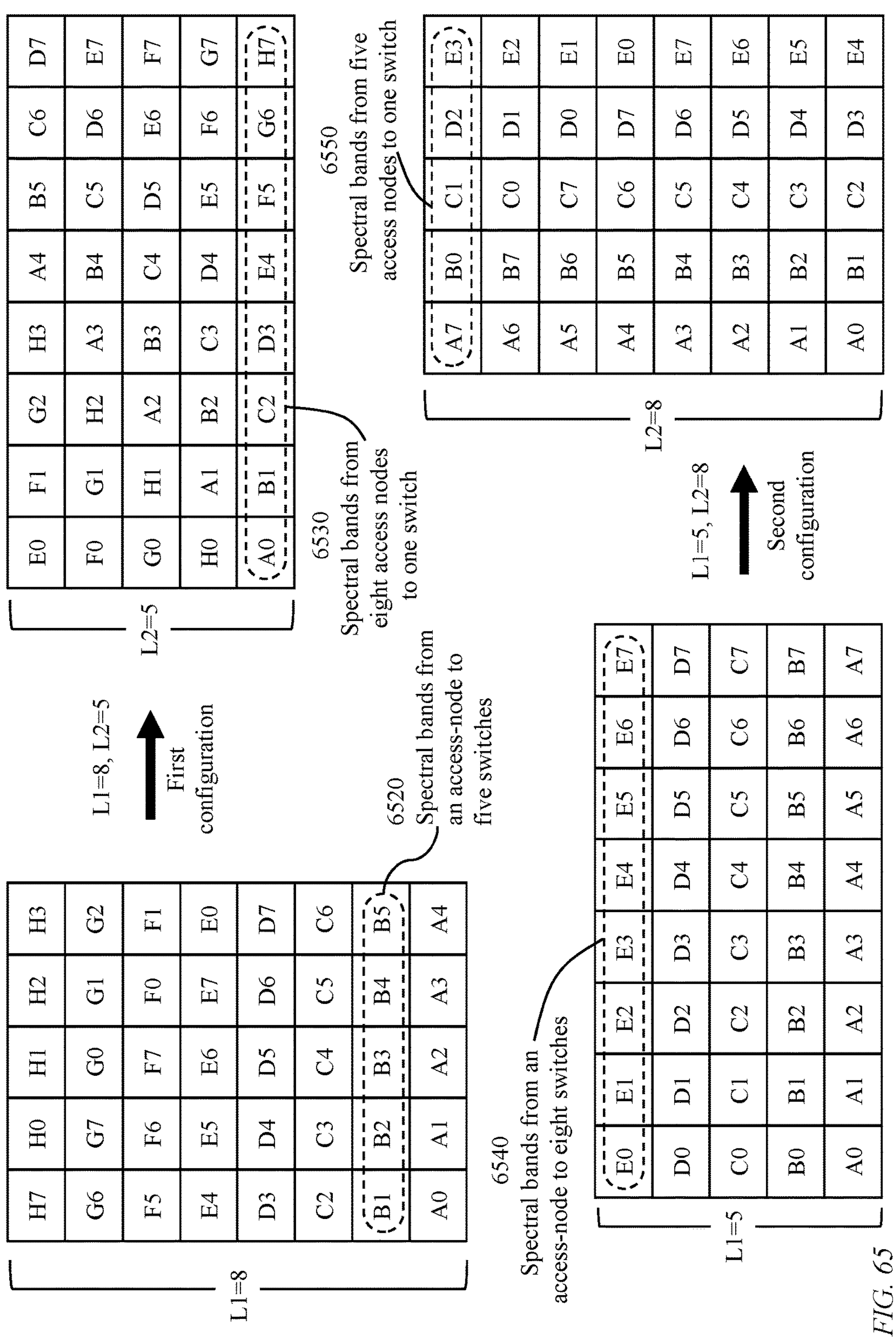
FIG. 65 illustrates distribution of spectral bands of input WDM links among a different number of output WDM links for use as an upstream spectral router or a downstream spectral router.

FIG. 65 illustrates spectral-band distribution 6500 using a spectral router to transfer spectral bands of input WDM links to a different number of output WDM links. Two configurations are illustrated.

In a first configuration of FIG. 65, in the upstream direction, each input WDM link from an access node of a group of eight access nodes (m=8) carries five spectral bands 6520 originating from one access node and directed to five switches. Each output WDM link carries eight spectral bands 6530 received from eight access nodes and directed to one switch 5340. The input spectral bands of a first input link are denoted {A0, A1, A2, A3, A4}, the spectral bands of a second input link are denoted {B0, B1, B2, B3, B4}, the spectral bands of a third input link are denoted {C0, C1, C2, C3, C4}, and so on with the spectral bands of the last input link denoted {H0, H1, H2, H3, H4}. Each output WDM link carries eight non-overlapping spectral bands 6530 comprising a spectral band from each input link.

In the downstream direction, each input WDM link carries eight spectral bands originating from one distributor (switch 5340) and directed to eight access nodes. Each output WDM link carries five spectral bands received from five distributors and directed to one access node.

In a second configuration of FIG. 65, in the upstream direction, each input WDM link from an access node of a group of five access nodes carries eight spectral bands 6540 originating from one access node and directed to eight switches. Each output WDM link carries five spectral bands 6550 received from five access nodes and directed to one switch 5340. The input spectral bands of a first input link are denoted {A0, A1, . . . , A7}, the spectral bands of a second input link are denoted {B0, B1, . . . , B7}, and so on with the spectral bands of the last input link denoted {E0, E1, . . . , E7}. Each output WDM link carries five non-overlapping spectral bands comprising a spectral band from each input link. In the downstream direction, each input WDM link carries five spectral bands originating from one switch 5340 and directed to five access nodes. Each output WDM link carries eight spectral bands received from eight switches and directed to one access node.

Figure 66:
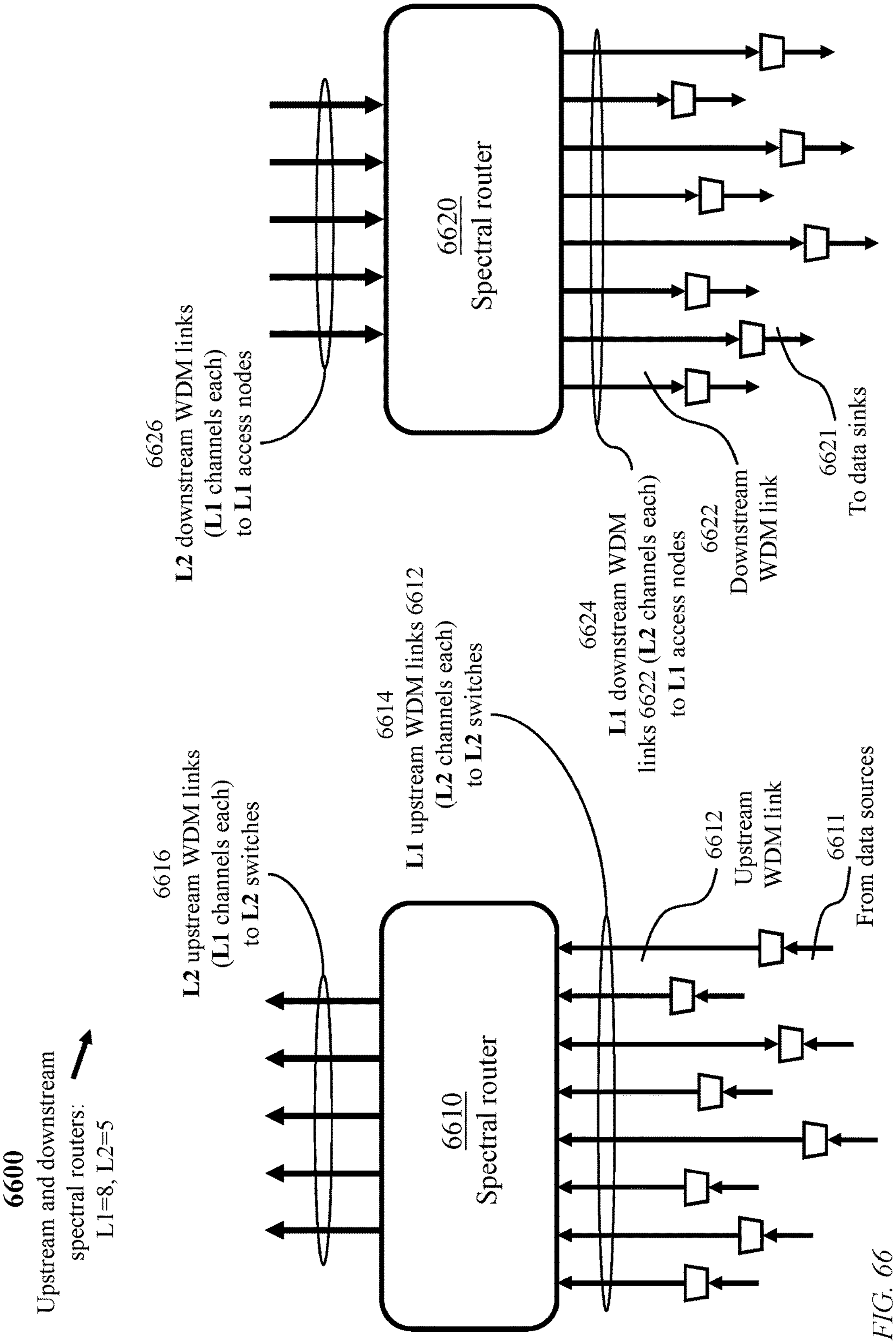
FIG. 66 illustrates an upstream spectral router having a number of input WDM links exceeding a number of output WDM links and a downstream spectral router having a number of output WDM links exceeding a number of input WDM links.

FIG. 66 illustrates a configuration 6600 of dual spectral router 6250 comprising an upstream spectral router 6610 and a downstream spectral router 6620. Upstream spectral router 6610 transfers spectral bands from a set 6614 of eight WDM links 6612 originating from eight access nodes to five WDM links 6616 directed to five switches 5340. Downstream spectral router 6620 transfers spectral bands from five WDM links 6626 originating from five switches 5340 to a set 6624 of eight WDM links 6622 directed to eight access nodes. Each of L1 access nodes connects to a respective upstream WDM link 6612 directed to upstream spectral router 6610 and a respective downstream WDM link 6622 from downstream spectral router 6620. Each of upstream WDM links 6616 from upstream spectral router connects to a respective distributor. Each of downstream WDM links 6626 connects a respective switch to downstream spectral router 6620. Each access node 220 receives data from a respective set of data sources through channels 6611 and transmits data to a respective set of data sinks through a set of channels 6621.

Figure 67:
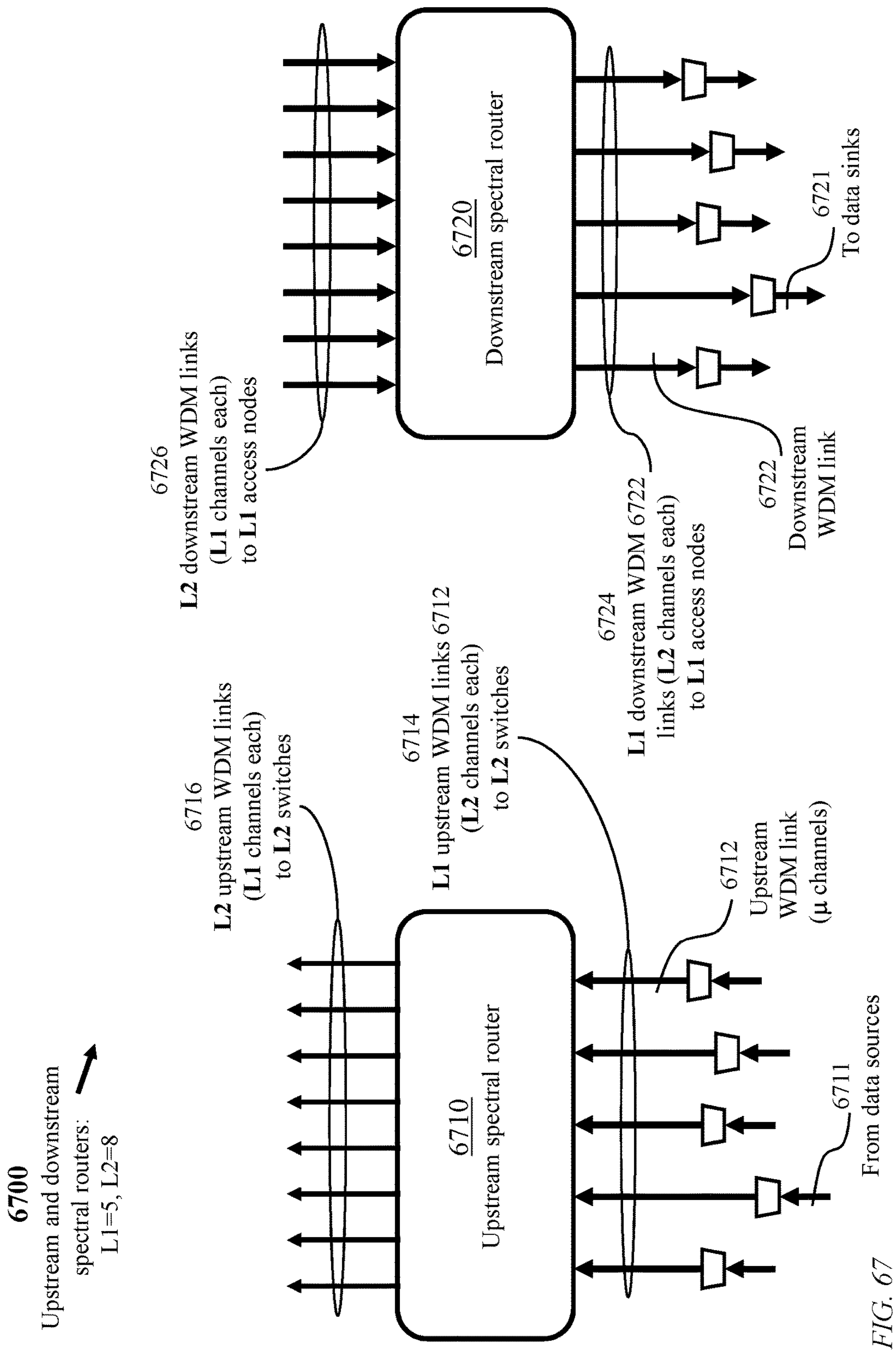
FIG. 67 illustrates an upstream spectral router having a number of output WDM links exceeding a number of input WDM links and a downstream spectral router having a number of input WDM links exceeding a number of output WDM links.

FIG. 67 illustrates a configuration 6700 of dual spectral router comprising an upstream spectral router 6710 and a downstream spectral router 6720. Upstream spectral router 6710 transfers spectral bands from a set 6714 of five WDM links 6712 originating from five access nodes to a set 6716 of eight WDM links directed to eight switches 5340. Downstream spectral router 6720 transfers spectral bands from a set 6726 of eight WDM links originating from eight distributors to a set 6724 of five WDM links 6722 directed to five access nodes 220. Each of five access nodes connects to a respective upstream WDM link 6712 directed to upstream spectral router 6710 and a respective downstream WDM link 6722 from downstream spectral router 6720. Each of eight upstream WDM links 6716 from upstream spectral router 6710 connects to a respective distributor. Each of eight downstream WDM links 6726 connects a respective distributor to downstream spectral router 6720. Each access node 220 receives data from a respective set of data sources through channels 6711 and transmits data to a respective set of data sinks through a set of channels 6721.

FIG. 68 illustrates a symmetrical switching system 6800 of parameters m=8 and μ=10. Symmetrical switching system 6800 comprises $\mu\times(\mu-1)/2$ switches 5340 indexed as 0 to 44 interconnecting μ access groups indexed as 0 to 9 (comprising m×μ access nodes indexed as 0 to 79). Indices 5420 of access groups coupled to each switch 5340 are indicated; for example, access groups of indices 3 and 4 are coupled to switch 5340 of index 9 (reference numeral 5310). To exploit WDM transport, the 45 switches may be arranged into constellations of collocated switches enabling each access node to connect to a constellation of switches through a respective WDM link, thus eliminating the need for intermediate spectral routers.

FIG. 69 illustrates an exemplary arrangement 6900 of the switches of FIG. 68 into a number of constellations 6950. Each access node connects to each of respective (μ−1) switches through a respective dual channel. The constellations are formed so that each access node connects to at most Ω switches in each of Π constellations where $1<\Omega<(\mu-1)$ and $\Pi=\lceil(\mu-1)/\Omega\lceil$. In the arrangement of FIG. 69, μ=10, Ω=3, and Π=3. With each switch connecting to two access groups, the ratio of the number of access groups connecting to a constellation to the number of switches of the constellation is 2/Ω. If μ is selected to equal 9 instead, with Ω=3, then each access node may connect to three switches in each of two constellations and two switches in one constellation. With Ω>1, Π>1, the minimum value of μ is 5. Naturally, arranging the distributors (switches or rotators) into constellations is attractive in a large-scale network where the number μ of access groups is significantly large—with μ exceeding 100 for example. For a network of global coverage, a value of μ exceeding 1000 may be considered.

The switches are arranged in $\Pi\times(\Pi+1)/2$ constellations including Π diagonal constellations each comprising $\Omega\times(\Omega+1)/2$ switches and $\Pi\times(\Pi-1)/2$ square constellations each comprising $\Omega^2$ switches. With μ=10, Ω=3, Π=3, the number of switches is 45, the number of diagonal constellations is 3 and the number of square constellations is 3. As illustrated in FIG. 69, each of the diagonal constellations 6950(0), 6950(2), and 6950(5) comprises 6 switches supporting 4 access groups and each of the remaining constellation 6950 (1), 6950(3), and 6950(4) comprises 9 switches supporting 6 access groups.

Thus, the plurality of distributors is arranged into a plurality of constellations where each access node connects to a respective set of constellations of the plurality of constellations through a set of multichannel links. The respective set of constellations collectively contain a respective set of (μ−1) distributors. Each multichannel link to a constellation carries a set of dual channels directed through a spectral demultiplexer and a spectral multiplexer to a subset of distributors of the respective set of (μ−1) distributors. Table-I below illustrates connectivity of access groups to distributors within constellations.

TABLE I

Connectivity of access-groups to distributors - Configuration of FIG. 69

| Access | Indices of Constellations (C) and distributors | | | | | | | | | | | |
|---|---|---|---|---|---|---|---|---|---|---|---|---|
| group | C | Distributors | | | C | Distributors | | | C | Distributors | | |
| 0 | 0 | 0 | 1 | 3 | 1 | 6 | 10 | 15 | 3 | 21 | 28 | 36 |
| 1 | | 0 | 2 | 4 | | 7 | 11 | 16 | | 22 | 29 | 37 |
| 2 | | 1 | 2 | 5 | | 8 | 12 | 17 | | 23 | 30 | 38 |
| 3 | 0 | 3 | 4 | 5 | 2 | 9 | 13 | 18 | 4 | 24 | 31 | 39 |
| 4 | 1 | 6 | 7 | 8 | 2 | 9 | 14 | 19 | 4 | 25 | 32 | 40 |
| 5 | | 10 | 11 | 12 | | 13 | 14 | 20 | | 26 | 33 | 41 |
| 6 | 1 | 15 | 16 | 17 | 2 | 18 | 19 | 20 | 5 | 27 | 34 | 42 |
| 7 | 3 | 21 | 22 | 23 | 4 | 24 | 25 | 26 | 5 | 27 | 35 | 43 |
| 8 | | 28 | 29 | 30 | | 31 | 32 | 33 | | 34 | 35 | 44 |
| 9 | | 36 | 37 | 38 | | 39 | 40 | 41 | | 42 | 43 | 44 |

With each access node connecting to $\Pi$ constellations, $\Pi>1$, and each multichannel link carrying at most $\Omega$ dual channels, $\Omega>0$, the integers $\Pi$ and $\Omega$ may be selected so that the product $(\Pi\times\Omega)$ at least equals $(\mu-1)$, $\mu$ denoting a count of the access groups of the entire network.

Identifiers of paths to other access nodes, where each path traverses only one distributor, comprise an identifier of a WDM link of the set of multichannel links and an identifier of a dual channel of the set of dual channels.

A constellation of index $\{(q\times(q+1))/2+p\}$, $0\le p<\Pi$ $p\le q<\Pi$, comprises distributors of indices: $\{j+k\ (k-1)/2\}$, $k>j$, where:

$$[p\times\Omega]\le j<[\Omega\times(p+1)];\text{ and}$$

$$[(q\times\Omega)+1]\le k\le[\Omega\times(q+1)];$$

the plurality of distributors comprising M distributors, $M=\mu\times(\mu-1)/2$, indexed from 0 to $(M-1)$, and the plurality of constellations comprising $\Gamma$ constellations, $\Gamma=\{\Pi\times(\Pi+1)\}/2$, indexed from 0 to $(\Gamma-1)$.

Figure 70:
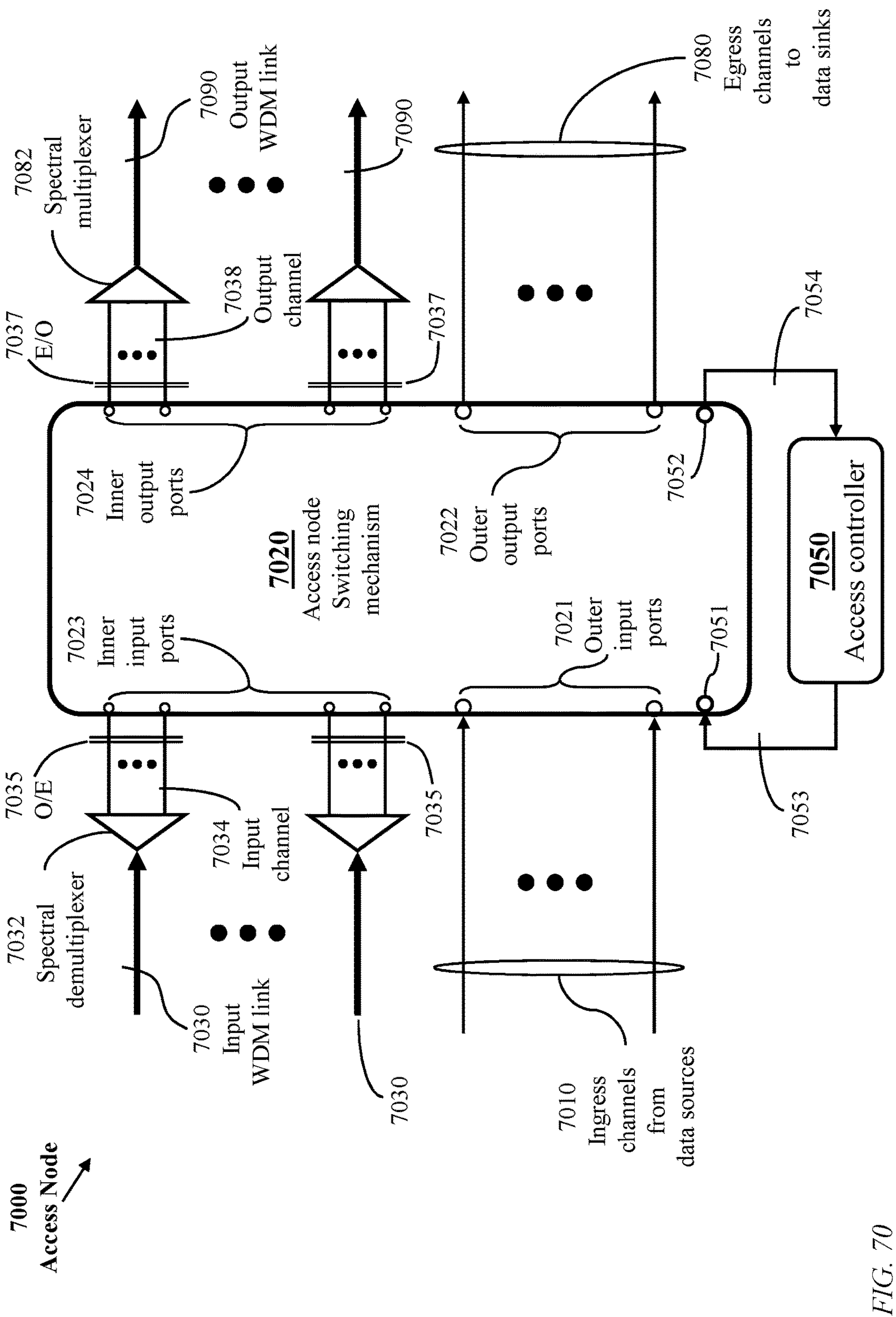
FIG. 70 illustrates an access node coupled to spectral demultiplexers at input and spectral multiplexers at output for use in an embodiment of the present invention.

FIG. 70 illustrates an access node 7000 comprising an access-node switching mechanism 7020 having a plurality of input ports and a plurality of output ports. The input ports are divided into ingress ports 7021 for receiving data from ingress channels 7010 originating from external data sources, inner input ports 7023 for receiving data from respective switches, and a receiving control port 7051 coupled to a control channel 7053 originating from an output port of access controller 7050. The output ports are divided into egress ports 7022 for transmitting data to external data sinks through egress channels 7080, inner output ports 7024 for transmitting data to respective switches, and a transmitting control port 7052 coupled to a control channel 7054 connecting to an input port of access controller 7050. A dual ingress channel/egress channel 7010/7080 may connect to a server or a set of network users.

Access node 7000 may receive data from respective switches through a number of input WDM links 7030 and transmit data to the respective switches through WDM links 7090. As described above, an access node of the symmetrical switching system connects to a respective set of $(\mu-1)$ switches through $(\mu-1)$ dual channels, $\mu$ being the number of access groups in the entire network. The $(\mu-1)$ inner input ports 7023 may be divided into a number $\Pi$ of sets of inner input ports each set comprising at most $\Omega$ ports where $1<\Omega<\mu$ and $\Pi=\lceil(\mu-1)/\Omega\rceil$, $\lceil Q\rceil$, denoting the value of Q if Q is an integer or the nearest higher positive integer to Q if Q is a positive real number. Likewise, the $\mu$ inner output ports 7024 may be divided into $\Pi$ sets of inner output ports each set comprising at most $\Omega$ ports.

Each input WDM link 7030 carries at most $\Omega$ spectral bands. A spectral demultiplexer 7032 separates the spectral bands. Input channels 7034 coupled to outputs of the spectral demultiplexer 7032 connect to a bank of optical-to-electrical converters 7035 the output of which is supplied to respective inner input ports 7023. Each set of inner output ports 7024 connects to a respective bank 7037 of electrical-to-optical converters the output of which is supplied through output channels 7038 to a spectral multiplexer 7082 couple to a respective output WDM link 7090

Each input WDM link 7030 carries at most $\Omega$ spectral bands. A spectral demultiplexer 7032 separates the spectral bands. Input channels 7034 coupled to outputs of the spectral demultiplexer 7030 connect to a bank of optical-to-electrical converters 7035 the output of which is supplied to respective inner input ports 7023. Each set of inner output ports 7024 connects to a respective bank 7037 of electrical-to-optical converters the output of which is supplied through output channels 7038 to a spectral multiplexer 7082 coupled to a respective output WDM link 7090.

Figure 71:
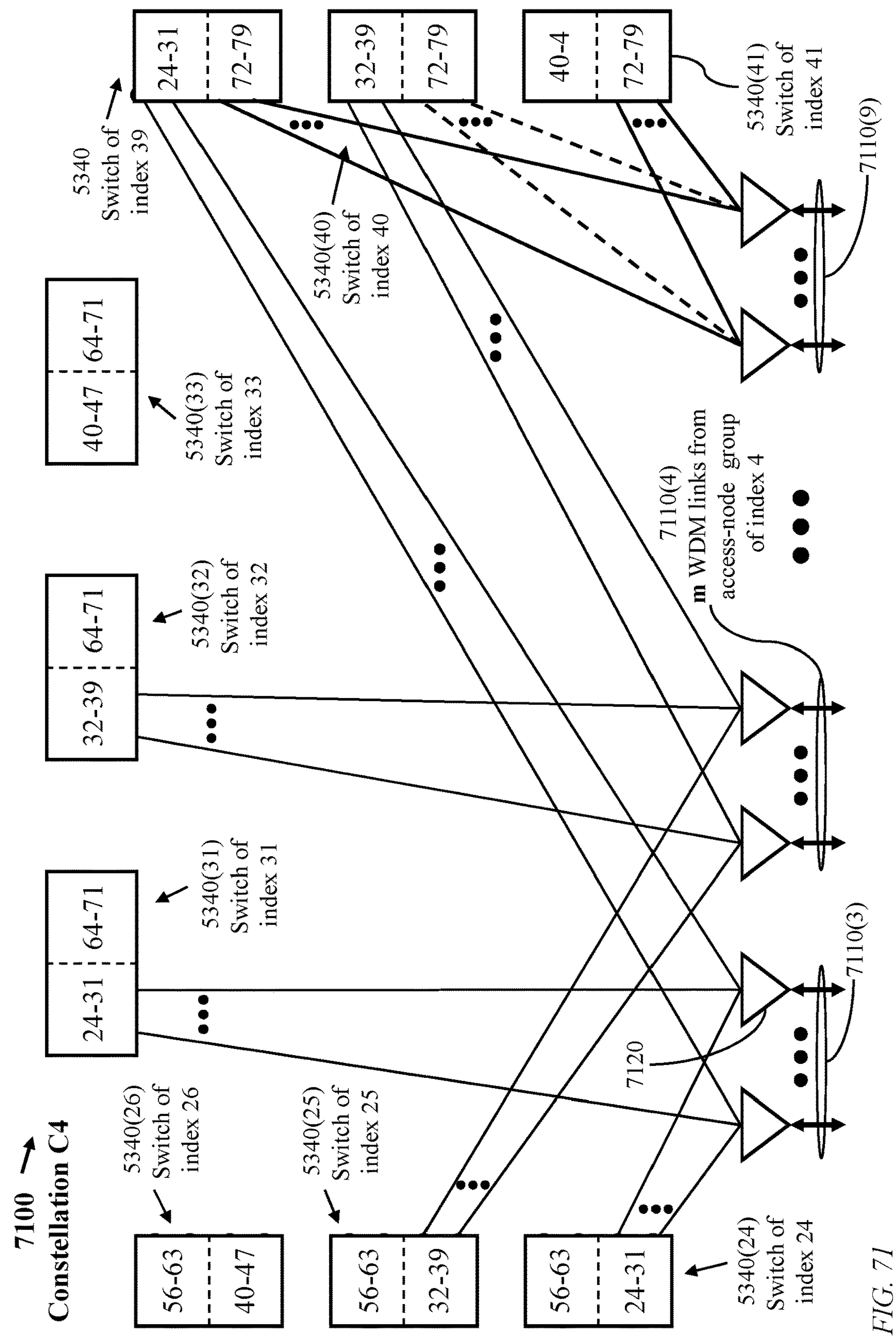
FIG. 71 illustrates switches of a constellation coupled to independent spectral demultiplexers at input and independent spectral multiplexers at output in accordance with an embodiment of the present invention.

FIG. 71 illustrates switches of a constellation 7100 of switches receiving data from WDM links 7090 (FIG. 70) originating from respective access nodes through independent spectral demultiplexers and transmitting data through independent spectral multiplexers coupled to WDM links 7030 (FIG. 70) directed to respective access nodes. Each dual WDM link 7110 comprises a WDM link 7090 from a respective access node and a WDM link 7030 to the respective access node. Each spectral demultiplexer/multiplexer 7120 comprises: (1) a spectral demultiplexer separating spectral bands of a WDM link 7090 from a respective access node to be directed through internal optical channels to respective switches of the constellation; and (2) a spectral multiplexer combining spectral bands received from the respective switches through internal optical channels onto a WDM link 7030 directed to the respective access node.

Figure 72:
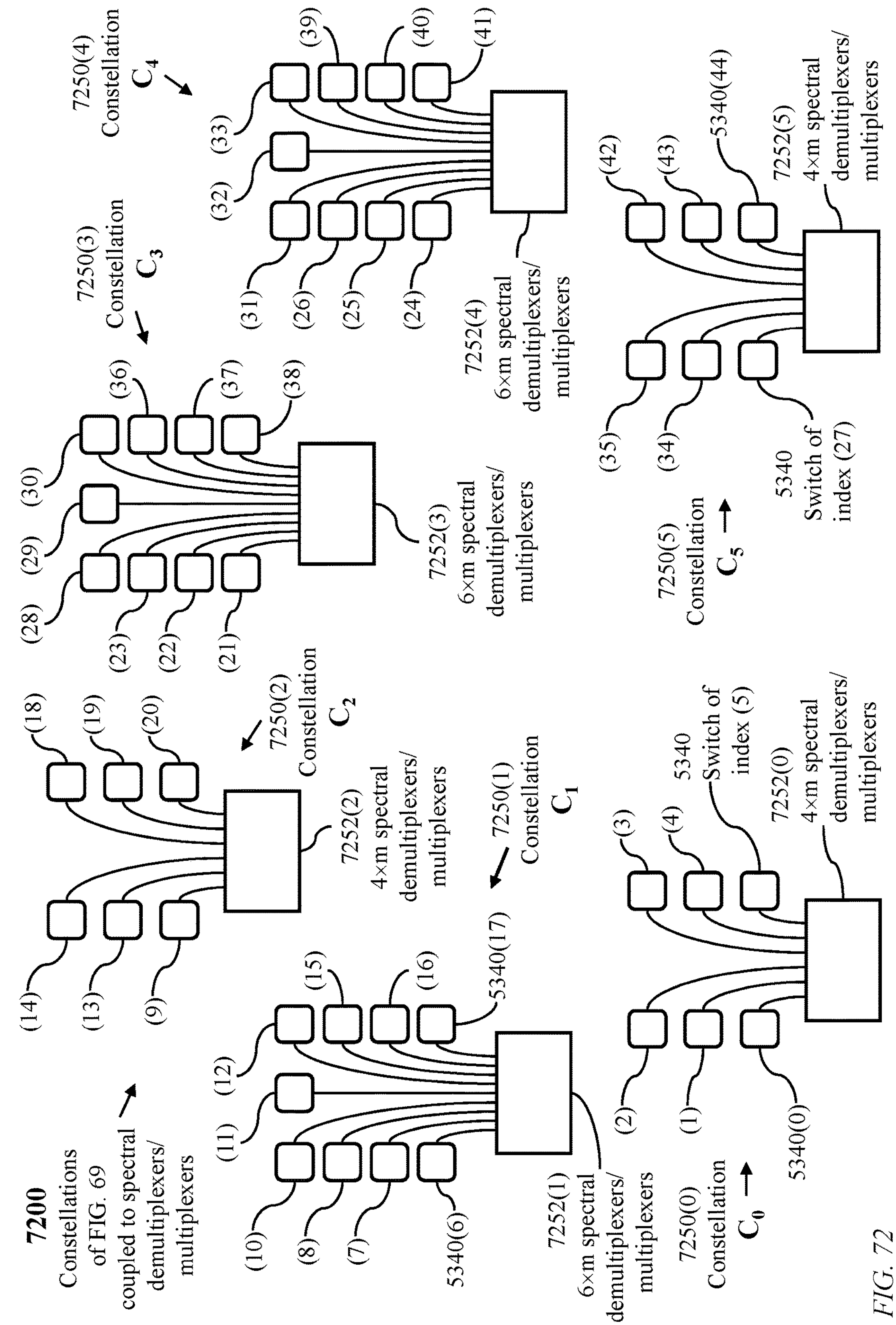
FIG. 72 illustrates the constellations of switches of FIG. 69 each comprising a respective array of independent spectral demultiplexer and a respective array of independent spectral multiplexers, in accordance with an embodiment of the present invention.

FIG. 72 illustrates constellations 7200 of switches coupled to respective arrays 7252 of independent spectral demultiplexers/multiplexers. The illustrated constellations 7200 are based on the arrangement of FIG. 69. Constellations 7250(0) to 7250(5) respectively correspond to constellations 6950(0) to 6950(5). Each of constellations 7250(0), 7250(2), and 7250(5) comprises six switches and supports 4 access groups. With each access group comprising m access nodes, the requisite total number of spectral demultiplexers is 4×m and the requisite total number of spectral multiplexers is 4×m for each of constellations 7250(0), 7250(2), and 7250(5). Each of constellations 7250(1), 7250(3), and 7250(4) comprises nine switches and supports 6 access groups. With each access group comprising m access nodes, the requisite total number of spectral demultiplexers is 6×m and the requisite total number of spectral multiplexers is 6×m for each of constellations 7250(1), 7250(3), and 7250(4).

Figure 73:
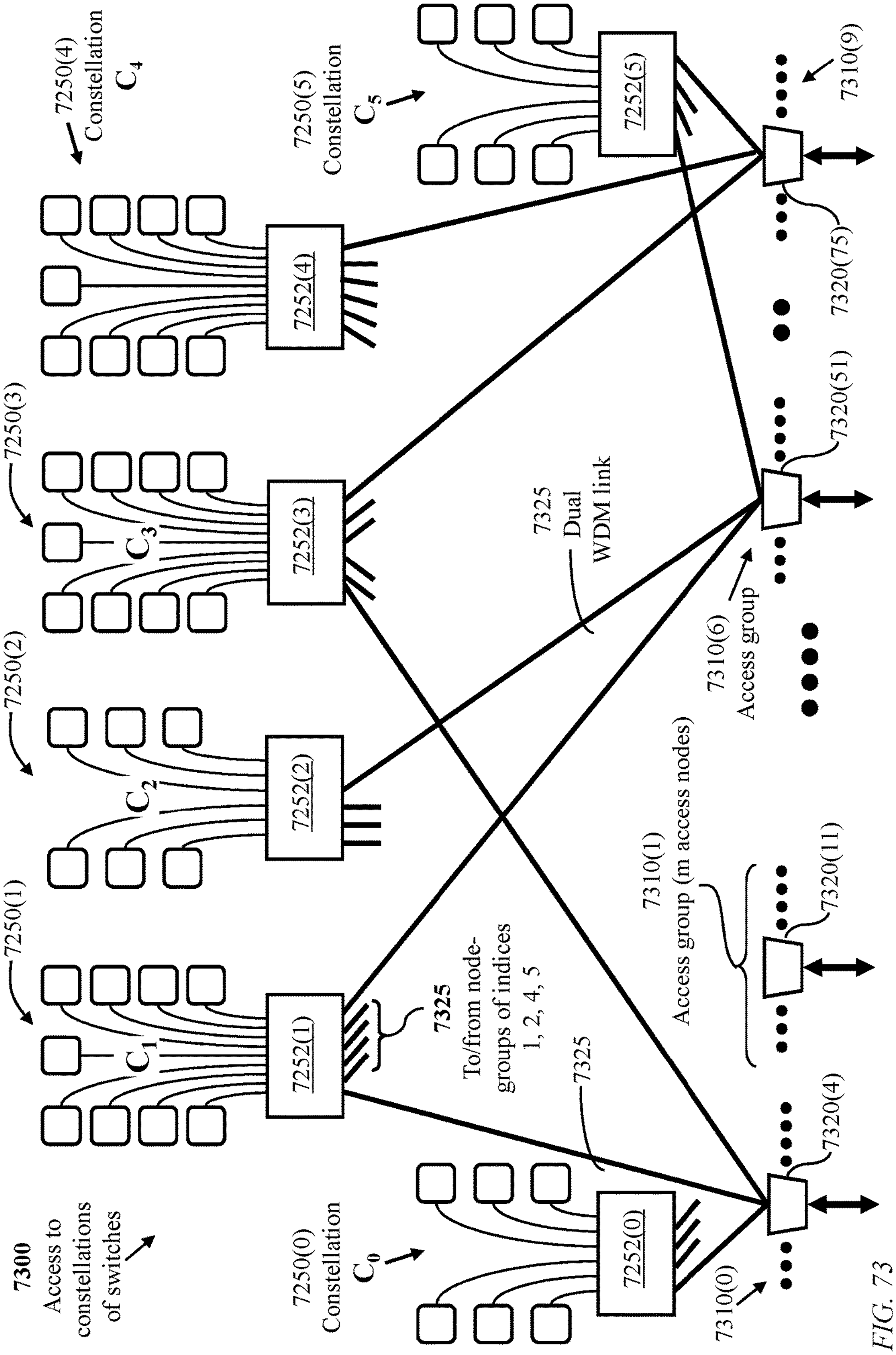
FIG. 73 illustrates connectivity of access nodes to the constellations of switches of FIG. 72, in accordance with an embodiment of the present invention.

FIG. 73 illustrates a switching system 7300 comprising access nodes connecting to the constellations of switches of FIG. 72. Each Group 7310 of access nodes 7320 connects to $\Pi$ respective constellations. Each access node is coupled to $\Pi$ dual WDM links 7325. Each WDM link 7325 is directed to a respective constellation and carries at most $\Omega$ spectral bands directed to respective switches of the constellation.

Figure 74:
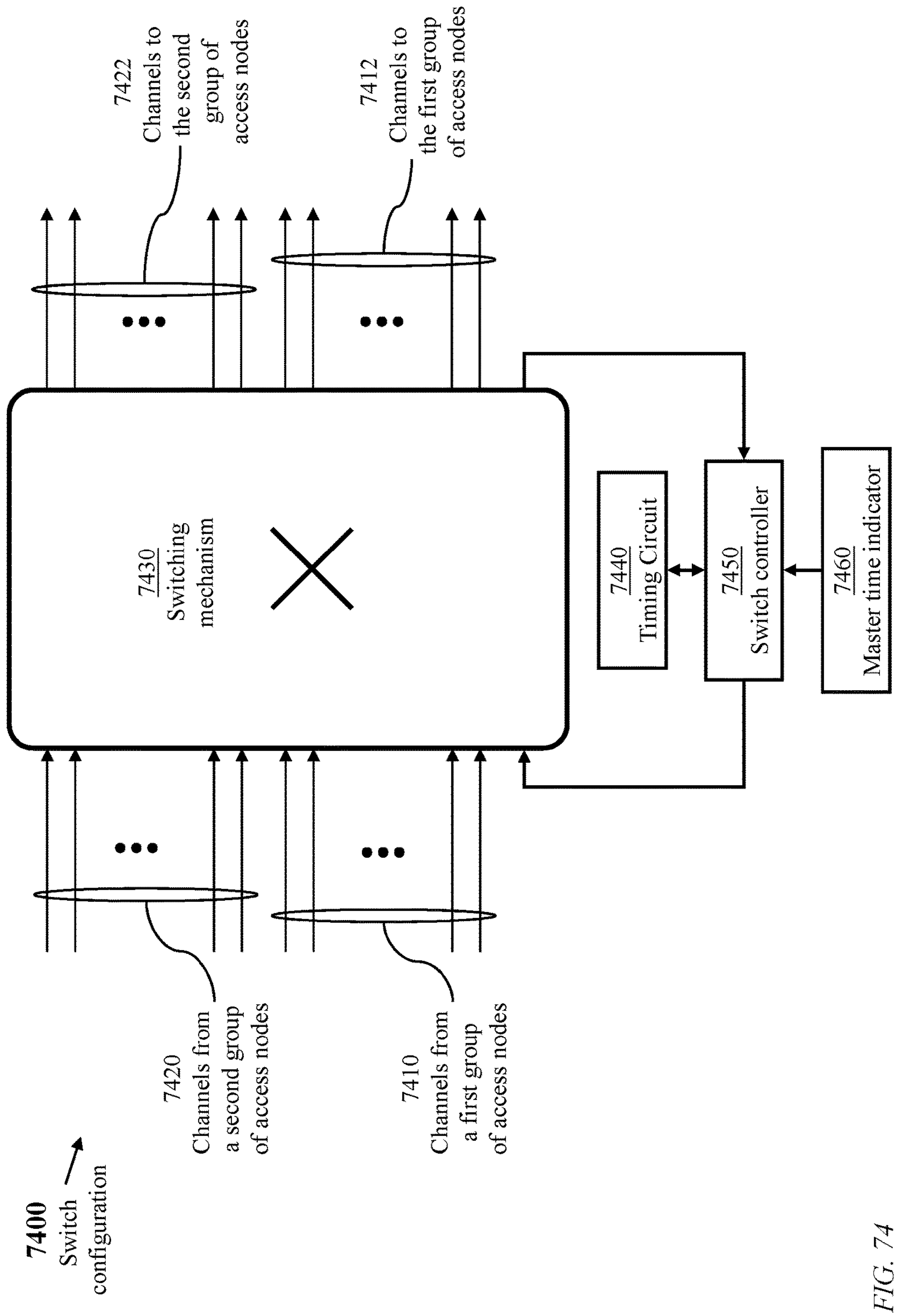
FIG. 74 illustrates a switch comprising a switching mechanism and a switch controller coupled to a timing circuit and a master time indicator, the switching mechanism coupled to two access groups through dual channels and the switch controller communicating with the access nodes through the switching mechanism.

FIG. 74 illustrates a configuration 7400 of a switch comprising a switching mechanism 7430 and a switch controller 7450 coupled to a timing circuit 7440 and a master time indicator 7460. Input ports of the switching mechanism 7430 receive data from a first access group through upstream channels 7410 and from a second access node group through upstream channels 7420. Output ports of the switching mechanism 7430 transmit data to the first access group through downstream channels 7412 and to the second access node group through downstream channels 7422. The switch controller communicates with the access nodes through the switching mechanism 7430.

A switch 5340 of the symmetrical switching system of FIG. 62 is coupled to two dual WDM links 6260 each connecting a respective dual spectral router coupled to a respective group of access nodes and carrying up to m dual spectral bands (m dual channels). A switch in the symmetrical switching system of FIG. 73 connects to m dual channels each carrying an upstream spectral band from a demultiplexer and a downstream spectral band to a multiplexer.

Figure 75:
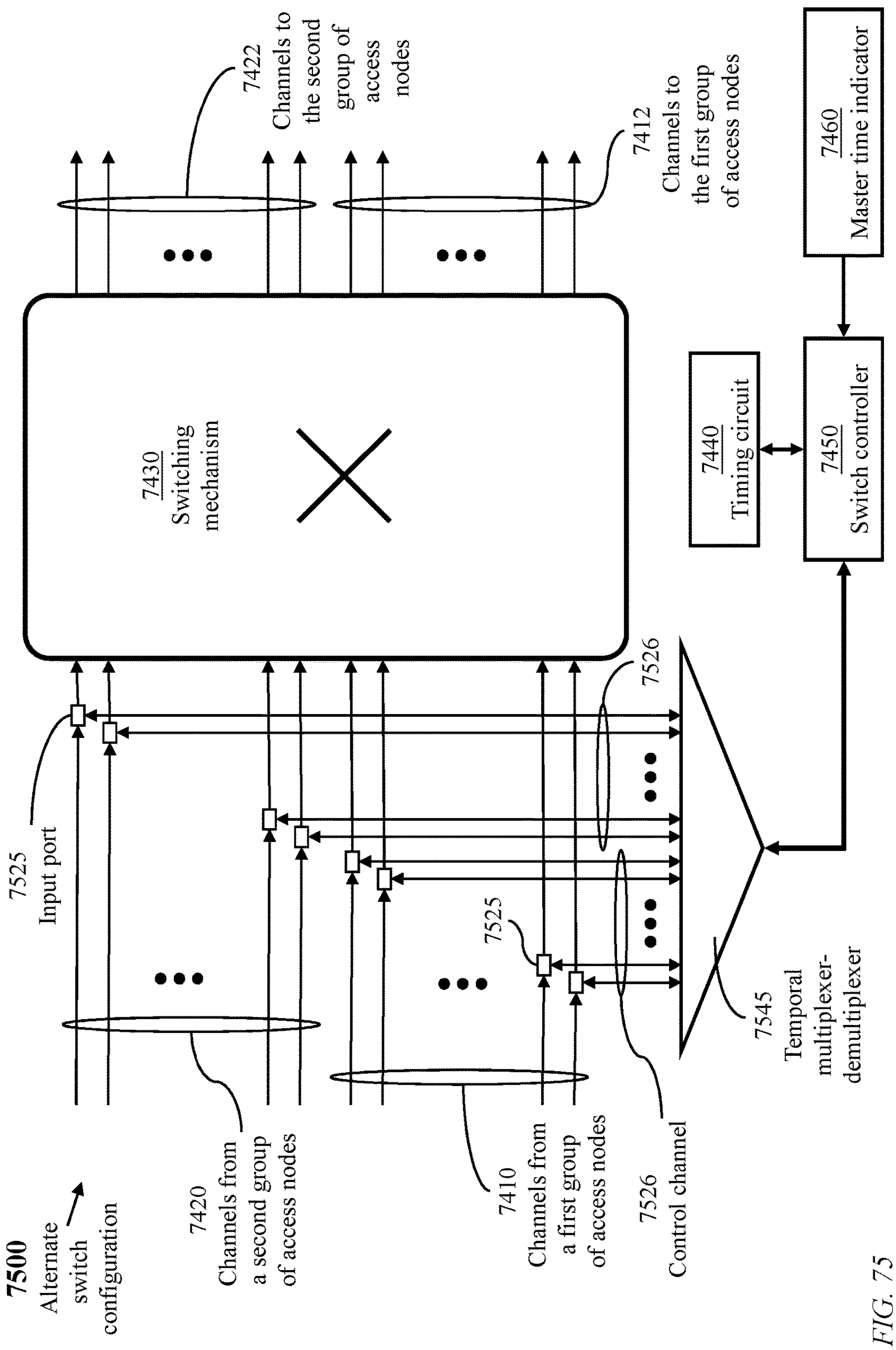
FIG. 75 illustrates a switch comprising a switching mechanism, a temporal multiplexer-demultiplexer coupled to ports of the switching mechanism, and a switch controller coupled to a timing circuit and a master time indicator, the switching mechanism coupled to two access groups through dual channels, and the switch controller communicating with the access nodes through the temporal multiplexer/demultiplexer.

FIG. 75 illustrates an alternate configuration 7500 of a switch comprising a switching mechanism 7430, a temporal multiplexer-demultiplexer 7545 coupled to input ports 7525 of the switching mechanism 7430, and a switch controller 7450 coupled to a timing circuit 7440 and a master time indicator 7460. The switching mechanism is coupled to two access groups through dual channels as in the configuration of FIG. 74. The switch controller 7450 communicates with the access nodes through the temporal multiplexer/demultiplexer 7545, dual control channels 7526 connecting to input ports 7525, and the switching mechanism.

Figure 76:
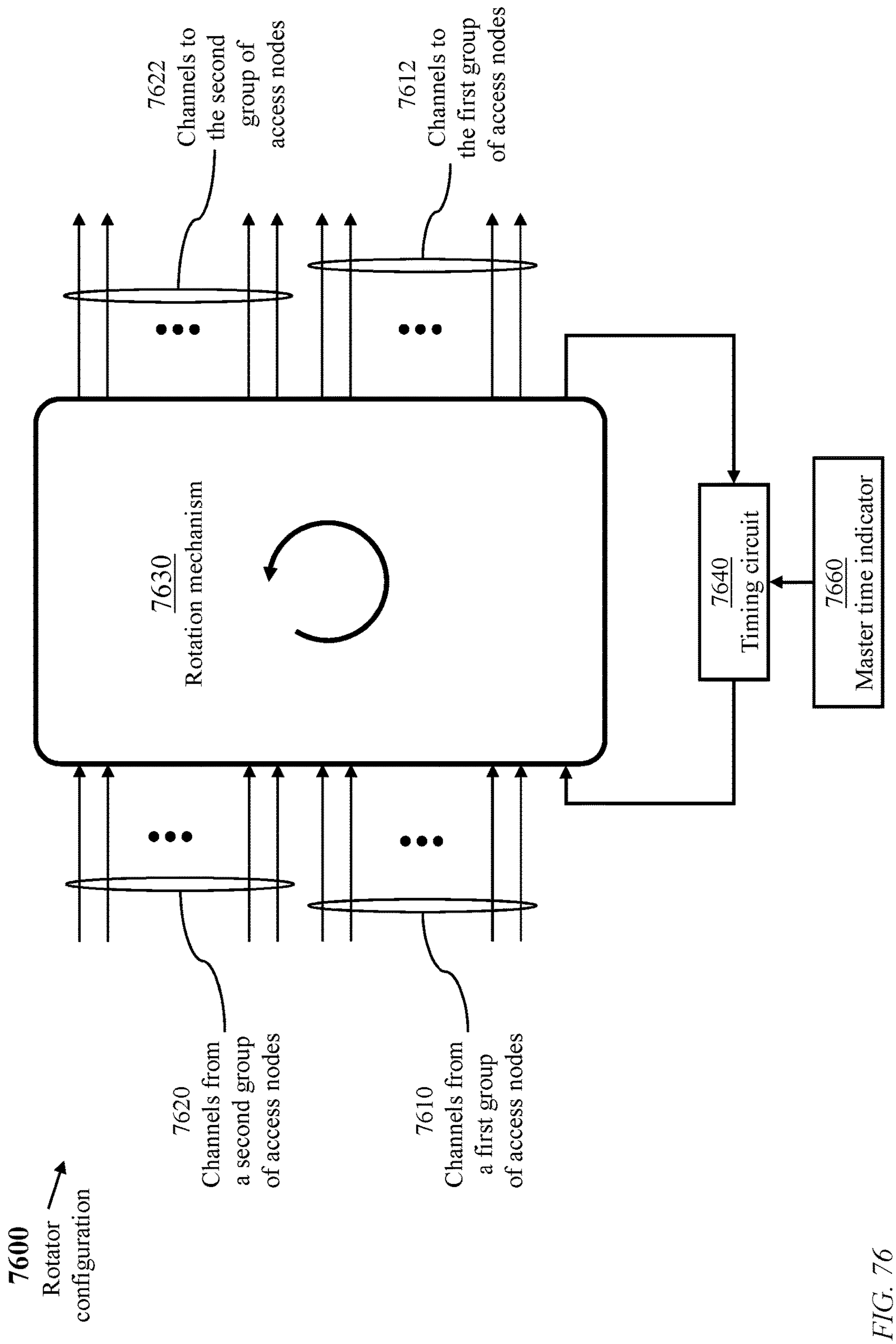
FIG. 76 illustrates a rotator and a timing circuit coupled a master time indicator, the rotator coupled to two access groups through dual channels, the timing circuit exchanging timing data with the access nodes through the rotator.

FIG. 76 illustrates a configuration 7600 of a rotator comprising a rotation mechanism 7630 and a timing circuit 7640 coupled a master time indicator 7660. Input ports of the rotation mechanism 7630 receive data from a first access group through upstream channels 7610 and from a second access node group through upstream channels 7620. Output ports of the rotation mechanism 7630 transmit data to the first access group through downstream channels 7612 and to the second access node group through downstream channels 7622. The timing circuit 7640 communicates with the access nodes through the rotation mechanism 7630.

The symmetrical switching system of FIG. 62 may employ rotators 5840 instead of switches 5340 and the symmetrical switching system of FIG. 73 may employ rotators instead of switches. In either case, the connectivity of the rotators to access nodes would be similar to the connectivity of the switches to the access nodes.

Figure 77:
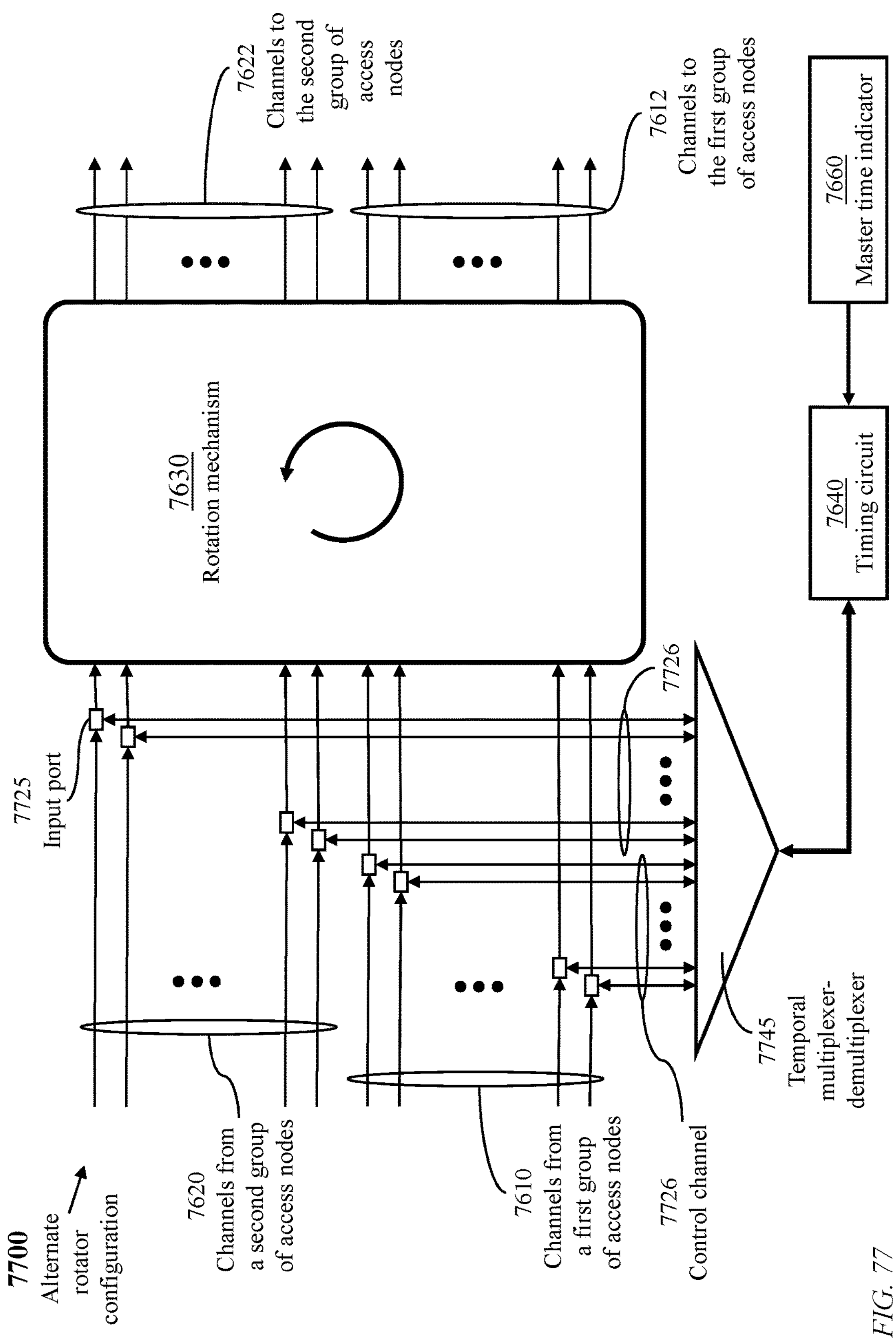
FIG. 77 illustrates a rotator, a temporal multiplexer-demultiplexer coupled to ports of the switching mechanism, and a timing circuit coupled to a master time indicator, the switching mechanism coupled to two access groups through dual channels, and the timing circuit exchanging timing data with the access nodes through the temporal multiplexer/demultiplexer.

FIG. 77 illustrates an alternate configuration 7700 of a rotator comprising a rotation mechanism 7630, a temporal multiplexer-demultiplexer 7745 coupled to input ports 7725 of the rotation mechanism 7630, and a timing circuit 7640 coupled to a master time indicator 7660. The rotation mechanism is coupled to two access groups through dual channels as in the configuration of FIG. 76. The timing circuit exchanges timing data with the access nodes through the temporal multiplexer/demultiplexer 7745, dual control channels 7726 connecting input ports 7725 to temporal multiplexer-demultiplexer 7745, and the rotation mechanism.

Figure 78:
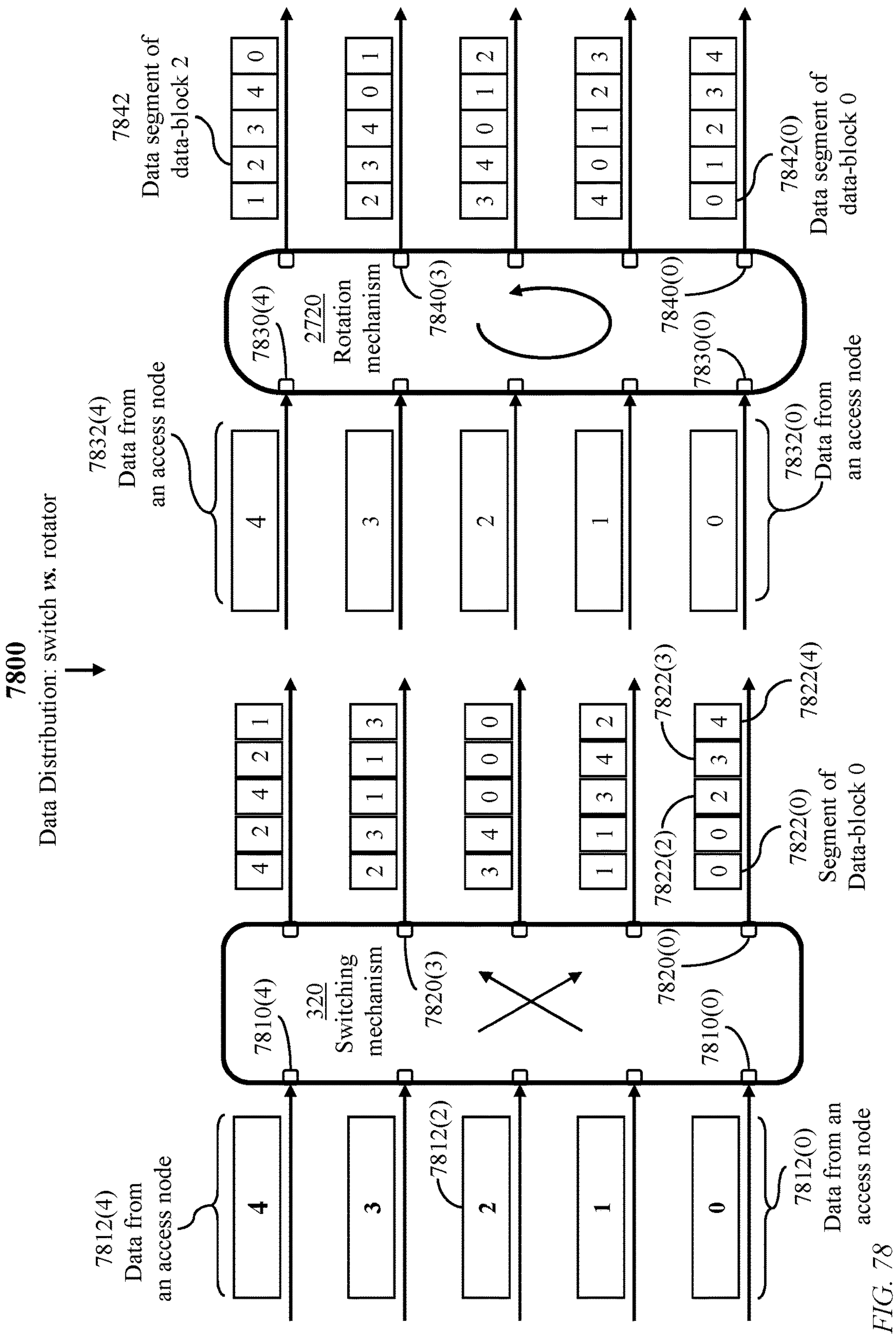
FIG. 78 compares data transfer through a switching mechanism with data transfer through a rotation mechanism.

FIG. 78 illustrates conventional data transfer through a switching mechanism and data transfer through a rotation mechanism. In the exemplary configurations 7800, a switch comprising switching mechanism 320 (FIG. 3) receives data blocks 7812(0) to 7812(4) from respective access nodes at switch input ports 7810 while a rotator comprising rotation mechanism 2720 (FIG. 27) receives data blocks 7832(0) to 7832(4) from respective access nodes at rotator input ports 7830.

A data block 7812 is formed at a respective access node and comprises data packets directed to different output ports 7820 of the switching mechanism. The data packets of each data block are formed at a respective access node and scheduled based on control-data exchange between a switch controller 350 (FIG. 3) and access nodes communicatively coupled to the switch. The control data includes timing-data exchanged between a timing circuit coupled to the switch controller and the access nodes coupled to the switch to enable temporal alignment of data received at the switch input ports 7810. The input ports of switching mechanism 320 may be configured to divide a data packet of arbitrary length into an integer number of data segments of equal sizes for transfer through the switching mechanism; the data packet being reassembled at output. Data block 7812(0) comprises five data segments where two data segments are directed to output port 7820(0) and three data segments are directed to output port 7820(2). Data block 7812(2) comprises five data segments directed to switch output ports 7820(0), 7820(1), 7820(3), and 7820(4) as illustrated. Switch output port 7820(0) receives two data segments 7822(0) belonging to data block 7812(0), one data segment 7822(2) belonging to data block 7812(2), one data segment 7822(3) belonging to data block 7812(3), and one data segment 7822(4) belonging to data block 7812(4).

A data block 7832 is formed at a respective access node and comprises data segments of equal sizes directed to different rotator output ports 7840 of the rotation mechanism. Thus, each data block 7832 comprises a same number of data segments each directed to a respective rotator output port 7840. The data segments of each data block are formed at a respective access node. Each rotator output port 7840 receives one data segment 7842 from each rotator input port 7830. As illustrated, rotator output 7840(3) cyclically receives data segments from rotator input ports 7830 of indices 2, 3, 4, 0, and 1. Likewise, each other rotator output port cyclically receives one data segment 7842 from each rotator input port 7830.

Timing-data exchange between a timing circuit 2750 (FIG. 27) and access nodes coupled to the rotator enable temporal alignment of data received at the rotator input ports 7830. An input data block 7812 or 7832 may include a null data segment.

Figure 79:
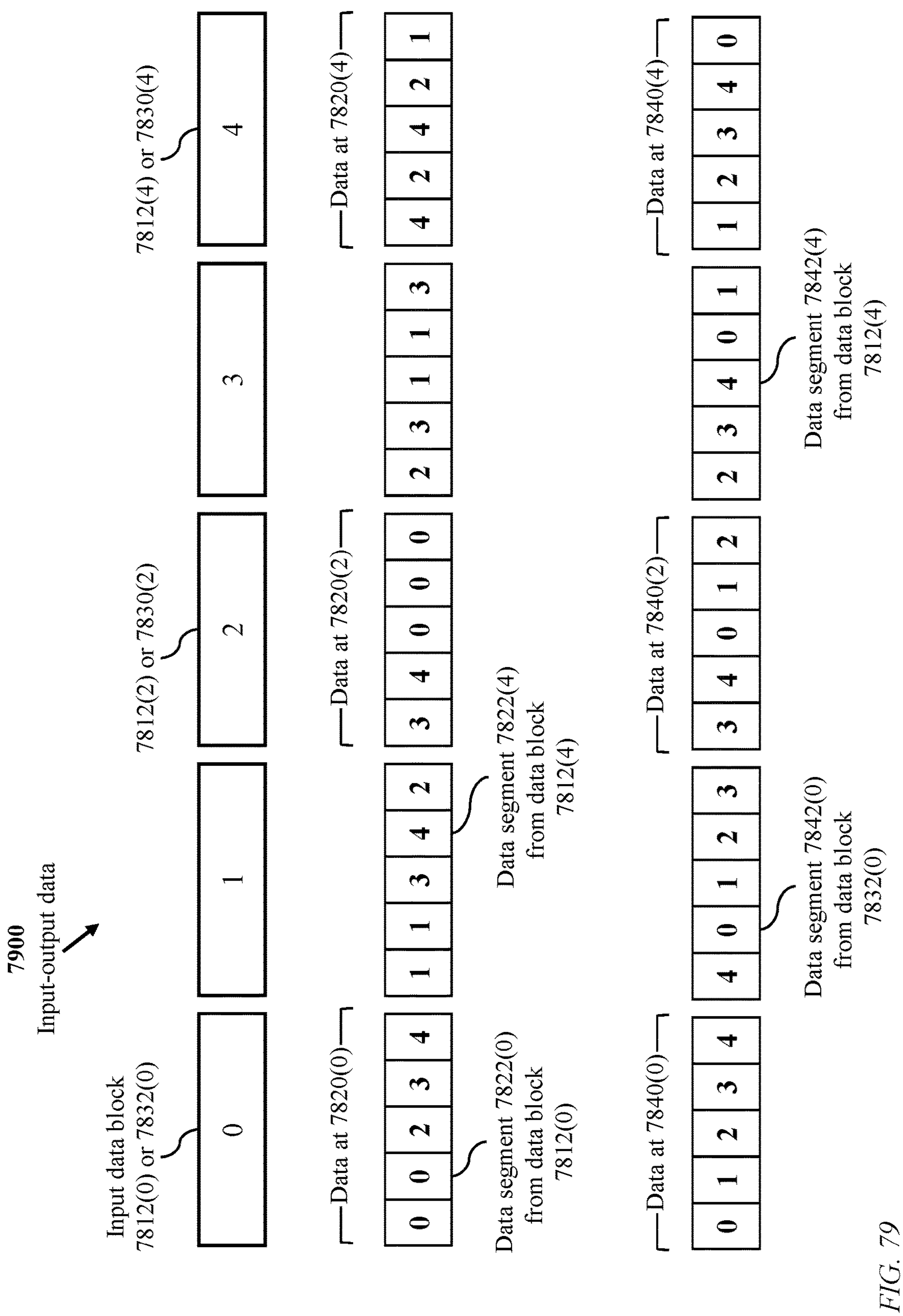
FIG. 79 illustrates further details of data transfer through a switching mechanism and data transfer through a rotation mechanism.

FIG. 79 illustrates further details 7900 of data transfer through a switching mechanism and data transfer through a rotator. Data segments of input data blocks 7812 presented to switching mechanism 320 are selectively distributed to output ports 7820 of the switching mechanism while data segments of input data blocks 7832 presented to rotation mechanism 2720 are cyclically distributed to output ports 7840 of the rotation mechanism. For example, output port 7820(3) receives one data segment from input port 7810(2), two data segments from input port 7820(1), and two data segments from input port 7810(3) while output port 7840(3) receives one data segment from each input port 7830.

Figure 80:
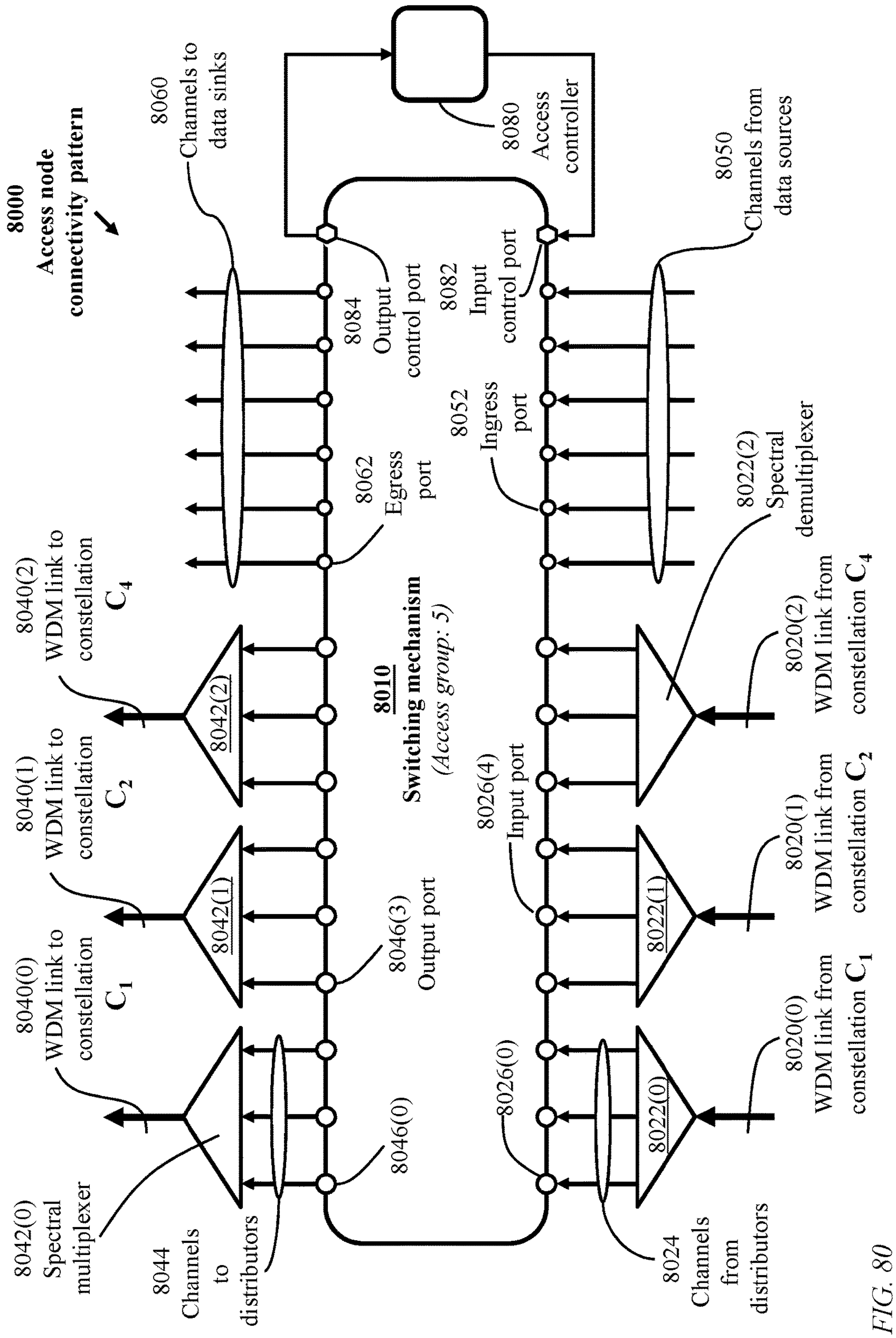
FIG. 80 illustrates a connectivity pattern of a specific access node to constellations of distributors, in accordance with an embodiment of the present invention.

FIG. 80 illustrates a connectivity pattern 8000 of a specific access node 220 to a respective subset of constellations of distributors of the set of constellations of FIG. 69 (further detailed in FIG. 72 and FIG. 73). The access node of FIG. 80 belongs to the access group of index 5 of FIG. 69 and comprises a switching mechanism 8010, a plurality of inner input ports 8026 connecting to inner input channels 8024 originating from distributors, a plurality of inner output ports 8046 connecting to inner output channels 8044 directed to distributors, a plurality of ingress ports 8052 connected to ingress channels 8050 originating from external data sources, a plurality of egress ports 8062 connecting to egress channels 8060 connecting to external data sinks, an input control port 8082 for receiving control data from an access controller 8080, and an output control port 8084 for transmitting control data to access controller 8080. A dual ingress/egress channel 8050/8060 may connect to a server or a set of network users.

As illustrated in FIG. 69, forty-five distributors are arranged into six constellations individually identified as 6950(0) to 6950(5) and labelled $C_0$, $C_1$, $C_2$, $C_3$, $C_4$, and $C_5$, respectively. Each of ten access groups indexed as 0 to 9 connects to respective nine distributors with each distributor connecting to two access groups.

Each of wavelength-division-multiplexed links (WDM links) 8020 originates from a constellation of distributors and carries channels 8024 directed to the access node 220. Each of WDM links 8040 terminates on a constellation of distributors and carries channels 8044 originating from the access node 220. As indicated in FIG. 69, the access group of index 6 connects to distributors of indices 15, 16, and 17 of constellation $C_1$, distributors of indices 18, 19, and 20 of constellation $C_2$, and distributors of indices 27, 34, and 42 of constellation $C_5$.

A WDM link 8020(0) carries spectrally-multiplexed channels from distributors of indices 15, 16, and 17 of constellation $C_1$, which are separated into respective individual channels 8024 using spectral demultiplexer 8022(0). A WDM link 8020(1) carries spectrally-multiplexed channels from distributors of indices 18, 19, and 20 of constellation C2, which are separated into respective individual channels 8024 using spectral demultiplexer 8022(1). A WDM link 8020(2) carries spectrally-multiplexed channels from distributors of indices 27, 34, and 42 of constellation $C_5$, which are separated into respective individual channels 8024 using spectral demultiplexer 8022(2).

Channels 8044 directed to distributors of indices 15, 16, and 17 of constellation $C_1$ are spectrally multiplexed onto WDM link 8040(0) using spectral multiplexer 8042(0). Channels 8044 directed to distributors of indices 18, 19, and 20 of constellation $C_2$ are spectrally multiplexed onto WDM link 8040(1) using spectral multiplexer 8042(1). Channels 8044 directed to distributors of indices 27, 34, and 42 of constellation $C_5$ are spectrally multiplexed onto WDM link 8040(2) using spectral multiplexer 8042(2).

Access controller 7050 of access node 7000 is configured to exchange time-alignment information with each distributor to which the access node connects through a respective dual channel. Access controller 7050 adjusts transmission time instants of data directed to a specific distributor according to respective time-alignment information.

Likewise access controller 8080 of access node 8000 is configured to exchange time-alignment information with each distributor to which access node 8000 connects through a respective dual channel and adjust transmission time instants of data directed to distributors accordingly.

Figure 81:
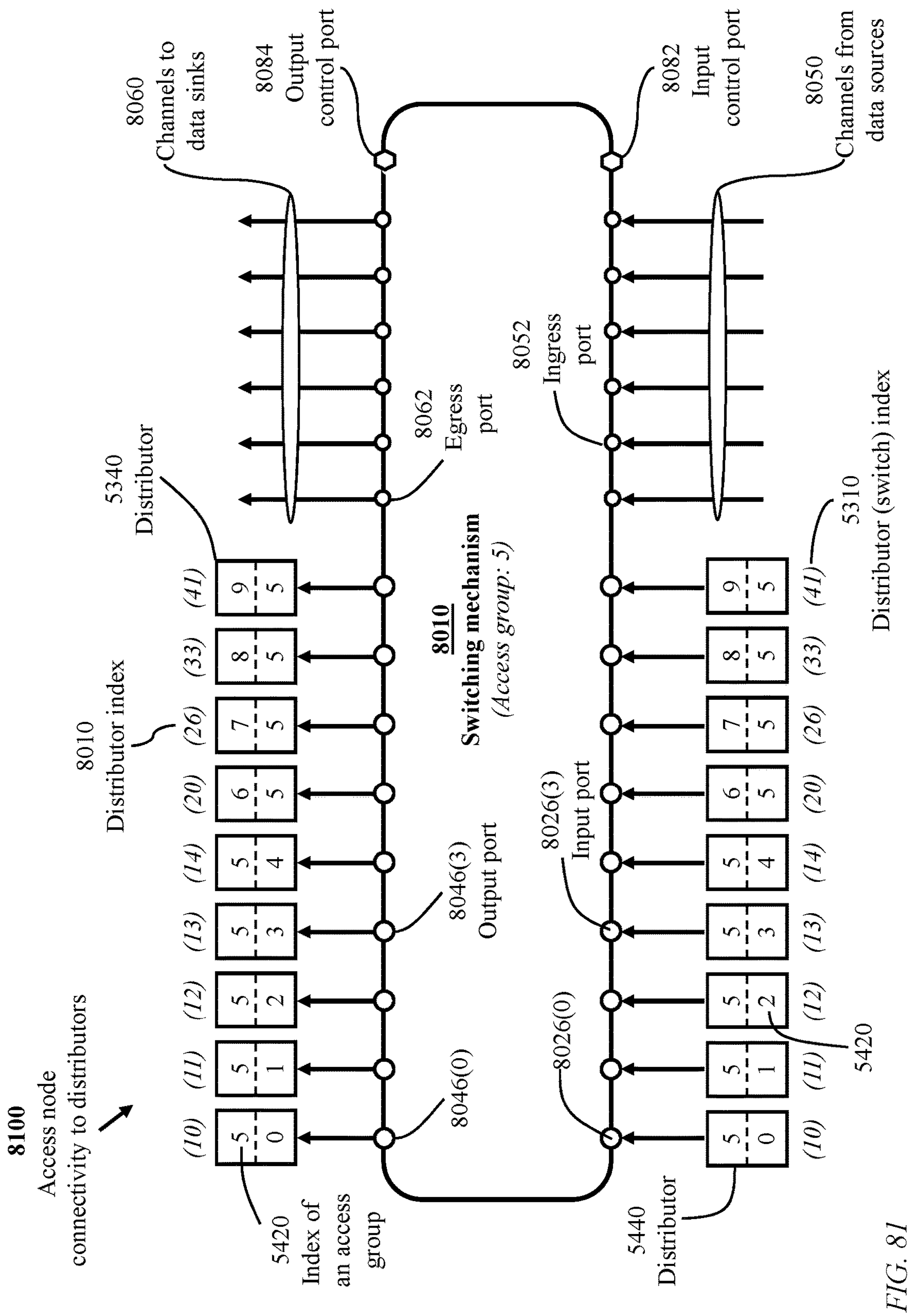
FIG. 81 illustrates connectivity of a specific access node to respective distributors, in accordance with an embodiment of the present invention.

FIG. 81 illustrates connectivity of the inner ports of an access node which belongs to the access group 5420 of index 5 to distributors (switches) 5340 based on the arrangement of FIG. 69. When the access controller 8080 of the access node receives a request to transfer data to a destination access node of an access group g, $0 \leq g < \mu$, where $\mu = 10$ in the exemplary case of FIG. 80, the access controller may select any of inner output ports 8046 if the destination access node belongs to the same access group (group of index 5) to which the source access node belongs. For destination access nodes belonging to the access groups of indices 0, 1, 2, 3, 4, 6, 7, 8, and 9, the access controller selects inner output ports 8046 of indices 0, 1, 2, 3, 4, 5, 6, 7, and 8, respectively in order to select preferred routes each traversing only one distributor.

If a preferred route is unavailable, the access controller may select any other inner output port and the route to destination would comprise two parts each traversing a respective distributor.

Figure 82:
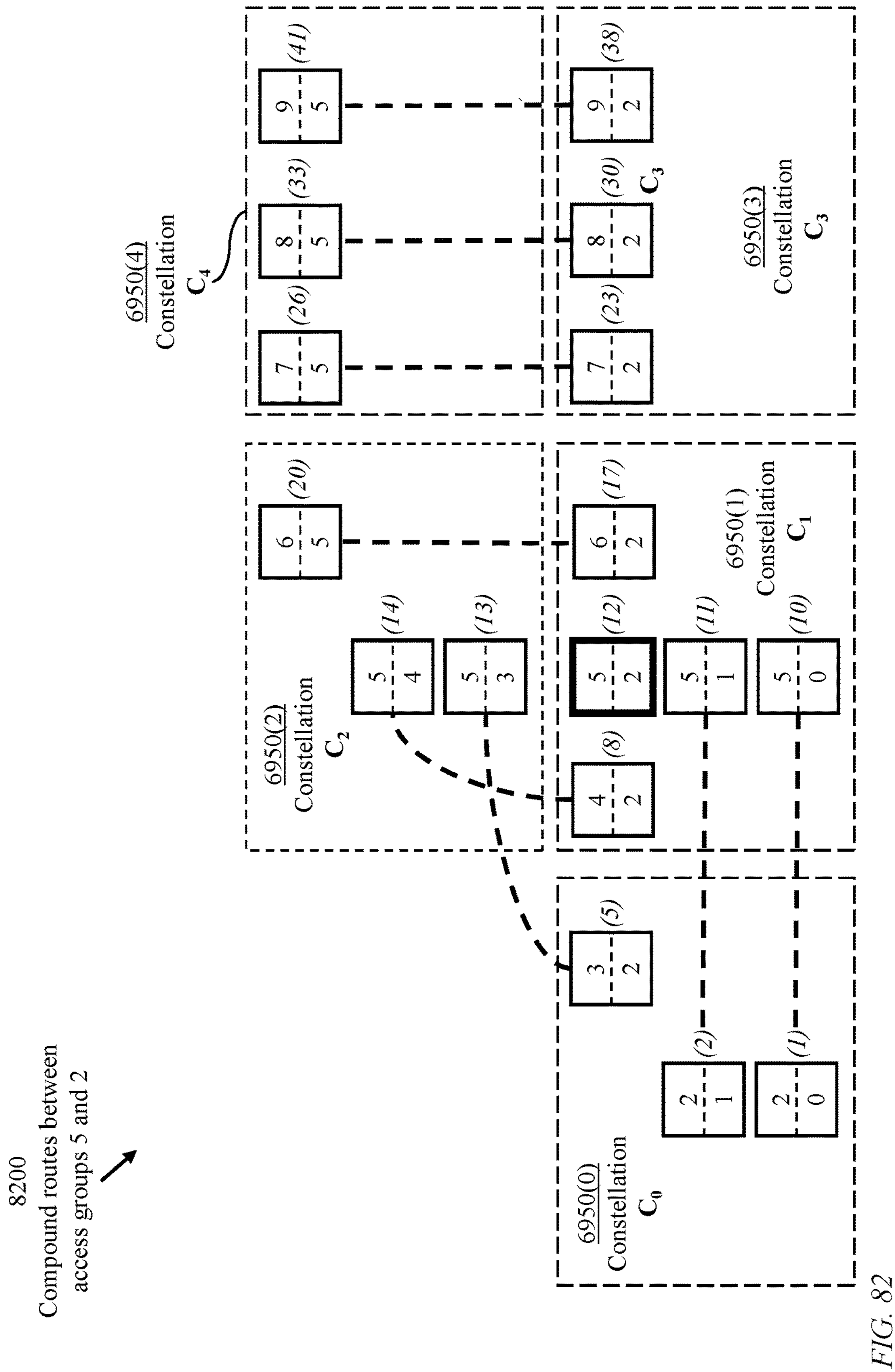
FIG. 82 illustrates compound routes originating from the specific access node of FIG. 81.

FIG. 82 illustrates a case where the destination access node belongs to the access group of index 2. The access controller selects inner output port 8046(2) which leads to the preferred distributor of index 12 that is coupled to the access groups of indices 5 and 2. If a path cannot be established through the preferred distributor, the access controller may select any of the inner output ports. As indicated, eight independent candidate sets of compound routes may be considered. In general, the number of candidate sets of compound routes is $(\mu - 2)$, where $\mu$ is the total number of access groups in the entire network.

Figure 83:
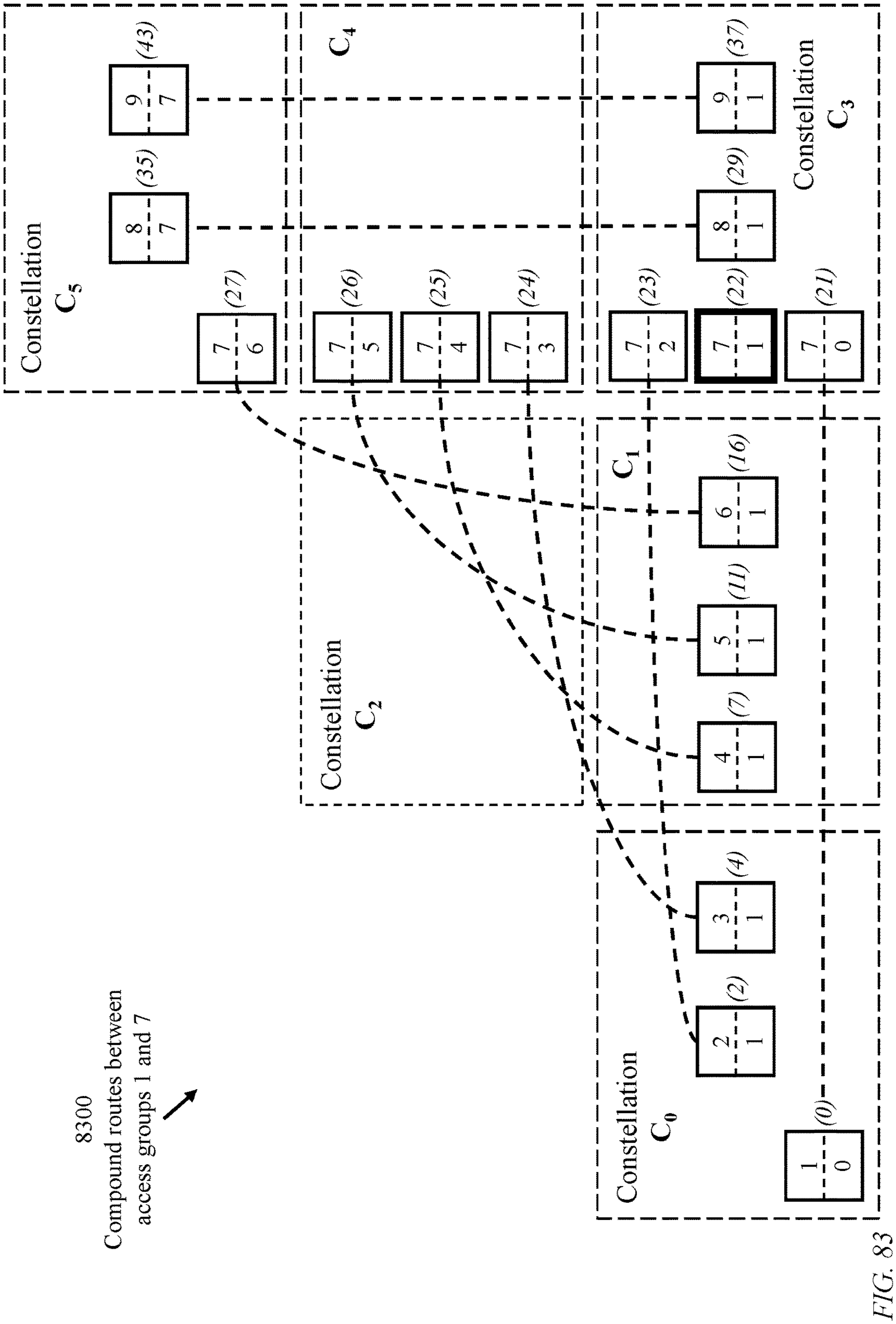
FIG. 83 illustrates compound routes for a selected access-group pair.

FIG. 83 illustrates a route traversing only one distributor and several compound routes between an access node belonging to the access group of index 1 and the access group of index 7. The route traversing only one distributor is effected through the distributor of index 22 which is accessible from any access node belonging to the access group of index 1 or the access group of index 7. Eight sets of compound routes, each traversing two distributors, are indicated.

Figure 84:
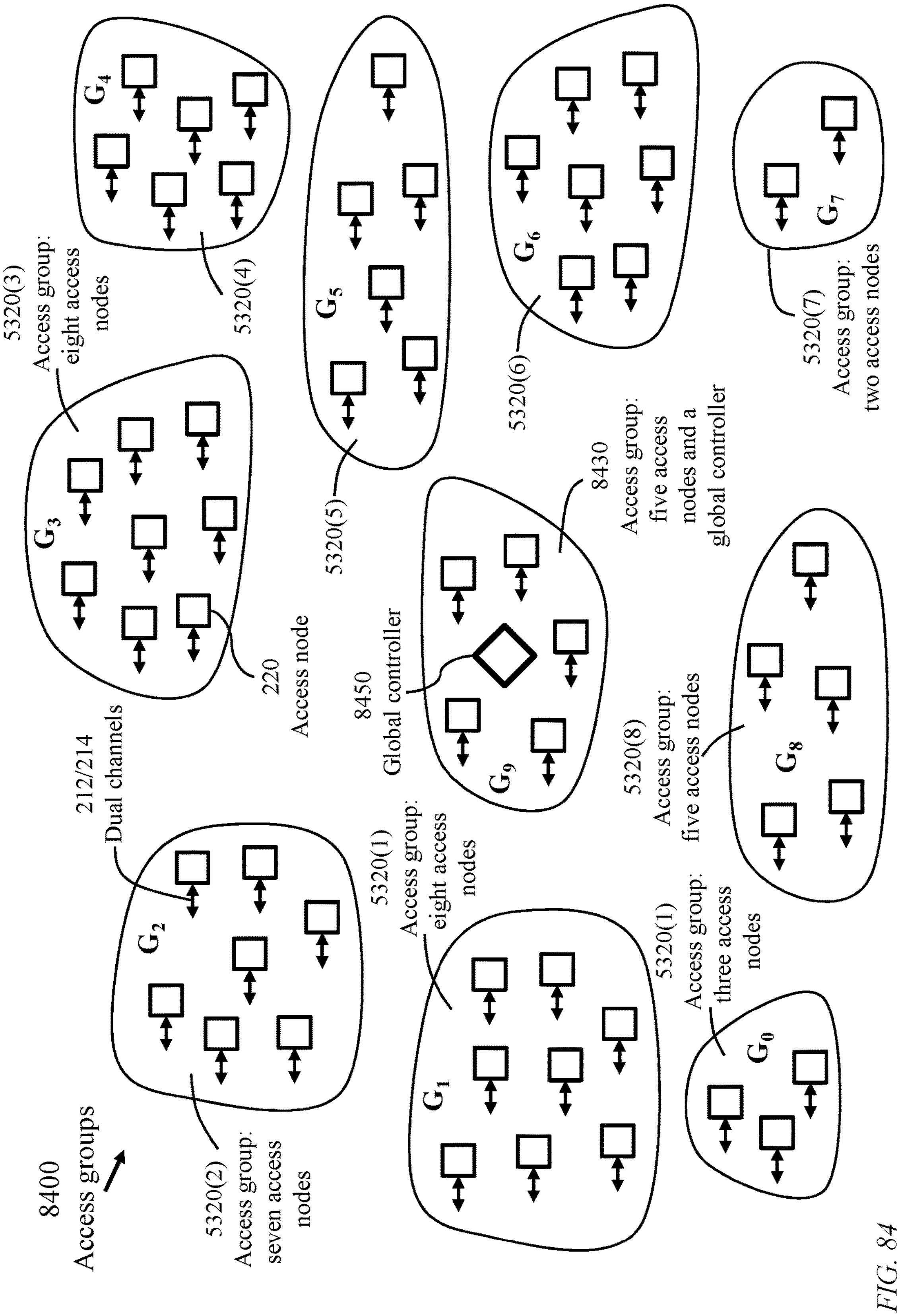
FIG. 84 illustrates arrangement of access nodes into access groups with one access group also including a global controller, in accordance with an embodiment of the present invention.

FIG. 84 illustrates arrangement of a plurality of access nodes 220 into nine access groups. Access groups 5320(0) to 5320(8), labeled $G_0$ to $G_8$, respectively, comprise different numbers of access nodes 220. An access group 8430, labeled $G_9$, comprises five access nodes 220 and a global controller 8450. As described above, an access node of a specific access group has a path to each access node of each other access group traversing only one distributor. An access node of any access group has multiple independent paths to each other access node of the same access group each traversing one distributor. The number of multiple independent paths is the number of distributors to which an access node connects. For example, an access node belonging to the access group of index 6 in the arrangement of FIG. 69 may connect to any other access node of the same access group through any of distributors 15, 16, 17, 18, 19, 20, 27, 34, and 42. Likewise, controller 8450 has a path to each access node of access groups G0 to $G_8$ traversing one distributor. However, controller 8450 has nine independent paths to each other access node of the same access group, $G_9$, each traversing one distributor.

Figure 85:
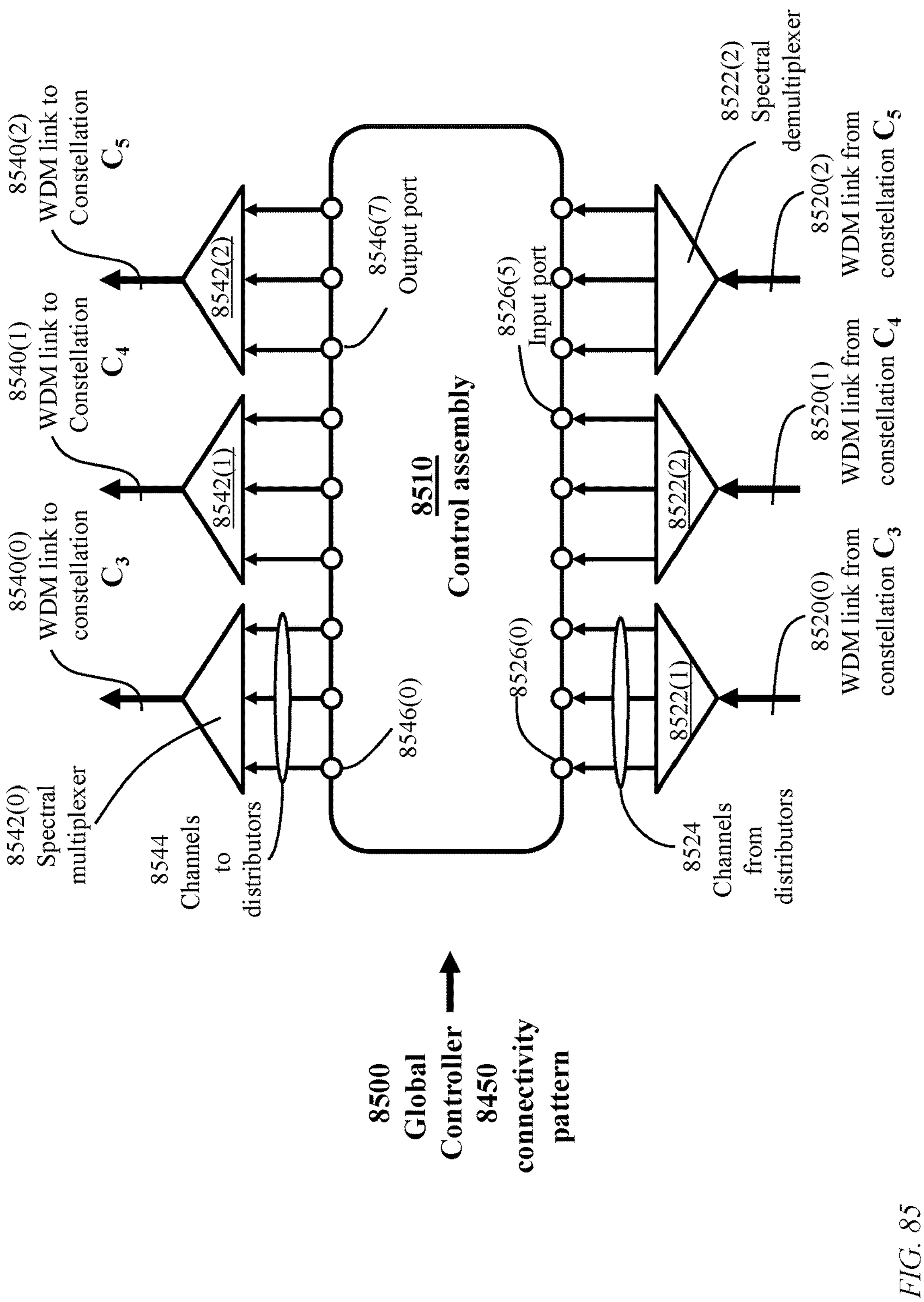
FIG. 85 illustrates a connectivity pattern of a global controller to constellations of distributors, in accordance with an embodiment of the present invention.

FIG. 85 illustrates a connectivity pattern 8500 of global controller 8450 to a respective subset of constellations of distributors of the set of constellations illustrated in FIG. 69 and FIG. 72. The global controller assembly 8150 belongs to the access group of index 9 of FIG. 69 and comprises a control assembly 8510 coupled to a plurality of input ports 8526 connecting to input channels 8524 originating from distributors, and a plurality of output ports 8546 connecting to output channels 8544 directed to distributors.

Each of wavelength-division-multiplexed links (WDM links) 8520 originates from a constellation of distributors and carries channels 8524. Each of WDM links 8540 terminates on a constellation of distributors and carries channels 8544. As indicated in FIG. 69, the access group of index 9 connects to distributors of indices 36, 37, and 38 of constellation $C_3$, distributors of indices 39, 40, and 41 of constellation $C_4$, and distributors of indices 42, 43, and 44 of constellation $C_5$. As illustrated in FIG. 69, the nine distributors of indices 36 to 44 connect to the access groups of indices 0 to 8, respectively, in addition to the access group of index 9. Thus, the control assembly 8510 has a downstream path to each access node 220 and an upstream path from each access node of the entire network, each upstream path and each downstream path traverses only one respective distributor. Preferably, each path to and from the control assembly is a dedicated path.

A WDM link 8520(0) carries spectrally-multiplexed channels from distributors of indices 36, 37, and 38 of constellation C3, which are separated into respective individual channels 8524 using spectral demultiplexer 8522(0). A WDM link 8520(1) carries spectrally-multiplexed channels from distributors of indices 39, 40, and 41 of constellation C4, which are separated into respective individual channels 8524 using spectral demultiplexer 8522(1). A WDM link 8520(2) carries spectrally-multiplexed channels from distributors of indices 42, 43, and 44 of constellation $C_5$, which are separated into respective individual channels 8524 using spectral demultiplexer 8522(2).

Channels 8544 directed to distributors of indices 36, 37, and 38 of constellation $C_3$ are spectrally multiplexed onto WDM link 8540(0) using spectral multiplexer 8542(0). Channels 8544 directed to distributors of indices 39, 40, and 41 of constellation $C_4$ are spectrally multiplexed onto WDM link 8540(1) using spectral multiplexer 8542(1). Channels 8544 directed to distributors of indices 42, 43, and 44 of constellation $C_5$ are spectrally multiplexed onto WDM link 8540(2) using spectral multiplexer 8542(2).

The control assembly 8510 comprises multiple hardware processors, multiple memory devices storing processor-executable instructions causing the hardware processors to perform the exchange of control data with access processors of the plurality of access nodes of the entire network, and multiple memory devices storing data relevant to overall network connectivity and states of network components. Thus, the contiguous network of the invention significantly facilitates both distributed control and global control where a control signal from any access node to any other access node traverses only one distributor and a control signal from the global controller to any access node, or vice versa, traverses only one distributor.

The network may employ two or more geographically distributed global controllers for increased reliability and expeditious global control.

The invention has been described with reference to particular example embodiments. The described embodiments are intended to be illustrative and not restrictive. Further modifications may be made within the purview of the appended claims, without departing from the scope of the invention in its broader aspect.

The invention claimed is:

1. A contiguous network comprising:

a plurality of access nodes arranged into a plurality of access groups, each access group comprising a respective set of access nodes; and a plurality of distributors, none of said distributors directly connecting to any other distributor, each distributor connecting to respective two access groups;

each access node having a dual channel to each distributor of a respective set of distributors selected so that each access group has a dual path to each other access group through a respective distributor of said plurality of distributors;

said each access node comprising a respective access controller comprising a memory device storing identifiers of paths to other access nodes each of said paths traversing only one distributor;

thereby the contiguous network provides a path from said each access node to each other access node traversing only one distributor.

2. The contiguous network of claim 1 wherein at least one access group comprises a global controller having a dual channel to each distributor of a designated set of distributors selected so that said global controller has a dual path to said each access node through a respective distributor of said plurality of distributors.

3. The contiguous network of claim 1 wherein at least one access node connects to dual channels coupled to data sources and sinks.

4. The contiguous network of claim 1 wherein at least one access node connects to dual channels coupled to servers of a plurality of servers.

5. The contiguous network of claim 1 wherein at least one access node connects to dual channels coupled to data sources and sinks and dual channels connecting to servers of a plurality of servers.

6. The contiguous network of claim 1 wherein said each distributor is coupled to a timing circuit for exchanging timing data with access nodes of said respective two access groups.

7. The contiguous network of claim 1 wherein an access group of index g, $0 \le g < \mu$, connects to $(\mu-1)$ distributors of indices:

$$\{j+g\times(g-1)/2\} \text{ for } 0 \le j < g, \text{ and}$$

$$\{g+j\times(j-1)/2\} \text{ for } g < j < \mu;$$

$\mu$ denoting a count of access groups of said plurality of access groups, said access groups indexed sequentially from 0 to $(\mu-1)$, and said distributors of said plurality of distributors indexed sequentially in steps of 1 starting from 0.

8. The contiguous network of claim 1 wherein an access group of index g and an access group of index h, $0<g<\mu$, $0 \le h<(\mu-1)$, $g>h$, connect to a distributor of index $\{h+g\times(g-1)/2\}$, $\mu$ denoting a count of said access groups, said access groups of said plurality of access groups indexed sequentially from 0 to $(\mu-1)$, and said distributors of said plurality of distributors indexed sequentially in steps of 1 starting from 0.

9. The contiguous network of claim 1 wherein:

said plurality of distributors is arranged into a plurality of constellations;

said each access node connects to a respective set of constellations, of said plurality of constellations, collectively containing said respective set of distributors through a set of multichannel links; and each multichannel link to a constellation carries a set of dual channels connecting through a spectral demultiplexer and a spectral multiplexer to a subset of distributors of said respective set of distributors.

10. The contiguous network of claim 9 wherein said identifiers comprise an identifier of a specific multichannel link of said set of multichannel links and an identifier of a dual channel within said specific multichannel link.

11. The contiguous network of claim 9 wherein said respective set of constellations comprises $\Pi$ constellations and said set of dual channels comprises $\Omega$ dual channels, $\Pi$ and $\Omega$ being positive integers selected so that $(\Pi\times\Omega)\ge(\mu-1)$, $\mu$ denoting a count of said access groups of said plurality of access groups, $\mu>4$.

12. The contiguous network of claim 9 wherein:

an access group of index g, $0 \le g<\mu$, connects to $(\mu-1)$ distributors of indices:

$$\{j+g\times(g-1)/2\} \text{ for } 0 \le j < g, \text{ and}$$

$$\{g+j\times(j-1)/2\} \text{ for } g < j < \mu;$$

and a constellation of index $\{(q\times(q+1))/2+p\}$, $0\leq p<\Pi$, $p\leq q<\Pi$, comprises distributors of indices: $\{j+k\ (k-1)/2\}$, $k>j$, where $$[p\times\Omega]\leq j<[\Omega\times(p+1)] \text{ and}$$

$$[(q\times\Omega)+1]\leq k\leq[\Omega\times(q+1)];$$

μ denoting a count of access groups of said plurality of access groups, said access groups indexed sequentially from 0 to (μ−1), and said distributors of said plurality of distributors indexed sequentially in steps of 1 starting from 0.

13. The contiguous network of claim 1 wherein at least one distributor of said plurality of distributors is configured as an optical rotator.

14. The contiguous network of claim 1 wherein at least one distributor of said plurality of distributors is configured as an optical switch comprising:

a plurality of dual ports connecting to access nodes of a respective pair of access groups; and a respective switch controller.

15. A contiguous network comprising:

a plurality of access nodes arranged into a plurality of access groups, each access group comprising a respective set of access nodes; and a plurality of distributors arranged into a set of constellations;

wherein:

each pair of access groups connects to a respective distributor of said plurality of distributors;

each access node of said plurality of access nodes connects to each constellation of a respective subset of constellations through a respective dual multichannel link; and each dual channel of said respective dual multichannel link connects to a respective distributor within said each constellation;

said respective subset of constellations and said respective distributor being selected so that said each access node has a path to each other access node of said plurality of access nodes traversing only one distributor;

thereby the contiguous network provides a dual path from each access node to each other access node traversing only one distributor.

16. The contiguous network of claim 15 wherein said each access node is coupled to a respective access controller configured to:

exchange time-alignment information with said respective distributor through said each dual channel; and adjust transmission time instants of data directed to said respective distributor according to said time-alignment information.

17. The contiguous network of claim 15 wherein said each access node comprises a switching mechanism coupled to a plurality of inner dual ports wherein said respective dual multichannel link is coupled to a respective number of inner dual ports of said plurality of inner dual ports through a spectral demultiplexer and a spectral multiplexer, thereby each dual inner port has a dual channel connecting to a selected distributor of said plurality of distributors.

18. A method of routing comprising:

arranging a plurality of access nodes into a plurality of access groups, each access node comprising a respective access controller comprising a memory device and each access group comprising a respective set of access nodes; and connecting each pair of access groups to a respective distributor of a plurality of distributors where none of said distributors directly connects to any other distributor;

configuring a controller of said respective distributor to selectively interconnect access nodes of said each pair of access groups;

storing in said memory device identifiers of paths from said each access node to other access nodes each said path traversing only one distributor; and transferring data to said other access nodes through said paths.

19. The method of claim 18 further comprising:

arranging said plurality of distributors into a plurality of constellations;

connecting said each access node to each constellation of a respective set of constellations of said plurality of constellations through a respective multichannel link carrying a set of dual channels connecting to a subset of distributors of said each constellation.

20. The method of claim 19 further comprising selecting a number Ω of dual channels of said set of dual channels and a number Π of constellations of said respective set of constellations so that $(\Pi\times\Omega)\geq(\mu-1)$, said plurality of access groups comprising μ access groups, $\Omega>1$, $\Pi>1$, and $\mu>4$.

* * * * *